(12) United States Patent
Layman, Jr.

(10) Patent No.: US 11,667,736 B2
(45) Date of Patent: Jun. 6, 2023

(54) PROCESS AND HYDROCARBON SOLUBLE SALINE HYDRIDE CATALYST FOR HYDROGEN MEDIATED SALINE HYDRIDE INITIATED ANIONIC CHAIN TRANSFER POLYMERIZATION AND POLYMER DISTRIBUTION COMPOSITIONS PRODUCED THEREFROM

(71) Applicant: ALBEMARLE CORPORATION, Charlotte, NC (US)

(72) Inventor: William J. Layman, Jr., Baton Rouge, LA (US)

(73) Assignee: ALBEMARLE CORPORATION, Charlotte, NC (US)

(*) Notice: Subject to any disclaimer, the term of this patent is extended or adjusted under 35 U.S.C. 154(b) by 177 days.

(21) Appl. No.: 17/184,774

(22) Filed: Feb. 25, 2021

(65) Prior Publication Data

US 2022/0002454 A1  Jan. 6, 2022

Related U.S. Application Data

(62) Division of application No. 16/091,795, filed as application No. PCT/US2017/025926 on Apr. 4, 2017, now Pat. No. 10,941,226.

(Continued)

(51) Int. Cl.
C08F 112/08 (2006.01)
C08F 2/38 (2006.01)

(52) U.S. Cl.
CPC ........ C08F 112/08 (2013.01); *C08F 2810/00* (2013.01)

(58) Field of Classification Search
CPC .... C08F 112/08; C08F 2810/00; C08F 4/488; C08F 2/38
See application file for complete search history.

(56) References Cited

U.S. PATENT DOCUMENTS 3,520,858 A  7/1970  Bodnar et al.
3,992,561 A  11/1976  Hargis et al.
(Continued)

FOREIGN PATENT DOCUMENTS

EP  0316857 A2  5/1989
EP  0659775 A2  6/1995
(Continued)

OTHER PUBLICATIONS

Murahashi, S., et al., Polymerization of Styrene with the Ziegler-Natta Catalysis in the Presence of Molecular Hydrogen, Mar. 1960, pp. 431-432, vol. 33, No. 3, Department of Polymer Science, Osaka University, Nakanoshima, Osaka.
(Continued)

*Primary Examiner* — Catherine S Branch
(74) *Attorney, Agent, or Firm* — Troy S. Kleckley; Nathan C. Dunn

(57) ABSTRACT

This invention relates to processes for forming hydrogen mediated saline hydride initiated anionic polymer distributions via novel polymerization conditions in which molecular hydrogen is a chain transfer agent and a Lithium Aminoalkoxide Complexed Saline Hydride (LOXSH) forms an anionic polymer chain initiating species by addition of saline hydride to an anionically polymerizable hydrocarbon monomer. This invention further relates to polystyrene compositions having greatly improved microstructures free of co-product polymer chain distributions. This invention also relates to novel hydrocarbon soluble saline hydride catalyst and reagent compositions useful in conducting the hydrogen mediated saline hydride initiated polymerizations of this invention. This invention further relates to hydrocarbon soluble lithium hydride catalysts and reagent compositions formed from dimethylaminoethanol, an alkyllithium reagent and molecular hydrogen. It also relates to the catalyst (Continued)

forming processes, the use of the catalyst in hydrogen mediated anionic polymerization of styrene (HMAPS) and the resulting low molecular weight polystyrene distributions of low asymmetry and high "head to tail" microstructure.

20 Claims, 17 Drawing Sheets

Related U.S. Application Data

(60) Provisional application No. 62/320,003, filed on Apr. 8, 2016, provisional application No. 62/318,258, filed on Apr. 5, 2016.

(56) References Cited

U.S. PATENT DOCUMENTS

| | | | |
|---|---|---|---|
| 5,143,990 | A | 9/1992 | Gibler et al. |
| 6,444,762 | B1 | 9/2002 | Fischer et al. |
| 8,217,120 | B2 | 7/2012 | Dershem |
| 2007/0161763 | A1 | 7/2007 | Desbois |
| 2011/0130520 | A1 | 6/2011 | Layman, Jr. |

FOREIGN PATENT DOCUMENTS

| | | |
|---|---|---|
| EP | 0741147 A1 | 11/1996 |
| WO | 2002008299 A1 | 1/2002 |
| WO | 2005090414 A1 | 9/2005 |
| WO | 2008154453 A1 | 12/2008 |
| WO | 2010065468 A1 | 6/2010 |

OTHER PUBLICATIONS

Broaddus, C.D., Homogeneous Metalation of Alkylbenzenes, The Journal of Organic Chemistry, Jan. 1970, pp. 10-15, vol. 35, No. 1.
Buncel, E., et al., Carbanion Mechanisms. 6.1 Metalation of Arylmethanes by Potassium Hydride/18-Crown-6 Ether in Tetrahydrofuran and the Acidity of Hydrogen, Journal of the American Chemical Society, Jun. 22, 1977, pp. 4457-4461, vol. 99, No. 13.
Ashby, E.C., et al., The Preparation of the Soluble ROMg2H3 Compounds and Their Unusual Stereoselectivity in the Reduction of Cyclohexanones, Tetrahedron Letters, 1977, pp. 3133-3136, No. 36.
Ashby, E.C., et al., Reactions of Magnesium Hydrides. 1. Reduction of Organic Functional Compounds by Magnesium Hydride and 2,6-Diisopropylphenoxymagnesium Hydride, The Journal of Organic Chemistry, 1978, pp. 1557-1560, vol. 43, No. 8.
Rudin, A., The Elements of Polymer Science and Engineering: An Introductory Text for Engineers and Chemists, Academic Press, 1982, pp. 54-58.
Pi, R., et al., Representative Metalation and Reduction Reactions of the Superactive Metal Hydrides LiH, NaH, and KH, The Journal of Organic Chemistry, 1987, p. 4299, vol. 52.
Michalczyk, M., Synthesis of Magnesium Hydride by the Reaction of Phenylsilane and Dibutylmagnesium, Organometallics, 1992, p. 2307, vol. 11.
Zhang, Y., et al., Highly Active Alkali Metal Hydrides; Their Catalytic Syntheses and Properties, Journal of Molecular Catalysis, 1993, pp. 211-221, vol. 84, Elsevier Science Publishers, Amsterdam.
Daasbjerg, K., Estimation of the pKa for Some Hydrocarbons and Aldehydes and Solvation Energies of the Corresponding Anions, Acta Chemica Scandanavia, 1995, pp. 878-887, vol. 49, Belgium.
Delong, G., et al., Decomposition of tert-Butyllithium/Lithium tert-Butoxide Mixed Aggregates: NMR Evidence for the Formation of Novel Mixed Lithium Hydride/Lithium tert-Butoxide Aggregates, Journal of the American Chemical Society, 1997, p. 11998, vol. 119.
Hoffmann, D., et al., X-Ray Structural Analysis of a Novel Lithium Hydride/Lithium tert-Butoxide Superaggregate Li33H17(OtBu)16, Angewandte Chemie International Edition, 1998, pp. 1537-1539, vol. 37, No. 11.
Tomotsu, N., et al., Syndiospecific Polymerization of Styrene, Journal of Molecular Catalysis A: Chemical, 1998, pp. 167-190, vol. 127, Elsevier Science Publishers.
Fix This—Menoret, S., et al., Initiation of Retarded Styrene Anionic Polymerization Using Complexes of Lithium Hydride with Organometallic Compounds, Macromolecules, 2003, pp. 5988-5994, vol. 36.
Carlotti, S., et al., Sodium Hydride/Trialkylaluminum Complexes for the Controlled Anionic Polymerization of Styrene at High Temperature, Macromolecular Rapid Communications, 2006, pp. 905-909, vol. 27, Wiley Interscience.
Carlotti, S., et al., Sodium Hydride as a New Initiator for the Retarded Anionic Polymerization (RAP) of Styrene, Polymer, 2007, pp. 4322-4327, vol. 48, Elsevier Science Publishers.
Stasch, A., A Hydrocarbon-Soluble Lithium Hydride Complex, Angewandte Chem. International Edition, 2012, pp. 1930-1933, No. 51.
Fohlmeister, L., et al., Alkali Metal Hydride Complexes: Well-Defined Molecular Species of Saline Hydrides, Australian Journal of Chemistry, 2015, pp. 1190-1201, vol. 68, CSIRO Publishing.
International Search Report and Written Opinion of corresponding international application No. PCT/US2017/026340 dated Jul. 14, 2017.
International Preliminary Report on Patentability of corresponding international application No. PCT/US2017/026340 dated Oct. 23, 2018.

PROCESS AND HYDROCARBON SOLUBLE SALINE HYDRIDE CATALYST FOR HYDROGEN MEDIATED SALINE HYDRIDE INITIATED ANIONIC CHAIN TRANSFER POLYMERIZATION AND POLYMER DISTRIBUTION COMPOSITIONS PRODUCED THEREFROM

CROSS-REFERENCE TO RELATED APPLICATIONS

This application, filed Feb. 25, 2021, is a Divisional Application claiming the benefit of U.S. patent application Ser. No. 16/091,795 filed Oct. 5, 2018, which is a national entry under 35 U.S.C. § 371 of and claims the benefit of Patent Cooperation Treaty Application No. PCT/US2017/025926, which claims priority to and the benefit of U.S. Provisional Application 62/318,258, filed Apr. 5, 2016, and U.S. Provisional Application 62/320,003, filed Apr. 8, 2016, the entire contents and substance of all of which are hereby incorporated by reference as if fully set forth below.

TECHNICAL FIELD

This invention relates processes for forming hydrogen mediated saline hydride initiated anionic polymer distributions via novel polymerization conditions in which molecular hydrogen is a chain transfer agent and a Lithium Aminoalkoxide Complexed Saline Hydride (LOXSH) forms an anionic polymer chain initiating species by addition of saline hydride to an anionically polymerizable hydrocarbon monomer; all of which takes place in a very efficient to highly efficient catalytic cycle where the kinetic chain length distribution is mediated by hydrogen or otherwise set by the relative feed rate of hydrogen to monomer. This invention further relates polystyrene compositions having greatly improved microstructures free of co-product polymer chain distributions. This invention also relates novel hydrocarbon soluble saline hydride catalyst and reagent compositions useful in conducting the hydrogen mediated saline hydride initiated polymerizations of this invention. This invention further relates to hydrocarbon soluble lithium hydride catalysts and reagent compositions formed from dimethylaminoethanol (a.k.a. dimethylethanolamine), an alkyllithium reagent and molecular hydrogen, it also relates the catalyst forming processes, the use of the catalyst in hydrogen mediated anionic polymerization of styrene (HMAPS) and the resulting low molecular weight polystyrene distributions of low asymmetry and high "head to tail" microstructure.

BACKGROUND OF THE INVENTION

Low molecular weight—$M_w$<<4000 Daltons—polystyrene compositions are useful in a variety of applications both in their end use such as polymer slip reagents (see EPO 741147) or as substrate precursor's for further synthetic derivatization. Such synthetic derivatizations entail aromatic electrophilic substitution reactions (see: U.S. Pat. No. 8,217,120B2 "Functionalized styrene oligomers and polymers"). Anionic chain transfer polymerization of polystyrene provides an economic benefit due to the cost-effective efficient use of the anionic chain transfer catalyst when forming low molecular weight polystyrene compositions due to substantial reduction in the amounts of organolithium reagents and other alkali earth metal regents used in forming the chain transfer initiators and catalysts. Accordingly, methyl benzene compounds (toluene). polym- ethylbenzene compounds (xylenes, mesitylene, durene, etc.) are excellent chain transfer agents for forming low molecular weight polystyrene compositions suitable for further synthetic elaboration. Such methyl benzene chain transfer agents owe in part their effectiveness to the chemical fact that the $pK_a$ of their most acidic carbon hydrogen bond is at least one order of magnitude lower (i.e. they are more acidic) than that of the conjugate acid of a poly(styryl) anion. More complex alkyl substituted benzene organic chain transfer agents, in particular ethylbenzene (EB) which is the simplest, have been reported (EPO 741147) or at least suggested to be suitable organic chain transfer agents for forming anionic chain transfer styrene distributions when using a catalyst formed from potassium t-butoxide, sec-butyllithium and N,N,N',N'-tetramethylethylenediamine (TMEDA).

Alkyl substituted aromatic hydrocarbon chain transfer reagents in general make up a relatively large percentage of the molecular weight of said anionic chain transfer compositions for low molecular weight compositions. For example an anionic chain transfer composition having $M_w=716$ formed from toluene and styrene, on a weight average basis said composition is comprised of 12.8% toluene. Similarly for an anionic chain transfer composition having $M_w=730$ formed from ethylbenzene and styrene, on a weight average basis said composition is comprised of 14.5% ethylbenzene. It can be desirable to form low molecular weight polystyrene compositions that are essentially free (comprising less than 2 wt % of the composition) of such organic chain transfer agents. Furthermore it can be desirable that the amount of an anionic chain transfer agent—whether organic or inorganic—also comprise less than 2 wt % of the resulting polystyrene composition. For an anionic chain transfer process each and every chain incorporates exactly one organic chain transfer initiator monomer added to the monomer(s) to be polymerized. Alkyl substituted aromatic hydrocarbons have molecular weights that are ≥92.14 Daltons—the formula weight of toluene. Thus it is a simple mathematical fact that the lowest $M_w$ of an anionic chain transfer distribution comprised of ≥2 wt % of toluene is given by $M_w \geq 92.14 \pm 0.02 = 4607$ Daltons. All anionic chain transfer compositions formed from alkyl substituted aromatic chain transfer agents (e.g. ethylbenzene or xylenes) of higher molecular weights would have to have a minimum $M_w$ that is greater than 4607 Daltons.

In theory an anionic chain transfer compositions formed from ethyl benzene and styrene would have a structure identical to anionically polymerized styrene compositions formed exclusively from styrene monomer. However quite to the contrary, it has been discovered that ethylbenzene when used as a chain transfer agent under prior art conditions such as in EP O 741 147, such process conditions provide polystyrene compositions of non-uniform microstructure with added impurities and impurity distributions (see FIG. 12). Such undesired impurities and impurity distributions arise from chain isomerization and fragmentation processes (see FIGS. 1 and 2). Consequently the chain length distribution of compositions such as the Examples of EP O 741 147 are in toto distributions that includes undesired ensembles of isomeric polymer microstructures—microstructures less desired for aromatic electrophilic substitution reactions. Such impurities and impurity distributions can be problematic in further derivatization of such anionic chain transfer compositions. A high level of any discrete impurity 13 an amount of 1000 ppm or greater—is undesirable in terms of producing a product for market. Thus it is desired to polymerize styrene to form low molecular weight polystyrene compositions having greatly reduced or essentially no undesired polymer microstructure features or impurity fragments and said compositions are desired to be comprised solely (/98 wt %) of polymerized styrene monomer.

The wt % ethylbenzene of the anionic chain transfer styrenic reaction distributions of EP O 741 147 have been calculated (wt % EB=106/$M_w$*100%) and presented in Table I below. From the experimental details as presented in Table I, it can be seen by comparison of EP O 741 147 Examples 2-7 that only Example 4 produced a polymeric anionic chain transfer styrenic reaction distribution (ACTSR distribution) having limited breadth (standard deviation) and small polydispersity. Minor changes in the relative feed rates or charges or both simultaneously as reported, resulted in ACTSR distributions having very large standard deviations and having polydispersity that increase significantly, and in some cases astronomically (e.g. EP O 741 147 Examples 2, 3 and 7). Thus, it can be seen that from such experimental details, a very narrow and limited process window for producing distributions with narrow breath, i.e., small standard deviation ($\sigma_n$) is provided.

From the experimental details of EP O 741 147 A1, as presented in Table I below, it can be seen by comparison of EP O 741 147 Examples 2-7 and D, that only Example 4 produced an anionic chain transfer styrenic reaction distribution (ACTSR distribution) having limited breadth (standard deviation) and small polydispersity. Minor changes in the relative feed rates or reagent charges as reported, or both simultaneously, resulted in ACTSR distributions having very large standard deviations and having polydispersity that increase significantly, and in some Examples, astronomically. Thus, it can be seen that from such experimental details, a very narrow and limited process window for producing distributions with narrow breath, i.e., small standard deviation $\sigma_n$ is provided. Investigations of this prior art technology reveals that the process technology suffers from the undesirable formation of a catalyst composition of low or limited solubility in the hydrocarbon reaction medium. It is desirable to have a catalyst system that has greatly improved hydrocarbon solubility with improved utilization or efficiency producing lower molecular weight styrenic distributions of more uniform, if not completely uniform, polymer chain length distribution microstructure.

As noted above in Table I EP O 741 147 Example D a monometallic lithium based catalyst system is ineffective, or at best very inefficient, at catalyzing anionic chain transfer polymerization of styrene with ethylbenzene. What is more is that it is well documented that monometallic TMEDA butyllithium catalyst forming reagents exhibit poor regioselectivity with regard to the metalation of ethylbenzene. In a paper authored by Broaddus (Broaddus, C. D., *J. Org. Chem.* 1970, 35, 10.) it is reported that the a position hydrogen of ethylbenzene forms the benzylic lithium in only 38%, with the ortho-lithiation occurring to the extent of 9%, the meta-lithiation occurring to the extent of 36% and the para-lithiation occurring to the extent of 17%. Thus the prior art teaches that monometallic lithium catalyst forming reagents that lithiate ethylbenzene would produce many different polymer microstructures that are regioisomeric chain length distributions with regard to the initiating ethylbenzene moiety. Thus it is desirable to have a highly efficient chain transfer polymerization process of styrene where the pathway that entails an anionic chain transfer step involving metalation of ethylbenzene (whether ethylbenzene is added or formed in situ) is reduced if not eliminated and yet still forms the desired anionic chain transfer distribution chain length microstructure. Such a process once realized would entail direct one step hydride addition (e.g. a one-step hydrolithiation reaction) to a styrene or other styrenic or other vinyl aromatic monomer. Such a hydrolithiated monomer should be capable of efficiently initiating polymerization of more monomer with subsequent chain transfer from molecular hydrogen. Such a process requires consistently and repeatedly reforming the hydride catalyst in an active form. Thus such a hydrogen mediated saline hydride initiated polymerization process should be high yielding of dimer and above and feature catalyst efficiencies where the amount of catalyst is reduced from 200% to 10,000%.

Investigations of this prior art technology (in connection with the Comparative Examples 46-48 of WO2010065468A1) have revealed that the process technology suffers from undesirable formation of a catalyst compositions of low or limited solubility in the hydrocarbon reaction medium. Thus minor changes in reaction charges can result in drastic changes in product distributions which arise from decreased catalyst availability. The processes of EP O 741 147 rely on very slow relative feed rates conducted

TABLE I

Prior Art EPO 741147 Anionic Chain Transfer Styrene Polymerization w/Ethylbenzene as the Chain Transfer Agent

| | EPO 741147 Example # | | | | | | | |
|---|---|---|---|---|---|---|---|---|
| | 1 | 2 | 3 | 4 | 5 | 6 | 7 | D |
| Cyclohexane Diluent (ml) | 0 | 1558 | 1558 | 1558 | 1558 | 1558 | 1558 | 0 |
| g Cyclohexane/g Styrene | 0 | 0.36 | 0.36 | 0.96 | 0.96 | 0.96 | 0.36 | 0 |
| Mole K:Mole Li | 1:1 | 1:1 | 1:1 | 1:1 | 1:1 | 1;1 | 1;1 | 0:1 |
| Mole Styrene/mole Ethylbenzene | 0.44 | 7.03 | 7.03 | 7.09 | 14.18 | 14.18 | 18.86 | 0.44 |
| Mole Styrene/hr/mole Ethylbenzene | 0.02 | 0.39 | 1.17 | 1.18 | 2.36 | 2.36 | 1.05 | 0.024 |
| Mole Styrene/hr/mole Lithium | 10.67 | 10.66 | 31.98 | 32.06 | 64.12 | 32.06 | 21.30 | 10.67 |
| Wt % Ethylbenzene | 40.5% | 0.5% | 0.3% | 7.1% | 2.2% | 2.8% | 0.3% | 2.2% |
| $M_n$ | 164 | 876 | 1212 | 932 | 2137 | 1736 | 596 | 2700 |
| $M_w$ | 262 | 19700 | 41800 | 1500 | 4830 | 3750 | 33300 | 4900 |
| $M_z$ | NR | NR | NR | NR | NR | NR | NR | NR |
| PD | 1.60 | 22.50 | 34.50 | 1.61 | 2.26 | 2.16 | 55.90 | 1.81 |
| Standard Deviation $\sigma_n = (M_w M_n - M_n^2)^{1/2}$ | 127 | 4060 | 7013 | 728 | 2399 | 1870 | 4414 | 2437 | over long feed times (6 to 18 hours) in order to attempt to equilibrate living and dead polymer chains. A primary problem with ethylbenzene as a chain transfer agent is that the $pK_a$ of ethylbenzene is of the same order of magnitude if not equal to the approximate value of that of the conjugate acid of a poly(styryl) anion. It is desirable to have a new catalyst and anionic chain transfer polymerization conditions that can provide soluble catalyst compositions such that in turn provide the advantages of: 1) lower molecular weight polystyrene distributions with $M_n$<930 even <700 Daltons; 2) more economical use of reagents; and 3) shorter time periods with more efficient use and productivity of the polymerization reactor. The hydrogen mediated saline hydride initiated process technology of this invention in fact provides such advantages.

Polymerization of styrene under a hydrogen atmosphere is known for Zeigler Natta polymerization of styrene (Murahashi, S.; Nozakura, S.; and Utsuhara Y. "Polymerization of Styrene with the Ziegler-Natta Catalysts in the Presence of Molecular Hydrogen." *Bulletin of the Chemical Society of Japan* 1960 33 431). Additionally there is at least one report of for metallocene polymerization of styrene under a hydrogen atmosphere (Ref. 14: Tomotsu, N., Kuramoto, M., Takeuchi, M., & Maezawa, H. (1996). *Metallocenes* 1996, 96, 211.(i) Chien, J C W.; in Tomotsu, N., et al. "Syndiospecific Polymerization of Styrene." *Journal of Molecular Catalysis A: Chemical* 1998 128.1 167.). In both polymerization chemistries formation of ethylbenzene, the hydrogenation product of styrene is mentioned. Thus Utsuhara and coworkers reported that isotactic polystyrenes of the low molecular weight could be obtained in the presence of hydrogen, although in addition to this there was found another reaction which is competitive to the polymerization reaction, i. e. hydrogenation of styrene to ethylbenzene. In both approaches to hydrogen mediation of styrene polymerization—Ziegler Natta and metallocenes catalysis—ethylbenzene is kinetically inert and represents an unrecoverable yield loss.

Deffieux and coworkers report the hydrogenolysis of poly(styryl)lithium distributions (50° C. $H_2$ 1 atm) leading to the in situ formation of lithium hydride capable of a largely inefficient reinitiation of styrene anionic polymerization at 100° C. (Ménoret, S., Deffieux, A., & Desbois, P. "Initiation of retarded styrene anionic polymerization using complexes of lithium hydride with organometallic compounds." *Macromolecules*, (2003) 36, 5988). Deffieux further reports that: "However, the slow addition of LiH to styrene with respect to propagation yields incomplete initiation." Deffieux reports that with addition of an added organometallic Lewis acid reagent (n,sec-$Bu_2Mg$, or BuMgOBT or i-$Bu_3Al$) the solubility and reinitiation efficiency of the LiH is improved but the catalyst efficiency is only between 50 and 150%. Furthermore the bimetallic complex formed decreases the rate of termination and the half-life of the active or living poly(styryl)lithium species is greatly increased from 40 min for uncomplexed poly(styryl)lithium to 34 hours for the bimetallic complexed poly(styryl)lithium at 50° C. in cyclohexane and 1.1 atm $H_2$. In fact they report that it requires 50 atmospheres (ca. 50 bar) $H_2$ to restore the half-life of the living poly(styryl)lithium species to 50 minutes. Deffieux and co-workers teach that soluble lithium hydride is a potential initiator of styrene polymerization:

"Lithium hydride, as long as it remains soluble, is a potential initiator of styrene anionic polymerization, at least at 100° C., even in nonpolar solvent. The efficiency of this initiator is improved by complexation with organometallic derivatives which first ensure its solubility and then reduce the styrene propagation rate. When n,sec-$Bu_2Mg$ is used as additive, Li—H bonds are not the real initiating sites, the polymerization proceeding after a ligand exchange between the two metal atoms."

"At high temperature, $H_2$ acts as a chain transfer agent in styrene anionic polymerization. However, to be efficient, its concentration in the medium should be high in order to shift the equilibrium toward the formation of metal hydride. This requires high hydrogen working pressures."

However Deffieux and coworkers require complexation of LiH with Lewis acids such as dialkylmagnesium reagents, aluminum alkyls and/or alkylaluminum hydrides to solubilize the LiH. Such Lewis acid complexed LiH reagents so formed are not efficiently reduced once used to initiate styrene polymerization. Consequently such Lewis acid complexed poly(styryl)lithium chains are not efficiently reduced nor does their reduction effectively regenerate a highly active or super active form of LiH initiator.

It is documented in the literature that only two highly soluble Group 1 metal hydrides free of Lewis acid complexing agents are known (see: Stasch, A. and Fohlmeister, L. *Aust. J. Chem.* 2015, 68, 1190-1201.; and Liptrot, D. J., *Springer Thesis: Group 2 Mediated Dehydrocoupling*, Chapter 2. *Group 1-Group 2 Bimetallic Alkyls and Hydrides*, Springer International Publishing, 2016, pp. 41-61). These are: (1) the "super aggregate" $[(t\text{-BuOLi})_{16}(LiH)_{17}]$ generated photolytic decomposition of a mixture of butyllithium lithium t-butoxide (Thomas, D. et. al., *J. Am. Chem Soc.* 1997, 119, 11998; and Thomas, D. et. al., *Angew. Chem. Int. Ed.* 1998, 37, 1537); and (2) Stash's hydrocarbon soluble LiH complex, $[(DipNPPh_2)_4Li_8H_4]$ (Dip, 2,6-i$Pr_2C_6H_3$), prepared by the application of phenylsilane to a reactive metal precursor (Stasch, A. *Angew. Chem. Int. Ed.* 2012, 51, 1930.) However this hydrocarbon soluble LiH reagent is not reactive or available enough to hydrolithiate the very active species diphenylacetylene or 1,1-diphenylethylene. Thus one of ordinary skill in the art would understand that $[(DipNPPh_2)_4Li_8H_4]$ would not likely hydrolithiate an even less active styrenic or other less active vinyl aromatic monomer and consequently would not initiate polymerization of such monomers. Stash also reports the formation of "initially clear solutions" of LiH/Li(pz) (pz=3,5-di-tert-butyl-1H-pyrazole) which turn milky likely due to formation of colloidal LiH. Such "initially clear solutions" are prepared by treating 3,5-di-tert-butyl-1H-pyrazole (pzH) with more than one equivalent of n-butyllithium in aromatic or aliphatic solvents, followed by addition of phenyl- or diphenylsilane to convert the excess alkyllithium groups to hydrides. Stash has prepared the first soluble NaH complex $[(pz)_6Na_7H]$ by the same synthetic strategy as the LiH/Li (pz) methodology again using the sterically demanding pyrazolate ligand (pz) by the reaction of [Na(pz)], [Na(nBu)] and diphenylsilane in aromatic solvents. The application of the same synthetic strategy used to produce $[(pz)_6Na_7H]$ to form a KH hydride analogue resulted only in the formation and separation of crystalline polymeric [K(pz)]. Thus a stable aliphatic and/or cycloaliphatic and/or aromatic hydrocarbon soluble monometallic, bimetallic or polymetallic alkali (Group 1) metal hydride formed directly from molecular hydrogen, $H_2$, is heretofore unknown.

In their publication (Stasch, A. and Fohlmeister, L. *Aust. J. Chem.* 2015, 68, 1190-1201) teach the following:

"Well-defined hydride complexes purely of Group 1 metals are very rare and are in fact only known for lithium and sodium so far . . . . Most isolated compounds involving alkali metals and hydridic hydrogen centres are mixed-element systems and are best described as 'ate'-type complexes in which the strongest interaction of the hydride ligand is with the non-alkali metal centre or metalloid . . . . This makes the majority of these 'ate' complexes covalent hydride complexes. The most prominent examples in this compound class are perhaps $LiAlH_4$, $NaBH_4$, and other related commercial derivatives such as L-Selectride®, N-Selectride®, and K-Selectride® (lithium, sodium, potassium tri-sec-butyl(hydrido)borate), or derivatives with sterically demanding ligands." emphasis added.

Thus it should be clear that the prior art Lewis acid complexed lithium hydride, sodium hydride and potassium hydride initiators (such as those utilized by Deffieux and co-workers in their retarded styrene anionic polymerizations) are covalent hydrides and not among the saline hydride catalyst of this invention.

In contrast to covalent hydrides, saline hydrides (meaning ionic hydrides) are defined by the presence of hydrogen as a negatively charged ion, $H^-$, in combination with an alkali metal or alkaline earth metal. With regard to the addition to styrene with concomitant polymerization of saline hydrides free of complexing Lewis acids, Deffieux and coworkers provide the following background (ibid):

"To the best of our knowledge, very few papers deal with anionic polymerization of vinylic monomers initiated by metal hydrides. Williams briefly mentioned one styrene polymerization experiment initiated by NaH in hexane at 25° C. However, the initiation efficiency was very low and the conversion reached only 90% after 3 days."

Liao and coworkers reported a form of highly active alkali metal hydrides having nanometric (≈20 nm) particle size distributions (Liao, S.; et. al. *Journal of Molecular Catalysis,* 1993, 84, 211.) In this paper Liao reports formation of highly active saline hydrides (HASH) from the corresponding alkali metal and hydrogen (1 atm) in THF (40° C.) catalyzed by $TiCl_4$ and naphthalene. Complete conversion to the saline hydride required 2 hours for LiH*, 4 hours NaH* and 28 hours for KH* (the * denoting highly active or super active hydride). These nanometric saline hydrides were found to have some utility in the dechlorination and debromination of certain arylhalides. They were also reported to be active as co-catalyst for the hydrogenation of olefins such as 1-hexene when used in certain transition metal complexes. Turnover frequencies in the range of 0.003 to 45.3 $s^{-1}$ were reported. Thus highly active alkali metal hydrides (50-300 mol) when used in conjunction with a transition metal catalyst (1 mol) only reduces olefins, no disclosure of polymerization or even dimerization of the olefin is made.

Other applications of nanometric size alkali metal hydrides were later reported by Liao and coworkers (Liao, S.; et. al. *Synth. Comm.* 1997, 27 3977.) Such applications include the reduction of carbonyl carbon to aldehydes and/or alcohols of benzaldehyde, methyl benzoate, acrolein and the methyl and n-butyl ester of acrylic acid. The reactions were conducted in refluxing THF using a stoichiometric excess of highly active saline hydride—either as NaH* or as KaH*—and reactions times of 0.25 to 15 hours. Of particular interest are the reduction of acrolein (0.3 hour) and methyl acrylate (0.25 hour) with NaH* to yield allyl alcohol in 97% and 96% yield respectively. In another publication Liao and co-workers report that heat treated nanometric LiH, NaH and KH complexed with $Cp_2TiCl_2$, $CP_2TiCl_2$-MH (M=Li, Na or K), can be used as a catalyst to hydrogenate either styrene (M=Li or Na) or Octene (M=K). Nanometric KH with $Cp_2TiCl_2$ under one atmosphere $H_2$ did not hydrogenate styrene instead initiated polymerization to form very high molecular weight (MW) polystyrene ($M_w$=200,000) with a wide range of melting points T=160-180° C. It was further found that nanometric KH alone polymerized styrene, one of ordinary skill in the art would understand that such high MW anionic polystyrene (APS) compositions are the result of inefficient initiation and consequently resulting in formation of only very few living polymer chains which rapidly incorporate the styrene monomer at the expense of the remaining insoluble nanometric KH.

Zhang and co-workers report highly active catalysts for the hydrogenation of styrene (2 ml) in toluene (9 ml) under hydrogen atmosphere at −17° C. to 42° C. (Zhang, M.; et. al. *Catal Lett* 2008, 124, 146.). The highly active catalysts were formed from nanometric sized sodium hydride (20 mg, $8.7 \times 10^{-4}$) and 12 different Lewis base free titanocene complexes (0.5 mL of $4 \times 10^{-4}$ mol/L i.e. $2 \times 10^{-7}$ mol)–NaH*/Ti=4350). Uptake of hydrogen was not observed in two other examples where the titanocene complex contained a coordinating oxygen (ether) or nitrogen (tertiary amine) species. Despite the large excess of NaH* to the titanocene catalyst, no report or even mention is made of the polymerization of styrene much less any form of chain transfer chemistry.

The preparation of super active—extremely finely divided—forms of lithium, sodium and potassium hydrides were reported by Schleyer and co-workers (Schleyer, P. v. R.; et. al. *J. Org. Chem.* 1987. 52, 4299; and Schleyer, P. v. R.; et. al. *Angew Chem Int. Ed. Engl.* 1986 25 465.) The preparation of these super active saline hydrides (SASH) as a fine suspension entailed the hydrogenation of the corresponding alkali metal alkyls in the presence of N,N,N',N'-tetramethylethylenediamine (TMEDA) in hexanes. Formation of super active LiH* was conducted between 30° and 35° C., super active NaH* was prepared under cryogenic conditions (−10° C. to −15° C.), and super active KH* was reported to be formed at −20° to −25° C. The application of the hydrides to organic synthesis was explored by Schleyer and reported in the above cited open literature papers. Most of the synthetic reactions (metalations, additions and reductions) were conducted under cryogenic conditions with temperatures as low as −90° C. with a few reactions conducted between room temperature and 50° C. There were also no disclosures in Schleyer to use the hydrides for polymerization of styrenic or vinyl, much less hydrogen mediation of such polymerization processes.

Harder and coworkers have reported that styrene can be catalytically hydrogenated (20° C., 20 atmospheres $H_2$, 15 hours in benzene) with 2.5 mole % of the organocalcium catalyst $[DIPPnacnacCaH.THF]_2$ initially formed from phenylsilane (see. Harder, S., Speilman, J., Buch, F. *Angew. Chem.* 2008, 120, 9576 also published as *Angew. Chem. Int. Ed.* 2008, 47, 9434.). The hydrogenation produced ethylbenzene in 85% yield along with a 15% yield of oligomers comprised mostly of styrene dimer with traces of styrene trimers and tetramers. Harder further reports 1,1-diphenylethene is reduced at a low conversion to yield 14% $Ph_2CHCH_3$ and 7% dimer in a catalyst formed from 5 mole % butyllithium/TMEDA complex at 20° C., 20 atmospheres $H_2$, 15 hours in benzene. With regard to this reaction the authors make the following statement:

"The reaction catalyzed by commercially available nBuLi/TMEDA proceeded only to low conversion . . . suggesting that, at lower $H_2$ pressures, the heavier alkaline-earth metal complexes are the more efficient catalysts."

Tetrahydrofuran soluble forms of magnesium hydride were produced by Ashby and coworkers from ortho-substituted (2,6-dimethyl- and 2,6-di-isopropylphenoxides) aryloxymagnesium reagents and an active form of solid magnesium hydride. Tetrahydrofuran insoluble forms of magnesium hydride resulted from alkoxymagnesium reagents and the solid magnesium hydride reagent (see Ashbey, E. C., Goel, A. B., Lin, J. J. *Tetrahedron Letters*, 1977, 3133.) Ashby also reported the formation of tetrahydrofuran soluble dialkylaminomagnesium hydrides from a series of bulky dialkyl and bulky alkylsubstituted cycloalkyl secondary amines by reaction with an active form of solid magnesium hydride. Said active form of magnesium hydride was prepared by the reduction of dimethylmagnesium with LiAlH$_4$ in diethyl ether. Thus the bulky dialkyl and bulky alkylsubstituted cycloalkyl secondary amines are reacted with dimethylmagnesium to form the bis(dialkylmagnesium)magnesium compounds which were in turn reacted in THF with the active form of magnesium hydride (see Ashbey, E. C., Goel, A. B., Lin, J. J. *J. Or. Chem.*, 1978, 43, 1564. Such aminomagnesium hydrides if they can initiate polymerization would likely initiate polymerization to some extent via addition of amide to the monomer and result in an incorporation of an undesired amine functionality in the resulting polymer distribution.

Michalczyk report the formation in ethereal or hydrocarbon solvents in the presence of "appropriate ligands" the formation of a precipitated form of magnesium hydride MgH$_2$L$_x$. Such appropriate ligands included tetrahydrofuran, ethylene glycol dimethyl ether, and TMEDA. The reducing agent employed was phenylsilane (see Michalczyk, M. J. *Organometallics*, 1992, 11, 2307). In a recent review entitled "Molecular Early Main Group Metal Hydrides: Synthetic Challenge, Structures and Applications" Harder reviews the state of the art of the controlled synthesis of well-defined Group 1 and Group 2 metal hydrides. In general such hydrides have been prepared by the methods outlined above which include: photo-degradation; reactions of active hydrides to form "ate-complexes" such as the aryloxymagnesium hydride as well as the dialkylaminomagnesium hydrides reported by Ashby; Harder's [DIPPnacnacCaH.THF]$_2$ initially formed from phenylsilane; and Stasch's soluble lithium hydride complex formed from phenylsilane. Additionally Harder reviews a host of hydrides formed from the thermal decomposition of magnesite complexes [(iPr$_2$N)$_3$Mg$^-$] M$^+$ (M$^+$=Na$^+$, K$^+$). A common feature of all approaches to forming soluble saline hydride compositions is the use of bulky (usually isopropylated ligands) to achieve solubility. In all cases except for the poorly catalytic species formed during the hydrogenation of styrene to ethylbenzene (85% yield) such as the example using [DIPPnacnacCaH.THF]$_2$ (which again was initially formed from phenylsilane), the saline hydride complexes were formed from some other reagent other than molecular hydrogen. Only Scheyer's insoluble forms of super active saline hydrides (SASH) are formed directly from molecular hydrogen as the initial reducing reagent.

Accordingly, the prior art does not disclose the use of a lithium aminoalkoxide complexed saline hydride (LOXSH) species for anionic-chain transfer polymerization of vinyl aromatic monomers such as a styrenic monomers. In fact the prior art does not even anticipate the formation of the LOXSH catalysts, especially as hydrocarbon soluble species and particularly when formed from simple non bulky ligands much less directly from H$_2$. The inventor has discovered these hydrides as well as the surprising fact that the use of these novel hydrides can catalyze hydrogen mediated saline hydride initiated polymerization process. Accordingly, this invention provides a process for the efficient anionic chain transfer polymerization of vinyl aromatic monomers under mild temperatures (e.g., about 20° C. to less than 100° C.) where hydrogen is the principal or sole chain transfer agent. Said process can be conducted at relatively low to very low hydrogen partial pressures. Furthermore the inventor has discovered that the novel polymerization catalysts of this invention provide low molecular weight anionically polymerized styrene distributions comprised solely of styrene (/98 wt % styrene) with unique, uniform and beneficial "Head to Tail" microstructure essentially if not completely free of quaternary carbons in the polymer microstructure. Thus such polystyrene distributions have less than 3.0 wt %, preferably less than 2.0 wt %, and more preferably less than 1.0 wt % of the polystyrene polymer chains with a quaternary carbon in the polymer chain backbone. Thus such compositions in toto have less than 1000 ppm even less than 200 ppm and even less than 20 ppm quaternary carbons present. Likewise the polystyrene compositions of this invention have less than 1.0%, preferably less 0.5% and most preferably less than 0.1% of polymer chain distributions or impurities resulting from fragmentation of the desired anionic chain transfer polystyrene distribution.

Definition of Chemical Acronyms and Numerical Terms

PTA is an acronym for a general class of polytertiaryamines used as promotors, the usage of ".XPTA" where X is a positive number and indicates the number, whole or fractional, of moles of PTA complexed to a catalyst composition.

TMEDA is an acronym for N,N,N',N'-tetramethylethylenediamine a PTA, the usage of ".XTMEDA" where X is a positive number and indicates the number, whole or fractional, of moles of TMEDA used and/or complexed to a catalyst composition.

PCAH is an acronym for a the general class of polarizing complexing agents used in forming the catalyst of this invention denoting the polarizing complexing agent as the neutral alcohol, the usage of [PCA$^-$] denotes the polarizing complexing agent as the alkoxide having given up one proton to a more basic chemical species. The use of [PCA$^-$] hereinafter is thus for convenience in showing that an alkoxide has been formed from PCAH. The use of in a formula such as [PCA$^-$]$_x$M$_y$H$_z$ is to be interpreted as a neutral catalyst complex or aggregate where the charge of the y-metal atoms is balanced by the charge of x [PCA$^-$] anions in combination with z hydride ions. It is to be understood that the use of [PCA$^-$]$_x$M$_y$H$_z$ is for the entire catalyst formulae and in would include any potential "ate" complex such as:

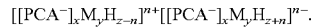

DMEAH is an acronym for N,N-dimethylethanolamine (Synonym: N,N-Dimethyl-2-hydroxyethylamine, N,N-Dimethylethanolamine) as the neutral aminoalcohol, the usage of [DMEA$^-$] represents N,N-dimethylethanolamine as an alkoxide having given up one proton to a more basic species.

DMAEOEH is an acronym for 2-N,N-dimethylaminoethoxyethanol (N(CH$_3$)$_2$CH$_2$CH$_2$O—CH$_2$CH$_2$OH) as the neutral amino ether-alcohol, the usage of [DMAEOE$^-$] represents N,N-dimethylaminoethoxyethanol as an alkoxide having given up one proton to a more basic species.

MEOEH is an acronym for 2-methoxyethanol as the neutral ether-alcohol, the usage of [MEOE$^-$] represents 2-methoxyethanol as an alkoxide having given up one proton to a more basic species.

The efficiency (Eff$_{CT}$) of an anionic chain transfer process is given by the expression:

$$\text{Eff}_{CT} = M_{n\ Th}/M_{n\ exp};$$

where $M_{n\ Th}$ is the theoretical number average molecular weight, and the term $M_{n\ exp}$ is the number average molecular weight obtained in the actual run or process. The percent efficiency is obtained by multiplication of the efficiency by 100%.

A brief resume of parameters used to describe molecular weight distributions and the equations that define them are presented in Table II below. (A. Rudin, *The Elements of Polymer Science and Engineering*, Academic Press, Orlando, 1982, pp. 54-58). The number average DP ($DP_n$) is calculated using $M_n$ as 100% polystyrene compositions.

TABLE II

| Parameter | Equation |
| --- | --- |
| $DP_n$, Number average degree of polymerization | $DP_n = (M_n - 2)/104$ (for a polystyrene distribution) |
| $M_n$, Number average molecular weight | $M_n = (\Sigma\ M_i n_i)$ |
| $M_w$, Weight average molecular weight | $M_w = [(\Sigma\ M_i^2 n_i)/M_n]$ |
| $M_z$, z-Average molecular weight | $M_z = (\Sigma\ M_i^3 n_i)/\Sigma M_i^2 n_i$ |
| PD, Polydispersity Index (also PDI) | $PD = (\Sigma\ M_i n_i)/[(\Sigma\ M_i^2 n_i)/M_n]$ |
| Variance | $V = (M_w M_n - M_n^2)$ |
| Standard Deviation, $\sigma_n$ | $\sigma_n = \sqrt{(M_w M_n - M_n^2)}$ |
| Skewness, $_n U_3$ | $_n U_3 = M_z M_w M_n - 3M_n^2 M_w + 2M_n^3$ |
| Asymmetry, $_n \alpha_3$ | $_n \alpha_3 = (M_z M_w M_n - 3M_n^2 M_w + 2M_n^3)/\sigma_n^3$ |

SUMMARY OF THIS INVENTION

The hydrogen mediated saline hydride initiated polymerization (HMSHIP) processes of this invention features: a) the novel ability of soluble saline hydride species to rapidly add to a vinyl aromatic monomer to form an initiating species; b) the novel high efficiency in which the addition of the saline hydride species to monomer takes place and thus allows competition between the reinitiation step to compete with the propagation reaction step to grow the active transient living poly(styryl)anion chains thus maintaining a constant or near constant number of active growing chains; and c) the capacity of chain transfer from hydrogen under the mild and novel process conditions to terminate such living poly(styryl)anionic species and regenerate the saline hydride in a form capable of effectively and efficiently reinitiating the polymerization process. Thus this invention relates to a process of conducting hydrogen mediated saline hydride initiated polymerizations which features feeding one or more anionically polymerizable hydrocarbon monomers to a reaction medium containing a soluble saline hydride catalyst under an atmosphere comprising molecular hydrogen. Without such features the chemical process would otherwise produce either mainly reduced monomer on one extreme or high molecular weight polymer at the other. In some embodiments of this invention the forgoing features act in concert and in balanced competition yielding anionic chain transfer polymer distributions with high yield, great efficiency and exceptional control of polymer chain length microstructure.

The present invention also relates to a process for anionic chain transfer polymerization comprising feeding a vinyl aromatic monomer and/or preferably a styrenic monomer to a reaction mixture under an atmosphere comprising molecular hydrogen in a reactor vessel, wherein said reaction mixture was formed from (i) an organolithium compound and/or an organomagnesium compound; (ii) optionally a polytertiaryamine compound; (iii) a polarizing complexing agent selected from a tertiary aminoalcohol compound; a tertiary amino ether-alcohol, an ether-alcohol or combinations thereof; (iv) optionally an alkali metal or metal alloy and/or a solid saline hydride and/or a saline metal amide; (v) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; (vi) optionally a vinylaromatic monomer; and in (vii) a hydrocarbon solvent with a $pK_a$ greater than $H_2$; wherein the aromatic hydrocarbon and hydrocarbon solvent may be the same or different; (viii) optionally molecular hydrogen; and wherein the solubility of hydride comprising said catalyst or reagent is at least about 0.0080 moles per liter.

The present invention also relates to a process for anionic chain transfer polymerization comprising feeding a vinyl aromatic monomer and/or preferably a styrenic monomer to a reaction mixture under an atmosphere comprising molecular hydrogen in a reactor vessel having a hydrogen mediated chain transfer polymerization catalyst of the formulas [DMEA$^-$]$_x$Li$_y$H$_z$, wherein said catalyst is formed from the process of contacting: (i) about y equivalents of an organolithium compound and/or an organomagnesium compound; (ii) optionally TMEDA compound; (iii) about x equivalents of dimethylamionethanol; (iv) optionally ethylbenzene; (v) a hydrocarbon solvent with a $pK_a$ greater than $H_2$; wherein the aromatic hydrocarbon and hydrocarbon solvent may be the same or different; and (vi) molecular hydrogen, wherein the amount of hydride formed z is given by the equation z=y−x and x, y and z are positive real numbers whole or fractional greater than zero; wherein said formula can further comprise N,N,N',N'-tetramethylethylenediamine (TMEDA) ligand complex i.e. [DMEA$^-$]$_x$Li$_y$H$_z$.XTMEDA in a molar ratio X of moles TMEDA per mole of catalyst [DMEA$^-$]$_x$Li$_y$H$_z$ wherein X=0.0001 to about 8.0.

Thus, the present invention also relates to a process for anionic chain transfer polymerization comprising: (a) feeding styrene monomer to; and/or (b) co-feeding styrene monomer with; a reaction mixture under an atmosphere comprising molecular hydrogen in a reactor vessel, wherein said reaction mixture was initially formed from (i) about y equivalents of an organolithium compound; (ii) optionally TMEDA compound; (iii) about x equivalents of dimethylamionethanol; (iv) optionally ethylbenzene; and (v) a hydrocarbon solvent with a $pK_a$ greater than $H_2$; wherein the aromatic hydrocarbon and hydrocarbon solvent may be the same or different; (vi) optionally molecular hydrogen; wherein a hydrocarbon soluble lithium hydride of the formulae [DMEA$^-$]$_x$Li$_y$H$_z$ is formed wherein the amount of hydride formed z is given by the equation z=y−x and x, y and z are positive real numbers whole or fractional greater than zero; and wherein the solubility of hydride comprising said catalyst or reagent is at least about 0.0080 moles per liter.

The present invention also relates to highly hydrocarbon soluble bimetallic tertiary aminoalkoxide and/or tertiary amino ether-alkoxide and/or ether-alkoxide complexed lithium hydride and/or magnesium hydride catalysts and/or reagents formed from a reaction medium comprising: (i) molecular hydrogen; (ii) an organolithium compound and/or an organomagnesium compound; (iii) optionally a polytertiaryamine compound; (iv) a polarizing complexing agent selected from a tertiary aminoalcohol compound; a tertiary amino ether-alcohol, an ether-alcohol or combinations thereof; (v) optionally an alkali metal or metal alloy and/or a solid saline hydride and/or a saline metal amide; (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; (vii) optionally a vinylaromatic monomer; and (viii) a hydrocarbon solvent with a $pK_a$ greater than $H_2$; wherein the aromatic hydrocarbon and hydrocarbon solvent may be the same or different, and wherein the solubility of hydride comprising said catalyst or reagent is at least about 0.0080 moles per liter.

The present invention also relates to highly hydrocarbon soluble monometallic tertiary aminoalkoxide and/or tertiary amino ether-alkoxide and/or ether-alkoxide complexed lithium hydride or lithium polyhydride ($LiH_n$ where n=1+2x where x is a positive integer) complex and/or aggregate formed from a reaction medium comprising: (i) molecular hydrogen; (ii) an organolithium compound; (iii) optionally a polytertiaryamine compound; (iv) a polarizing complexing agent selected from a tertiary aminoalcohol compound; a tertiary amino ether-alcohol, an ether-alcohol or combinations thereof; (v) optionally lithium metal or lithium alloy and/or a solid lithium hydride and/or a lithium amide; (vi) optionally an aromatic hydrocarbon having at least one C—H covalent bond $pK_a$ within the range of 2.75 pKa units above that of the $pK_a$ of toluene to −4.30 $pK_a$ units below the $pK_a$ of toluene; (vii) a hydrocarbon solvent with a $pK_a$ greater than $H_2$; wherein the aromatic hydrocarbon and hydrocarbon solvent may be the same or different, and wherein the solubility of hydride comprising said catalyst or reagent is at least about 0.0080 moles per liter.

The present invention also relates to highly hydrocarbon soluble lithium tertiary aminoalkoxide complexed lithium hydride (LiH) or lithium polyhydride ($LiH_n$ where n=1+2x where x is a positive integer) hydrogen mediated chain transfer polymerization catalyst of the formulas $[DMEA^-]_x Li_y H_z$, wherein said catalyst is formed from the process of contacting: (i) about y equivalents of an organolithium compound and/or an organomagnesium compound; (ii) optionally TMEDA compound; (iii) about x equivalents of dimethylamionethanol; (iv) optionally ethylbenzene; (v) a hydrocarbon solvent with a $pK_a$ greater than $H_2$; wherein the aromatic hydrocarbon and hydrocarbon solvent may be the same or different; and (vi) molecular hydrogen; wherein the amount of hydride formed z is given by the equation z=y−x and x, y and z are positive real numbers whole or fractional greater than zero; wherein said formula can further comprise N,N,N',N'-tetramethylethylenediamine (TMEDA) ligand complex i.e. $[DMEA^-]_x Li_y H_z \cdot X TMEDA$ in a molar ratio X of moles TMEDA per mole of catalyst $[DMEA^-]_x Li_y H_z$ wherein X=0.0001 to about 8.0.

The present invention also relates highly hydrocarbon soluble tertiary aminoalkoxide and/or tertiary amino ether-alkoxide and/or ether-alkoxide complexed lithium deuteride ($Li^2H$), or lithium tritide ($Li^3H$) or lithium polydeuteride ($Li^2H_n$ where n=1+2x where x is a positive integer) or lithium polytritide ($Li^3H_n$ where n=1+2x where x is a positive integer) complex and/or formed from a reaction medium comprising: (i) isotopically enriched molecular hydrogen; (ii) an organolithium compound and/or an organomagnesium compound; (iii) optionally a polytertiaryamine compound; (iv) a polarizing complexing agent selected from a tertiary aminoalcohol compound; a tertiary amino ether-alcohol, an ether-alcohol or combinations thereof; (v) optionally an alkali metal or metal alloy and/or a solid saline hydride and/or a saline metal amide; (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; (vii) optionally a vinylaromatic monomer; and (viii) a hydrocarbon solvent with a $pK_a$ greater than $H_2$; wherein the aromatic hydrocarbon and hydrocarbon solvent may be the same or different, and wherein the solubility of hydride comprising said catalyst or reagent is at least about 0.0080 moles per liter.

The present invention further relates to highly hydrocarbon soluble lithium tertiary aminoalkoxide complexed lithium hydride (LiH) or lithium polyhydride ($LiH_n$ where n=1+2j where j is a positive integer including zero) complex and/or aggregates formed from a reaction medium comprising: (i) molecular hydrogen; (ii) about y equivalents of an organolithium compound; (iii) optionally a TMEDA; (iv) about x equivalents of dimethylaminoethanol; (vi) optionally ethylbenzene; and (vii) a hydrocarbon solvent with a $pK_a$ greater than $H_2$; wherein the ethylbenzene and hydrocarbon solvent may be the same or different, wherein a hydrocarbon soluble lithium hydride of the formulae $[DMEA^-]_x Li_y H_n$ is formed wherein the amount of hydride formed z is given by the equation z=y−x and x, y and z are positive real whole numbers greater than zero and n=z+2j; and wherein the solubility of hydride comprising said catalyst or reagent is at least about 0.0080 moles per liter.

This invention also relates to hydrogen mediated anionic polymerization of styrene (HMAPS) processes which features: a) the novel ability of soluble lithium hydride species to rapidly polymerize styrene; b) the novel high efficiency in which the addition of the lithium hydride species to styrene monomer takes place and thus allows the reinitiation step to compete with the propagation reaction step to grow the active transient living poly(styryl)lithium anionic chains thus maintaining a constant or near constant number of active growing chains; c) the capacity of chain transfer from hydrogen under mild and novel process conditions to terminate such living poly(styryl)lithium anionic species and regenerate the soluble lithium hydride in a form capable of effectively reinitiating the polymerization process; d) eliminates or nearly eliminates intramolecular chain transfer steps that otherwise lead to undesired quaternary carbon formation in the anionic polystyrene polymer chains; and f) control of the MWD is accomplished via high relative monomer to catalyst feed rates, catalyst concentration and hydrogen activity.

Thus the present invention also relates to an HMAPS process for anionic chain transfer polymerization comprising feeding styrene monomer to a reaction mixture under an atmosphere comprising $H_2$ in a reactor vessel, wherein said reaction mixture contains a catalyst having the chemical formulas $[DMEA^-]_x Li_y H_z$, wherein said catalyst is formed from the process of contacting: (i) about y equivalents of an organolithium compound and/or an organomagnesium compound; (ii) optionally TMEDA compound; (iii) about x equivalents of dimethylamionethanol; (iv) optionally ethylbenzene; (v) a hydrocarbon solvent with a $pK_a$ greater than $H_2$; wherein the aromatic hydrocarbon and hydrocarbon solvent may be the same or different; and (vi) optionally molecular hydrogen; wherein the amount of hydride formed z is given by the equation z=y−x and x, y and z are positive real numbers whole or fractional greater than zero and wherein the solubility of hydride comprising said catalyst or reagent is at least about 0.0080 moles per liter.

The present invention also relates to saline hydride initiated anionic polystyrene and anionic chain transfer polystyrene distributions in which the polystyrene chain length distribution of individual or discrete polymer chain constituents have the general formula:

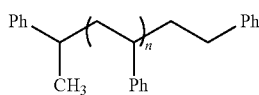

wherein n is the number of repeating styrene monomer units covalently bonded between the initiating styrene monomer and the terminating styrene monomer; wherein the chain length distribution of the general formula above comprises at least about 97.0 wt. %, preferably at least about 98.0 wt. %, more preferably at least about 99.0% and most preferably comprises at least about 99.2 wt % of the total weight of the polystyrene composition; and wherein the balance of the chain length distribution is comprised of not more than 3.0 wt. %. or more preferably not more than 2.0 wt. %, more preferably not more than 1.0%, and most preferably comprises not more than 0.8 wt % combined of: 1) distributions of polymer chains that are isomeric of 1; and/or 2) distributions formed from a chain fragmentation process step and thus are thereby essentially free of discrete chain length compositions with structural formula weight ($FW_i$) given by the equation: $FW_i = FW_{i\ polystyrene} \pm 14$ Daltons.

The present invention further relates to lithium hydride initiated anionic polystyrene and anionic chain transfer polystyrene distributions in which the polystyrene chain length distribution of individual or discrete polymer chain constituents have the general formula 1: wherein n is the number of repeating styrene monomer units covalently bonded between the initiating styrene monomer and the terminating styrene monomer; wherein the chain length distribution of the general formula above comprises at least about 99.0% and preferably comprises at least about 99.2 wt % of the total weight of the polystyrene composition; and wherein the balance of the chain length distribution is comprised of not more than 1.0 wt. %. or more preferably not more than 0.8 wt % combined of: 1) distributions of polymer chains that are isomeric of formula 1; and 2) are essentially free of chain length distributions formed from a chain fragmentation-process step and thus have discrete chain length structural formula weight ($FW_i$) where $FW_i = FW_{i\ polystyrene} \pm 14$ Daltons below a detection limit of about 0.02% by the GC Oligomer Test.

DETAILED DESCRIPTION OF THE INVENTION

Glossary

It is to be understood and appreciated that the term "polymer" as used anywhere herein, including the claims, refers to the term "polymer" as defined in the context of the OECD definition of "polymer", which is as follows:

"A chemical substance consisting of molecules characterized by the sequence of one or more types of monomer units and comprising a simple weight majority of molecules containing at least three monomer units which are covalently bound to at least one other monomer unit or other reactant and which consists of less than a simple weight majority of molecules of the same molecular weight. Such molecules must be distributed over a range of molecular weights wherein differences in the molecular weight are primarily attributable to differences in the number of monomer units."

Saline Hydrides (meaning ionic hydrides) are defined by the presence of hydrogen as a negatively charged ion, $H^-$, in combination with an alkali metal or alkaline earth metal: said alkali metals include lithium, sodium, potassium, rubidium, and cesium; and said alkaline earth metals include magnesium and calcium.

Saline metal amide are metallic amides or diamides formed from ammonia and/or a primary amine and/or a secondary amine wherein the metal ion in combination with the amide is an alkali metal selected from lithium, sodium, potassium, rubidium, and cesium; and in combination with the diamide is an alkaline earth and includes magnesium and calcium.

"Polymer microstructure" as used here refers to a discrete polymer chain's (or chain length distribution of such chains) configuration in terms of its composition, sequence distribution, steric configuration, geometric and substitutional isomerism.

The term "head to tail" polymer microstructure is the description of the microstructure exhibited by the styrene polymer structure (1) presented above. A head to tail microstructure exist when the head (being formed from the vinyl carbon bearing the phenyl substituent) of each styrenic monomer unit is covalently bonded to the tail (being formed from the vinylidene carbon) of one and only one other styrenic monomer unit.

The term "tail to tail" microstructure exists when the tail of a styrenic monomer unit is covalently bonded to the tail of another styrenic monomer unit. Such tail to tail microstructure is common as part of the microstructure of anionic polymerizations of styrenic monomers initiated by electron transfer mechanisms.

The term "tail to head to tail" microstructure means a polymer backbone linkage where the head of one styrenic monomer is covalently bonded to the tail of two other styrenic monomers. This microstructure produces an irregularity in the polymer backbone and incorporates an undesired chemically labile (easily cleaved under certain reaction conditions) quaternary carbon in the polymer chain.

The terms "organolithium (active) alkyl", "active" lithium and "active organolithium alkyl" (abbreviated as Li active) and the terms "organomagnesium (active) alkyl" and "active organomagnesium alkyl" means the total amount of either of these organometallic compounds as the metal alkyl charged above the amount of organolithium and/or organomagnesium compound needed to titrate any protic reagent as well as any protic impurity species such as water, and/or alcohol and/or a primary or secondary amine. Though we wish not to be bound by theory it is considered to be that the molar amount of active organolithium is equal to the molar amount of saline hydride formed on a 1:1 basis. It is also considered to be that one mole equivalent of active organomagnesium compound forms up to 2 equivalent moles of a saline hydride. For this purpose the "active metal alkyl" represents lithium and/or magnesium covalently bonded alkyl radicals wherein the bonded alkyl radical can be an aliphatic, cycloaliphatic, aromatic, allylic, benzylic or vinylic hydrocarbon radical.

Protic when in combination with the term species, or reagent, or solvent or impurity means a chemical species having a covalently bonded proton ($H^+$) with a $pK_a$ below that of $H_2$ under the conditions of the chemical processes of this invention (see Buncel, E., Menon, B *J. Am. Chem. Soc.*, 1977, 99, 4457: "Carbanion mechanisms. 6. Metalation of Arylmethanes by Potassium Hydride/18-Crown-6 Ether in Tetrahydrofuran and the Acidity of Hydrogen").

"LOXSH" means a lithium aminoalkoxide or a lithium amine-ether-alkoxide or a lithium ether-alkoxide complexed saline hydride formed from: (i) molecular hydrogen; (ii) an organolithium compound with or without an organomagnesium compound; (iii) optionally a polytertiaryamine compound; (iv) a tertiary amino alcohol and/or a tertiary amino ether-alcohol and/or a ether-alcohol; (v) an optional solid alkali or alkaline earth metal hydride or an alkali metal or alkali metal alloy (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and in (vii) a hydrocarbon solvent with a $pK_a$ greater than $H_2$; wherein the aromatic hydrocarbon and hydrocarbon solvent may be the same or different (see: Daasbjerg, K, *Acta Chemica Scandinavica*, 1995, 49, 878: "Estimation of the $pK_a$ for some Hydrocarbons and Aldehydes and Solvantion Energies of the Corresponding Anions").

LOXLiH is a term denoting the monometallic form of LOXSH where the catalyst/reagent is formed with lithium reagents as the only metal reagents. LOXKH is term denoting a bimetallic catalyst comprised of lithium and potassium wherein a portion of the active saline hydride is potassium hydride. $LOXMgH_2$ is term denoting a bimetallic catalyst comprised of lithium and magnesium wherein a portion of the active saline hydride is a magnesium hydride.

$[DMEA^-]_xLi_yH_z$ represents chemical formulae for catalyst or reagent component compositions of hydrocarbon soluble lithium aminoalkoxide complexed lithium hydride formed from: (i) molecular hydrogen; (ii) about y equivalents organolithium compound; (iii) optionally TMEDA; (iv) about x equivalents of dimethylaminoethanol; (v) optionally ethylbenzene; and in (vii) a hydrocarbon solvent with a $pK_a$ greater than $H_2$; wherein the hydrocarbon solvent may be ethylbenzene or different (see: Daasbjerg, K, *Acta Chemica Scandinavica*, 1995, 49, 878: "Estimation of the $pK_a$ for some Hydrocarbons and Aldehydes and Solvantion Energies of the Corresponding Anions"); wherein the index values x, y and z are positive real numbers where the equivalents of hydride formed is z, wherein z=y−x and wherein for the stoichiometric ratio x:y:z; a) y is in the range of about 2 to about 6; b) x is in the range of about 1 to about 5; and thus z is in the range of about 5 to about 1. A preferred compositions of $[DMEA^-]_xLi_yH_z$ is a catalyst composition where the stoichiometric ratio x:y:z is 2:3:1 $[DMEA^-]_2Li_3H$ or where $[DMEA^-]_4Li_6H_2$ or $[DMEA^-]_6Li_9H_3$ or any higher number multiple of x=2, y=3 and z=1.

The term "molecular hydrogen" means $H_2$ as $^1H_2$ but can also include the isotopes of hydrogen $^2H_2$ or $^3H_2$ either as mixtures of the isotopes or enriched in a particular isotope whether in the gas state in the vapor space or dissolved in the condensed phase.

The term "alkali metal alloy" means a metal alloy of at least two metals wherein at least one of which is an alkali metal however such an alkali metal alloy can be comprised of two alkali metals such as NaK or $NaK_2$ and may have such alkali metals dissolved or in some physical combination with the alloy.

The term "and/or" means singular or a combination. For example, "A and/or B" means "A" alone, "B" alone, or a combination of A and B.

The term "with or without" means singular or in combination. For example A with or without B means "A" alone or a combination of A and B.

The terms "about x equivalents", "about y equivalents" "about z equivalents" and the like mean±50%, or ±30% or ±20%, or ±10%, or ±5% from stoichiometric equivalents with the stipulation that the amount x is always less than the total amount of active y (i.e. "active organolithium reagent, a.k.a. active lithium) and thereby the amount z is a positive real number greater than but not equal to zero.

The term "organolithium compound" means an organic group bonded to a lithium atom. Non-limiting examples of organic groups may be aliphatic (e.g., an alkyl group), cycloaliphatic (e.g., cycloalkyl), vinyl group, allylic group, benzylic group, an aromatic group (e.g., phenyl) or a poly (styryl)lithium.

The term "organomagnesium compound" means an organic group bonded to a magnesium atom. Non-limiting examples of organic groups may be aliphatic (e.g., an alkyl group), cycloaliphatic (e.g., cycloalkyl), vinyl group, allylic group, benzylic group, an aromatic group (e.g., phenyl) or a poly(styryl)magnesium. Preferred organomagnesium compounds are organomagnesium compounds with two organic groups.

The "term polytertiaryamine (PTA) promotor" means a compound containing at least two tertiary amine groups that promotes or activates the formation of the hydride catalyst during the HMSHIP process. Non-limiting generic formulae would include:

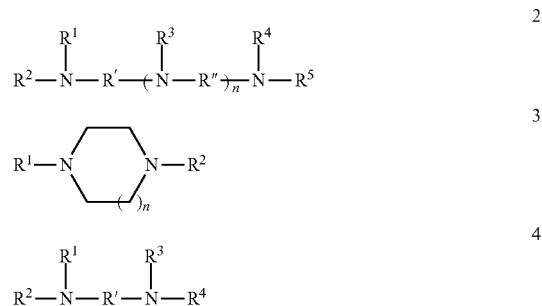

where R' and R" are independently organic groups capable of forming bonds with two or more amines and $R^1$, $R^2$, $R^3$, $R^4$, and $R^5$ are independently organic groups which may also be further substituted by other tertiary amines, and the index value n is independently a whole number equal to or greater than 0 (i.e. n=0, 1, 2, 3 . . . ). It should be understood that when n=0 than the group within the parentheses does not exist and the structure is intended to mean that the chemical bond is between the two groups that intersect the two sides of the parentheses. Thus polyteriary amine structure 2 becomes structure 4 when n=0.

The term "polarizing complexing agent" is a general term for the neutral alcohol used in forming the catalyst of this invention such as a tertiary amino alcohol, a tertiary amino ether-alcohol or a ether-alcohol.

The terms "alkali or alkaline earth aminoalkoxide", "alkali or alkaline earth amino ether-alkoxide" and "alkali or alkaline earth ether-alkoxide" are alkoxides formed from the tertiary amino alcohol or a tertiary amino ether-alcohol or a ether-alcohol, respectively and an alkali metal, and/or alkali or alkaline earth metal hydride, and/or alkali or alkaline earth metal amide or and/or alkali or alkaline earth metal alkyl. The tertiary amino alcohols or tertiary amino ether-alcohols or a ether-alcohols can be represented by, but not limited to, the following generic structures:

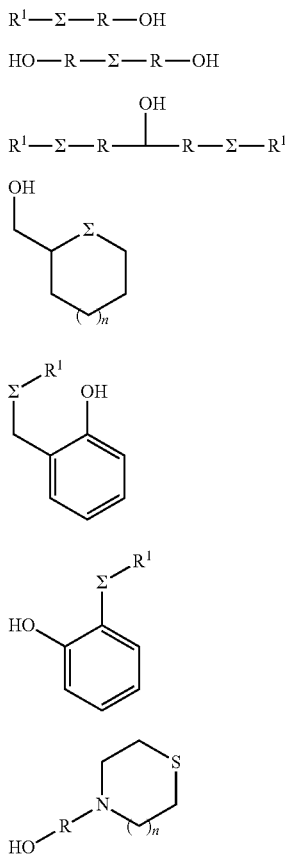

where R is an organic group capable of forming bonds with one or more tertiary amines and one hydroxyl, $R^1$ is independently an organic group which may also be further substituted by other tertiary amines, Σ can include: i) O or $NR^1$ for 5, 6, 7, 8, 9 and 10; and ii) O or $NR^1$ or $CH_2$ for 11; and the index value n is independently a whole number equal to or greater than 0 (i.e. n=0, 1, 2, 3 . . . ). It should be understood that when n=0 than the group within the parentheses does not exist and the structure is intended to mean that the chemical bond is between the two groups or atoms that interconnect the two sides of the parentheses. Preferred aminoalcohols included dimethylaminoethanol, diethylaminoethanol, 3-Dimethylamino-1-propanol, N-methyl-deiethanolamine. tri-ethanolamine, 2-[2-(dimethylamino) ethoxy]ethanol, 1-(2-hydroxyethyl)piperidine, 1-(2-hydroxyethyl)morpholine, 1-(2-hydroxyethyl)pyrolidine, 1-methyl-2-pyrolidinemethanol and the like.

It is preferred that the tertiary amino alcohols or tertiary amino ether-alcohols or ether-alcohols do not undergo additional metalation reactions other than the reaction to form the alkoxide. Thus not all tertiary amino alcohols or tertiary amino ether-alcohols or ether-alcohols are suitable for use in forming some catalyst compositions, especially compositions formed with an excess amount of certain organolithium compounds—in particular alkyllithium reagents. An excess amount means a molar quantity greater than the molar quantity of the alcohol moiety of the tertiary amino alcohols or tertiary amino ether-alcohols or a ether-alcohols used to form the catalyst. Additionally the tertiary amino alkoxide or tertiary amino ether-alkoxide or ether-alkoxide should serve as solubilizing spectator ligand. That means that other than to function as activating polarizing complexing agent that imparts solubility to the saline hydride of the catalyst composition and contributes to the activation and formation of the saline hydride during the HMSHIP process. Thus the polarizing ligand is otherwise inert and does not participate in the polymerization process nor participate in catalyst degradation reactions. It is undesirable to incorporate the tertiary amino alcohols or tertiary amino ether-alcohols or ether-alcohols degradation products of such ligands or in the polymer structure or product distribution.

DESCRIPTION

Figure 1:
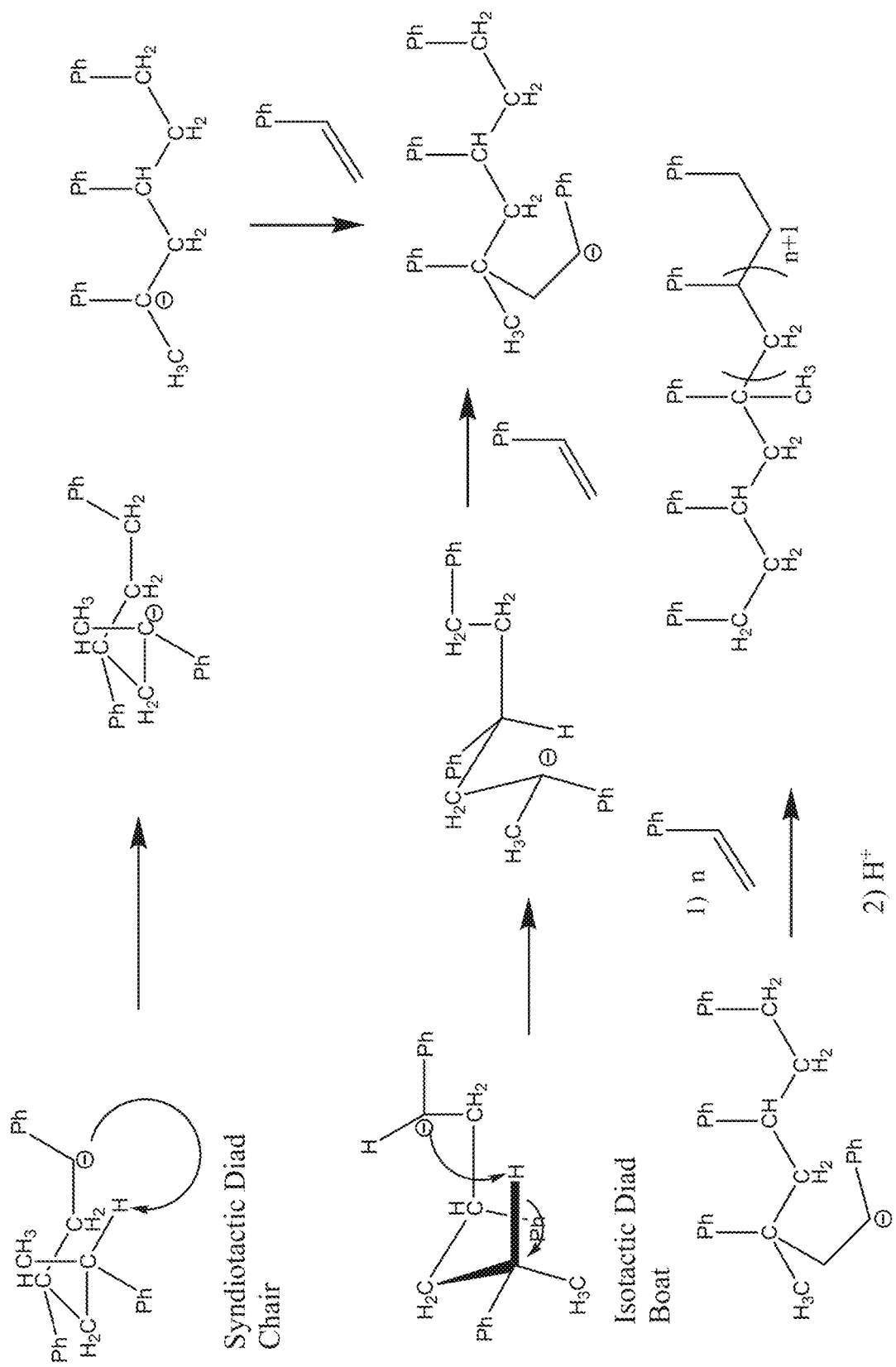
FIG. 1 is drawing explaining the chemical reaction pathway leading to isomerization and further polymerization of a living (meaning ionized) anionic styrene trimer or styrene trimer equivalent (i.e. ethylbenzene combined with two styrene monomers) to form and undesired quaternary "tail to head to tail" microstructure.

The present invention relates a process of conducting hydrogen mediated saline hydride initiated polymerizations (HMSHIP) of anionically polymerizable hydrocarbon monomers, catalyst compositions for conducting such a process and under certain preferred conditions the formation of novel and beneficial low molecular weight anionic chain transfer polymer distributions of very pure "head to tail" microstructure. The process features feeding at least one anionically polymerizable hydrocarbon monomer to a suitable solvent containing an active and generally soluble saline hydride catalyst under an atmosphere comprising molecular hydrogen wherein chain transfer from molecular hydrogen is a significant component of the mechanism that determines the kinetic chain length (v) distribution and hence the number average molecular weight ($M_n$) of the resulting product distribution.

One embodiment of the present invention relates to a process for hydrogen mediated anionic polymerization of vinyl aromatic monomers such as styrenic monomers such as styrene using a hydrocarbon soluble LOXSH catalyst. The hydrocarbon soluble LOXSH catalyst is formed from a reaction medium comprising (i) an organolithium compound with or without an organomagnesium compound; (ii) an optional polytertiaryamine promotor compound; (iii) a polarizing complexing agent selected from a tertiary amino alcohol, a tertiary amino ether-alcohol an ether-alcohol or combinations thereof; (iv) optionally an aromatic hydrocarbon having at least one C—H covalent bond pKa within the range of 2.75 pKa units above that of the pKa of toluene to −4.30 pKa units below the pKa of toluene; (v) an optional solid alkali or alkaline earth metal hydride or an alkali metal or alkali metal alloy or a alkali or alkaline earth amide; (vi) a hydrocarbon solvent having a $pK_a$ greater than $H_2$ wherein the aromatic hydrocarbon and hydrocarbon solvent may be the same or different; and (vii) molecular hydrogen. The product distribution formed from such a process when the monomer is solely styrene hereinafter designated LOXSH PS distribution. More specifically when the catalyst is a monometallic catalyst comprised solely of lithium as the metal, that catalyst is designated as LOXLiH and the resulting anionic chain transfer styrene polymer distribution is a LOXLiH PS. However when the catalyst is bimetallic catalyst comprised of lithium and potassium that catalyst is designated as LOXKH and the resulting anionic chain transfer styrene polymer distribution is a LOXKH PS. Likewise when the catalyst is bimetallic catalyst comprised of lithium and magnesium that catalyst is designated as $LOXMgH_2$ and the resulting anionic chain transfer styrene polymer distribution is a $LOXMgH_2$ PS.

In the practice of the invention the LOXSH catalyst can be optionally formed in a variety of methods which are not limited by but include:

A. forming a well-mixed and reacted solution or suspension comprised of (i), optionally (ii), (iii), optionally (iv) and optionally (v) in (vi) under an inert atmosphere and then converted to LOXSH by: 1) feeding a portion of the monomer to the thus formed "ate" complex; and then 2) replacing or otherwise displacing the inert atmosphere with $H_2$; or B. forming a well-mixed and reacted solution or suspension comprised of (i), optionally (ii), (iii), optionally (iv) and optionally (v) in (vi) under an inert atmosphere to form a precursor "ate" complex which is then converted to LOXSH by replacing or otherwise displacing the inert atmosphere with hydrogen; or C. forming a well-mixed and reacted solution or suspension comprised of a portion of (i) with optionally (ii), (iii), the desired amount of (iv) and optionally (v) in (vi) in an external reactor, transferring said solution to the polymerization reactor under hydrogen and then charging the balance of (i); or D. forming a well-mixed and reacted solution or suspension comprised of optionally (ii), (iii), optionally (iv) and optionally (v) in (vi) under a hydrogen atmosphere; feeding a portion of the monomer then feeding (i) all at once; or E. forming a well-mixed and reacted solution or suspension comprised of optionally (ii), (iii), optionally (iv) and optionally (v) in (vi) under a hydrogen atmosphere then feeding (i) over a period greater than about 3 minutes then optionally or when necessary feeding monomer; or F. forming a well-mixed and reacted solution or suspension comprised of (iii), optionally (iv) and optionally (v) in (vi) under a hydrogen atmosphere then feeding (i) over a period greater than about 3 minutes followed by the addition of desired amount of (ii) then optionally or when necessary feeding monomer.

It has been found that the LOXLiH and LOXMgH$_2$ catalyst/reagent is conveniently prepared in a very active and soluble form according to methods E and F under a hydrogen atmosphere of 1.0 to 2.0 atmospheres $H_2$ pressure though higher or lower $H_2$ pressures can be employed. However the LOXMgH$_2$ catalyst was not reduced to the hydride or at least was not completely reduced to the hydride by hydrogen until the monomer styrene was introduced. Introduction of styrene forms a poly(styryl)magnesium reagent that is completely reduced to the hydride during the hydrogen mediated chain transfer polymerization. Thus for the LOXMgH$_2$ may require the presence of a vinyl aromatic monomer in order to completely form the catalyst in such cases feeding monomer is necessary and not optional.

The initial temperatures of about −5° C. to about 40° C. have been employed as set forth in the Examples below in forming the LOXLiH and LOXMgH$_2$ catalysts and or reagents of this invention. Lower or higher initial temperatures can be used to form the catalyst especially when using an aminoalkoxide. Thus the organolithium (n-butyllithium) and or the organomagnesium (di-n-butylmagnesisum) compound (i) is then fed slowly to the well stirred reaction mixture comprising dissolved $H_2$, (ii), (iii), in (vi) using a modest backpressure across a metering needle valve. Initially a heat kick ensues and the reactor pressure will rise if the organolithium and/or organomagnesium compounds produce light hydrocarbons such as butane during the catalyst forming process. Subsequently the temperature has been observed to continue to rise however the reactor pressure will generally drop below the initial pressure or remain constant as hydrogen is consumed in the catalyst forming process. When the initial pressure is 0 PSIG then a negative pressure or slight vacuum is or can be created in the reactor. In most cases, under the conditions set forth in the Examples the $H_2$ pressure will usually drop during the feed of the organolithium reagent. However in some Examples when temperatures below 15° C. and or when an organomagnesium reagent is used, the reactor pressure does not appear to drop during the introduction of the organometallic reagent. Instead reduction to the hydride occurs while warming the reaction mixture to the desired reaction temperature. In the case of LOXMgH$_2$ catalyst, hydrogen uptake did not appear to be significant until the monomer styrene was introduced at the reaction temperature of 70° C. or above. Mass Spec analyses of the lowest molecular weight oligomers obtained from a LOXMgH$_2$ run demonstrated the presence of trace levels of oligomers that had been initiated with a butyl group; this has not been observed in any of the other catalyst systems free of magnesium. To facilitate reduction of the LOXSH catalyst upon forming the catalyst reaction mixture hydrogen is further charged to the reactor such that the reactor pressure will be from 40 to 70 PSIG once the reaction mixture has warmed to the desired initial polymerization reaction temperature, though higher pressures can and have been employed.

In forming the catalyst compositions of this invention: LOXSH; LOXLiH; LOXMgH$_2$; or reagent producible by this invention hydrogen pressures from 0.1 bar to greater than 300 bar can be used. The preferred $H_2$ pressure is in the range of from 0.25 bar to 10.00 bar and a more preferred range is from 0.5 bar to 7.0 bar and the most preferred range is from 0.75 bar to about 5.0 bar. It has not escaped our attention that pressures as high as 100 G Pascals could in theory and perhaps in fact produce polyhydride compositions from the catalyst and reagents of this invention and hence the application of such pressures and formation of such products are within the scope of this invention.

Figure 8:
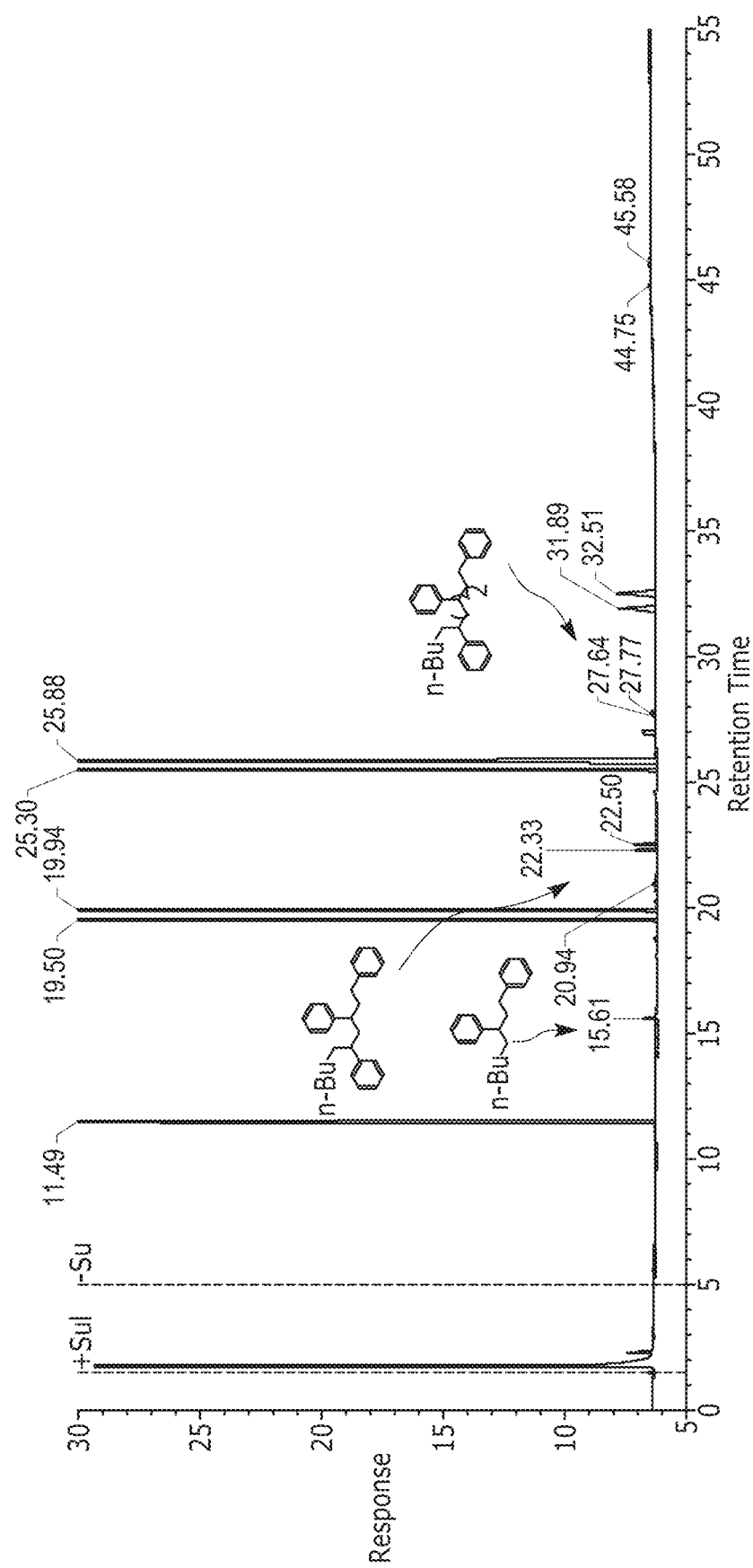
FIG. 8 is a gas chromatogram with structural assignments of the trace quantities of "head to tail" styrene oligomers initiated by unreduced butylmagnesium as well as the high purity "head to tail" styrene oligomers obtained from a of polystyrene composition of this invention formed from a $LOXMgH_2$ catalyst of this invention employing a hydrogen mediated saline hydride initiated polymerization process of this invention.

It is to be noted that commercially available organomagnesium compounds may contain about 0.12 to 0.25 wt % triethylaluminum (TEA) as an additive to the reagent which is usually supplied in heptanes. Because such organoaluminum reagents can have a retarding effect on anionic polymerization reactions, it is desired that the ratio of lithium metal to aluminum metal be greater than 50.0:1.0 and preferably greater than 101.0:1.0. As is depicted in FIG. 8 there was no evidence of initiation by or participation of TEA in the HMSHIP process of the LOXMgH$_2$ runs made. Thus by analogy other organometallic reagents such as organoaluminum, and or organoberyllium, and or organoboron agents can be present in the reaction mixture so long as the added reagent does not retard the HMSHIP process to the point that hydride addition to monomer is inhibited and/or that hydrogen chain transfer to the growing polymer chain is arrested or otherwise substantially interfered with and consequently form a distribution of undesired molecular weight parameters.

Non-limiting preferred examples of organolithium compounds suitable for forming the LOXSH catalysts are n-butyllithium, sec-butyllithium, t-butyllithium, allyllithium, vinyllithium, phenyllithium, 1-hexyl-1-phenyllithium, 1-hexyl-1,1-diphenyllithium, cyclohexyllithium, and poly(styryl)lithium compounds which can be added or generated in situ.

Non-limiting preferred examples of organomagnesium compounds suitable for forming LOXMgH$_2$ catalysts are butylethylmagnesium (BEM), di-n-butylmagnesium (DBM), n-butyl-n-octylmagnesium, di-n-octylmagnesium, di-cyclohexylmagnesium, and poly(styryl)magnesium compounds. A comprehensive list of potential organomagnesium compounds is provided in U.S. Pat. No. 3,817,955.

In forming a LOXMgH$_2$ catalyst it is possible to pre-form an "ate" complex having the stoichiometry R$_3$MgLi or R$_4$MgLi$_2$ where the group R is independently an alkyl, vinyl, cycloalkyl, poly(styry), phenyl selected from but not limited by any combination of the organolithium with an organomagnesium recited above.

Non-limiting alkali or alkaline earth aminoalkoxide, alkali or alkaline earth amino ether-alkoxide and alkali or alkaline earth ether-alkoxide (designated as [PCA$^-$]M$^+$ or as [PCA$^-$]$_2$M$^{2+}$ for alkali and alkaline earth alkoxides respectively) formed in the process of forming a LOXSH catalysts are formed from the generic structures of suitable polarizing complexing agents [PCAH] hereinabove. It should be clear that the [PCA$^-$]M$^+$ and/or as [PCA$^-$]$_2$M$^{2+}$ formed can be formed in situ when forming the LOXSH catalysts and/or they can be formed well in advance and charged to the catalyst forming reactor as the alkali or alkaline earth aminoalkoxide, alkali or alkaline earth amino ether-alkoxide and alkali or alkaline earth ether-alkoxide. Thus any alkali or alkaline earth reagent capable of forming either [PCA$^-$]M$^+$ and/or as [PCA$^-$]$_2$M$^{2+}$ from a PCAH and/or a [PCA$^-$] precursor (e.g. an appropriate N,N-dialkylaminoacid suitably reduced) can be employed in the practice of this invention and accordingly is within the scope of this invention. As is demonstrated in Examples 25-27 the [PCA$^-$] component of a catalyst composition can be formed in advance and subsequently charged during the catalyst forming reaction. Thus reagents such as solid alkali and alkali metal hydrides, alkali metal and alkali metal alloys, alkali metal and alkaline earth alkyls, alkali metal and/or alkaline earth amides (saline metal amides) can be used in the practice of this invention to react with a PCAH and/or a [PCA$^-$] precursor to form the [PCA$^-$] that comprises the catalysts and reagents of this invention. Said formation of the [PCA$^-$]M$^+$ and/or as [PCA$^-$]$_2$M$^{2+}$ can be conducted either; (a) in situ in the catalyst forming reactor well in advance of catalyst formation and/or during catalyst formation; and/or (b) in an external reactor associated with the catalyst forming reactor or completely separate from the catalyst forming reactor. It should be noted however that use of a saline metal amide could potentially result in the incorporation of an amine functionality in the polymer compositions of this invention and in some applications is not desired. Additionally, the use of a complexed metal hydride such as LiAH$_4$ to form a [PCA$^-$]Li$^+$ could require separation of the [PCA$^-$]Li$^+$ thus formed from the aluminum co-product of such a reaction.

Examples 28 and 29 hereinafter demonstrate that the amino ether-alkoxides can under certain conditions degrade or decompose when formed or during the course of a LOXLiH catalyzed HMSHIP process. Example 30 demonstrates that under certain process conditions the LOXLiH catalyst formed from an ether-alkoxide formed from 2-methoxyethanol and an organolithium compound does not sufficiently activate the hydrogen chain transfer process. Thus the preferred polarizing complexing agents especially for a LOXLiH process are the aminoalkoxides. It is to be understood however that the amino ether-alkoxides may be well suited for LOXSH bimetallic catalyst low in LiH activity. Likewise conditions or processes where the LOXLiH catalyst formed from 2-methoxyethanol is more suitable or more active can likely be found by through the practice of this invention.

There are many chiral tertiary aminoalcohols available that can be synthesized by reduction and further synthetic elaboration of chiral amino acids for example so a list of suitable aminoalcohols can be endless. Any advantage that the use of such chiral tertiary amino alcohols may provide in terms of selectivity, tacticity or stereo regularity is well within the scope of this invention. Nonetheless, the less complex tertiary aminoalcohols which may be prepared by the simple reaction of an amine with reactive cyclic ethers such as ethylene oxide or other epoxides are preferred. Non-limiting examples of such tertiary aminoalcohols that are readily available include: dimethylaminoethanol, diethylaminoethanol, N-methyl-diethanolamine, 3-dimethylamino-1-propanol, 2-[2-(dimethylamino)ethoxy]ethanol, 1-(2-hydroxyethyl)piperidine, 1-(2-hydroxyethyl)morpholine, 1-(2-hydroxyethyl)pyrolidine, 1-methyl-2-pyrolidinemethanol and the like.

Non-limiting examples of poly(tertiary amine) promotors useful in LOXSH catalysts include di(tertiary amine) ligands derived from propylene diamine, di(tertiary amine) ligands derived from ethylene diamine or from polyethylene imine. Preferred examples include N,N,N',N'-tetramethylethylenediamine (TMEDA), N,N,N',N'',N''-pentamethyldiethylenetriamine (PMDETA), sparteine, isosparteine, and 1,4-methylpiperazine wherein TMEDA is most preferred. The most preferred poly(tertiary amine) promotor ligands are the most volatile and/or the most water and/or acid soluble compounds thus TMEDA is preferred. The presence of the polytertiaryamine promotor compound appears to facilitate formation of the LOXSH catalyst/reagent. A LOXSH process can be conducted in the absence of the polytertiaryamine promotor however the presence of the polytertiaryamine promotor in some Examples provided LOXSH PS distributions of lower asymmetry and in increased yields at reduced monomer feed rates and at reduced hydrogen pressure.

The preferred aromatic hydrocarbon which may be used is any aromatic hydrocarbon having a pK$_a$ relative to toluene±2.75 pK$_a$ units however it is conceivable that an aromatic hydrocarbon such as diphenylmethane with a pK$_a$ of 4.32 units less than toluene can be employed so long as: 1) the incorporation of diphenylmethane moiety in the polymer microstructure does not affect the ultimate end use; and/or 2) the pK$_a$ of such hydrocarbons are sufficiently above that of H$_2$ under the reaction conditions so as to not interfere with the hydrogen mediated chain transfer mechanism. Non-limiting examples of aromatic hydrocarbons that may be used are benzene, toluene, mesitylene, ethylbenzene, n-propylbenzene, n-butylbenzene, iso-butylbenzne, amylbenzene, 1,2-diarylethanes, 1,3-diarylpropanes, cumene, t-butylbenzene, a 1-alkyl naphthalene, 2-alylnaphthalene or a styrene dimer or low molecular weight oligomer distribution (styrene dimers, trimers, tetramers and pentamers). Though the use of such aromatic hydrocarbons is optional, their use is preferred in that it is believed their presence diminishes or preempts or otherwise mitigates the undesired attack of the organolithium more specifically an alkyllithium reagent on the polytertiaryamine promotor. LOXSH catalysts can mitigate or inhibit the attack of the organolithium reagent on the alkali or alkaline earth aminoalkoxide, alkali or alkaline earth amino ether-alkoxide and "alkali or alkaline earth ether-alkoxide comprising the said catalyst. Hydrocarbons that are easily removed from the product distribution by distillation or by polymer precipitation are preferred. The most preferred aromatic hydrocarbon for HMSHIP process utilizing styrene is ethylbenzene.

The hydrocarbon solvent which may be used in any hydrocarbon having a pK$_a$ greater than molecular hydrogen (H$_2$) under the reaction conditions. Non-limiting examples of such preferred solvents are cyclohexane, methyl cyclohexane, and the aromatic hydrocarbons listed above. Other hydrocarbon solvents can be used as long as their use does not affect the solubility of the saline hydride catalyst, reactive intermediates, transient living polymer chains and the polymer chain distribution product.

The aromatic hydrocarbon and the aromatic solvent may be the same or different. This means that the aromatic hydrocarbon can act as both the aromatic hydrocarbon and the solvent. For example, ethylbenzene is a preferred component in the polymerization of styrene and can be used as both the aromatic hydrocarbon and the solvent. In this case, for a LOXSH process components (iv) and (vi) would merge into one component (or limitation) and be the same. Likewise, they can be different. For example, the aromatic hydrocarbon may be ethylbenzene and the hydrocarbon may be cyclohexane. Thus components (iv) and (vi) would be different. Furthermore, component (iv) may be optional if no aromatic hydrocarbon is used and, for example, cyclohexane is used as component (vi).

The partial pressure of hydrogen in the above LOXSH catalysts forming process is maintained at pressures between about 0.001 to about 10.0 Bar, or about 0.3 to about 6.8 Bar, or about 0.5 to about 5.2 Bar or about 1.0 to about 4.2 Bar.

In forming a monometallic LOXLiH catalyst from a tertiaryaminoalcohol and an organolithium compound the ratio of tertiaryaminoalcohol to organolithium can vary widely. It should be understood however, in order to form a lithium hydride species, a molar excess of the organolithium compound over the molar equivalent amount of tertiaryaminoalcohol must be used such that a lithium-carbon bond is available for reduction to the lithium hydride species. It is conceivable to employ charge ratios of 40 moles of tertiaryaminoalcohol per 41 moles of organolithium reagent; however such charge ratios are a waste of expensive reagents. Preferred charge ratios (tertiaryaminoalcohol:organolithium) is in the range of from (1.00:1.05) to about (1:6), a more preferred range is from (1.00:1.10) to about (1:5); an even more preferred range is from (1.0:1.2) to about (1:4); and the most preferred range is from (1.00:1.40) to about (1:3).

Though we wish not to be bound by theory the results set forth in the Examples 33 and 34 below indicate that a (1:1.5)—i.e. (2:3) charge ratio of N,N-dimethylaminoethanol (DMEAH) to n-butyllithium with concurrent or subsequent reduction with hydrogen to form the hydride provides a di-hydride catalyst with the formula $[DMEA^-]_4Li_6H_2$ where only one of the two hydrides initiate polymerization of styrene under a cyclohexane atmosphere. Similarly the Examples 35 and 36 indicate that a 1:2 ratio of DMEAH to n-butyllithium provides tetra-hydride catalyst with the formula $[DMEA^-]_4Li_8H_4$ where only one of the four hydrides initiate polymerization of styrene under a hydrogen atmosphere. Likewise a (1:3) charge ratio as used in Example 37) produced a soluble hydride catalyst with the formula $[DMEA^-]_2Li_6H_4$ where only approximately 1 in 9 hydrides initiated polymerization of styrene in a cyclohexane atmosphere. thus this preferred catalyst composition in theory includes a mixture of aggregates having the empirical formulae $[DMEA^-]_4Li_{12}H_{18}$ in combination with $[DMEA^-]_5Li_{15}H_{10}$ wherein both catalyst only one hydride is available for initiation of styrene polymerization in the absence of additional molecular hydrogen. A Most preferred catalyst composition is comprised of catalyst aggregates having the overall empirical formula: (a) $[DMEA^-]_5Li_{12}H_7$; and/or (b) $[DMEA^-]_2Li_5H_3$ where the ratio of (tertiaryaminoalcohol:organolithium) is in the range of from (1:2.4) to (1:2.5). The same preferred ranges apply in forming soluble lithium hydride complexes, catalyst and reagents from tertiary amino ether-alcohols and/or ether-alcohols.

It should be noted that it is believed that the LOXLiH catalyst when formed under hydrogen exist as aggregates which under certain stoichiometry exist as well defined species of a fixed molecular weight while other stoichiometry or charge ratios provide catalyst that are not well defined but exists as mixtures of non-uniform aggregates. It is further believed that the presence of a polytertiaryamine promotor can additionally either stabilize certain aggregates or help to break up other less uniform mixtures of larger aggregates into smaller more active aggregates. Thus the activity of a catalyst system can vary greatly, but as a whole this class of catalyst is relatively poor at initiation of living anionic polymerization. That is to say as initiators the LOXLiH reagents in a $H_2$ free atmosphere are relatively inefficient with regard to the availability of the hydride for initiation ($Eff_{CT}$<1.0 and is in the range of $Eff_{CT}$=0.1 to $Eff_{CT}$=0.67). Thus it remains extraordinarily surprising that these same catalyst so efficiently initiate and catalyze the hydrogen mediated anionic chain transfer polymerizations of the present inventions with the % $Eff_{CT}$=1000% to 16000% with the lower values—values closer to 1000% —only resulting from intentional limiting use of the monomer.

The hydrocarbon soluble LOXSH catalyst may have the following empirical chemical formulas: a) $[PCA^-]_4Li_6H_2$, b) $[PCA^-]_4Li_8H_4$; c) $[PCA^-]_2Li_6H_4$; d) $[PCA^-]_4Li_{12}H_8$; e) $[PCA^-]_5Li_{15}H_{10}$; f) $[PCA^-]_5Li_{12}H_7$; g) $[PCA^-]_2Li_5H_3$; h) $[PCA^-]_4Li_4MgH_2$, i) $[PCA^-]_4Li_4Mg_2H_4$; j) $[PCA^-]_2Li_4MgH_4$; k) $[PCA^-]_4Li_6Mg_3H_8$; l) $[PCA^-]_5Li_9Mg_3H_{10}$; m) $[PCA^-]_5Li_6Mg_3H_7$; n) $[PCA^-]_2Li_3MgH_3$; o) $[PCA^-]_4Li_5KH_2$; p) $[PCA^-]_4Li_7KH_4$; and q) $[PCA^-]_2Li_5KH_4$, and wherein said empirical formula can optionally further comprise a PTA promoter ligand complex in a molar ratio of total alkali and alkali earth metal to PTA from about 10,000 to 1.0 to about 1.0 to about 8.0. The preferred $[PCA^-]$ are $[DMEA^-]$, $[DMAEOE^-]$ or $[MEOE^-]$.

In forming the bimetallic Group I alkali metal LOXSH catalyst the ratio of tertiaryaminoalcohol to total alkali metal (tertiaryaminoalcohol:alkali) is in the range of range of from (1.00:1.05) to about (1:6), a more preferred range is from (1.00:1.10) to about (1:5); an even more preferred range is from (1.0:1.2) to about (1:4); and the most preferred range is from (1.00:1.40) to about (1:3). And the ratio of lithium to alkali metal excluding lithium (Li:Na and/or Li:K and/or Li:Cs etc.) is from (10,000:1) to (1:2), the preferred ratio are in the range of (34:1) to (2:1), and most preferred are (17:1) to (3:1). It is to be understood that in this connection a charge ratio of (10,000:1) can represent the unintended presence of alkali metal, potassium in particular, in even trace quantities due to an amount left in the reactor or charge lines or tanks from previous runs where the alkali metal was intentionally charged. Potassium and other alkali metal based bimetallic lithium catalysts have a tendency to deposit trace levels of catalyst or catalyst by-products on reactor walls such trace levels have been found to negatively impact the otherwise highly selective microstructure delivered by a pure LOXLiH catalyst system during the hydrogen mediated saline hydride initiate polymerization of styrene.

Bimetallic lithium with sodium and/or with potassium and/or with cesium bimetallic complex LOXSH catalyst with the empirical chemical formulae: a) $[DMEA^-]_4Na_4Li_4H_4$; b) $[DMEA^-]_6Na_4Li_4H_2$; c) $[DMEA^-]_6Na_4Li_6H_4$; d) $[DMEA^-]_4K_4Li_4H_4$; e) $[DMEA^-]_6K_4Li_4H_2$; f) $[DMEA^-]_6K_4Li_6H_4$; g) $[DMEA^-]_4Cs_4Li_4H_4$; h)

[DMEA$^-$]$_6$Cs$_4$Li$_4$H$_2$); and i) [DMEA$^-$]$_6$Cs$_4$Li$_6$H$_4$ are producible from this invention. Additionally such bimetallic LOXSH catalyst formulations in combination with the monometallic LOXLiH catalyst formulations from above are within the scope of the invention.

In forming the magnesium hydride based bimetallic Group II alkaline earth complex with lithium, the LOXMgH$_2$ catalyst, the ratio of (tertiaryaminoalcohol:total-metal-equivalents) where lithium provides one equivalent and magnesium provides 2, is in the range from (1.00:1.05) to about (1:6), a more preferred range is from (1.00:1.10) to about (1:5); an even more preferred range is from (1.0:1.2) to about (1:4); and the most preferred range is from (1.00:1.40) to about (1:3). Thus a catalyst composition with the empirical formula [DMEA$^-$]$_4$Li$_4$MgH$_2$ (4 moles DMEAH to 5 total moles of metal is thus (4:6 or 1.0:1.5 DMEAH:total-metal-equivalents) and is preferred. Likewise catalysts with the empirical formulae: a) [DMEA$^-$]$_4$Li$_4$Mg$_2$H$_4$ (1:2 DMEAH:total-metal-equivalents); b) [DMEA$^-$]$_6$Li$_4$Mg$_2$H$_2$ (1.00:1.33 DMEAH:total-metal-equivalents); and c) [DMEA$^-$]$_6$Li$_4$Mg$_3$H$_4$ (1.00:1.67 DMEAH:total-metal-equivalents); alone or in combination with a LOXLiH or LOXSH catalyst formulation from above are within the scope of the invention. The same preferred ranges in forming soluble bimetallic lithium magnesium hydride complexes, catalyst and reagents from tertiary amino ether-alcohols and/or ether-alcohols can be used. The same preferred ranges can be applied to form soluble bimetallic lithium calcium hydride complexes, catalyst and reagents from tertiaryaminoalcohols and/or tertiary amino ether-alcohols and/or ether-alcohols.

The invention further relates to a hydrocarbon soluble catalyst or reagent composition formed from reagents comprising a solid alkali hydride, an alkali metal and/or an alkali metal alloy wherein the ratio of polarizing complexing agent to total alkali metal is in the range of range of from about 1:1.05 to about 1:6; and the molar ratio of organolithium compound to alkali metal is from 10,000:1 to 1:2.

Another embodiment is a hydrocarbon soluble monometallic LOXLiH catalyst or reagent composition formed from molecular hydrogen and either:
  a. a polarizing complexing agent reacted to a lithium alkoxide and an organolithium compound wherein the molar ratio of polarizing complexing agent to total alkali metal is in the range of from about 1:1.05 to about 1:6; or
  b. a polarizing complexing agent and an organolithium compound wherein the molar ratio of polarizing complexing agent to total alkali metal is in the range of from about 1:1.05 to about 1:6; or
  c. a polarizing complexing agent; at least one of solid lithium hydride and/or lithium metal; and an organolithium compound wherein the molar ratio of polarizing complexing agent to total lithium is in the range of range of from about 1:1.05 to about 1:6.

Another embodiment is a hydrocarbon soluble catalyst or reagent composition comprising a magnesium hydride alkaline earth metal LOXMgH$_2$ catalyst or reagent formed from molecular hydrogen and either:
  a. a polarizing complexing agent reacted to form a lithium and/or magnesium alkoxide; an organolithium compound and/or an organomagnesium compound; wherein the molar ratio of polarizing complexing agent to total-metal-equivalents is in the range of from about 1:1.05 to about 1:6, where lithium provides one equivalent and magnesium provides 2 equivalents; or
  b. a polarizing complexing agent; an organolithium compound; and an organomagnesium compound; wherein the molar ratio of polarizing complexing agent to total-metal-equivalents is in the range of from about 1:1.05 to about 1:6, where lithium provides one equivalent and magnesium provides 2 equivalents; or
  c. a polarizing complexing agent; at least one of solid lithium hydride, metallic lithium, solid magnesium hydride; at least one of an organolithium compound and/or an organomagnesium compound; wherein the molar ratio of polarizing complexing agent to total-metal-equivalents is in the range of from about 1:1.05 to about 1:6, where lithium provides one equivalent and magnesium provides 2 equivalents; or
  d. a polarizing complexing agent; at least one of solid lithium hydride and/or metallic lithium; and organomagnesium compound; wherein the molar ratio of polarizing complexing agent to total-metal-equivalents is in the range of from about 1:1.05 to about 1:6, where lithium provides one equivalent and magnesium provides 2 equivalents;
  e. a polarizing complexing agent; solid magnesium hydride; and an organolithium compound; wherein the molar ratio of polarizing complexing agent to total-metal-equivalents is in the range of from about 1:1.05 to about 1:6, where lithium provides one equivalent and magnesium provides 2 equivalents.
  f. and wherein the molar ratio of lithium to magnesium in the catalyst composition is from 10,000:1 to 1:6.

Another embodiment is a process for forming a hydrocarbon soluble catalyst or reagent composition formed from: (i) molecular hydrogen; (ii) an organolithium compound and/or an organomagnesium compound; (iii) optionally a polytertiaryamine compound; (iv) a polarizing complexing agent selected from a tertiary aminoalcohol compound; a tertiary amino ether-alcohol, an ether-alcohol or combinations thereof; (v) optionally an alkali metal or metal alloy and/or a solid saline hydride and/or a alkali amide; (vi) optionally an aromatic hydrocarbon having at least one C—H covalent bond pK$_a$ within the range of 2.75 pK$_a$ units above that of the pK$_a$ of toluene to −4.30 pK$_a$ units below the pK$_a$ of toluene; and in (vii) a hydrocarbon solvent with a pK$_a$ greater than H$_2$; wherein the aromatic hydrocarbon and hydrocarbon solvent may be the same or different.

In the above process, the hydrogen partial pressure used in forming the catalyst or reagent is in the range of from about 0.1 bar to about 300 bar. In addition, the temperature used in forming the catalyst or reagent is in the range of from about −96° C. to about 130° C. Furthermore, the molar equivalent charge ratios of the polarizing complexing agent to the organolithium compound and/or an organomagnesium is in the range of from about 1:1.05 to about 1:6 moles of polarizing complexing agent per mole of metal-alkyl equivalents where lithium provides one equivalent and magnesium provides 2 equivalents. When PTA is used to form the catalyst or reagent, the molar ratios of the PTA to total metal (magnesium and lithium) is from about 10,000:1.0 to about 1:8.

One embodiment for forming the hydrocarbon soluble catalyst or reagent composition involves the steps of:
  A. the polarizing complexing agent is first contacted with at least one alkoxide forming reagent of: a) solid lithium hydride; b) lithium metal; c) magnesium hydride; d) lithium amide; e) magnesium amide; f) organolithium compound; g) organomagnesium compound thereby forming a reaction mixture wherein the stoichiometric molar equivalent ratio of polarizing complexing agent to alkoxide forming reagent is from about 1:1 to less than 1:1 where lithium provides one equivalent and magnesium provides 2 equivalents;
B. wherein the organolithium compound and/or organomagnesium compound is further added;
C. wherein the ratio of polarizing complexing agent to total metal equivalents is in the range of from about 1:1.05 to about 1:6 where lithium provides one equivalent and magnesium provides 2 equivalents;
D. wherein either the molar ratio of lithium to magnesium is in the range of from about 10,000:1 to about 1.0:6.0;
E. and wherein the formed reaction product is further reduced with hydrogen to form the hydrocarbon soluble saline hydride catalyst or reagent.

Another embodiment for forming the hydrocarbon soluble catalyst or reagent composition involves the steps of:
A. the polarizing complexing agent is first contacted with an alkali alkoxide forming reagent thereby forming a reaction mixture wherein the stoichiometric molar equivalent ratio of polarizing complexing agent to alkoxide forming reagent is from about 1:1 to less than 1:1;
B. wherein said alkoxide forming reagent is at least one of a) a solid alkali hydride; b) an alkali metal; c) an alkali metal alloy; d) and alkali amide; e) magnesium amide; f) organolithium compound; g) organomagnesium compound;
C. wherein the organolithium and/or organomagnesium compound is further added;
D. wherein the ratio of polarizing complexing agent to total alkali metal is in the range of from about 1:1.05 to about 1:6;
E. wherein either the molar ratio of lithium to non-lithium alkali metal is in the range of range of from 1:2 to about 10,000:1 or the alkali metal of the catalyst composition is exclusively lithium;
F. and wherein the formed reaction product is further reduced with hydrogen to form the hydrocarbon soluble saline hydride catalyst or reagent.

In the above process and steps for forming the hydrocarbon soluble catalyst or reagent composition, the process may further comprises feeding styrenic monomer to form a poly(styryl)magnesium and/or a poly(styryl)lithium compound prior to reduction by contacting with molecular hydrogen to form the soluble saline hydride wherein the molar ratio of styrenic monomer to total metal is from about 1:10 to about 20:1. In another embodiment, the process may further comprises feeding styrenic monomer to form a transient 1-phenyl-hexylmagneisium compound and/or poly(styryl)magnesium compound which is further reduced by molecular hydrogen to the soluble saline hydride wherein the molar ratio of styrenic monomer to magnesium is from about 1:5 to about 20:1 The preferred styrenic monomer is styrene.

In another embodiment of the present invention, a hydrocarbon soluble catalyst or reagent composition formed from: (i) molecular hydrogen; (ii) an organolithium compound and/or an organomagnesium compound; (iii) optionally a polytertiaryamine compound; (iv) a polarizing complexing agent selected from a tertiary aminoalcohol compound; a tertiary amino ether-alcohol, an ether-alcohol or combinations thereof; (v) optionally an alkali metal or metal alloy and/or a solid saline hydride and/or a alkali amide; (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; (vii) a vinylaromatic monomer; and in (viii) a hydrocarbon solvent with a $pK_a$ greater than $H_2$; wherein the aromatic hydrocarbon and hydrocarbon solvent may be the same or different, and wherein the solubility of hydride comprising said catalyst or reagent is at least about 0.0080 moles per liter.

Another embodiment of the present invention is a catalyst or reagent composition formed from: (i) molecular hydrogen; (ii) an organolithium compound and/or an organomagnesium compound; (iii) optionally a polytertiaryamine compound; (iv) a tertiary aminoalcohol compound and/or a tertiary amino ether-alcohol and/or a ether-alcohol; (v) optionally an alkali metal or metal alloy and/or a solid saline hydride (vi) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; and in (vii) a hydrocarbon solvent with a $pK_a$ greater than $H_2$; wherein the aromatic hydrocarbon and hydrocarbon solvent may be the same or different.

A most desired LOXSH catalyst are the bimetallic LOXMgH$_2$ catalyst compositions or aggregates formed when the tertiary aminoalcohol is N,N-dimethylaminoalcohol (DMEAH) and depending on the reagent's charge ratios can have the empirical and/or molecular formulae as a well-defined composition or as the average composition of the catalyst mixture in solution: a) [DMEA$^-$]$_4$Li$_4$MgH$_2$, b) [DMEA$^-$]$_4$Li$_4$Mg$_2$H$_4$; c) [DMEA$^-$]$_2$Li$_4$MgH$_4$; d) [DMEA$^-$]$_4$Li$_6$Mg$_3$H$_8$; e) [DMEA$^-$]$_5$Li$_9$Mg$_3$H$_{10}$; (f) [DMEA$^-$]$_5$Li$_6$Mg$_3$H$_7$; and (b) [DMEA$^-$]$_2$Li$_3$MgH$_3$.

Among the most desired LOXSH catalyst are the monometallic LOXLiH catalyst compositions or aggregates formed when the tertiary aminoalcohol is N,N-dimethylaminoalcohol (DMEAH) and depending on the reagent's charge ratios can have the empirical and/or molecular formulae as a well-defined composition or as the average composition of the catalyst mixture in solution: a) [DMEA$^-$]$_4$Li$_6$H$_2$, b) [DMEA$^-$]$_4$Li$_8$H$_4$; c) [DMEA$^-$]$_2$Li$_6$H$_4$; d) [DMEA$^-$]$_4$Li$_{12}$H$_8$; e) [DMEA$^-$]$_5$Li$_{15}$H$_{10}$; (f) [DMEA$^-$]$_5$Li$_{12}$H$_7$; and (g) [DMEA$^-$]$_2$Li$_5$H$_3$.

Thus preferred hydrocarbon soluble LOXLIH catalysts have the chemical formulas [DMEA$^-$]$_x$Li$_y$H$_z$; wherein z=y−x and x, y and z are positive real numbers, whole or fractional, greater than and not equal to zero and wherein said formula can optionally further comprise TMEDA ligand complex in a molar ratio of total lithium to TMEDA from about 10,000 to 1.0 to about 1.0 to about 8.0.

Thus this invention also relates to a hydrocarbon soluble catalyst or reagent composition formed from reagents comprising hydrogen, an organolithium compound and dimethylaminoethanol and depending on the reagent's charge ratios can have the empirical and/or molecular formulae as I) a well-defined LiH aggregate composition of 1)-105) in solution; or II) as the average LiH aggregate composition as any two or more of 1)-105) in any proportion in solution; or III) one or more well-defined LiH aggregate composition or average composition in solution in combination with some insoluble LiH aggregate composition of 1)-105) out of solution; of one or more of the following

| | | |
|---|---|---|
| 1) [DMEA$^-$]Li$_2$H; | 16) [DMEA$^-$]Li$_7$H$_6$; | 31) [DMEA$^-$]$_3$Li$_9$H$_6$; |
| 2) [DMEA$^-$]$_2$Li$_3$H; | 17) [DMEA$^-$]$_2$Li$_7$H$_5$; | 32) [DMEA$^-$]$_4$Li$_9$H$_5$; |
| 3) [DMEA$^-$]Li$_3$H$_2$; | 18) [DMEA$^-$]$_3$Li$_7$H$_4$; | 33) [DMEA$^-$]$_5$Li$_9$H$_4$; |
| 4) [DMEA$^-$]Li$_4$H$_3$; | 19) [DMEA$^-$]$_4$Li$_7$H$_3$; | 34) [DMEA$^-$]$_6$Li$_9$H$_3$; |

-continued

5) $[DMEA^-]_2Li_4H_2$;
6) $[DMEA^-]_3Li_4H$;
7) $[DMEA^-]Li_5H_4$;
8) $[DMEA^-]_2Li_5H_3$;
9) $[DMEA^-]_3Li_5H_2$;
10) $[DMEA^-]_4Li_5H$;
11) $[DMEA^-]Li_6H_5$;
12) $[DMEA^-]_2Li_6H_4$;
13) $[DMEA^-]_3Li_6H_3$;
14) $[DMEA^-]_4Li_6H_2$;
15) $[DMEA^-]_5Li_6H$;
20) $[DMEA^-]_5Li_7H_2$;
21) $[DMEA^-]_6Li_7H$;
22) $[DMEA^-]Li_8H_7$;
23) $[DMEA^-]_2Li_8H_6$;
24) $[DMEA^-]_3Li_8H_5$;
25) $[DMEA^-]_4Li_8H_4$;
26) $[DMEA^-]_5Li_8H_3$;
27) $[DMEA^-]_6Li_8H_2$;
28) $[DMEA^-]_7Li_8H$;
29) $[DMEA^-]Li_9H_8$;
30) $[DMEA^-]_2Li_9H_7$;
35) $[DMEA^-]_7Li_9H_2$;
36) $[DMEA^-]_8Li_9H$;
37) $[DMEA^-]Li_{10}H_9$;
38) $[DMEA^-]_2Li_{10}H_8$;
39) $[DMEA^-]_3Li_{10}H_7$;
40) $[DMEA^-]_4Li_{10}H_6$;
41) $[DMEA^-]_5Li_{10}H_5$;
42) $[DMEA^-]_6Li_{10}H_4$;
43) $[DMEA^-]_7Li_{10}H_3$;
44) $[DMEA^-]_8Li_{10}H_2$;
45) $[DMEA^-]_9Li_{10}H$;
46) $[DMEA^-]Li_{11}H_{10}$;
47) $[DMEA^-]_2Li_{11}H_9$;
48) $[DMEA^-]_3Li_{11}H_8$;
49) $[DMEA^-]_4Li_{11}H_7$;
50) $[DMEA^-]_5Li_{11}H_6$;
51) $[DMEA^-]_6Li_{11}H_5$;
52) $[DMEA^-]_7Li_{11}H_4$;
53) $[DMEA^-]_8Li_{11}H_3$;
54) $[DMEA^-]_9Li_{11}H_2$;
55) $[DMEA^-]_9Li_{11}H$;
56) $[DMEA^-]Li_{12}H_{11}$;
57) $[DMEA^-]_2Li_{12}H_{10}$;
58) $[DMEA^-]_3Li_{12}H_9$;
59) $[DMEA^-]_4Li_{12}H_8$;
60) $[DMEA^-]_5Li_{12}H_7$;
61) $[DMEA^-]_6Li_{12}H_6$;
62) $[DMEA^-]_7Li_{12}H_5$;
63) $[DMEA^-]_8Li_{12}H_4$;
64) $[DMEA^-]_9Li_{12}H_3$;
65) $[DMEA^-]_{10}Li_{12}H_2$;
66) $[DMEA^-]_{11}Li_{12}H$;
67) $[DMEA^-]Li_{13}H_{12}$;
68) $[DMEA^-]_2Li_{13}H_{11}$;
69) $[DMEA^-]_3Li_{13}H_{10}$;
70) $[DMEA^-]_4Li_{13}H_9$;
71) $[DMEA^-]_5Li_{13}H_7$;
72) $[DMEA^-]_6Li_{13}H_7$;
73) $[DMEA^-]_7Li_{13}H_6$;
74) $[DMEA^-]_8Li_{13}H_5$;
75) $[DMEA^-]_9Li_{13}H_4$;
76) $[DMEA^-]_{10}Li_{13}H_3$;
77) $[DMEA^-]_{11}Li_{13}H_2$;
78) $[DMEA^-]_{12}Li_{13}H$;
79) $[DMEA^-]Li_{14}H_{13}$;
80) $[DMEA^-]_2Li_{14}H_{12}$;
81) $[DMEA^-]_3Li_{14}H_{11}$;
82) $[DMEA^-]_4Li_{14}H_{10}$;
83) $[DMEA^-]_5Li_{14}H_9$;
84) $[DMEA^-]_6Li_{14}H_8$;
85) $[DMEA^-]_7Li_{14}H_7$;
86) $[DMEA^-]_8Li_{14}H_6$;
87) $[DMEA^-]_9Li_{14}H_5$;
88) $[DMEA^-]_{10}Li_{14}H_4$;
89) $[DMEA^-]_{11}Li_{14}H_3$;
90) $[DMEA^-]_{12}Li_{14}H_2$;
91) $[DMEA^-]_{13}Li_{14}H$;
92) $[DMEA^-]Li_{15}H_{14}$;
93) $[DMEA^-]_2Li_{15}H_{13}$;
94) $[DMEA^-]_3Li_{15}H_{12}$;
95) $[DMEA^-]_4Li_{15}H_{11}$;
96) $[DMEA^-]_5Li_{15}H_{10}$;
97) $[DMEA^-]_6Li_{15}H_9$;
98) $[DMEA^-]_7Li_{15}H_8$;
99) $[DMEA^-]_8Li_{15}H_7$;
100) $[DMEA^-]_9Li_{15}H_6$;
101) $[DMEA^-]_{10}Li_{15}H_5$
102) $[DMEA^-]_{11}Li_{15}H_4$
103) $[DMEA^-]_{12}Li_{15}H_3$
104) $[DMEA^-]_{13}Li_{15}H_2$
105) $[DMEA^-]_{14}Li_{15}H$ or IV) any of I), II) or III) where the total composition of catalyst aggregate can be expressed as $[DMEA^-]_xLi_yH_z$. Thus the hydrocarbon soluble $[DMEA^-]_xLi_yH_z$ catalysts of this invention are formed from: (i) y equivalents of an organolithium compound; (ii) an optional amount of TMEDA; (iii) x equivalents of dimethylaminoethanol; (iv) optionally ethylbenzenee; in (v) a hydrocarbon solvent having a $pK_a$ greater than $H_2$, wherein the aromatic hydrocarbon can be ethylbenzene or different and (vi) molecular hydrogen, wherein the amount of hydride formed z is given by the equation z=y-x and x, y and z are positive real numbers whole or fractional greater than and not equal to zero In the practice of the invention the $[DMEA^-]_xLi_yH_z$ catalysts can be optionally formed in a variety of methods which are not limited by but include:

a) forming a well-mixed and reacted solution or suspension comprised of about y equivalents of (i), optionally (ii), about x equivalents (iii), optionally (iv) and in (v) under an inert atmosphere and then converted to $[DMEA^-]_xLi_yH_z$ by: 1) feeding a portion of the styrene to the thus formed "ate" complex; and then 2) replacing or otherwise displacing the inert atmosphere with $H_2$; or b) forming a well-mixed and reacted solution or suspension comprised of about y equivalents (i), optionally (ii), about x equivalents of (iii), and optionally (iv) in (v) under an inert atmosphere to form a precursor "ate" complex which is then converted to $[DMEA^-]_xLi_yH_z$ by replacing or otherwise displacing the inert atmosphere with hydrogen; or c) forming a well-mixed and reacted solution or suspension comprised of a portion of about x equivalents of (i) with optionally (ii), about x equivalents of (iii), and optionally (iv) in (vi) in an external reactor, transferring said solution to the hydride forming reactor under hydrogen and then charging the balance of about z or y-x equivalents (i); or d) forming a well-mixed and reacted solution or suspension comprised of optionally (ii), about x equivalents of (iii), and optionally (iv) in (v) under a hydrogen atmosphere; then feeding y equivalents of (i) all at once or in large proportion increments; or e) forming a well-mixed and reacted solution or suspension comprised of optionally (ii), about x equivalents of (iii), and optionally (iv) in (v) under a hydrogen atmosphere then feeding about y equivalents of (i) continuously or in increments over a period greater than about 3 minutes; or f) forming a well-mixed and reacted solution or suspension comprised of about x equivalents of (iii), and optionally (iv) in (v) under a hydrogen atmosphere then feeding about y equivalents of (i) continuously or in increments over a period greater than about 3 minutes followed by the addition of desired amount of (ii);

g) forming a well-mixed and reacted solution or suspension comprised of x equivalents of (iii), and optionally (iv) in a portion of (v) under a hydrogen atmosphere then feeding about y equivalents of (i) previously further diluted with (iv) and/or a portion of (v) continuously or in increments over a period greater than about 3 minutes followed by the addition of desired amount of (ii);

h) forming a well-mixed and reacted solution or suspension comprised of about x equivalents of (i), and optionally (iv) in a portion of (v) under a hydrogen atmosphere then feeding about x equivalents of (iii) previously further diluted with (iv) and/or a portion of (v) all at once, or continuously or in increments over time until the entire charge of (iii) is complete then feeding about z or y-x equivalents of (i) followed by the addition of desired amount of (ii).

It has been found that the $[DMEA^-]_xLi_yH_z$ catalyst/reagent is conveniently prepared in a very active and soluble form according to methods e), f), and g) under an initial hydrogen atmosphere of 1.0 to 3.0 atmosphere $H_2$ pressure though higher or lower $H_2$ pressures can be employed.

The initial temperatures of −96° to above 100° C. can be employed in forming the $[DMEA^-]_xLi_yH_z$ catalysts and or reagents of this invention depending on the melting points of (iv) and (v) and the solubilities and stabilities of (i), (ii) and (iii) under the reaction conditions. As set forth in the Examples, the [DMEA$^-$]$_x$Li$_y$H$_z$ catalyst were conveniently prepared at temperatures in the range of 35° to 40° C.

Thus when forming [DMEA$^-$]$_2$Li$_3$H catalyst most typically about 3 equivalents (y≈3) of organolithium compound (n-butyllithium 16.5 wt % in cyclohexane) (i) further diluted with cyclohexane and or methylcyclohexane (v) and/or ethylbenzene (iv) is then fed slowly (over a period of 15 to 25 minutes using a modest backpressure across a metering needle valve (20-30 PSIG back pressure drop across the valve) to the well stirred reaction mixture (about 50 to about 2000 RPMs; preferably about 200 to about 1500 RPMs; and most preferably about 500 to about 1200 RPMs when using the pitched blade impellers described herein below or any other suitable gas dispersing mixing apparatus) at 35° C. to 40° C. comprising dissolved H$_2$ (15-22 PSIG H$_2$), about 2 equivalents (x≈2) of dimethylaminoethanol (ii), in cyclohexane and or methylcyclohexane (v) with or without ethylbenzene (iv). Initially during the first ⅓ to about ⅔ of the feed of (i) a barely discernable heat kick ensues and the reactor pressure will increase 2-3 PSIG as a result of the butane that is formed—i.e. when (i) is a butylllithium reagent. The increase in reactor pressure is also in part the result of the compression of headspace vapors and gasses by the volume of the feed introduced—especially when (i) is further diluted with large volumes of (iv) and/or (v). During the last about ⅓ of the feed of (i) the temperature will rise (1.0° to 3.0° C. in the reactor described in the Examples) and the pressure will either stabilize or decrease by 1 to 3 PSIG depending on the conditions used in forming the [DMEA$^-$]$_x$Li$_y$H$_z$ catalyst.

To facilitate complete reduction of the [DMEA$^-$]$_x$Li$_y$H$_z$ catalyst upon forming the catalyst reaction mixture hydrogen is further charged to the reactor such that the reactor pressure will be from 60 to 80 PSIG once the reaction mixture has warmed to the desired initial polymerization reaction temperature. It has been found though it is not necessary to form an active catalyst, the most active forms of [DMSA$^-$]$_x$Li$_y$H$_z$ catalyst are prepared when this further charge of hydrogen to elevated pressure is employed. It is also found that the most active and most reproducible catalyst are formed when the [DMEA$^-$]$_x$Li$_y$H$_z$ catalyst is held at the desired or near the hydrogen mediated anionic polymerization reaction temperature (about 68° to about 82° C.) for a period greater than about one hour, preferably greater than about 2 to more than about 5 hours and then can be vented to the desired H$_2$ pressure for the polymerization. It is not necessary for the practice of this invention to perform such catalyst aging procedures; however the run to run reproducibility is more favored by this technique. Though we wish not to be bound by theory, the catalyst aging process may provide the highest concentration of available hydride in the form of well-defined catalyst compositions having 2, or 3 or 4 LiH moieties within the discrete aggregate—depending on the charge ratio of (i):(iii). The catalyst aging process is considered as an equilibration or redistribution of initially formed higher aggregates having greater than 4 LiH moieties or equivalents per aggregate and or redistribution of catalyst aggregate compositions of less desired ratios of x:y:z to form in higher concentration of catalyst aggregates of desired ratio of x:y:z.

Thus the most active catalysts have been formed when: (a) about 3 equivalents of (i) (2.0 M in cyclohexane one part by weight) is further dissolved in ethylbenzene 8-10 parts by weight; (b) feeding (a) over a period of about 15 to 25 minutes to about 2 equivalents of (iii) dissolved in 24 to 28 parts by weight of (iv) and/or (v) free of (ii) stirred at about 500 RPMs at about 35° C. to 40° C. under a hydrogen atmosphere of 16 to 21 PSIG; (c) optionally adding (ii); (d) increasing the hydrogen pressure to 50 PSIG and the mixing RPMS to 900 to about 1200 RPMS; (e) warming the solution formed in (b) to about 65° to about 85° C.; (f) further increasing the hydrogen pressure to about 75 PSIG; and (g) aging the catalyst for a period of about 1 hour to greater than about 5 hours. After the aging period the hydrogen pressure is carefully vented from the reactor to the desired pressure for conducting the hydrogen mediated anionic polymerization of styrene processes of this invention. Hydrocarbon soluble lithium hydride compositions free of any covalently bonded Lewis Acid group formed directly from hydrogen is heretofore unknown. Thus this equilibration or catalyst aging process under hydrogen at elevated temperature is also a feature of this invention. This feature is not without some rational from the open literature reports regarding formation of vicinal lithium aminoalkoxide aggregates as well as lithium aminoalkoxides complexed organolithium reagents. Thus it has been reported that certain organolithium reagents prepared from chiral vicinal lithium aminoalkoxides are made more enantioselective towards the addition of the organolithium reagent to ketones by following certain charge protocols and aging under cryogenic conditions the reagent components prior to introduction of the ketone. In this connection see: Collumn, D. B.; et. al. "Highly Enantioselective 1,2 Addition of Lithium Acetylide-Ephedrate Complexes: Spectroscopic Evidence for Reaction Proceeding via 2:2 Tetramer, and X-ray Characterization of Related Complexes", *J. Am. Chem. Soc.* 2000, 122. 11212.

Non-limiting preferred examples of organolithium compounds suitable for forming the LOXSH catalysts are n-butyllithium, sec-butyllithium, t-butyllithium, allyllithium, vinyllithium, phenyllithium, 1-hexyl-1-phenyllithium, 1-hexyl-1,1-diphenyllithium, cyclohexyllithium, and poly(styryl)lithium compounds which can be added or generated in situ.

In forming a [DMEA$^-$]$_x$Li$_y$H$_z$ catalyst from a dimethylaminoethanol and an organolithium compound the ratio of dimethylaminoethanol to organolithium can vary widely. It should be understood however, in order to form a lithium hydride species a molar excess of the organolithium compound over the molar equivalent amount of dimethylaminoethanol must be used such that a lithium-carbon bond is available for reduction to the lithium hydride species. It is conceivable to employ charge ratios of 40 moles of dimethylaminoethanol per 41 moles of organolithium reagent; however such charge ratios are a waste of expensive reagents. Preferred charge ratios (dimethylaminoethanol: organolithium) is in the range of from (1.00:1.05) to about (1:6), a more preferred range is from (1.00:1.10) to about (1:5); an even more preferred range is from (1.0:1.2) to about (1:4); and the most preferred range is from (1.00:1.40) to about (1:3). The [DMEA$^-$]$_4$Li$_6$H$_2$ catalyst of the Examples were formed from a charge ratio of about 2 moles of dimethylaminoethanol to 3 moles of n-butyllithium.

It has been found that further dilution of about 2.0 molar or greater solution of the organolithium reagent with the hydrocarbon solvent, especially with some portion of ethylbenzene to about ≤0.2 molar is beneficial (but not necessary) in forming a more active [DMEA$^-$]$_x$Li$_y$H$_z$ catalyst. One explanation is that at lower concentrations of the organolithium compound is less likely to exist in a polymeric aggregate of organolithium species. The complications brought on by the degree of association of alkyllithium compounds in living anionic polymerization reactions of styrene and conjugated dienes is well established in the art (in this connection see Hsieh H. L. and Quirk, R. P. *Anionic Polymerization Principles and Practical Applications*, Marcel Dekker, 1996, New York, pp 135-132 especially Table 6.2 pg. 138). As normally supplied as relatively concentrated solutions (≥1.0 molar solutions) the degree of association of n-butyllithium is generally 6 wherein the degree of association of t-butyllithium and sec-butyllithium is generally 4 in hydrocarbon solvents. Dilution of the organolithium compound with the solvent could result in reduced association of the organolithium reagents and thus a lower localized organolithium concentration when forming the $[DMEA^-]_xLi_yH_z$ catalyst. Though we wish not to be bound by theory, higher local concentrations of the organolithium compound during catalyst formation can result in the formation of less active—i.e. less available LiH—superaggregates of the active $[DMEA^-]_xLi_yH_z$ catalyst. The lower $pK_a$ relative to aliphatic and cycloaliphatic hydro carbons may be of some benefit as well in suppressing any undesired attack of the organolithium reagent upon DMEAH beyond the initial formation of the lithium DMEA$^-$ alkoxide. Thus it may be found that the use of sec-butyllithium is more efficient than n-butyllithium due to the inherent lower state of association of this organolithium compound as compared to n-butyllithium.

It should be noted that it is believed that the $[DMEA^-]_xLi_yH_z$ catalyst when formed under a hydrogen atmosphere exist as aggregates which under certain stoichiometry can exist as well defined species of a fixed molecular weight while other stoichiometry or charge ratios provide catalyst that are not well defined but exists as mixtures of non-uniform aggregates or super aggregates. It is further believed that the presence of a polytertiaryamine promotor or any other suitable organic Lewis base (e.g. tetrahydrofuran) can additionally either stabilize certain aggregates or help to break up other less uniform mixtures of larger aggregates into smaller more active aggregates. Thus the activity of a catalyst system can vary greatly based on the charge ratios, catalyst components and the protocol followed in preparing the catalyst.

The partial pressure of molecular hydrogen employed in forming the $[DMEA^-]_xLi_yH_z$ catalyst is maintained at pressures between about 0.1 to about 300 Bar, or about 0.5 to about 12.0 bar, or about 1.0 to about 10.0 Bar or about 1.1 to about 5.0 Bar. Low or high partial pressures of hydrogen can be employed so long as adequate mixing is provided for mass transfer of $H_2$ from the vapor phase to the condensed phase thus mixing is critical in forming the $[DMEA^-]_xLi_yH_z$ catalyst in reasonably short periods of time.

The temperature employed in forming the $[DMEA^-]_xLi_yH_z$ catalyst is maintained in the range of about −96° C. to about 130° C., more preferably in the range of about 20° C. to about 110° C. and most preferred in the 30° C. to 90° C. In forming the $[DMEA^-]_xLi_yH_z$ catalyst and during a subsequent initial heat up, the catalyst components can be combined and reacted at the temperature just above the melting temperature of the hydrocarbon solvent (or mixture of solvents) or the freezing point of the monomer that is or will be fed. Combining the catalyst components at low temperatures (i.e. −10 to 15° C.) and even under cryogenic conditions (−10° C. to −126° C.) may have the benefit of avoiding or suppressing lithiation reactions that can lead to partial decomposition of the TMEDA promotor and/or DMEAH used.

In that nitrogen may (though no evidence of this has been observed) potentially be "fixed" by—that is $N_2$ may be reduced by—the $[DMEA^-]_xLi_yH_z$ catalyst of this invention it is potentially desirable but perhaps not necessary to eliminate or at least minimize $N_2$ from the reactor headspace and system. It is possible to operate with other gases present which are generally deemed inert toward activated hydrides such as a noble gas (He, Ne, Ar) or a relatively light aliphatic or cycloaliphatic hydrocarbon (hydrocarbon with boiling point close to or less than the reaction temperature).

Of these inert gases the relatively light hydrocarbons are preferred (including any C4 hydrocarbons formed from a butyllithium reagent) because such hydrocarbons are generally soluble in the reaction medium and hence do not displace $H_2$ with decreasing head space volume and thereby or reduce the partial pressure of $H_2$ in significantly varying amounts during the course of the monomer feed at a constant reactor pressure. Thus inert gases that become compressed in the head space as the condensed phase volume increases are less desired. However the presence of such low solubility gases such as the noble gases in a continuous process where the headspace volume is fixed may perhaps be used to some benefit. It is difficult to operate a commercial reactor at low positive pressures of constant pressure thus it may be advantageous to have present low boiling (petroleum ethers) hydrocarbons such that a desired $H_2$ partial pressure and hence activity can be maintained at a higher overall reactor pressure. Such light hydrocarbons can even provide the added benefit of some means of refluxive cooling.

When forming the [DMEA$^-$]xLiyHz catalyst TMEDA can optionally be present during the reduction or hydride forming process or be optionally added subsequent to hydride formation. TMEDA may facilitate formation or the [DMEA$^-$]xLiyHz catalyst under certain conditions or it may be beneficial in promoting the [DMEA$^-$]xLiyHz catalyst activity during its use but it is not necessary for forming the catalyst. In fact there is some evidence that the presence of even trace amounts of TMEDA during catalyst formation can lead to diminished catalyst activity. It is presumed that TMEDA complexed organolithium reagents can undergo competitive reduction to form Schleyer's super active nanometric sized LiH (Schleyer, P. v. R.; et. al. *J. Org. Chem.* 1987. 52, 4299; and Schleyer, P. v. R.; et. al. *Angew Chem Int. Ed. Engl.* 1986 25 465). Such nanometric LiH has been to be found to be very ineffective as a catalyst for HMAPS processes (described below) and thus its co-formation would reduce the titer of active catalyst. Thus it is recommended though not completely necessary to add TMEDA after formation of the [DMEA$^-$]xLiyHz catalyst. Likewise it is recommended that some effort is taken at reducing if not eliminating adventitious TMEDA from the [DMEA$^-$]xLiyHz catalyst forming steps by means of rinsing the catalyst forming reactor and reactor train prior to use as well as acid extraction or removal of TMEDA from recycle solvents. It is even advisable but not necessary to form the [DMEA$^-$]xLiyHz catalyst in a reactor, transfer the catalyst to the HMAPS polymerization reactor already charged with or to be charged with TMEDA.

When employing a TMEDA, it is present in a molar ratio of lithium to TMEDA (lithium:TMEDA), in a ratio of from about the limit of (∞:1) or more practically (10,000:1) to about (1:8), or preferably about (5:1) or about (1:5) or even more preferably (3:1) to about (1:3). It is to be understood that in this connection a charge ratio of (∞:1) or more practically (10,000:1) can represent the unintended presence of the TMEDA promotor in even trace quantities due to an amount left in the reactor or charge lines or tanks from previous runs where the TMEDA was intentionally charged. Further it is within the scope to have a charge ratio greater than (1:8) total lithium to TMEDA, however such a charge ratio provides little if any advantage and represents and uneconomic use of the TMEDA promotor as well as any reagent and/or added effort needed to remove and/or recover the TMEDA promotor from the reaction or product mixture.

The hydrocarbon solvent which may be used in forming the LOXLiH [DMEA⁻]xLiyHz catalyst is any hydrocarbon having a $pK_a$ greater than molecular hydrogen ($H_2$) under the reaction conditions. Non-limiting examples of such preferred solvents are cyclohexane, methylcyclohexane, used with or without ethylbenzene. Other hydrocarbon solvents may be used as long as their use does not affect: 1) the solubility of the saline hydride catalyst, reactive intermediates, transient living polymer chains and the polymer chain distribution product; or 2) when using the catalyst for an HMSHIP or HMAPS process, the solvent does not act as an organic chain transfer agent of sufficient activity that the hydrocarbon solvent is incorporated in the HMAPS product distribution at a level of about 2 wt % or more.

FURTHER DETAILED DESCRIPTION OF THIS INVENTION

Another embodiment of the present application relates to a process for hydrogen mediated anionic chain transfer polymerization comprising feeding an anionically polymerizable monomer such as a vinyl aromatic, and/or a styrenic monomer under an atmosphere comprising molecular hydrogen to a reactor vessel containing a reaction mixture of a hydrocarbon solvent and a hydrocarbon soluble saline hydride catalyst. The soluble saline hydride catalyst includes a LOXSH catalyst either used separately or in combination. Preferred embodiments of the LOXSH catalyst process have kinetic chain length distributions (v), hence degree of polymerizations ($DP_n$) and hence number average molecular weights ($M_n$) that are determined or otherwise set by the following relationship:

$$\psi^{-1} = C_{trH_2} \frac{[H_2]}{[sty]}$$

thus $M_n$ is essentially set exclusive of other kinetic terms and thus the polymers are essentially anionic chain transfer polymer distributions formed exclusively from hydrogen and monomer without any significant incorporation—at least less than about 2 wt %, more preferably less than 1 wt % and more preferably less than 0.1 wt %—of any added organic chain transfer agent. Thus the $M_n$ of such polymers (excluding of ethylbenzene content) when the monomer is styrene is given by:

$$M_n \approx \left(\frac{\text{moles styrene}}{\text{moles Hydrogen}} * 104\right) + 2$$

wherein the moles of styrene is the amount of styrene fed, the moles of hydrogen consumed and wherein the moles of ethylbenzene produced is small preferably less than 10 wt %, more preferably less than 7 wt % and most preferably less than 5 wt % of the product composition.

Thus the present invention also relates to a LOXSH catalyst process for anionic chain transfer polymerization comprising feeding an anionically polymerizable monomer (e.g. vinyl aromatic monomers and/or preferably a styrenic monomers) to a reaction mixture under an atmosphere comprising molecular hydrogen in a reactor vessel, wherein said reaction mixture was formed from (i) an organolithium compound and/or an organomagnesium compound; (ii) optionally a polytertiaryamine compound; (iii) a polarizing complexing agent selected from a tertiary aminoalcohol compound; a tertiary amino ether-alcohol, an ether-alcohol or combinations thereof; (iv) optionally an alkali metal or metal alloy and/or a solid saline hydride and/or a saline metal amide; (v) optionally an aromatic hydrocarbon having at least one C—H covalent bond $pK_a$ within the range of 2.75 $pK_a$ units above that of the $pK_a$ of toluene to −4.30 $pK_a$ units below the $pK_a$ of toluene; (vi) optionally a vinyl aromatic monomer; and (vii) a hydrocarbon solvent with a $pK_a$ greater than $H_2$; wherein the aromatic hydrocarbon and hydrocarbon solvent may be the same or different; (viii) molecular hydrogen; and wherein the solubility of hydride comprising said catalyst or reagent is at least about 0.0080 moles per liter.

The same non-limiting examples and amounts of the components listed above for forming the LOXSH catalyst as well as used in the above catalytic and or reagent compositions may be used for conducting the LOXSH catalyst saline hydride initiated hydrogen mediated polymerization processes and need not be repeated.

The hydrocarbon and aromatic hydrocarbon solvent may be the same or different. This means that the aromatic hydrocarbon can act as both the aromatic hydrocarbon and the solvent. Ethylbenzene is a preferred component in a commercial hydrogen mediated anionic polymerization of styrene given that a portion of the styrene is reduced to ethylbenzene and thus ethylbenzene is a likely component of recycled solvent unless great care, time and energy is taken in the fractional distillation of the co-product ethylbenzene from the hydrocarbon solvent used in forming the LOXSH catalyst as well as to conduct the LOXSH process of this invention. It is conceivable to use exclusively ethylbenzene and in this case, for LOXSH catalyst forming process components (v) and (vii) would merge into one component (or limitation) and be the same. It is also conceivable to use an ethylbenzene free process using ethylbenzene free recycle and/or fresh hydrocarbon solvents.

The anionically polymerizable hydrocarbon monomers can include one or more vinyl aromatic monomers, especially styrenic monomers. Preferably, the vinyl aromatic monomer is a styrenic monomer such as styrene, or alkylated styrene monomers such as the o- m-, and p-, isomers of methyl styrene, p-isopropylstyrene, 2,4-diethylstyrene, o-ethylstyrene, 3,5-di-isobutylstyrene, 2,6-dimethyl styrene, 2-ethyl-4-methyl styrene and combinations thereof. For forming linear polymeric microstructures free of branching molecular architectures, styrene is the preferred vinyl aromatic monomer. Alkylated styrene monomers under certain process conditions will themselves behave as chain transfer agents and result in some degree of branching and potential cross linking. Divinyl aromatic monomers such as divinylbenzene can also be used as co-monomers however branching and crosslinking can occur. Styrenic monomers such as alpha alkylated styrenes (e.g. α-methylstyrene) generally do not homopolymerize under chain transfer conditions but can be used as co-monomers especially with conjugated dienes. However it should be noted that the use of an alpha alkylated styrene will result in formation of quaternary carbons in the polymer microstructure. Thus the use of such alpha alkylated styrenes should be avoided for styrenic polymers formed as substrates for derivatization by electrophilic aromatic substation reactions.

The partial pressure of molecular hydrogen employed in the above LOXSH catalyst process is maintained at pressures between about 0.5 to about 19.0 Bar, or about 1.5 to about 12.0 bar, or about 2.5 to about 10.0 Bar or about 3.0 to about 7.0 Bar.

A hydrogen partial pressure greater than about about 10.0 Bar is permissible for a period of time during the process when process conditions entail routine operation with adequate mixing to maintain hydrogen transfer to the condensed phase. However a substantial amount of time at such increased hydrogen partial pressures will generally result in hydrogenation of the monomer with a substantial reduction of polymer molecular weight. Conversely, hydrogen pressures below 0.1 Bar (less than 1.5 PSI) are permissible during routine operation of the processes involving potassium hydride forms of the LOXKH catalysts. Under such conditions of low hydrogen partial pressure and hence low $H_2$ activity in the condensed phase, chain transfer from the organic chain transfer agents whether added or formed during the course of the run will compete more substantially. When employing a LOXLiH, or a LOXMgH$_2$ and combinations thereof, feeding monomer for short periods of time under conditions of poor hydrogen mass transfer results in the production of a high molecular weight polymer chains and consequently a more asymmetric product distribution with a high molecular weight tail (as reflected by a substantial increase in the GPC measured value "M$_w$ 10% High" in Daltons). It is pointed out that the partial pressures recited above are only meaningful if adequate mass transfer of molecular hydrogen to the condensed phase is maintained such that the partial pressure reflects the condensed phase activity of molecular hydrogen—i.e. a steady state mass transfer of $H_2$ to the condensed phase is established. Thus much higher $H_2$ partial pressures can be applied when mass transfer to the condensed phase is diminished due to poor mixing of the vapor phase with the condensed phase and thus results in poor mass transfer.

In that nitrogen may (though no evidence of this has been observed) potentially be "fixed" by—that is $N_2$ may be reduced by—the saline hydride catalyst of this invention and because as the reactor headspace volume is reduced by the monomer feed when operating under semi-batch conditions, it is potentially desirable but perhaps not necessary to eliminate or at least minimize $N_2$ from the reactor headspace and system. It is possible to operate with other gases present which are generally deemed inert toward activated hydrides such as a noble gas (He, Ne, Ar) or a relatively light aliphatic or cycloaliphatic hydrocarbon (hydrocarbon with boiling point close to or less than the reaction temperature). Of these inert gases the relatively light hydrocarbons are preferred because such hydrocarbons are generally soluble in the reaction medium and hence do not displace $H_2$ and thereby do not reduce the partial pressure of $H_2$ in significantly varying amounts during the course of the monomer feed at a constant reactor pressure. Thus inert gases that become compressed in the head space as the condensed phase volume increases are less desired. However the presence of such low solubility gases such as the noble gases in a continuous process where the headspace volume is fixed may perhaps be used to some benefit. It is difficult to operate a commercial reactor at low positive pressures of constant pressure thus it may be advantageous to have present low boiling (e.g. petroleum ethers) hydrocarbons such that a desired $H_2$ partial pressure and hence activity can be maintained at a higher overall reactor pressure. Such light hydrocarbons can even provide the added benefit of some means of refluxive cooling.

The temperature of the reaction mixture and/or process is maintained in the range of about 20° C. to about 130° C., more preferably in the range of about 40° C. to about 110° C. and most preferred in the range of about 60° C. to about 90° C.

The molar ratio of the total charge of monomer to metal hydride compound initially formed, (monomer:metal hydride), is about (10:1) to about (1000:1), or about (10:1) to about (600:1) or about (40:1) to about (600:1), or about (150:1) to about (360:1). Whereas the molar quantity of metal hydride formed is taken as being equal to the molar quantity of organometallic bonds—organolithium and/or organomagnesium carbon-metal bonds, the conjugate acid thereof having a pK$_a$>H$_2$—that remain after reaction with all protic species having a pK$_a$<H$_2$ under the conditions of the catalyst forming reactions. Any decrease in the amount of metal hydride due to decomposition reactions is not taken into account and conditions (e.g. temperatures) as well as reagents (e.g. organic species such as certain ethers that easily undergo metalation and decomposition by organolithium reagents) that contribute to catalyst deactivation of simply best avoided.

In the batch or semi-batch operation of the process technology of this invention the monomer (e.g. styrene) is fed with time to the reaction medium, hence the initial ratio monomer to saline metal hydride formed at the very instant that the vapor from the first drop or increment of monomer fed is mathematically approaches the limit (1:∞). Thus a total monomer charged to the initially formed saline metal hydride molar ratio outside the preferred recited ranges—i.e. a molar ratio in the range of from the limit of (1.00:∞ to 1.00:0.101) which is about (1:10,000 to about 9.9:1.0) monomer to saline metal hydride formed—are demonstrated as workable ranges at the outset of each of the Examples provided below. However the monomer feed is generally continued until the higher desired monomer to metal hydride ratio is complete. The practice of a charge molar ratio limited to (1:10,000 to about 9.9:1.0) is within the scope of the invention but simply represent uneconomical utilization of the organolithium compound and/or organomagnesium compound.

Conversely feeding monomer at a relative molar ratio to saline metal hydride compound initially greater than about 1000:1 becomes unworkable; resulting in diminished chain transfer producing compositions of undesired molecular weight distributions (MWD). The LOXLiH catalyzed process is a more preferred process both because of ease in forming the catalyst, selectivity with regard to microstructure and finally because of catalyst activity. In Examples 14 and 15 it is demonstrated that an catalyst efficiency of 15,000% can be achieved using a >600:1 monomer:metal hydride charge ratio. The combination of these two runs produced a dimer stripped polymer distribution characterized as having M$_w$=730 with PD$_n$=1.4 in 75% isolated yield.

For the LOXSH process, the polytertiaryamine (PTA) promotor is optional. Accordingly, when employing a monomeric PTA composition, the PTA promotors is present in a molar ratio of total alkali and alkali earth metal to PTA (metal:PTA), in a ratio of from about the limit of (∞:1) or more practically (10,000:1) to about (1:8), or preferably about (5:1) or about (1:5) or even more preferably (3:1) to about (1:3). It is to be understood that in this connection a charge ratio of (1: ∞) or more practically (10,000:1) can represent the unintended presence of the PTA promoter in even trace quantities due to an amount left in the reactor or charge lines or tanks from previous runs where the PTA was intentionally charged. Further it is within the scope to have a charge ratio greater than (1:8) total metal to PTA, however such a charge ratio provides little if any advantage and represents and uneconomic use of the PTA promotor as well as any reagent and/or added effort needed to remove and/or recover the PTA promotor from the reaction or product mixture.

The monomer feed rates relative to the amount of catalyst is among the determining kinetic factors with regard to setting the polymer composition's polydispersity, $PD_n$, and hence the overall molecular weight distribution (MWD) as measured by the values of $M_n$, $M_w$, $M_z$, $PD_n$, number average standard deviation ($\sigma_n$), and asymmetry ($_n\alpha_3$). It is therefore advisable to feed the monomer in certain relative rates at given $H_2$ activity (or partial pressure) in a given reactor design or geometry. It should be clear that a very small relative feed rate (i.e. less than about 15 moles monomer/hr/moles active Li) of the monomer to the catalyst will produce an undesired level of reduced (essentially hydrogenated) monomer with some dimer. Furthermore the compositions produced have high asymmetry values and are less desired. On the other hand very high relative feed rates generally form higher molecular weight distributions, such compositions that can otherwise be economically produced with little to no chain transfer. Because the molecular formula of the LOXSH catalyst is not of necessity determined, nor necessarily completely defined due to formation of aggregates, nor is the molecular weight of the these catalysts aggregates known, the hourly feed rate of monomer (styrene) relative to catalyst is suitably expressed in terms of the amount of active hydride formed in the catalyst composition. It is assumed that each equivalent mole of active organolithium alkyl and/or active organomagnesium alkyl forms one equivalent mole of a saline hydride; where the organolithium compounds provides one equivalent and the organomagnesium provides 2 equivalents. Thus in the practice of this invention, the hourly feed rate of monomer to saline hydride compound should be in the range of from about 10 to about 500 moles of monomer per hour per mole of active saline hydride reagent charged in the reactor, or more preferably in the range of from about 65 to about 380 moles of monomer per hour per mole of saline hydride initially formed in the reactor. Again the equivalent mole of saline hydride is taken as being equal to the molar equivalent of the active organolithium alkyl and/or molar equivalents of the active organomagnesium alkyl initially charged. Again active organolithium alkyl and/or molar equivalents of the active organomagnesium alkyl means the amount of organolithium alkyl and/or the amount of magnesium alkyl radicals left after reaction with any and all protic species having a $pK_a$ less than $H_2$ present in the reaction mixture.

The temperature of the reaction mixture during the course of the monomer feed is maintained in the range of about 20° C. to about 130° C., or in the range of about 40° C. to about 99° C., or in the range of about 60° C. to about 90° C. It is conceivable that higher temperatures can be employed during the entire run or during a portion of the run; however temperatures that accelerate any decomposition of the catalyst and/or cause the elimination of hydride from the polymer chains and formation of chain lengths terminated with unsaturated bonds are best avoided. The amount of such hydride elimination termination reactions should vary with temperature and catalyst composition. In forming the LOXSH catalysts and during the initial heat up, the catalyst can be combined at the temperature just above the melting temperature of the hydrocarbon solvent (or mixture of solvents) or the freezing point of the monomer that is being fed. Combining the catalyst components at low temperatures (i.e. −10 to 15° C.) and even under cryogenic conditions (−10° C. to −126° C.) may have the benefit of avoiding or suppressing lithiation or other metalation reactions that can lead to partial decomposition of the polytertiaryamine promotor and/or the polarizing complexing agents used. However conditions that result in precipitation of the saline hydride catalyst or its precursor complexes and reagents are perhaps best avoided.

The desired level of dispersal of monomer in the reaction medium will depend upon the efficiency by which hydrogen is transported from the vapor phase and/or hydrogen gas feed to the condensed phase throughout the course of a run. Ideally a commercial scale, pilot scale and even bench scale reactor can be designed and configured such that hydrogen transfer from the vapor phase to the condensed phase is essentially uniform throughout the course of the monomer feed. Under such uniform hydrogen transport between phases, it is desirable to minimize the reduction of monomer to its saturated analog by feeding the monomer such that a locally high concentration exists in the reactor. In bench or small pilot scale reactors such locally high monomer concentrations is accomplished by employing very high relative monomer to catalyst feed rates and ratios with the use of relatively low feed velocities. In large commercial equipment monomer is fed to a reaction zone which can be physically apart or separated from the bulk of the reaction mixture (i.e. a pump-around-loop). The LOXLiH catalysts formed from 2-[2-(dimethylamino)ethoxy]ethanol (DMAEOE) notwithstanding, the advantage of the saline hydride catalyst of these HMSHIP processes of this invention is that such catalyst appears to be quite stable under the process conditions and do not degrade catalyst activity or lead to impurities derived from the polytertiaryamine promotor or the aminoalkoxide polarizing complexing agent used. Under these conditions the production of reduced monomer is kept to well under 10% of the total monomer charged. Dimer content can also be kept below 12% of the product distribution and thus yields of trimer and above can well exceed 80% to 90% based on monomer charged.

Upon completion of the LOXSH catalysts process monomer feed and reaction, as indicated, for example by rapid reduction in the process temperature at constant heat flux and/or the termination of uptake of $H_2$, the reaction mixture is maintained under hydrogen pressure and then transferred to a wash reactor for quenching and water washing. The wash reactor is charged with water (with or without a mineral acid such as $H_2SO_4$ and/or an organic acid such as acetic acid). Additionally the wash reactor can be previously charged with an optional additional amount of a solvent, preferably a hydrocarbon solvent. The quench can be conducted with cooling or at ambient temperatures up to the temperature at which the hydrocarbon solvent forms an azeotrope with water under the pressure conditions of the wash reactor. The product is water washed to remove alkali metal salts and at least a portion of the PTA promotor if present and polarizing complexing agent. Under very acidic conditions such reagents are nearly completely removed with the alkali and alkaline earth metal salts formed from the acid. Under basic conditions where an equivalent of acid or less is used the PTA promotor if present and the polarizing complexing agent is partitioned between the organic reaction mixture and the aqueous wash. Water washing is continued until the desired pH of the exiting wash water is obtained. Under basic conditions a pH of 9 to a pH of 11 indicates that all the alkali and alkaline earth metal salts have been removed. Under acidic conditions, a pH of 6 to a pH of 8 (depending on the alkalinity of the wash water) indicates that all acidic species have been removed or at least neutralized.

When the wash is deemed complete solvent and a portion of any remaining polytertiaryamine promoter as well as any remaining polarizing complexing agent (if it was present) and monomer reduction product are preferably separated and recovered from the reaction mixture, whereby the last traces of water are also removed azeotropically from the reaction mixture. This separation operation should be continued until monomer reduction product content of the resultant product mixture is less than about 0.1 wt %. Further modification and shaping of the product distribution by reducing the monomer dimer content is desirable for some applications. For high boiling dimers this is easily conducted using a wiped film evaporator.

The present invention relates a process of conducting hydrogen mediated anionic polymerization of styrene (HMAPS) which under certain preferred conditions the formation of novel and beneficial low molecular weight anionic chain transfer polymer distributions low in asymmetry with very pure "head to tail" microstructure are formed in high yields. The process features feeding styrene monomer to a suitable solvent the containing the $[DMEA^-]_xLi_yH_z$ catalyst under an atmosphere comprising molecular hydrogen wherein chain transfer from molecular hydrogen is the significant component of the mechanism that determines the number average molecular weight ($M_n$) of the resulting product distribution including the ethylbenzene co-product. Thus the number average molecular weight of the HMAPS product distribution is given by the formula:

$$M_n = 2 + ([styrene]/[H_2]*104)$$

Wherein [styrene] is the total amount of styrene fed and [$H_2$] is the total amount of hydrogen consumed over a period of time whether the time is instantaneous or the entire period of the polymerization reaction. The product distribution formed from such a process when the monomer is hereinafter designated a HMAPS distribution. The shape in terms of the HMAPS M molecular weight distribution (i.e. $M_n$, $M_w$, $M_z$; $PD_n$, $\sigma_n$ and asymmetry) is set and thereby controlled by the relative feed rate of styrene monomer to catalyst at a particular catalyst concentration and hydrogen partial pressure or activity.

The present invention also relates to a process for anionic chain transfer polymerization comprising feeding a vinyl aromatic monomer and/or preferably a styrenic monomer to a reaction mixture under an atmosphere comprising molecular hydrogen in a reactor vessel having a hydrogen mediated chain transfer polymerization catalyst of the formulas $[DMEA^-]_xLi_yH_z$, wherein said catalyst is formed from the process of contacting: (i) about y equivalents of an organolithium compound; (ii) optionally TMEDA compound; (iii) about x equivalents of dimethylaminoethanol; (iv) optionally ethylbenzene; (v) a hydrocarbon solvent with a $pK_a$ greater than $H_2$; wherein the aromatic hydrocarbon and hydrocarbon solvent may be the same or different; and (vi) molecular hydrogen, wherein the amount of hydride formed z is given by the equation z=y-x and x, y and z are positive real numbers whole or fractional greater than zero; wherein said formula can further comprise N,N,N',N'-tetramethylethylenediamine (TMEDA) ligand complex i.e. $[DMEA^-]_xLi_yH_z$.XTMEDA in a molar ratio X of moles TMEDA per mole of catalyst $[DMEA^-]_xLi_yH_z$ wherein X=0.0001 to about 8.0.

Thus the present invention further relates to an HMAPS process for anionic chain transfer polymerization comprising feeding styrene monomer to a reaction mixture under an atmosphere comprising $H_2$ in a reactor vessel, wherein said reaction mixture contains a catalyst having the chemical formulas $[DMEA^-]_xLi_yH_z$, wherein said catalyst is formed from the process of contacting: (i) about y equivalents of an organolithium compound and/or an organomagnesium compound; (ii) optionally TMEDA compound; (iii) about x equivalents of dimethylamionethanol; (iv) optionally ethylbenzene; (v) a hydrocarbon solvent with a $pK_a$ greater than $H_2$; wherein the aromatic hydrocarbon and hydrocarbon solvent may be the same or different; and (vi) molecular hydrogen; wherein the amount of hydride formed z is given by the equation z=y-x and x, y and z are positive real numbers whole or fractional greater than zero and wherein the solubility of hydride comprising said catalyst or reagent is at least about 0.0080 moles per liter.

The same non-limiting examples and amounts of the components listed above for forming the $[DMEA^-]_xLi_yH_z$ catalyst as well as used in the above catalytic and or reagent compositions may be used for conducting the $[DMEA^-]_xLi_yH_z$ HMAPS processes and need not be repeated.

The hydrocarbon solvent which may be used is any hydrocarbon having a $pK_a$ greater than molecular hydrogen ($H_2$) under the reaction conditions. Non-limiting examples of preferred such solvents are cyclohexane, methylcyclohexane, used with or without ethylbenzene. Other hydrocarbon solvents can be used as long as their use does not affect: 1) the solubility of the saline hydride catalyst, reactive intermediates, transient living polymer chains and the polymer chain distribution product; or 2) act as an organic chain transfer agent of sufficient activity that the hydrocarbon solvent is incorporated in the HMAPS product distribution at a level of 2 wt % or more.

In conducting the HMAPS process of this invention in order to form the most desired HMAPS distributions of this invention the monomer feed relative to lithium hydride is generally in the range of from about (10:1) to about (1000:1), preferably from about (50:1) to about (800:1) and most preferably (100:1) to about (600:1) with a lithium hydride concentration of about 200 ppm to about 750 ppm at the start of a run and from about 65 ppm to about 350 ppm at the end of the run for a semi-batch operation of this process depending the total amount of styrene monomer is fed. For a continuous mode of operation, it is preferred to operate the process such that the lithium hydride concentration is between from about 200 ppm to about 500 ppm throughout the course of the operation.

In the batch or semi-batch operation of the process technology of this invention the monomer (i.e. styrene) is fed with time to the reaction medium, hence the initial ratio monomer to $[DMEA^-]xLiyHz$ catalyst formed at the very instant that the vapor from the first drop or increment of monomer fed mathematically approaches the limit (1: ∞). Thus a total monomer charged to the initially formed saline lithium hydride molar ratio outside the preferred recited ranges—i.e. a molar ratio in the range of from the limit of (1.00:∞ to 1.00:0.101) which is about (1:10,000 to about 9.9:1.0) monomer to $[DMEA^-]xLiyHz$ catalyst formed—are demonstrated as workable ranges at the outset of each of the Examples provided below. However the monomer feed is generally continued until the higher desired monomer to lithium hydride ratio is complete. The practice of a charge molar ratio limited to (1:10,000 to about 9.9:1.0) is within the scope of the invention but simply represent uneconomical utilization of the organolithium compound used in forming the $[DMEA^-]xLiyHz$ catalyst.

Conversely feeding monomer at a relative molar ratio to $[DMEA^-]xLiyHz$ catalyst initially greater than about 1000:1 can become unworkable due to viscosity levels; resulting in diminished chain transfer thereby producing compositions of undesired molecular weight distributions (MWD). The [DMEA⁻]xLiyHz catalyzed process technology features ease in forming the catalyst, selectivity with regard to microstructure and finally high catalyst activity. In Examples 14 and 15 it is demonstrated that an catalyst efficiency of 15,000% can be achieved using a >600:1 monomer:lithium hydride charge ratio. The combination of these two runs produced a dimer stripped polymer distribution characterized as having $M_w$=730 with $PD_n$=1.4 in 75% isolated yield.

The monomer feed rates relative to the amount of [DMEA⁻]xLiyHz catalyst is among the determining kinetic factors with regard to setting the polymer composition's polydispersity, PDn, and hence the overall molecular weight distribution (MWD) as measured by the values of $M_n$, $M_w$, $M_z$, $PD_n$, number average standard deviation ($\sigma_n$), and asymmetry ($_n\alpha_3$). It is therefore advisable to feed the monomer in certain relative rates at given $H_2$ activity (or partial pressure) in a given reactor design or geometry. It should be clear that a very small relative feed rate (i.e. less than about 15 moles monomer/hr/moles active Li) of the monomer to the catalyst will produce an undesired level of reduced (essentially hydrogenated) monomer with some dimer. Furthermore the compositions produced have high asymmetry values and are less desired. On the other hand higher relative feed rates generally form higher molecular weight distributions with lower yield of ethylbenzene and styrene dimer. HMAPS Compositions having $M_w$ in the range of 850 to 1050 can be easily prepared in from about 82% to about 90% yield after stripping ethylbenzene (yields as low as 4% to 6% yield) and dimer (yields as low as 8% to 12% yield).

The temperature of the reaction mixture during the course of the monomer feed is maintained in the range of about 20° C. to about 130° C., or in the range of about 40° C. to about 99° C., or in the range of about 60° C. to about 90° C. It is conceivable that higher temperatures can be employed during the entire run or during a portion of the run; however temperatures that accelerate any decomposition of the catalyst and/or cause the elimination of hydride from the polymer chains and formation of significant levels of chain length distributions terminated with unsaturated bonds are best avoided. The amount of such hydride elimination termination reactions may vary with temperature and catalyst composition.

The desired level of dispersal of monomer in the reaction medium will depend upon the efficiency by which hydrogen is transported from the vapor phase and/or hydrogen gas feed to the condensed phase throughout the course of a run. Ideally a commercial scale, pilot scale and even bench scale reactor can be designed and configured such that hydrogen transfer from the vapor phase to the condensed phase is essentially uniform throughout the course of the monomer feed. Under such uniform hydrogen transport between phases, it is desirable to minimize the reduction of monomer to its saturated analog by feeding the monomer such that a locally high concentration exists in the reactor. In bench or small pilot scale reactors such locally high monomer concentrations is accomplished by employing very high relative monomer to catalyst feed rates and ratios with the use of relatively low feed velocities controlled by feed rate (volume/sec) and the area (set by the radius for a cylindrical feed tip) through which the monomer is fed (i.e. cc/sec divided by square cm). In large commercial equipment monomer can be fed to a reaction zone which can be physically apart or separated from the bulk of the reaction mixture (i.e. a pump-around-loop). The $[DMEA^-]_xLi_yH_z$ catalysts have the advantage in that such catalyst appears to be quite stable under the process conditions and do not suffer from degradation of catalyst activity and thus do not lead to the formation of impurities derived from the polytertiaryamine promotor or the aminoalkoxide polarizing complexing agent used. Under the HMAPS process conditions the formation of reduced ethylbenzene is kept to well below 10% of the total monomer charged. Dimer content can also be kept below 12% of the product distribution. Yields of HMAPS distributions stripped to less than 2% preferably less than 1% styrene dimer content and thus comprising >98% trimer and above can well exceed 80% to 90% based on total monomer charged.

Once the components are combined in the desired charge ratios the catalyst and further activated if desired, the catalyst is then ready for use for the hydrogen mediated anionic polymerization process of this invention. Thus styrene monomer is fed to the [DMEA⁻]xLiyHz catalyst composition under a partial pressure of hydrogen between about 0.001 to about 10.0 Bar, or about 0.3 to about 6.8 Bar, or about 0.5 to about 5.2 Bar or about 1.0 to about 4.2 Bar. A hydrogen partial pressure greater than about 10.0 Bar is permissible for a period of time during the process when process conditions entail routine operation with adequate mixing to maintain hydrogen transfer to the condensed phase. However a substantial amount of time at such increased hydrogen partial pressures will generally result in hydrogenation of the monomer with a substantial reduction of polymer molecular weight with an increase yield of ethylbenzene. Conversely, hydrogen pressures below about 0.1 Bar (less than 1.5 PSI) are permissible during routine operation of the process but will result in a composition of high asymmetry with a very high molecular weight tail having a 10% high molecular weight above about 2000 Daltons as measured by GPC. Formation of such compositions with high asymmetry also occurs when reaction conditions result in poor hydrogen mass transfer to the condensed phase. Formation of such high molecular weight tails as a feature of the product molecular weight distribution is observed when feeding monomer for short periods of time under inadequate mixing conditions which create a reaction medium of increased viscosity. The increased viscosity makes mass transfer of hydrogen increasingly inefficient resulting even more increased viscosity. Reaction conditions that can result in increased viscosity are: 1) reaction temperature; and/or 2) less than optimum catalyst concentration; and/or 3) less then optimum monomer to catalyst charge ratio; and/or 4) too high of a localized monomer concentration: and/or 5) periods of the feed when mixing has become inefficient due to poor reactor geometry/design. Thus it is therefore pointed out that the partial pressures recited above are only meaningful if adequate mass transfer of molecular hydrogen to the condensed phase is maintained such that the partial pressure reflects the condensed phase activity of molecular hydrogen—i.e. a steady state mass transfer of $H_2$ to the condensed phase is established. Thus much higher $H_2$ partial pressures can be applied when mass transfer to the condensed phase is diminished due to poor mixing of the vapor phase with the condensed phase and thus results in poor mass transfer. However if viscosity becomes too great, then increased mixing generally results in formation of a foam and even less efficient mass transfer to the condensed phase.

Upon completion of the [DMEA⁻]xLiyHz catalyst HMAPS process styrene monomer feed and reaction, as indicated, for example by rapid reduction in the process temperature at constant heat flux and/or the termination of uptake of $H_2$, the reaction mixture is maintained under hydrogen pressure and then transferred to a wash reactor for quenching and water washing. The wash reactor is charged with water (with or without a mineral acid such as $H_2SO_4$ and/or an organic acid such as acetic acid). Additionally the wash reactor can be previously charged with an optional additional amount of a solvent, preferably a hydrocarbon solvent. The quench can be conducted with cooling or at ambient temperatures up to the temperature at which the hydrocarbon solvent forms an azeotrope with water under the pressure conditions of the wash reactor. The product is water washed to remove alkali lithium salts and at least a portion of the TMEDA promotor if present and polarizing complexing agent. Under very acidic conditions such reagents are nearly completely removed with the alkali and alkaline earth lithium salts formed from the acid. Under basic conditions where an equivalent of acid or less is used the TMEDA promotor if present and the DMEAH reagent is partitioned between the organic reaction mixture and the aqueous wash. Water washing is continued until the desired pH of the exiting wash water is obtained. Under basic conditions a pH of 9 to a pH of 11 indicates that all the alkali and alkali earth lithium salts have been removed. Under acidic conditions a pH of 6 to a pH of 8 (depending on the alkalinity of the wash water) indicates that all acidic species have been removed or at least neutralized. It may be desirable at times under acidic wash conditions to add a small (20 mg for two liter run) amount of a surfactant such as sodium dodecylsulfate to disrupt any emulsion or micelle formation When the wash is deemed complete solvent and a portion of any remaining polytertiaryamine promotor as well as any remaining polarizing complexing agent (if it was present) and ethylbenzene co-product are preferably separated and recovered from the reaction mixture, whereby the last traces of water are also removed azeotropically from the reaction mixture. This separation operation should be continued until ethylbenzene co-product content of the resultant product mixture is less than about 0.1 wt %. Modification with essentially complete removal of ethylbenzene is achieved by further shaping the HMAPS distribution by reducing the styrene dimer content by distillation preferably with a wiped film evaporator.

In comparison to other prior art technologies (e.g. EPO 741147), the HMAPS process featuring the ability to form the lithium alkoxides in situ is both a laboratory convenience and a major commercial advantage in forming a hydrocarbon soluble saline metal hydride catalyst. Thus when forming the LOXLiH and LOXMgH$_2$ catalyst, forming the lithium and/or magnesium alkoxide reagent precursor in situ: (1) avoids the handling of flammable air and moisture reactive solids; (2) eliminates dissolving a metal alkoxide in a concentrate of the large molar excesses of the polytertiaryamine promotor; (3) eliminates the need to remove trace levels of by product alcohol from process streams prior to recycle of solvents and other reagents, and (4) greatly reduces and in some embodiments eliminates the amount of polytertiaryamine promotor needed. Both the LOXLiH and LOXMgH$_2$ catalyst appears to be more uniformly soluble in the catalyst forming and/or polymerization reaction mixture. Thus run to run variability is deemed to be substantially improved—more reproducible—hence resulting in an even more robust commercial process than the SASH processes of Examples 38 and 39 or the HASH process of Example 40. The LOXLiH and LOXMgH$_2$ catalysts also appear to leave little if any substantial amount of undesired solids on the walls and internal parts of the polymerization reactor and other associated equipment. Insoluble catalyst deposits on reactor surfaces are a significant complication associated with prior art organic chain transfer processes where the catalyst is formed from reagents such as n-butyllithium, potassium t-butoxide, TMEDA and ethylbenzene under inert atmospheres such as nitrogen.

Figure 3:
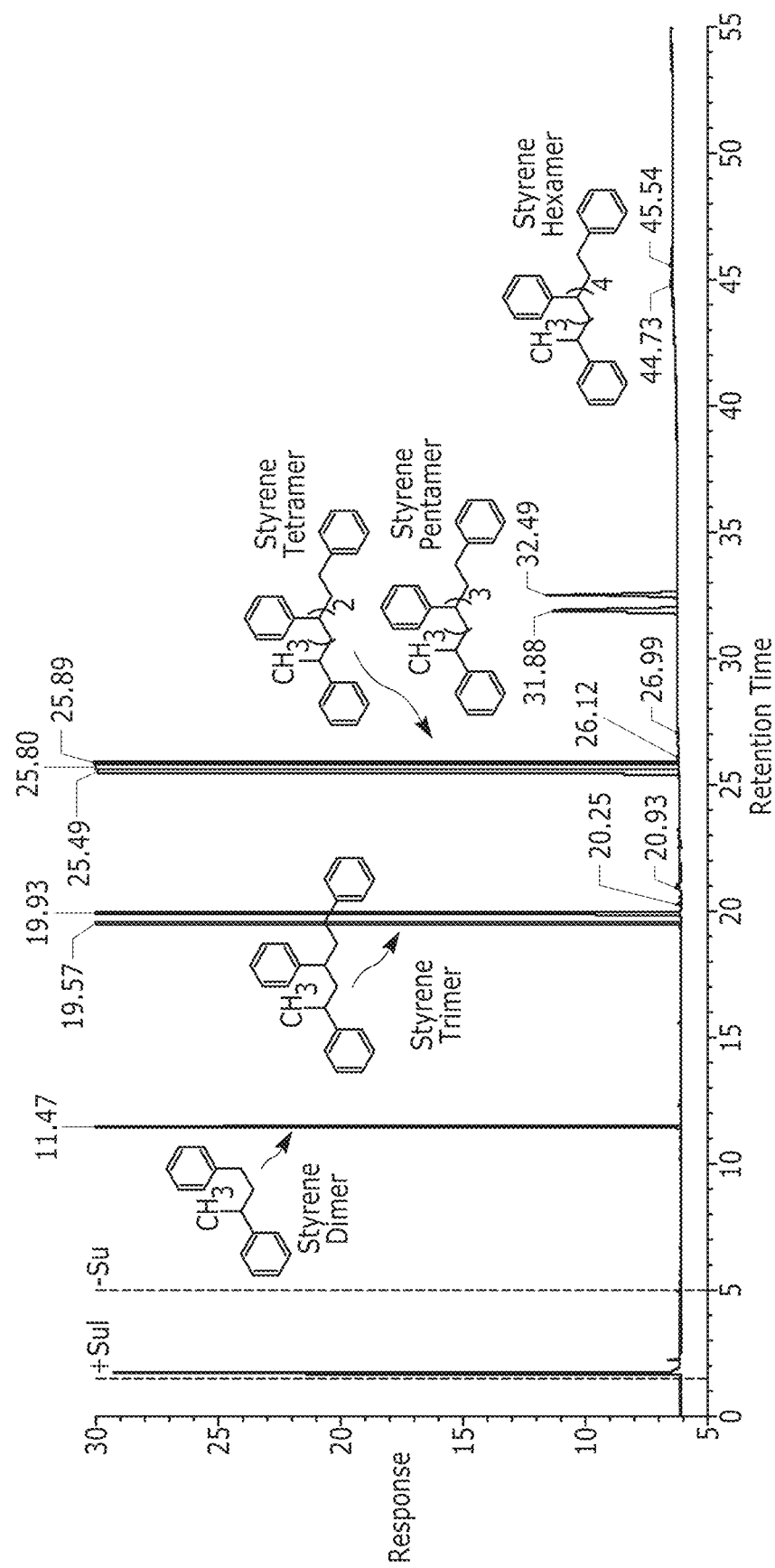
FIG. 3 is a gas chromatogram with structural assignments of the desired high purity "head to tail" styrene oligomers obtained from a of polystyrene composition of this invention formed from a LOXLiH catalyst of this invention employing a hydrogen mediated saline hydride initiated polymerization process of this invention.
Figure 4:
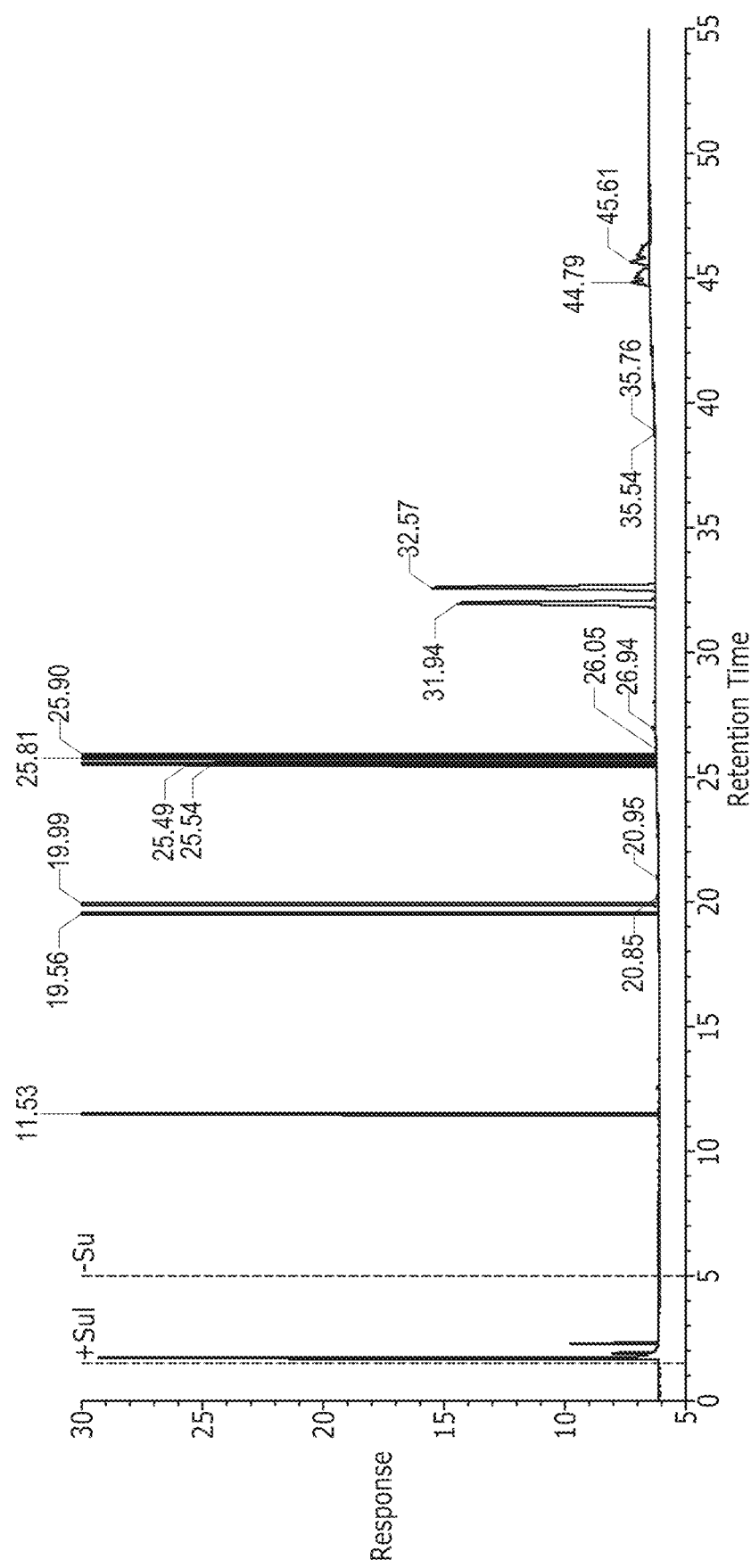
FIG. 4 is a gas chromatogram of styrene oligomers obtained from a polystyrene composition of this invention formed from another LOXLiH catalyst of this invention employing a hydrogen mediated saline hydride initiated polymerization process of this invention.
Figure 5:
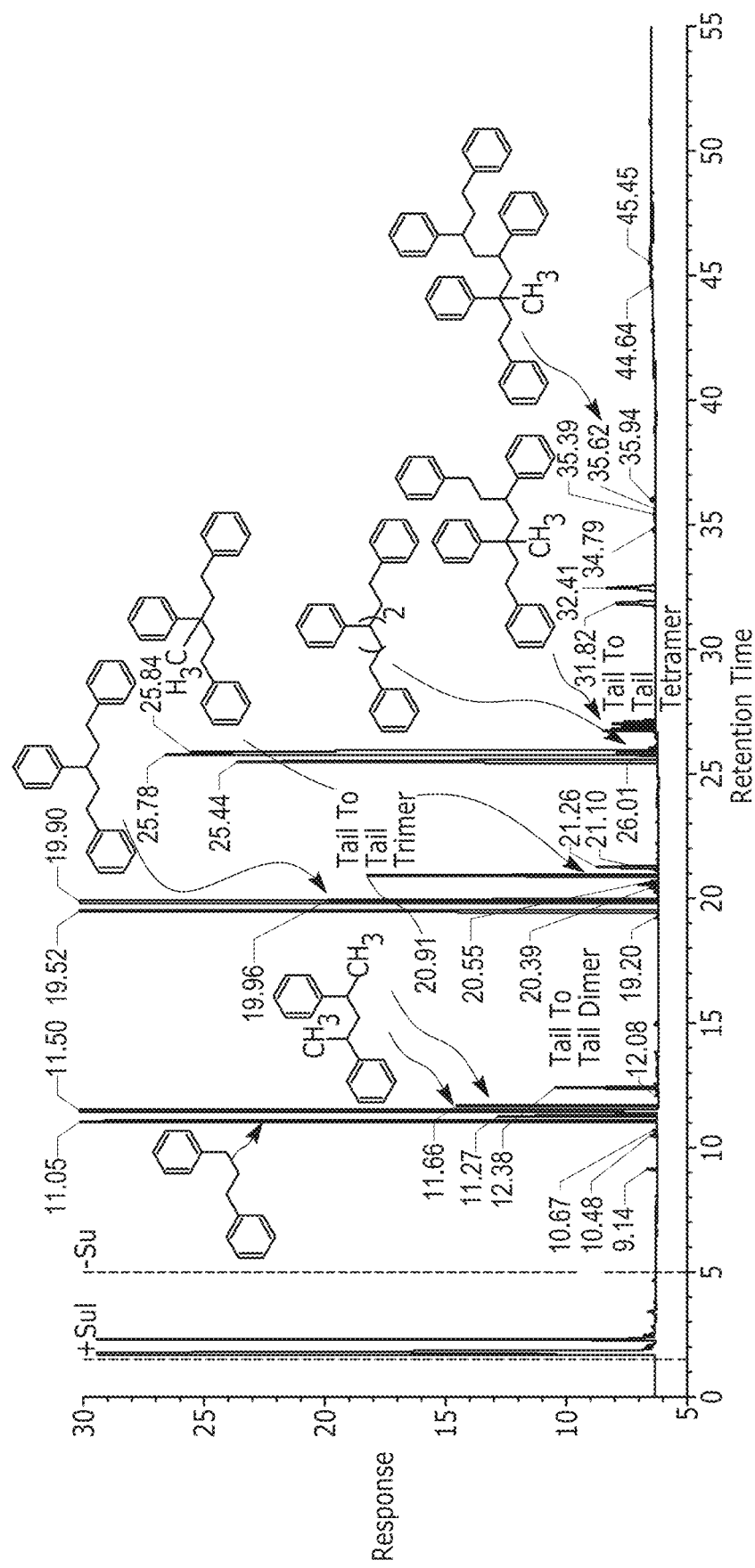
FIG. 5 is a gas chromatogram with structural assignments of styrene oligomers obtained from a polystyrene composition formed from a HASH catalyst employing a hydrogen mediated saline hydride initiated polymerization process of this invention.
Figure 6:
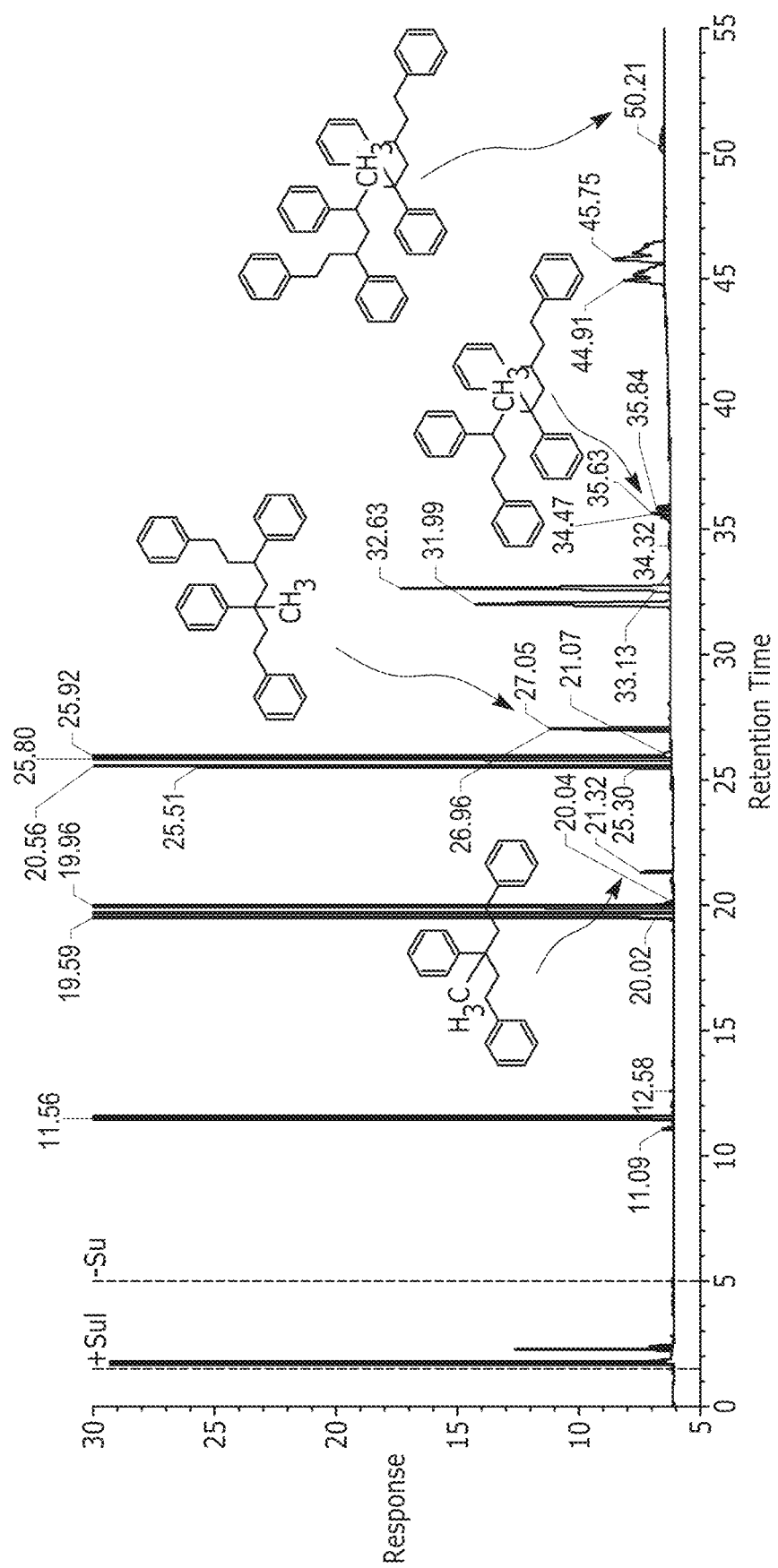
FIG. 6 is a gas chromatogram with structural assignments of styrene oligomers obtained from a polystyrene composition formed from a LOXKH catalyst employing a hydrogen mediated saline hydride initiated polymerization process of this invention.
Figure 7:
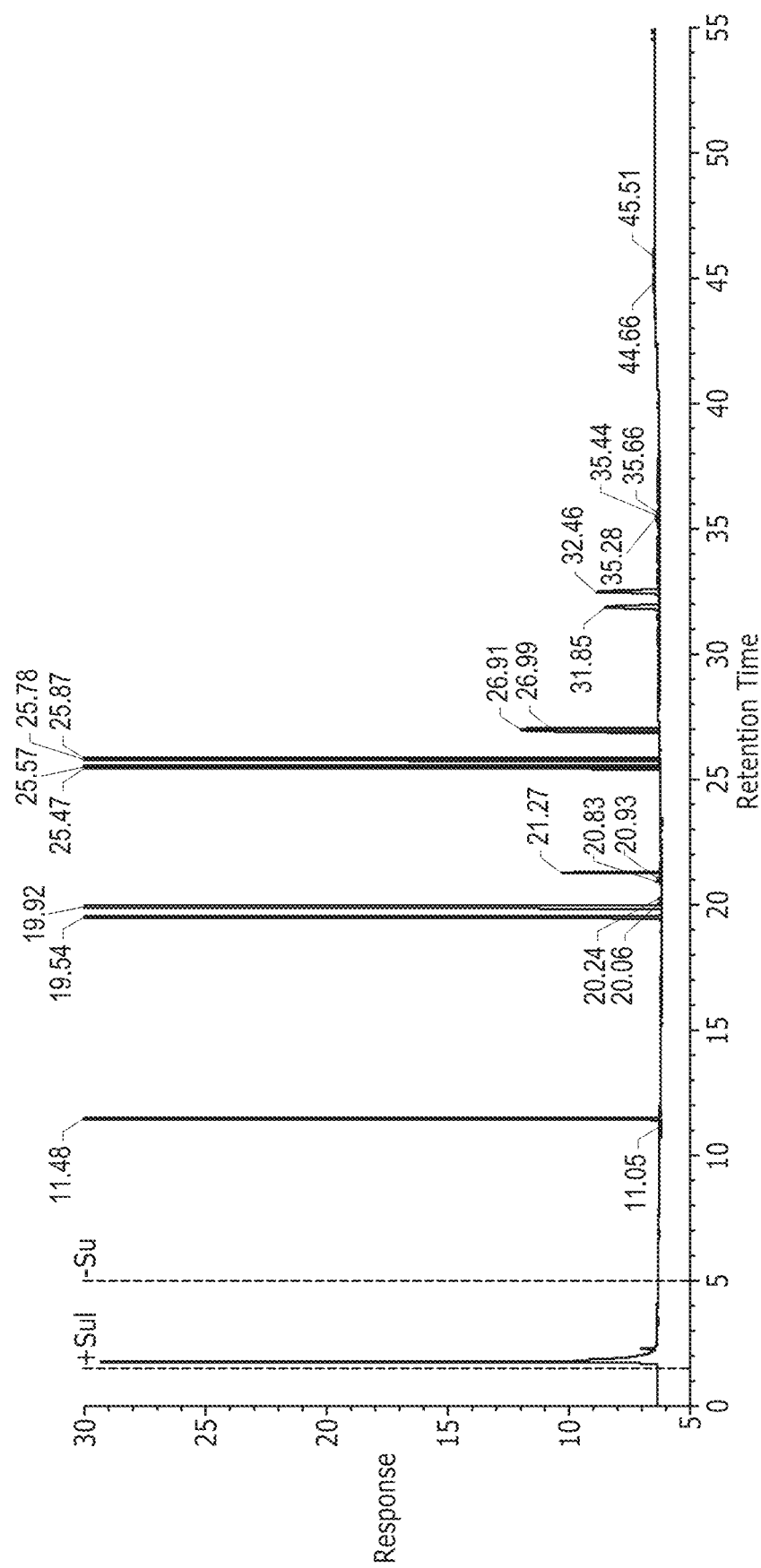
FIG. 7 is a gas chromatogram with structural assignments of styrene oligomers obtained from a polystyrene composition formed from a SASH catalyst employing a hydrogen mediated saline hydride initiated polymerization process of this invention.

The fortuitous advantage of the LOXLiH and LOXMgH$_2$ catalyst as well as the hydrogen mediated anionic chain transfer processes which they catalyze, is that these catalyst and processes provide pure chain transfer polystyrene compositions with microstructures free of fragmentation polymerization and chain isomerization impurities or impurity distributions. This has been experimentally demonstrated by analyzing the first 4 to 6 oligomers by gas chromatography (see FIGS. 3 and 4 which compare LOXLiH PS oligomer microstructure with that of prior art ethylbenzene chain transfer polymerization PS derived oligomers). The LOXKH catalyst process as well as the HASH and SASH processes generally produce polystyrene compositions with less desired microstructures (see FIGS. 5-7), which are also common to the prior technologies (see also FIGS. 12-14). Thus, the LOXLiH PS and LOXMgH$_2$ PS compositions are greatly advantageous in forming commercial product derived from further chemistry such as aromatic electrophilic substitution reactions conducted upon the product distributions. It should be understood that judicious selection of the aminoalcohol component—including optically active aminoalcohols—of the catalyst, along with further experimentation, the practitioner of this invention may discover methods of controlling other microstructure features such as tacticity for vinyl aromatic polymers.

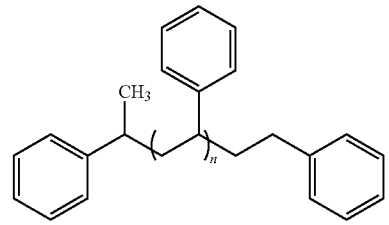

12

Thus another embodiment of this invention are anionic chain transfer styrenic polymer distributions initiated with a saline hydride and having a polymer microstructure that is greater than 97% head to tail microstructure, more preferably greater than 98% head to tail microstructure and most preferred greater than 99% head to tail microstructure as depicted by the polymeric polystyrene structure 12 above (shown specifically for but not limited to styrene). Stated in another way, the anionic chain transfer styrenic polymer compositions of this invention are initiated via addition of a saline hydride to a styrenic monomer and have chain length distributions wherein less than 3.0%, more preferably less than 2.0% and most preferably less than 0.8% of the polymer chains have one or more quaternary carbons in the polymer microstructure. Additionally said distributions of the hydride initiated poly(styrenic) structure (again shown specifically for but not limited to styrene) 12 above comprise less than 3%, more preferably less than 2% and even more preferably less than 1% and most preferably less than 0.2% to an amount below the detection limit of the chain length distribution(s) as a coproduct distribution(s) arising from a fragmentation polymerization processes where the microstructure and purity of the chain length distribution is determined vide infra from gas chromatographic analyses of the lowest molecular weight chains obtained from said hydrogen mediated saline hydride initiated polystyrene or poly(styrenic) or poly(vinylaromatic) distributions where n=0 to n=4 of the above polymer structure:

The most preferred initially formed hydrogen mediated saline hydride initiated styrenic distributions are formed exclusively from styrene monomer and hydrogen and have a chain length distribution of the above structure (12). Said chain length distribution is comprised of i−1 discrete polymer chain lengths in a statistical number average distribution of the relative molar content where i is the total number of monomers incorporated in a given discrete polymer chain. The number i is a positive integer from i=2 to i=i. Thus for (Chain-1) when n=0 (styrene dimer) then i=2; (Chain-2) when n=1 (styrene trimer) then i=3; (Chain-3) n=2 (styrene tetramer) then i=4; (Chain-4) when n=3 (styrene pentamer) then i=5; (Chain-5) when n=4 (styrene hexamer) then i=6; . . . and (Chain-(i−1)) when n=i−2 then i=i. Thus the (i−1)$^{th}$ discrete polymer chain is the discrete polymer chain of the greatest chain length. We have found that in general the GPC MWD analysis results for the polymer compositions of this invention can be reasonably modeled with a Gamma probability density function (PDF). More importantly however we have found that compositions formed from a catalyst other than the monometallic lithium based LOXLiH catalyst are generally more accurately modeled with a Beta PDF. Most importantly the LOXLiH PS GPC MWD results are accurately modeled by the Weibull PDF—which would indicate that for the LOXLiH catalyzed system the molecular weight distribution is set by chain transfer alone without significant regeneration of dead polymer chains as well as may indicate no activation, participation or incorporation of ethylbenzene as an organic chain transfer agent in forming the polymer distribution.

The molecular weight distributions of the chain length distributions of this invention when styrene is the monomer are characterized where $M_n$ is in the range of from 315 to 934 Daltons; $M_w$ is in the range of from about 392 to about 1705 Daltons; and $M_z$ is in the range of about 512 to 2930 Daltons; $PD_n$ is in the range of 1.24 to 1.82; with a standard deviation in the range of 156 to 849 Daltons and the asymmetry is in the range of 1.40 to about 3.00. More preferred compositions have molecular weight distributions where $M_n$ is in the range of from 410 to 680 Daltons; $M_w$ is in the range of from about 553 to about 1205 Daltons; and $M_z$ is in the range of about 745 to 1950 Daltons; $PD_n$ is in the range of 1.29 to 1.82; with a standard deviation in the range of 257 to 600 Daltons and the asymmetry is in the range of 1.50 to about 2.60. Most preferred compositions have molecular weight distributions where $M_n$ is in the range of from 444 to 683 Daltons; $M_w$ is in the range of from about 600 to about 1150 Daltons; and $M_z$ is in the range of about 798 to 1768 Daltons; $PD_n$ is in the range of 1.35 to 1.68; with a standard deviation in the range of 263 to 565 Daltons and the asymmetry is in the range of 1.50 to about 2.31.

Preferred non-blended compositions of this invention are comprised essentially only if not solely of styrene, have greater than 97 wt % "Head to Tail" microstructure and have had their chain length distribution further shaped or modified by removal of a portion of the lowest molecular weight chains. Removal of the lower molecular weight chains, especially styrene dimer—like removing the lowest value(s) or a portion of the lowest value(s) from all other arithmetic averages (e.g. a grade point average)—results in a new average with an increased overall molecular weight distribution. Thus the preferred modified molecular weight distributions of this invention will overlap with the unaltered distributions but may not lie within the range of molecular weight distributions or molecular weight parameters specified above because of the simple numerical consequence of having been altered by the removal of a portion of the lower molecular weight fraction of the distribution. Thus preferred compositions where the dimer content has been reduced but is still present and represents about 0.1 to about 1.0 wt % (as determined by GPC analysis) of the entire distribution have molecular weight or chain length distributions where $M_n$ is in the range of from 407 to 1018 Daltons; $M_w$ is in the range of from about 487 to about 1741 Daltons; and $M_z$ is in the range of about 579 to 2938 Daltons; $PD_n$ is in the range of 1.40 to 1.71; with a standard deviation in the range of 180 to 858 Daltons and the asymmetry is in the range of 1.31 to about 3.016. More preferred compositions have molecular weight distributions where $M_n$ is in the range of from 494 to 788 Daltons; $M_w$ is in the range of from about 623 to about 1278 Daltons; and $M_z$ is in the range of about 782 to 1964 Daltons; $PD_n$ is in the range of 1.26 to 1.62; with a standard deviation in the range of 253 to 621 Daltons and the asymmetry is in the range of 1.40 to about 2.40. Most preferred compositions have molecular weight distributions where $M_n$ is in the range of from 521 to 737 Daltons; $M_w$ is in the range of from about 661 to about 1202 Daltons; and $M_z$ is in the range of about 827 to 1783 Daltons; $PD_n$ is in the range of 1.27 to 1.63; with a standard deviation in the range of 270 to 586 Daltons and the asymmetry is in the range of 1.40 to about 2.50.

It is pointed out that blending operations where statistical distributions are combined can result in non-statistical distributions where the constraints provided for $PD_n$, standard deviations would not be applicable. However such blends are within the scope of this invention in that they are formed by combination of compositions of and formed from this invention.

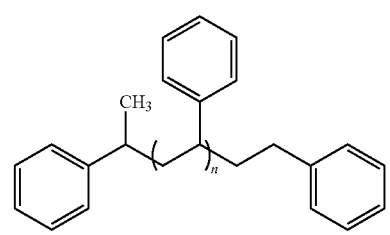

12

Thus another embodiment of this invention are LOXLIH PS distributions designated as HMAPS distributions. Such HMAPS distributions have $M_n \approx$[styrene]/[$H_2$] and $M_w$ and $M_z$ set or by the relative feed rate of styrene to catalyst at for a given catalyst composition, catalyst concentration and hydrogen pressure. HMAPS distributions are initiated with a lithium hydride, terminated by a proton from hydrogen and possess a polymer microstructure that is greater than 97% head to tail microstructure, more preferably greater than 98% head to tail microstructure and most preferred greater than 99% head to tail microstructure as depicted by the polymeric polystyrene structure 12 above. Stated in another way, the HMAPS polymer compositions of this invention are initiated via addition of lithium hydride to a styrene monomer and have chain length distributions wherein less than 3.0%, more preferably less than 2.0% and most preferably less than 0.8% of the polymer chains have one or more quaternary carbons in the polymer microstructure. Additionally the HMAPS distributions of 12 above comprise less than 3%, more preferably less than 2% and even more preferably less than 1% and most preferably less than 0.2% to an amount below the detection limit of the chain length distribution(s) as a coproduct distribution(s) arising from a fragmentation polymerization processes where the microstructure and purity of the chain length distribution is determined vide infra from gas chromatographic analyses of the lowest molecular weight chains obtained from the HMAPS distributions where n=0 to n=2 of the polymer structure 12 above.

The most preferred initially formed HMAPS distribution have chain length distribution is comprised of i−1 discrete polymer chain lengths in a statistical number average distribution of the relative molar content where i is the total number of monomers incorporated in a given discrete polymer chain. The number i is a positive integer from i=2 to i=i. Thus for (Chain-1) when n=0 (styrene dimer) then i=2; (Chain-2) when n=1 (styrene trimer) then i=3; (Chain-3) n=2 (styrene tetramer) then i=4; (Chain-4) when n=3 (styrene pentamer) then i=5; (Chain-5) when n=4 (styrene hexamer) then i=6; . . . and (Chain-(i−1)) when n=i−2 then i=i. Thus the $(i-1)^{th}$ discrete polymer chain is the discrete polymer chain of the greatest chain length. We have found that in general the GPC MWD analysis results for the polymer compositions of this invention can be reasonably modeled with a Gamma probability density function (PDF). More importantly however we have found that HMAPS distributions are in general model quite well by the Weibull PDF. This in then interpreted to mean the polymerization process is limited to the steps of: i) initiation; ii) chain propagation; and iii) chain termination almost exclusively if not exclusively by hydrogen mediation, i.e. ethylbenzene is not kinetically active as a chain transfer agent.

The molecular weight distributions of the HMAPS compositions of this invention are characterized by GPC (UV detector) analysis wherein the $M_n$ is in the range of from 400 to 800 Daltons; the $M_w$ is in the range of from about 600 to about 1200 Daltons; the $PD_n$ is in the range of about 1.35 to about 1.75; the standard deviation is in the range of about 270 to about 550 Daltons and the $M_w$ 10% High is less than about 3300 Daltons. More preferred compositions are HMAPS polymer, distributions are characterized as measured by GPC (UV detector) analysis wherein the $M_n$ is in the range of from about 400 to about 800 Daltons; the $M_w$ is in the range of from about 600 to about 1200 Daltons; the $M_z$ is in the range of about 750 to about 1500 Daltons; the $PD_n$ is in the range of about 1.35 to about 1.75; the standard deviation is in the range of about 270 to about 550 Daltons; the asymmetry is in the range of about 1.60 to about 2.2; and the $M_w$ 10% High is less than about 2400 Daltons.

Preferred HMAPS distributions of this invention are comprised essentially only if not solely of styrene, have greater than 97 wt % "Head to Tail" microstructure and have had their chain length distribution further shaped or modified by removal of a portion of the lowest molecular weight chains. Removal of the lower molecular weight chains, especially styrene dimer results in a new higher value for each moment of the molecular weight distribution (i.e. $M_n$; $M_w$; and $M_z$) and thus an increased and alteration of the overall MWD. Thus the preferred modified molecular weight distributions of this invention will overlap with the unaltered distributions but may not lie within the range of molecular weight distributions or molecular weight parameters specified above because of the simple numerical consequence of having been altered by the removal of a portion of the lower molecular weight fraction of the distribution. Thus preferred HMAPS distributions wherein the dimer content has been reduced but is still present and represents from about 0.1 to about 1.5 wt % (as determined by GPC analysis UV detector) of the entire distribution have molecular weight or chain length distributions where $M_n$ is in the range of from about 500 to about 800 Daltons; $M_w$ is in the range of from about 650 to about 1200 Daltons; and $M_z$ is in the range of about 900 to about 1500 Daltons; $PD_n$ is in the range of about 1.25 to about 1.70; with a standard deviation in the range of about 280 to about 600 Daltons; the asymmetry is in the range of about 1.45 to about 3.20; and a $M_w$ 10% High in the range of about about 1500 Daltons to about 3500 Daltons.

It is pointed out that blending operations where statistical distributions are combined can result in non-statistical distributions where the constraints provided for $PD_n$, standard deviations would not be applicable. However such blends are within the scope of this invention in that they are formed by combination of compositions of and formed from this invention.

Thus this invention also relates polymeric flame retardant compositions formed from electrophilic aromatic bromination of pure polystyrene compositions. Said brominated polystyrene compositions having been prepared by processes that entails bromination with bromine and a bromination catalyst in a solvent, or other known bromination processes for polystyrene compositions, formed from the saline hydride initiated hydrogen mediated anionic polymerization of styrene monomer. Thus this invention provides flame retardant composition comprising a brominated polystyrene of the HMAPS distributions described above, wherein the composition: (i) has a bromine content in the range of about 73 wt % to about 77 wt %; (ii), a thermal HBr value at 300° C. below the detection limit of 50 ppm and no more than about 1000 ppm, the wt % and ppm values being based upon the total weight of the composition; a thermogravimetric (TGA) weight loss of 5% occurring at a temperature greater than about 355° C. to about 375° C.; and a glass transition temperature in the range of about 110° C. to about 155° C.

Components referred to by chemical name or formula anywhere in the specification or claims hereof, whether referred to in the singular or plural, are identified as they exist prior to coming into contact with another substance referred to by chemical name or chemical type (e.g., another component, a solvent, or etc.). It matters not what chemical changes, transformations and/or reactions, if any, take place in the resulting mixture or solution as such changes, transformations, and/or reactions are the natural result of bringing the specified components together under the conditions called for pursuant to this disclosure. Thus the components are identified as ingredients to be brought together in connection with performing a desired operation or in forming a desired composition. Also, even though the claims hereinafter may refer to substances, components and/or ingredients in the present tense ("comprises", "is", etc.), the reference is to the substance, component or ingredient as it existed at the time just before it was first contacted, blended or mixed with one or more other substances, components and/or ingredients in accordance with the present disclosure. The fact that a substance, component or ingredient may have lost its original identity through a chemical reaction or transformation during the course of contacting, blending or mixing operations, if conducted in accordance with this disclosure and with ordinary skill of a chemist, is thus of no practical concern.

The invention described and claimed herein is not to be limited in scope by the specific examples and embodiments herein disclosed, since these examples and embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

The following Examples illustrate the present invention. It is to be understood, however, that the invention, as fully described herein and as recited in the Claims, is not intended to be limited by the details of the following Examples.

EXAMPLES

General Apparatus Used

The apparatus used for HMSHIP processes is as follows. A 316 stainless steel 2-liter Parr autoclave having thermal couple, bottom drain valve, cooling coils, hot oil jacket and either two or three or four pitch-blade turbine impellers (with placement of each impeller as noted below and specified in the Examples) was further equipped with a piston pump, a diaphragm pump, nitrogen purged 250 ml stainless charge vessel, a well calibrated high pressure metering pump and a $1/16$th inch OD subsurface monomer feed line having either a 0.02", or a 0.01" or a 0.007" ID terminal section (as noted or as otherwise noted in the Examples). The magnetic drive on the agitator is connected to a high speed air driven motor and generally operated (unless otherwise noted in the Examples) such that the stirrer impellers spin at a rate of 1130±25 RPMs during the polymerization. The autoclave is vented to an oil bubbler and/or to a 6-liter oil jacketed creased wash vessel having a bottom drain and outfitted for overhead stirring and distillation. The bottom drain valve and the dip-leg sampling port of the autoclave are both plumbed to the wash vessel for direct transfer of the unquenched reaction mixture. Bulk solvent (e.g., cyclohexane or methylcyclohexane or ethylbenzene or mixtures thereof recovered from a previous run) is charged to the reactor via piston pump through the charge vessel. The catalyst components (e.g., TMEDA/potassium t-butoxide/solvent solution and butyllithium) are charged separately to the reactor through the charging vessels with the flow rate controlled with a fine metering Vernier handle needle valve. The contents of the charge vessel are pressure transferred with a minimum of nitrogen bsck-pressure to the autoclave having either nitrogen or a hydrogen or a hydrogen/nitrogen atmosphere. Styrene is fed via high pressure metering pump through basic alumina columns (1 or 2 0.5" O.D columns each w/11.0 g of 60-325 mesh $Al_2O_3$) to remove the inhibitor at predetermined constant rate. Hydrogen is fed to the head space and/or subsurface and maintained at the desired pressure. The autoclave reactor is heated with oil having a temperature set point at or just above (+1° C. to +3° C.) the desired reaction temperature and the reaction temperature was tightly maintained at the predetermined set point once the reactor controller lined out (generally after the first 20-30 minutes of the monomer feed when starting at ambient temperature). Thus the reaction temperature might have brief excursion in temperature generally no more than 5° C. above the desired set-point temperature.

During the course of the development of this invention 4 separate configurations (Configurations I-IV below) or placements involving two, three or four pitch-blade turbine impellers was utilized:

I. Two pitch blades with the first 6.25" and the second 10.0" from the top of the reactor II. Three pitch blades with the first 6.0", the second 8.0", and the third 10" from the top of the reactor.

III. Three pitch blades with the first 5.0", the second 7.0", and the third 10" from the top of the reactor.

IV. Four pitch blades with the first 4.0", the second 6.0", the third 8" and the fourth 10" from the top of the reactor.

The 2-liter autoclave is a cylinder having 10 inches in depth, thus each inch represents 200 ml of volume. Configuration II and III with three impellers resulted in uniform uptake of hydrogen throughout the course of the feed so long as the feed was limited such that the total volume in the reactor did not significantly go above the level where the top impeller became ineffective at mass transfer. Configuration IV with the use of 4 pitched blade impellers is the preferred configuration for operation of this invention—especially with the LOXSH catalyst of this invention—in the Parr 2-liter reactor, this configuration allowed for the full use of the reactor's volume with uniform mass transfer of the vapor space to the condensed phase and hence uptake of hydrogen throughout the styrene monomer feed. In that the polymerization reactor is 2000 ml in volume having a maximum working volume of 1750 ml and the initially formed reaction mixture is typically 400 to 600 ml in volume, then the maximum volume of styrene that can be safely fed is in the range of 1350 ml to 1150 ml (not accounting for temperature or changes in density upon polymerization). Thus feeding such volumes of styrene (1150 ml to 1350 ml) is deemed as a full charge of styrene or of monomer for this reactor configuration. The terms full charge of styrene or partial charge of styrene or any term or other phrase used to imply a fractional portions of styrene charged are limitations or restrictions for the apparatus as described above and in no way represents a limitation on the processes or practice of this invention in a reactor system(s) having a different reactor geometry or configuration or mode of operation (batch, semi-batch, semi-continuous, continuous, back-mixed or plugged flow are all modes and/or configurations within the scope of this invention). The Examples recited below are representative of batch or semi-batch operations of this invention. Clearly one of ordinary skill in the art can take the teachings of these Examples and extend the application of this invention to include modes of operation that entail continuous operation with and/or without some level of back mixing and accordingly such modes are well within the scope of this invention.

When charges are made to the polymerization reactor under a nitrogen atmosphere, the autoclave reactor is purged at least 3 times by pressurizing and then venting with 65 PSIG $H_2$ (65 PSIG vented to 0 PSIG). The polymerization reactor is then pressurized to the desired $H_2$ pressure. If reactor charges are made to the reactor containing a hydrogen atmosphere, then the reactor is typically pressurized and vented 2 times with 50 PSIG $H_2$. Styrene (99%, Acros), TMEDA (Aldrich), 2-methoxymethanol (99.9% Aldrich HPLC grade), 2-N,N-dimethylethanolamine (99.5% Aldrich), 2-[2-(dimethylamino)ethoxy]ethanol (98%, Aldrich), Potassium Hydride (30% in mineral oil, Aldrich), di-n-butylmagnesium 1.0 M in heptanes and n-butyllithium (2M in Cyclohexane (Aldrich) are each used as received from the vendor. Anhydrous cyclohexane methylcyclohexane and ethylbenzene (all Aldrich) are handled under an inert dry nitrogen atmosphere.

Examples 1-24

The experimental details of Examples 1-24 (reaction conditions, reagent charges, and initial as well as final catalyst concentration), scale-up parameters (relative feeds and relative hourly feed rates) and results (polymer molecular weight distribution [MWD] as determined by GPC and polymer yield) are presented in tabular form in Tables III-VI. It should be clear that the LOXSH catalyst and polymerization reaction conditions of this invention provide countless combinations of the reagents from which they are synthesized and the reaction parameters under which a process is conducted. Thus Examples 1-5 and Examples 6-13 comprise the initial scoping experiments designed to explore this novel catalyst system and reaction conditions. Accordingly these Examples only utilized about 25% to 50% of the preferred amount of monomer per experiment. With the reduced amount of styrene monomer employed, impeller configuration II was employed. Therefore except for the placement of the impellers in the polymerization reaction and the shortened styrene monomer feed, the preparation and execution of these experiments was essentially the same as Examples 14-24. Thus Examples 3, 14-15, 20-21 and 24 are deemed representative and are described in greater detail. It should be noted that GC analyses of the four to six most volatile styrene oligomers of the LOXLiH PS compositions thus produced (Examples 1-24) demonstrated 99.4% to 99.9% of the discrete polymer chains have pure linear "head to tail" polymer microstructure. Additionally these LOXLiH PS compositions are essentially free of any fragmentation polymerization impurities or co-product distributions. On an individual monomer repeating unit basis, statistical models (Weibull PDF) of these distribution indicate that between 99.986 mole % and 99.999 mole % of the styrene repeating units have either 2° (methylene) or 3° (methine) benzylic carbon atoms. Put in another way, these LOXLiH PS compositions have less than 10 ppm to no more than 140 ppm quaternary carbon "tail to head to tail" linkages in the microstructure.

Example 3

Representative of 25% of Full Monomer Feed Volume LOXLiH Ca. [DMEA⁻]$_5$Li$_{12}$H$_7$ Catalyst at 80° C.

Anhydrous cyclohexane, 345 ml of 495 ml (384.9 g) was charged to the reactor at 25° C. under a dry hydrogen (0 PSIG H$_2$) atmosphere. To the stirred solvent (800 RPM, three pitched blade turbines with Configuration II above) was charged through the charge vessel via positive nitrogen pressure, a solution previously formed from 2.27 g (0.0255 mol.) N,N-dimethylethanolamine, 134.7 g (1.27 mol) ethylbenzene and 12.22 g (0.105 mol) of TMEDA. The charge vessel and transfer line to the reactor was flushed with a 50 ml portion of anhydrous cyclohexane from the total amount above. Next, 30.37 ml (0.0607 mole) 2.0 M n-butyllithium was transferred through the charge vessel to the reactor followed by two 50 ml aliquots of the anhydrous cyclohexane from the total amount above. During the organolithium charge agitation speed was increased to 1130 RPM and consequently the reactor pressure decreased to −3 PSIG over the course of the 15 minute charge period as hydrogen was consumed. The reactor head space was purged and vented with 21 PSIG dry H$_2$ (through a subsurface feedline) two times (slowly venting to keep the contents from foaming out of the reactor) leaving the reactor at 0 PSIG. The reactor was then heated to 70° C. with the pressuring building to 4 PSIG. The heating was conducted with 81° C. oil on the reactor jacket. Upon reaching 70° C. the styrene monomer feed was initiated, feeding 257.2 g g (2.47 mol.) of styrene.

The styrene was fed through a subsurface feed line (0.02" ID tip, 2.02 ft/s) against the hydrogen head pressure of 6 PSIG over a period of 38 minutes controlling the reaction temperature at 80° C. Within 10 minutes of initiation of the monomer feed the reactor temperature reached 79° C. and the pressure was increased to 13 PSIG. Periodically the hydrogen uptake was monitored by closing the valve to the regulator and timing the period required to drop 5 PSIG. Thus the period in seconds required for the pressure to drop (−1) one PSIG was recorded.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of deoxygenated water and 200 ml of cyclohexane.

During the transfer of the unquenched reaction mixture a 10 ml sample was obtained for analysis. The sample was essentially water white—i.e. colorless and transparent to light—with no settled or suspended solids. The sample was quenched by the addition of a drop of methanol from a transfer pipet. The methanol quench produced hydrogen very slowly but constantly over a period greater than one hour—with hydrogen appearing to evolve from extremely small particles that only formed upon the initial quench. Accordingly the catalyst thus formed is surprisingly very slow to undergo methanolysis in cyclohexane under the ending conditions of the polymerization. GPC Analysis of the crude quenched reaction mixtures including the dimer content was as follows: $M_n$: 702, $M_w$: 1091, $M_z$: 1489, PD: 1.554, $\sigma_n$=523, $_n\alpha_3$=1.537—thus these conditions produce a linear (no branching) anionic chain transfer distribution of exceptionally low asymmetry.

Standard Work-Up and Product Isolation

The two phase product mixture was heated to 65° C. in the wash reactor and then the phases were separated. Phase cuts were easily made at 65° C., and were rapid requiring little settling time. Water and any rag or emulsion was removed through the bottom drain valve. The pH of the wash water removed from the reactor was monitored, the first wash invariably (meaning all previous and subsequent like runs) had pH=14. An additional deoxygenated water wash was conducted; the removed water wash phase had a pH≈12. The organic phase was then washed with 300 ml of 3 wt % H$_2$SO$_4$ followed by two 300 ml tap water washes with an ending pH of 7. The water washed product mixture was stripped in the wash reactor of cyclohexane and ethylbenzene by normal distillation while gradually heating the wash reactor's jacket temperature to 165° C. The distillation was deemed complete when the pot temperature reached a temperature above 140° C. The solution was allowed to cool before collecting 394.75 g of solution. The solution was then further stripped of ethylbenzene with the use of a wiped film evaporator (WFE, 2" glass Pope Still, operated at 50.0 mmHg vacuum, 140° C., wiper speed 60% of full rate, feeding at 1.0 liters/hr). This first WFE operation produced 245.0 g LOXLiH PS distribution having GPC MWD including dimer of $M_n$: 702, $M_w$: 1091, $M_z$: 1489, PD: 1.554, $\sigma_n$=523, $_n\alpha_3$=1.537. A second WFE operation (0.1-0.3 mmHg vacuum, 172.5° C., wiper speed 60% of full rate, feeding at 1.0 liters/hr) provided 217.9 g of a LOXLiH PS distribution having 2.40 GPC area % styrene dimer content and a GPC MWD of $M_n$: 821, $M_w$: 1152, $M_z$: 1505, PD: 1.403, $\sigma_n$=521, $_n\alpha_3$=1.417.

Examples 14 and 15

Representative of Full Scale Monomer Feed Volume for LOXLiH [DMEA$^-$]$_4$Li$_6$H$_2$ Catalyst at 80° C. w/Oligomer Microstructure Analysis Anhydrous cyclohexane, 150 ml of 300 ml (233.7 g) was charged to the reactor at 37° C. under a dry hydrogen (10 PSIG H$_2$) atmosphere. To the stirred solvent (800 RPM, three pitched blade turbines with Configuration III above) was charged through the charge vessel via positive nitrogen pressure, a solution previously formed from 2.72 g (0.0305 mol.) N,N-dimethylethanolamine, 140.0 g (1.32 mol) ethylbenzene and 1.82 g (0.0157 mol) of TMEDA. The charge vessel and transfer line to the reactor was flushed with a 50 ml portion of anhydrous cyclohexane from the total amount above. Next, 22.90 ml (0.0458 mole) 2.0 M n-butyllithium was transferred through the charge vessel to the reactor followed by two 50 ml aliquots of the anhydrous cyclohexane from the total amount above. During the organolithium charge agitation speed was increased to 1130 RPM and the reactor pressure decreased to 9 PSIG over the course of the 15 minute charge period. The reactor head space was purged and vented with 50 PSIG to 0 PSIG with dry H$_2$ (through a subsurface feedline) three times (slowly venting to keep the contents from foaming out of the reactor) leaving the reactor at 45 PSIG. The reactor was then heated to 74° C. with the pressuring building to 63 PSIG. The heating was conducted with 81° C. oil flowing through the reactor jacket. Upon reaching a reaction temperature of 73° C. the styrene monomer feed was initiated, feeding 960.4 g g (9.22 mol.) of styrene. The styrene was fed through a subsurface feed line (0.02" ID tip, 1.88 ft/s) against the hydrogen head pressure over a period of 151 minutes controlling the reaction temperature at 80° C. Within 10 minutes of initiation of the monomer feed the reactor temperature reached 81° C. and the pressure had dropped to 13 PSIG. The hydrogen regulator was set to maintain a pressure of 16 PSIG. Periodically the hydrogen uptake was monitored by closing the valve to the regulator and timing the period required to drop 5 P SIG. Thus the period in seconds required for the pressure to drop (−1) one PSIG was recorded. When this value was adjusted for estimated reactor headspace, the hydrogen uptake in terms of mole H$_2$ per mole of styrene feed appeared constant or near constant.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of deoxygenated water. Thus the reaction mixture was quenched with care in the wash reactor. The above process was repeated as Example 15 with the identical charges and conditions to within minor run to run variations in measuring out the reagents and reproducing the conditions except that 1020.4 g g (9.80 mol.) of styrene was fed over a period of 160 minutes. As noted above during the added 9 minutes of feed hydrogen uptake and was reduced somewhat.

During the transfer of the unquenched reaction mixtures (Examples 14 and 15) 10 ml samples of the individual reaction mixtures were obtained for analyses. The samples were essentially water white—i.e. colorless and transparent to light—with no settled or suspended solids. The samples were quenched by the addition of a drop of methanol from a transfer pipet. The methanol immediately resulted in the formation and evolution of hydrogen gas. GPC Analysis of the crude quenched reaction mixtures including the dimer content was as follows: Example 14 $M_n$: 439, $M_w$: 628, $M_z$: 886, PD: 1.411, $\sigma_n$=288, $_n\alpha_3$=2.108; Example 15 $M_n$: 428, $M_w$: 636, $M_z$: 979, PD: 1.539, $\sigma_n$=298, $_n\alpha_3$=2.778.

The standard work-up from above provided 3271 g of solution. Wiped film evaporation (WFE, 2" glass Pope Still, operated at 50.0 mmHg vacuum, 140° C., wiper speed 60% of full rate, feeding at 1.0 liters/hr) produced 1793 g LOXLiH PS distribution having GPC MWD including dimer of $M_n$: 434, $M_w$: 630, $M_z$: 934, PD: 1.452, $\sigma_n$=292, $_n\alpha_3$=2.543. A second WFE operation (0.1-0.3 mmHg vacuum, 172.5° C., wiper speed 60% of full rate, feeding at 1.0 liters/hr) provided 1492 g of a LOXLiH PS distribution having 2.40 GPC area % styrene dimer content and a GPC MWD of $M_n$: 530, $M_w$: 731, $M_z$: 1150, PD: 1.379, $\sigma_n$=326, $_n\alpha_3$=3.661. A third WFE operation was performed to obtain the low molecular weight oligomers in order to determine the LOXLiH PS distribution microstructure. Thus a 163.2 g sample of the 1492 g product distribution recovered from the 2$^{nd}$ WFE operation was stripped of oligomers (0.13 mmHg vacuum, 199.5° C., wiper speed 85% of full rate, feeding at 2.0 g/min.). This third WFE operation produced 31.24 g of a styrene oligomer mixture having GPC MWD: of $M_n$: 310, $M_w$: 323, $M_z$: 337, PD: 1.043. GC analysis indicated that 99.940% of the chains had the desired "head to tail" microstructure, with only a trace if any of chains having the fragmented (FW$_t$-14) microstructure (See FIG. 3).

It should be noted that Examples 14 and 15 are nearly identical except that an additional amount of styrene monomer was employed in Example 15. These Examples utilized impeller configuration III which was more than adequate for uniform for hydrogen transfer to the condensed phase for Example 14 but proved to be just less than fully adequate for the added 60 grams of monomer fed in Example 15. This is reflected in the increased values of PD$_n$, $\sigma_n$ and $_n\alpha_3$ for the MWD of Example 15 as compared to Example 14 (Table V). Thus in order to feed more monomer to the same size starting reaction medium a fourth impeller was added to the agitator shaft spaced as indicated above for Configuration IV. Configuration IV was utilized in Example 20-21 and 24. Example 21 was identical to Example 20 except that Example 21 utilized only 25% of the preferred total monomer feed. This was done in order to explore how the molecular weight distribution evolves over the course of a run. Based on this experiment the values of PD$_n$, and $_n\alpha_3$ decrease as the molecular weight increases indicating that as the feed continues a distribution of less breadth and asymmetry are formed with each increment of styrene monomer fed all the while forming incrementally different statistical distributions of dead polymer chains and simultaneously reforming the LOXLiH catalyst. This combination of experiments would indicate that a continuous process operated at steady state conditions can be utilized to form even more preferred molecular weight distributions of desired low polydispersity, breadth and asymmetry.

Examples 20 and 21

Representative of Full Scale Monomer Feed Volume LOXLiH [DMEA$^-$]$_2$Li$_6$H$_4$ Catalyst at 80° C.

Anhydrous methylcyclohexane, 150 ml of 300 ml (231.0 g) was charged to the reactor at −5° C. under a dry hydrogen (12 PSIG H$_2$) atmosphere. To the stirred solvent (800 RPM, four pitched blade turbines with Configuration IV above) was charged through the charge vessel via positive nitrogen pressure, a solution previously formed from 1.00 g (0.0112 mol.) N,N-dimethylethanolamine, 140.0 g (1.32 mol) ethylbenzene and 2.60 g (0.022 mol) of TMEDA. The charge vessel and transfer line to the reactor was flushed with a 50 ml portion of anhydrous methylcyclohexane from the total amount above. Next, 16.81 ml (0.0336 mole) 2.0 M n-butyllithium was transferred through the charge vessel to the reactor followed by two 50 ml aliquots of the anhydrous methylcyclohexane from the total amount above. During the organolithium charge agitation speed was increased to 1130 RPM and the reactor pressure increased to 14 PSIG over the course of the 15 minute charge period. The reactor head space was purged with 50 PSIG with dry H$_2$ (through a subsurface feedline) and venting three times (slowly venting to keep the contents from foaming out of the reactor) leaving the reactor at 40 PSIG. The reactor was then heated to 70° C. by the time the reactor temperature had reached 18° C. the pressure had built only 2 PSIG to 42 PSIG indicating uptake of hydrogen upon heating. The H$_2$ pressure was increased to 46 PSIG, by the time the reactor reached 72° C. the pressure had built to 60 PSIG. The heating process was conducted with 81° C. oil flowing through the reactor jacket. Upon reaching 72° C. the styrene monomer feed was initiated, feeding 1042.5 g (10.01 mol.) of styrene. The styrene was fed through a subsurface feed line (0.02" ID tip, 1.88 ft/s) against the hydrogen head pressure over a period of 164 minutes controlling the reaction temperature at 80° C. Within 10 minutes of initiation of the monomer feed the reactor temperature reached 80° C. and the pressure had dropped to 32 PSIG. The hydrogen regulator was set to maintain a pressure of 14 PSIG. Periodically the hydrogen uptake monitored by closing the valve to the regulator and timing the period required to drop 4 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared constant or near constant.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of deoxygenated water. Thus the reaction mixture was quenched with care in the wash reactor. The above process was repeated as Example 21 with the identical charges and conditions to within minor run to run variations in measuring out the reagents and reproducing the conditions except that 255.0 g (2.45 mol.) of styrene was fed over a period of 40 minutes.

During the transfer of the unquenched reaction mixtures (Examples 20 and 21) 10 ml samples of the individual reaction mixtures were obtained for analyses. The samples were essentially water white—i.e. colorless and transparent to light—with no settled or suspended solids. The samples were quenched by the addition of a drop of methanol from a transfer pipet. The methanol immediately resulted in the formation and evolution of hydrogen gas. GPC Analyses of the crude quenched reaction mixtures including the dimer content was as follows: Example 20 $M_n$: 466, $M_w$: 675, $M_z$: 951, PD: 1.409, $\sigma_n$=312, $_n\alpha_3$=2.033; Example 21 $M_n$: 408, $M_w$: 598, $M_z$: 932, PD: 1.559, $\sigma_n$=278, $_n\alpha_3$=2.993.

The standard work-up from above but conducted at 82° C. provided 1631.5 g of solution. Wiped film evaporation (WFE, 2" glass Pope Still, operated at 50.0 mmHg vacuum, 140° C., wiper speed 60% of full rate, feeding at 1.0 liters/hr) produced 1168 g LOXLiH PS distribution having GPC MWD including dimer of $M_n$: 424, $M_w$: 626, $M_z$: 979, PD: 1.476, $\sigma_n$=293, $_n\alpha_3$=2.9794. A second WFE operation (0.1-0.3 mmHg vacuum, 172.5° C., wiper speed 60% of full rate, feeding at 1.0 liters/hr) provided 946 g of a LOXLiH PS distribution having 1.40 GPC area % styrene dimer content and a GPC MWD of $M_n$: 536, $M_w$: 722, $M_z$: 1049, PD: 1.379, $\sigma_n$=326, $_n\alpha_3$=2.912.

Examples 24

Representative of Full Scale Monomer Feed Volume LOXLiH [DMEA$^-$]$_5$Li$_{12}$H$_7$ Catalyst at 80° C. w/ Oligomer Microstructure Analysis Anhydrous methylcyclohexane, 150 ml of 300 ml (231.0 g) was charged to the reactor at −5° C. under a dry hydrogen (13 PSIG H$_2$) atmosphere. To the stirred solvent (800 RPM, four pitched blade turbines with Configuration IV above) was charged through the charge vessel via positive nitrogen pressure, a solution previously formed from 2.27 g (0.0255 mol.) N,N-dimethylethanolamine, 140.0 g (1.32 mol) ethylbenzene and 12.40 g (0.107 mol) of TMEDA. The charge vessel and transfer line to the reactor was flushed with a 50 ml portion of anhydrous methylcyclohexane from the total amount above. Next, 30.79 ml (0.0616 mole) 2.0 M n-butyllithium was transferred through the charge vessel to the reactor followed by two 50 ml aliquots of the anhydrous methylcyclohexane from the total amount above. During the organolithium charge agitation speed was increased to 1130 RPM and the reactor pressure increased to 14 PSIG over the course of the 15 minute charge period. The reactor head space was purged and vented with 50 PSIG to 0 PSIG with dry H$_2$ (through a subsurface feedline) three times (slowly venting to keep the contents from foaming out of the reactor) leaving the reactor at 41 P SIG. The reactor was then heated to 73° C., by the time the reactor temperature reached 72° C. the pressure had built to 62 PSIG. The heating process was conducted with 81° C. oil flowing through the reactor jacket. Upon reaching 73° C. the styrene monomer feed was initiated, feeding 1041.0 g (10.00 mol.) of styrene. The styrene was fed through a subsurface feed line (0.02" ID tip, 1.88 ft/s) against the hydrogen head pressure over a period of 164 minutes controlling the reaction temperature at 80° C. Within 10 minutes of initiation of the monomer feed the reactor temperature reached 81° C. and the pressure had dropped to 34 PSIG. The hydrogen regulator was set to maintain a pressure of 14 PSIG. Periodically the hydrogen uptake monitored by closing the valve to the regulator and timing the period required to drop 4 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared constant or near constant.

At the end of the styrene feed, the monomer feed line to the reactor, including the alumina columns (acidic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of deoxygenated water. Thus the reaction mixture was quenched with care in the wash reactor.

During the transfer of the unquenched reaction mixture a 10 ml sample of the reaction mixture was obtained for analyses. The sample was essentially water white—i.e. colorless and transparent to light—with no settled or suspended solids. The sample was quenched by the addition of a drop of methanol from a transfer pipet. The methanol quench immediately resulted in the formation and evolution of hydrogen gas. GPC Analyses of the crude quenched reaction mixture including the dimer content was as follows: $M_n$: 466, $M_w$: 675, $M_z$: 951, PD: 1.409, $\sigma_n$=312, $_n\alpha_3$=2.033.

The standard work-up from above but conducted at 82° C. provided 1312.9 g of solution. Wiped film evaporation (WFE, 2″ glass Pope Still, operated at 50.0 mmHg vacuum, 140° C., wiper speed 60% of full rate, feeding at 1.0 liters/hr) produced 966.2 g LOXLiH PS distribution having GPC MWD including dimer of $M_n$: 477, $M_w$: 685, $M_z$: 961, PD: 1.436, $\sigma_n$=315, $_n\alpha_3$=2.032. A second WFE operation (0.1-0.3 mmHg vacuum, 172.5° C., wiper speed 60% of full rate, feeding at 1.0 liters/hr) provided 828.4 g of a LOXLiH PS distribution having 1.2 GPC area % styrene dimer content and a GPC MWD of $M_n$: 575, $M_w$: 753, $M_z$: 933, PD: 1.310, $\sigma_n$=320, $_n\alpha_3$=1.933. A third WFE operation was performed to obtain the low molecular weight oligomers in order to determine the LOXLiH PS distribution microstructure. Thus a 106.2 g sample of the 966.2 g product distribution recovered from the $2^{nd}$ WFE operation was stripped of oligomers 0.1 mmHg vacuum, 199.5° C., wiper speed 85% of full rate, feeding at 2.0 g/min.). This third WFE operation produced 33.17 g of a styrene oligomer mixture having GPC MWD: of $M_n$: 372, $M_w$: 398, $M_z$: 426, PD: 1.069. GC analysis indicated that 99.82% of the chains had the desired "head to tail" microstructure, with only a trace id any of the chains having the fragmented ($FW_i$-14) microstructure (See FIG. 4).

Upon completion of the series of LOXLiH runs (Examples 29-35) the autoclave reactor was rinsed with standard drum grade (not anhydrous) cyclohexane, purged well with nitrogen and then opened for inspection. The heated reactor walls and the cold surfaces (i.e. cooling coils, agitator assembly, dip leg, monomer feed-line and thermowell) for all intents and purposes were free of all solids.

Examples 25-29

The experimental details of Examples 25-29 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table VII. As was stated above is reiterated here, it should be clear that the LOXSH catalyst and polymerization reaction conditions of this invention provide countless combinations of the reagents from which they are synthesized and the reaction parameters under which a process is conducted. These Examples 25-29 include bimetallic catalyst involving other saline hydrides. Thus Examples 25-27 entail the use of potassium hydride in forming the LOXKH catalyst and Examples 28-29 entail formation of $LOXMgH_2$ catalyst using an organomagnesium reagent. Examples 26, 28 and 29 are described in greater detail.

It should be noted that GC analyses of the four to six most volatile styrene oligomers of the $LOXMgH_2$ PS compositions thus produced (Examples 28-29) demonstrated 99.2% linear "head to tail" polymer microstructure essentially free of any fragmentation polymerization impurities or co-product distributions. Statistical models (Beta PDF) of these distributions indicate that about 99.982 mole % of the styrene repeating units have either 2° (methylene) or 3° (methine) benzylic carbon atoms. Put in another way, these $LOXMgH_2$ PS compositions have no more than 185 ppm quaternary carbon "tail to head to tail" linkages. Analyses of the LOXKH produced oligomers showed very high levels—8 to 12% of the discrete polymer chains—of the composition with a single quaternary carbon head "tail to head to tail" linkages. Thus based on statistical models of these compositions (Beta PDF) the LOXKH compositions can have less than 99.725 mole % of the styrene repeating units with either a 2° (methylene) or a 3° (methine) benzylic carbon atoms. This means that these compositions can have greater than 2750 ppm quaternary carbon "tail to head to tail" linkages rendering them less preferred compositions for certain applications.

Surprisingly even the composition of Example 27 produced from a LOXKH catalyst having a Li:K ratio of 15:1 produced a composition with greater than 8 wt % of the chains with the undesired single quaternary carbon "tail to head to tail" linkages. It is assumed in part based on results to be presented in Table VII, that a catalyst formed from one part DMEAH to 2 parts of a Group I metal ($M^+$) exist as an aggregate with the formula $[DMEA^-]_4M_8H_4$. Based on this assumption the catalysts of Example 27 (15:1 Li:K) could be comprised of 1 aggregate having the formula $[DMEA^-]_4Li_8H_4$ and one aggregate having the formula $[DMEA^-]_4Li_7KH_4$. The catalyst of Example 25 (3:1 Li:K) may well be an aggregate or aggregates having the formula $[DMEA^-]_4Li_6K_2H_4$ and the catalyst of Example 26 (7:1 Li:K) may be an aggregate having the formula $[DMEA^-]_4Li_7KH_4$. Wherein with each of these aggregate catalyst systems, the most active hydride species is the KH in terms of initiation and consequently in terms of formation of less desired polymer microstructure—as these three Examples (25, 26 and 27) provided just like all other potassium based catalyst systems.

In comparison and contrast to LOXKH, Examples 28 and 29 which are representative of $LOXMgH_2$ aggregate catalyst systems, it would appear that a LOXLiH aggregate catalyst is more active than the $LOXMgH_2$. For Example 28 the stoichiometric ratio of DMEAH to n-butyllithium to dibutylmagnesium is such that if one single aggregate were formed it would have the empirical formula $[DMEA^-]_{21}Li_{28}Mg_4H_{15}$, and thus there should or at least could exist both LiH and $MgH_2$ active species. It is anticipated that several different aggregates form and some of which may be free of magnesium and hence a form of LiH as the active reagent should exist in the catalyst composition. In contrast, Example 29 the n-butyllithium and dibutylmagnesium charges were such as to consume all of the lithium alkyl radicals (butyllithium groups) leaving only magnesium alkyl radicals (dibutylmagnesium groups). The stoichiometry and anticipated empirical formula of Example 29 is $[DMEA^-]_4Li_4MgH_2$ and thus no explicit form of LiH should exist.

In that Example 28 could be run at a significantly lower hydrogen pressure than Example 29 to obtain similar product MWDs, it is surmised that an all lithium catalyst aggregate is likely present and is more active as a catalyst for the hydrogen mediated saline hydride initiated polymerization process then a catalyst aggregate comprising some amount of magnesium hydride. Again, Example 29 the catalyst was formed such that no active LiH would be present (i.e. the moles of DMEAH was in excess of the moles of organolithium charged). This catalyst system was very effective but required a much higher $H_2$ pressure than Example 28. Given the demands of a commercial reactor (challenges in maintaining a constant pressure and the simple amount of back pressure needed for a proper seal) this need for a modestly higher $H_2$ pressure is deemed as fortuitous advantage over the LOXLiH catalyst (Examples 1-24) and the mixed LOXLiH LOXMgH$_2$ catalyst of Example 28.

Formation of a "[DMEA$^-$]$_2$LiK.2TMEDA Stock Solution for Examples 25-27

Unlike potassium tert-butoxide which is easily solubilized by 2 to 5 moles of TMEDA into hydrocarbon solvents, the potassium alkoxide formed from N,N-dimethylethanolamine, [DMEA$^-$]K, appears to be poorly soluble even with TMEDA added. However a mixed metal alkoxide formed from potassium hydride, n-butyllithium and DMEAH was easily dissolved in ethylbenzene. Thus a 6.12 wt % homogenous 206.71 g stock solution of TMEDA complexed mixed metal aminoalkoxide "[DMEA$^-$]$_2$LiK.2TMEDA" solution in ethylbenzene was prepared under a nitrogen atmosphere in 182.5 (1.72 moles anhydrous ethylbenzene from 1.10 g (0.274) dry fresh KH, 4.90 g (0.0550 mole) DMEAH, 6.51 (0.560 mole) TMEDA, and 15.12 ml (0.0302 moles) 2.0 M n-butyllithium in cyclohexane. This was accomplished by charging 3.67 g of 30 wt % KH in mineral oil to a previously weighed oven dried 500 ml borosilicate glass bottle and glass coated stirrer bar placed on to a stirrer hot plate in a nitrogen purged glovebox. The potassium hydride suspension was then washed and decanted three times with 30 ml of anhydrous n-pentane. After drying to a constant weight under a stream of dry nitrogen, 182.46 g of ethylbenzene, 6.51 g TMEDA (/99.5%) and 4.90 g of DMEAH (/99.5%, added in portions as $H_2$ evolved) were then charged. The resulting heterogeneous solution was gently warmed to 50° C. and n-butyllithium was added slowly until a homogenous solution was formed. A 10 mole % excess of n-butyllithium was needed to produce a homogenous solution with a persistent faint red color indicating the presence of other protic species. One drop of DMEAH was added to quench the red color and upon cooling to room temperature the stock solution remained homogenous. Aliquots of this 6.12 wt % homogenous stock solution containing the desired amount of potassium ions were then used in forming the reaction mixture of Examples 25-27.

Examples 26

Representative of LOXKH [DMEA$^-$]$_4$Li$_7$KH$_4$ Catalyst at 80° C. w/Oligomer Microstructure Analysis Anhydrous cyclohexane, 150 ml of 300 ml (233.7 g) was charged to the reactor at 37° C. under a dry hydrogen (10 PSIG H$_2$) atmosphere. To the stirred solvent (800 RPM, three pitched blade turbines with Configuration III above) was charged through the charge vessel via positive nitrogen pressure, 51.68 g of the 6.12 wt % homogenous a solution described above was combined with an additional 1.23 g (0.0138 mol.) N,N-dimethylethanolamine and 1.63 g (0.0140 mol) of TMEDA dissolved in 50.0 ml anhydrous cyclohexane. The charge vessel and transfer line to the reactor was flushed with a 50 ml portion of anhydrous cyclohexane from the total amount above. Next, 20.66 ml (0.0413 mole) 2.0 M n-butyllithium diluted with 42.71 g (0.403) of anhydrous EB was transferred through the charge vessel to the reactor followed by two 50 ml aliquots of the anhydrous cyclohexane from the total amount above. During the organolithium charge agitation speed was increased to 1130 RPM and the reactor pressure decreased to 8 PSIG over the course of the 18 minute charge period. The reactor head space was purged and vented with 50 PSIG with dry H$_2$ (through a subsurface feedline) three times (slowly venting to keep the contents from foaming out of the reactor) leaving the reactor at 41 PSIG. The reactor was then heated to 75° C. with the pressuring building to 62 PSIG. The heating was conducted with 81° C. oil on the reactor jacket. Upon reaching 75° C. the styrene monomer feed was initiated, feeding 996.9 g (9.57 mol.) of styrene. The styrene was fed through a subsurface feed line (0.02" ID tip, 1.88 ft/s) against the hydrogen head pressure over a period of 156 minutes controlling the reaction temperature at 81.5° C. Within 10 minutes of initiation of the monomer feed the reactor temperature reached 82° C. and the pressure had dropped to 47 PSIG. The hydrogen regulator was set to maintain a pressure of 22 PSIG. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared fall off somewhat during the course of the monomer feed which indicated that ethylbenzene in addition to hydrogen behaves as a chain transfer agent with this catalyst composition.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of deoxygenated water. During the transfer of the unquenched reaction mixture a 10 ml sample of the reaction mixture was obtained for analyses. The sample was red in color and transparent to light with no settled or suspended solids. The sample was quenched by the addition of a drop of methanol from a transfer pipet. The methanol quench immediately resulted in the formation and evolution of hydrogen gas. Based on GPC analyses of the crude quenched reaction mixtures including the dimer content was as follows: $M_n$: 688, $M_w$: 1051, $M_z$: 1461, PD: 1.527, $\sigma_n$=500, $_n\alpha_3$=1.725.

The standard work-up from above but conducted at 82° C. provided 1159.5 g of solution. Wiped film evaporation (WFE, 2" glass Pope Still, operated at 50.0 mmHg vacuum, 140° C., wiper speed 60% of full rate, feeding at 1.0 liters/hr) produced 935 g LOXLKH PS distribution having GPC MWD including dimer of $M_n$: 689, $M_w$: 1051, $M_z$: 1461, PD: 1.527, $\sigma_n$=500, $_n\alpha_3$=1.725. A second WFE operation (0.1-0.3 mmHg vacuum, 172.5° C., wiper speed 60% of full rate, feeding at 1.0 liters/hr) provided 845 g of a LOXKH PS distribution having 0.48 GPC area % styrene dimer content and a GPC MWD of $M_n$: 765, $M_w$: 1099, $M_z$: 1486, PD: 1.437, $\sigma_n$=505, $_n\alpha_3$=1.667. A third WFE operation was performed to obtain the low molecular weight oligomers in order to determine the LOXKH PS distribution microstructure. Thus a 150.2 g sample of the 845 g product distribution recovered from the 2$^{nd}$ WFE operation was stripped of oligomers 0.1 mmHg vacuum, 199.5° C., wiper speed 85% of full rate, feeding at 2.0 g/min.). This third WFE operation produced 18.94 g of a styrene oligomer mixture having GPC MWD: of $M_n$: 34, $M_w$: 371, $M_z$: 400, PD: 1.077. GC analysis indicated that 89.53% of the chains had the desired "head to tail" microstructure, with 0.78% of the chains having the fragmented ($FW_i$-14) microstructure and the balance of the chains possess the less desired sing quaternary "tail to head to tail" linkage in the discrete polymer chains (See FIG. 6). The gas chromatogram in FIG. 6 demonstrates the oligomer microstructure purity: 89.53% "Head to Tail" Microstructure; 9.7% of oligomers w/one quaternary "tail to head to tail" linkage; and 0.78% ($FW_i$-14) fragmentation oligomers.

Examples 28

Representative of Full Monomer Feed for LOXMgH$_2$ [DMEA$^-$]$_{21}$Li$_{28}$Mg$_4$H$_{15}$ Catalyst at 80° C.

Anhydrous methylcyclohexane, 175 ml of 375 ml (288.8 g) was charged to the reactor at −5° C. under a dry hydrogen (13 PSIG H$_2$) atmosphere. To the stirred solvent (800 RPM, four pitched blade turbines with Configuration VI above) was charged through the charge vessel via positive nitrogen pressure, a solution previously formed from 3.32 g (0.0372 mol.) N,N-dimethylethanolamine, 30.0 g (0.28 mol) ethylbenzene and 6.51 g (0.056 mol) of TMEDA. The charge vessel and transfer line to the reactor was flushed with a 50 ml portion of anhydrous methylcyclohexane from the total amount above. Next, 24.50 ml (0.0490 mole) 2.0 M n-butyllithium in cyclohexane dissolved in 80 g (0.75 mole) was transferred through the charge vessel to the reactor followed by two 50 ml aliquots of the anhydrous methylcyclohexane from the total amount above. Then 7.00 ml of 1.0 M dibutylmagnesium (0.007 mole) in heptane dissolved in 30.0 g (0.28 mole) ethylbenzene was charged and transferred through the charge vessel to the reactor followed by a 50 ml aliquot of the anhydrous methylcyclohexane from the total amount above. During the organolithium/organomagnesium charge agitation speed was increased to 1130 RPM and the reactor pressure increased to 16 PSIG over the course of the 15 minute charge period. The reactor head space was purged and vented with 50 PSIG with dry H$_2$ (through a subsurface feedline) three times (slowly venting to keep the contents from foaming out of the reactor) leaving the reactor at 46 PSIG and −3.4° C. The reactor was then heated to 40° C. by the time (45 min.) the reactor temperature reached 40° C. the pressure had built to 55 PSIG. The reactor was vented to 46 PSIG and heating continued. After an additional 15 minutes of heating the reactor reached 67° C. and the pressure was set to 63 PSIG. The heating process was conducted with 81° C. oil on the reactor jacket. Upon reaching 72° C. and 64 PSIG the styrene monomer feed was initiated, feeding 1009.0 g (9.69 mol.) of styrene. The styrene was fed through a subsurface feed line (0.02" ID tip, 1.88 ft/s) against the hydrogen head pressure over a period of 159 minutes controlling the reaction temperature at 82° C. Within 10 minutes of initiation of the monomer feed the reactor temperature reached 80° C. and the pressure had dropped to 36 P SIG. The hydrogen regulator was set to maintain a pressure of 14 PSIG for the next 40 minutes of feed. After a total of 60 minutes of feeding monomer, the hydrogen pressure was set to 11 PSIG. Periodically the hydrogen uptake was monitored by closing the valve to the regulator and timing the period required to drop 4 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared near constant.

At the end of the styrene feed, the monomer feed line to the reactor, including the alumina columns (acidic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of 3 wt % H$_2$SO$_4$. During the transfer of the unquenched reaction mixture a 10 ml sample of the reaction mixture was obtained for analyses. The sample was light yellow in color with no solids observed. The sample was quenched by the addition of a drop of methanol from a transfer pipet. The methanol quench immediately resulted in quenching of the yellow color and the formation and evolution of hydrogen gas. GPC Analyses of the crude quenched reaction mixtures including the dimer content was as follows: $M_n$: 504, $M_w$: 773, $M_z$: 1180, PD: 1.534, $\sigma_n$=368, $_n\alpha_3$=2.538.

The two phase product mixture was heated to 82° C. in the wash reactor and then the phases were separated. Phase cuts were easily made at 82° C., and were rapid requiring little settling time. The organic phase was then washed with 4λ300 ml of tap water until an ending pH of 7 was achieved. The standard solvent strip from the above standard product isolation provided 1561.8 g of solution. Wiped film evaporation (WFE, 2" glass Pope Still, operated at 50.0 mmHg vacuum, 140° C., wiper speed 60% of full rate, feeding at 1.0 liters/hr) produced 962 g LOXMgH$_2$ PS distribution having GPC MWD including dimer of $M_n$: 511, $M_w$: 780, $M_z$: 1187, PD: 1.526, $\sigma_n$=371, $_n\alpha_3$=2.530. A second WFE operation (0.1-0.3 mmHg vacuum, 172.5° C., wiper speed 60% of full rate, feeding at 1.0 liters/hr) provided 828.4 g of a LOXMgH$_2$ PS distribution having 1.1 GPC area % styrene dimer content and a GPC MWD of $M_n$: 622, $M_w$: 853, $M_z$: 1207, PD: 1.371, $\sigma_n$=379, $_n\alpha_3$=2.417.

Examples 29

Representative of 50% Monomer Feed Volume for LOXMgH$_2$ [DMEA$^-$]4Li$_4$MgH2 Catalyst at 80° C. w/Oligomer Microstructure Analysis Anhydrous methylcyclohexane, 175 ml of 375 ml (288.8 g) was charged to the reactor at −5° C. under a dry hydrogen (12 PSIG H$_2$) atmosphere. To the stirred solvent (800 RPM, four pitched blade turbines with Configuration VI above) was charged through the charge vessel via positive nitrogen pressure, a solution previously formed from 5.00 g (0.0561 mol.) N,N-dimethylethanolamine, 30.0 g (0.28 mol) ethylbenzene and 8.15 g (0.056 mol) of TMEDA. The charge vessel and transfer line to the reactor was flushed with a 50 ml portion of anhydrous methylcyclohexane from the total amount above. Next, 28.05 ml (0.0561 mole) 2.0 M n-butyllithium in cyclohexane dissolved in 80 g (0.75 mole) was transferred through the charge vessel to the reactor followed by two 50 ml aliquots of the anhydrous methylcyclohexane from the total amount above. Then 14.00 ml of 1.0 M dibutylmagnesium (0.014 mole) in heptane dissolved in 30.0 g (0.28 mole) ethylbenzene was charged and transferred through the charge vessel to the reactor followed by a 50 ml aliquot of the anhydrous methylcyclohexane from the total amount above. During the organolithium/organomagnesium charge agitation speed was increased to 1130 RPM and the reactor pressure increased to 17 PSIG over the course of the 16 minute charge period. The reactor head space was vented to 0 PSIG and then pressured to 65 PSIG with dry $H_2$ (through a subsurface feedline) and venting three times (slowly venting to keep the contents from foaming out of the reactor) leaving the reactor at 44 PSIG and −4.4° C. The reactor was then heated to 71° C. over 120 minutes with the heating process conducted with 81° C. oil on the reactor jacket. Upon reaching 71° C. and 61 PSIG the styrene monomer feed was initiated, feeding 509.0 g (4.89 mol.) of styrene. The styrene was fed through a subsurface feed line (0.02" ID tip, 1.88 ft/s) against the hydrogen head pressure over a period of 80 minutes controlling the reaction temperature at 81° C. Within 10 minutes of initiation of the monomer feed the reactor temperature reached 80° C. and the pressure had dropped to 49 PSIG. (However it is pointed out that hydrogen consumption as evidence in a drop in pressure was delayed by about 0.25 to 0.75 minutes when compared to a LOXLiH run.) The hydrogen regulator was set to maintain a pressure of 46 PSIG for the next 40 minutes of feed. After total of 60 minutes of feeding monomer the hydrogen pressure was then controlled at 65 PSIG. Periodically the hydrogen uptake was monitored by closing the valve to the regulator and timing the period required to drop 4 PSIG. Thus the period in seconds required for the pressure to drop (−1) one PSIG was recorded. When this value was adjusted for estimated reactor headspace, the hydrogen uptake in terms of mole $H_2$ per mole of styrene feed appeared near constant.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of 3 wt % $H_2SO_4$. During the transfer of the unquenched reaction mixture a 10 ml sample of the reaction mixture was obtained for analyses. The sample was light yellow in color with some large particles that settled. The sample was quenched by the addition of a drop of methanol from a transfer pipet. The methanol quench immediately resulted in quenching of the yellow color and the formation and evolution of hydrogen gas. GPC Analyses of the crude quenched reaction mixtures including the dimer content was as follows: $M_n$: 481, $M_w$: 713, $M_z$: 1008, PD: 1.482, $\sigma_n$=334, $_n\alpha_3$=1.969.

The work-up and strip procedure of Example 28 yielded 729.9 g of solution. Wiped film evaporation (WFE, 2" glass Pope Still, operated at 50.0 mmHg vacuum, 140° C., wiper speed 60% of full rate, feeding at 1.0 liters/hr) produced 492 g $LOXMgH_2$ PS distribution having GPC MWD including dimer of $M_n$: 485, $M_w$: 718, $M_z$: 1018, PD: 1.480, $\sigma_n$=336, $_n\alpha_3$=2.000. A second WFE operation (0.1-0.3 mmHg vacuum, 172.5° C., wiper speed 60% of full rate, feeding at 1.0 liters/hr) provided 427 g of a $LOXMgH_2$ PS distribution having 1.1 GPC area % styrene dimer content and a GPC MWD of $M_n$: 593, $M_w$: 805, $M_z$: 1116, PD: 1.358, $\sigma_n$=355, $_n\alpha_3$=2.256. A third WFE operation was performed to obtain the low molecular weight oligomers in order to determine the $LOXMgH_2$ PS distribution microstructure. Thus a 94.5 g sample of the 492 g product distribution recovered from the $2^{nd}$ WFE operation was stripped of oligomers (0.12 mmHg vacuum, 199.5° C., wiper speed 85% of full rate, feeding at 2.0 g/min.). This third WFE operation produced 15.73 g of a styrene oligomer mixture having GPC MWD: of $M_n$: 314, $M_w$: 329, $M_z$: 344, PD: 1.049. GC analysis indicated that 99.21% of the chains had the desired "head to tail" microstructure, free of chains having the fragmented ($FW_f$-14) microstructure with trace quantities of oligomers initiated with a butyl group (See FIG. 8). The gas chromatogram in FIG. 8 demonstrates the oligomer microstructure purity: 99.21% "Head to Tail" Microstructure; 0.0% fragmentation oligomers; and a trace of [n-butyl]MgH initiated styrene oligomers w/0.0% TEA ethyl end group incorporation. The slight delay in hydrogen consumption observed and the presence of trace polystyrene distribution initiated with a butyl group might suggest that formation of a magnesium hydride composition is more completely achieved after alkylation of styrene by the residual butylmagnesium radical in the catalyst composition. This might suggest that a benzylmagnesium or benzyl magnesite reagent is more readily reduced by hydrogen than an aliphaticmagnesium or aliphatic magnesite reagent.

Upon completion of this series of $LOXMgH_2$ runs (Examples 28 and 29) the autoclave reactor was rinsed with standard drum grade (not anhydrous) cyclohexane, purged well with nitrogen and then opened for inspection. The heated reactor walls and the cold surfaces (i.e. cooling coils, agitator assembly, dip leg, monomer feed-line and thermowell) for covered in scaly white solids. A tap water rinse of the solids off the reactor surfaces produced a pH=11 rinsate. Analysis (ICP) indicated that the scaly solids were comprised of lithium and magnesium salts, 84.0 milligrams as LiOH (3.51 mmoles Li or 3.34% of total lithium) and 0.24 milligrams (0.004 mmole Mg or 0.02% of total magnesium) as $Mg(OH)_2$. Between the two runs 105.1 mmoles of lithium and 21.02 mmoles of magnesium had been charged, thus the solid residue represents only a small percentage of the lithium and essentially a trace of the magnesium charged.

Examples 30-32

The experimental details of Examples 30-32 (reaction conditions, reagent charges, and initial as well as final catalyst concentration), scale-up parameters (relative feeds and relative hourly feed rates) and results (polymer molecular weight distribution as determined by GPC and polymer yield) are presented in tabular form in Table VIII. Examples 30-32 entail the formation of other LOXLiH catalyst and processes where the complexing ligand is either lithium methoxyethoxide [MEOE$^-$]Li$^+$ or lithium 2-N,N-dimethylaminoethoxyethoxide [DMAEOE$^-$]Li$^+$. Example 30 demonstrates that a hydrocarbon soluble lithium hydride reagent or catalyst having the empirical formula of [MEOE$^-$]$_4$Li$_8$H$_4$.4TMEDA can be formed from 2-methoxyethanol [MEOEH], n-butyllithium in the presence of TMEDA under a hydrogen atmosphere. Example 30 also demonstrates that this catalyst system will initiate polymerization of styrene monomer, however the hydrogen mediated or chain transfer process is inefficient under the conditions of the Example producing only 0.86 moles of polymer chains per mole of complexed lithium hydride. This might imply that it is necessary to have an amine functional group present on the lithium alkoxide complexing agent of the catalyst, if the catalyst is to promote or facilitate the hydrogen chain transfer reaction involving the living poly(styryl) lithium species. It is to be noted that hydrocarbon soluble lithium hydride compositions having the empirical formula [MEOE$^-$]$_4$Li$_{12}$H$_8$ would have very high hydride content—

2.06 wt % hydride—for a hydrocarbon soluble form of LiH. Likewise a composition with empirical formula [MEOE⁻]₄Li₈H₄ would have a high hydride content—1.12 wt % hydride.

For Examples 31 and 32 2-N,N-dimethylaminoethoxyethanol [DMAEOEH] was used to form the hydride reagent or catalyst species. The reagent charge used in Example 31 was such that a catalyst having the empirical formula [DMAEOE⁻]₄Li₈H₄.4TMEDA would be formed. However it was clear from the outset based on little evidence of hydrogen uptake that little catalyst formed. It is surmised that the TMEDA facilitated the decomposition of the [DMAEOE⁻]Li⁺ species by n-butyllithium. Thus this catalyst under the conditions of the Example produced a very high molecular weight ($M_w$=183,233) polystyrene composition having a very broad and highly asymmetric distribution. It is surmised that the TMEDA facilitated the decomposition of the [DMAEOE⁻]Li⁺ species by n-butyllithium. The reagent charge used in Example 32 was such that a catalyst having the empirical formula [DMAEOE]₄Li₆H₂ free of TMEDA would be formed. Additionally the catalyst was initially formed at −5° C. Under the reaction conditions of Example 32 the desired catalyst formed and at least initially had activity comparable to that of catalysts formed from DMAEH, however the catalyst activity dropped precipitously during the styrene monomer feed resulting the formation of a high molecular weight tail as indicated by an $M_z$=139,795 with an asymmetry of 34.4. It is surmised that under the temperature conditions of the reaction decomposition of the catalyst resulted. The decomposition of [DMAEOE⁻]Li⁺ whether during catalyst formation or during the polymerization process is believed to entail metalation alpha to the dimethylamino function followed by elimination of a di-lithium alkoxide of ethylene glycol and formation of vinyl-dimethylamine (an enamine) as shown below. Thus this ligand and any other ligand susceptible to such possible degradation processes are less preferred to DMEAH for forming catalysts for hydrogen mediated saline hydride initiated polymerization processes involving a monometallic lithium catalyst.

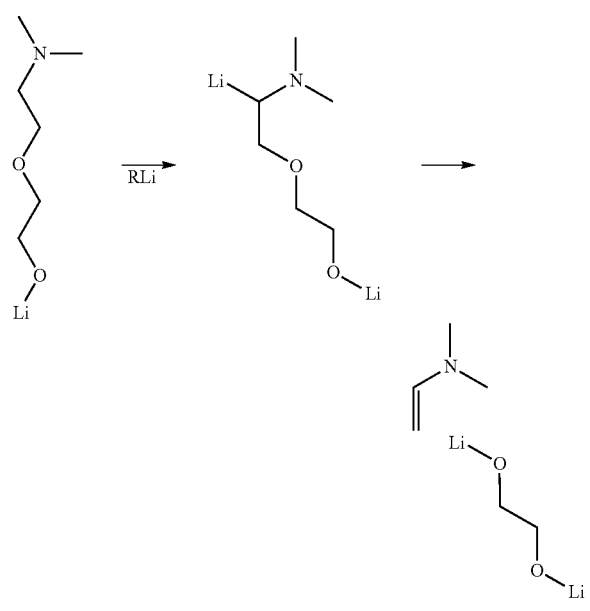

Example 30

Representative Pf LOXLiH [MEOE⁻]₄Li₈H₄.4TMEDA Catalyst Formed from 2-Methoxyethanol Anhydrous cyclohexane, 400 ml of 550 ml (428.5 g) was charged to the reactor at 20° C. under a dry hydrogen (0 PSIG $H_2$) atmosphere. To the stirred solvent (800 RPM, three pitched blade turbines with Configuration III above) was charged through the charge vessel via positive nitrogen pressure, a solution previously formed from 2.10 g (0.0276 mol.) 2-methoxymethanol, 15.0 g (0.14 mol) ethylbenzene and 3.35 g (0.029 mol) of TMEDA. The charge vessel and transfer line to the reactor was flushed with a 50 ml portion of anhydrous cyclohexane from the total amount above. Next, 28.77 ml (0.0575 mole) 2.0 M n-butyllithium in cyclohexane dissolved in 80 g (0.75 mole) was transferred through the charge vessel to the reactor over 15 minutes followed by two 50 ml aliquots of the anhydrous cyclohexane from the total amount above. During the organolithium charge agitation speed was increased to 1130 RPM and the reactor pressure decreased to −4 PSIG and the temperature increased to 22° C. indicating the consumption of $H_2$. The reactor head space was then purged and vented with 50 PSIG to 0 PSIG dry $H_2$ (through a subsurface feedline) three times (slowly venting to keep the contents from foaming out of the reactor) leaving the reactor at 35 PSIG. The reactor was then heated to 73° C. over 60 minutes with the heating process conducted with 81° C. oil flowing through the reactor jacket. Upon reaching 73° C. and 51 PSIG the styrene monomer feed was initiated, feeding 160.0 g (1.54 mol.) of styrene. The styrene was fed through a subsurface feed line (0.02" ID tip, 1.35 ft/s) against the hydrogen head pressure over a period of 35 minutes controlling the reaction temperature at 80° C. Within 10 minutes of initiation of the monomer feed the reactor temperature had only reached 78° C. and the pressure had increased to 52 PSIG. The valve to hydrogen regulator was kept closed and the pressure increased as the head space was compressed by the styrene monomer feed. After total of 35 minutes of feeding the hydrogen pressure had reached 55 PSIG.

At the end of the styrene feed, the monomer feed line to the reactor, including the alumina columns (basic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of deoxygenated water. During the transfer of the unquenched reaction mixture a 10 ml sample of the reaction mixture was obtained. The sample was colorless and transparent to light with no settled or suspended solids. The sample was quenched by the addition of a drop of methanol from a transfer pipet. The methanol quench immediately resulted in the formation and evolution of hydrogen gas.

The standard work-up and solvent strip from above except that the distillation was deemed complete when no more ethylbenzene could be taken over head with a nitrogen sparge of the headspace. The resulting resin was transferred through the bottom drain valve to a previously weighed metal tray lined with aluminum foil. The resin was then further stripped of ethylbenzene in a vacuum oven which was gradually heated from 100° C. to 165° C. with the vacuum gradually increased from 50.0 mmHg to 1.0 mmHg vacuum. Upon cooling the resulting brittle colorless resin was sampled and analyzed by GPC: $M_n$: 6179, $M_w$: 14,450, $M_z$: 22,964, PD: 1.578, $\sigma_n$=7192, $_n\alpha_3$=2.338.

Example 32

Representative pf LOXLiH [DMAEOE$^-$]$_4$Li$_6$H$_2$ Catalyst Formed from 2-N,N-Dimethylaminoethoxyethanol Anhydrous methylcyclohexane, 150 ml of 300 ml (231.0 g) was charged to the reactor at −5° C. under a dry hydrogen (0 PSIG H$_2$) atmosphere. To the stirred solvent (800 RPM, three pitched blade turbines with Configuration III above) was charged through the charge vessel via positive nitrogen pressure, a solution previously formed from 4.00 g (0.0300 mol.) 2-N,N-Dimethylaminoethoxyethanol and 16.0 g (0.14 mol) ethylbenzene. The charge vessel and transfer line to the reactor was flushed with a 50 ml portion of anhydrous methylcyclohexane from the total amount above. Next, 22.54 ml (0.0451 mole) 2.0 M n-butyllithium in cyclohexane dissolved in 120 g (1.13 mole) was transferred through the charge vessel to the reactor over 15 minutes followed by two 50 ml aliquots of the anhydrous methylcyclohexane from the total amount above. During the organolithium charge agitation speed was increased to 1130 RPM and the reactor pressure neither increased nor decreased. The reactor head space was then pressured to 50 PSIG with dry H$_2$ (through a subsurface feedline) and vented three times (slowly venting to keep the contents from foaming out of the reactor) leaving the reactor at 36 P SIG. The reactor was then heated to 73° C. over 60 minutes with the heating process conducted with 81° C. oil on the reactor jacket. Upon reaching 72° C. and 59 PSIG the styrene monomer feed was initiated, feeding 131.1 g (1.26 mol.) of styrene. The styrene was fed through a subsurface feed line (0.02" ID tip, 1.35 ft/s) against the hydrogen head pressure over a period of 29 minutes controlling the reaction temperature at 80° C. Within 10 minutes of initiation of the monomer feed the reactor temperature had reached 82° C. and the pressure had dropped to 52 PSIG. The hydrogen regulator was set to 36 PSIG. During the first 10-15 minutes of the styrene monomer feed the process appeared to run comparable to a catalyst system formed from DMEA. However it was quite apparent that by 20 minutes the uptake of hydrogen was quickly diminishing.

At the end of the styrene feed, the monomer feed line to the reactor, including the alumina columns (acidic alumina), were flushed with 50 ml of anhydrous ethylbenzene. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of deoxygenated water. During the transfer of the unquenched reaction mixture a 10 ml sample of the reaction mixture was obtained. The sample was colorless and transparent to light with no settled or suspended solids. The sample was quenched by the addition of a drop of methanol from a transfer pipet. The methanol quench immediately resulted in the formation and evolution of hydrogen gas.

The standard work-up and solvent strip from above except that the distillation was deemed complete when no more ethylbenzene could be taken over head with a nitrogen sparge of the headspace. The resulting resin was transferred through the bottom drain valve to a previously weighed metal tray lined with aluminum foil. The resin was then further stripped of ethylbenzene in a vacuum oven which was gradually heated from 100° C. to 165° C. with the vacuum gradually increased from 50.0 mmHg to 1.0 mmHg vacuum. Upon cooling the resulting brittle colorless resin was sampled and analyzed by GPC: $M_n$: 745, $M_w$: 23,605, $M_z$: 139,795, PD: 5.922, $\sigma_n$=4127, $_n\alpha_3$=34.431.

Examples 33-37

The experimental details of Examples 33-37 (reaction conditions, reagent charges, and initial as well as final catalyst concentration), scale-up parameters (relative feeds and relative hourly feed rates) and results (polymer molecular weight distribution as determined by GPC and polymer yield) are also presented in tabular form in Table VIII. These Examples (33-37) were by design conducted under a hydrocarbon atmosphere with little if any hydrogen present. The intent of these Examples is to demonstrate the following four points: (1) the LOXLiH catalyst of this invention initiate polymerization of a monomer such as styrene; (2) the resulting $M_n$ molecular weight of these Examples provide some experimental evidence for the actual composition of the LOXLiH catalyst aggregates formed; (3) demonstrate that the added promotor TMEDA does in fact play a role in defining catalyst activity; and (4) that hydrogen by its absence in these Examples, clearly and unequivocally has the amazing and surprising effect of mediating and perhaps even further activating the saline hydride initiated polymerization processes of this invention.

Thus Example 33 which utilized a catalyst having the empirical formula [DMEA$^-$]$_2$Li$_3$H in a LiH:styrene ratio of 1:31.9 ($M_n$ calc=3316) provided an saline hydride initiated polystyrene composition with $M_n$=6707 with a % Efficiency of 50%. Assuming no chain transfer from ethylbenzene, this would imply that only one in two LiH's are available in an aggregate to initiate polymerization and would indicate that the actual catalytic or initiating species has the chemical formula [DMEA$^-$]$_4$Li$_6$H$_2$. In comparison, Example 34 which employed the same catalyst system but had present 1 mole of TMEDA per mole of lithium metal, produced a saline hydride initiated polystyrene composition with $M_n$=5084. Thus this charge of TMEDA appears to increase the efficiency and perhaps the availability of hydride for a catalyst formed from 2 moles of DMEAH and 3 moles of n-butyllithium. In contrast to Examples 33 and 34, the catalyst system of Examples 35 and 36 has surprisingly completely different behavior. Accordingly Examples 35 and 36 utilized a catalyst having the empirical formula [DMEA$^-$]LiH (Example 35 w/o TMEDA and Example 36 w/TMEDA 0.5 mole TMEDA per mole total lithium). As is indicated in Table VIII, the % Efficiency of Example 35 and 36 were 35% and 26% respectively. Again assuming little to no participation of ethylbenzene as a chain transfer agent, this would indicate formation of catalysts having compositions with empirical or actual chemical formulae of [DMEA$^-$]$_3$Li$_6$H$_3$ and [DMEA$^-$]$_4$Li$_8$H$_4$.4TMEDA respectively, where in both cases only one hydride is available to add to styrene and form the polymer initiating species. It should be clear from the % Efficiency of the catalyst of Examples 33-36, ca. 50%, ca. 66.7%, ca. 33.3% and ca. 0.25% that the LOXLiH catalyst and by extension the LOXSH catalyst of this invention likely exist as relatively simple aggregates of defined stoichiometry depending upon the reagents used in their formation. Example 37 however might suggest the formation of much more complex yet well-defined super aggregates can be formed. Thus Example 37 which utilized a catalyst having the empirical formula [DMEA$^-$]Li$_3$H$_2$ in a LiH:styrene ratio of 1:18.6 (M$_n$ calc=1933) provided a saline hydride initiated polystyrene composition with M$_n$=17,972 with a % Efficiency of ≈11%. This would indicate that only one in nine LiH's were available to add to styrene and thus initiate polymerization. This might indicate a mixture of aggregates having the empirical formulae [DMEA$^-$]$_8$Li$_{16}$H$_8$ and [DMEA$^-$]$_6$Li$_{18}$H$_{12}$ in a ratio of 75:25 where one in eight and one in 12 LiH's were available to initiate polymerization. Thus, though we wish not to be bound by such theory as just presented regarding actual chemical formula of the LOXLiH catalyst, Examples 33-37 clearly demonstrate the four points (1)-(4) above. Example 37 is presented to be representative of Examples 33-37.

Example 37

Representative of LOXLiH [DMEA$^-$] Li$_3$H$_2$.2TMEDA Catalyst Under Hydrocarbon Atmosphere at 82° C.

Anhydrous cyclohexane, 450 ml of 650 ml (506.4 g) was charged to the reactor at 10° C. under a dry hydrogen (11 PSIG H$_2$) atmosphere. To the stirred solvent (800 RPM, three pitched blade turbines with Configuration III above) was charged through the charge vessel via positive nitrogen pressure, a solution previously formed from 3.02 g (0.0339 mol.) N,N-dimethylaminoethanol and 7.90 g (0.068 mol) of TMEDA dissolved in 50 ml of the total amount of anhydrous cyclohexane above. The charge vessel and transfer line to the reactor was flushed with a 50 ml portion of anhydrous cyclohexane from the total amount above. Next, 50.90 ml (0.1018 mole) 2.0 M n-butyllithium in cyclohexane dissolved in 65 g (0.61 mole) was transferred through the charge vessel to the reactor over 15 minutes followed by two 50 ml aliquots of the anhydrous cyclohexane from the total amount above. During the organolithium charge agitation speed was increased to 1130 RPM and the reactor pressure decreased to 5 PSIG and the temperature increased to 13° C. The reactor head space was then pressured to 50 PSIG with dry H$_2$ (through a subsurface feedline) and then vented to 0 PSIG, repeating for a total of three times (slowly venting to keep the contents from foaming out of the reactor) leaving the reactor at 46 PSIG. The reactor was then heated to 70° C. over 50 minutes with the heating process conducted with 85° C. oil flowing through the reactor jacket. Upon reaching 73° C. and 57 PSIG the hydrogen atmosphere was vented to a mineral oil bubbler (0 PSIG). Heating was continued until the reactor temperature reached 82° C. and the vent line began to warm from the condensing cyclohexane vapors thus purging remaining hydrogen and establishing a hydrocarbon atmosphere. The valve to the mineral oil bubbler was closed and the agitation was reduced to 794 RPM and styrene monomer feed was initiated, feeding 131.3 g (1.26 mol.) of styrene. The styrene was fed through a subsurface feed line (0.02" ID tip, 1.29 ft/s) against the hydrocarbon atmosphere over a period of 30 minutes controlling the reaction temperature at 82° C.

At the end of the styrene feed, the monomer feed line to the reactor, including the alumina columns (basic alumina), were flushed with 50 ml of anhydrous ethylbenzene. The reactor was pressured to 65 PSIG H$_2$ with the pressure dropping to 60 PSIG upon increasing the agitation to 1130 RPM. The thus hydrogen quenched anionic polymerization reaction mixture was transferred with positive H$_2$ pressure to the wash vessel previously heated (N$_2$ atmosphere) and previously charged with 300 ml of deoxygenated water. During the transfer of the unquenched hydride reaction mixture a 10 ml sample of the reaction mixture was obtained. The sample was faintly pink in color and transparent to light with no settled or suspended solids. Shaking the sample with the air entrapped in the sample vial quenched the faint pink color. The sample was quenched by the addition of a drop of methanol from a transfer pipet. The methanol quench immediately resulted in the formation and evolution of hydrogen gas.

The standard work-up and solvent strip from above except that the distillation was deemed complete when no more ethylbenzene could be taken over head with a nitrogen sparge of the headspace. The resulting resin (154 g) was transferred through the bottom drain valve to a previously weighed metal tray lined with aluminum foil. The resin was then further stripped of ethylbenzene in a vacuum oven which was gradually heated from 100° C. to 165° C. with the vacuum gradually increased from 50.0 mmHg to 1.0 mmHg vacuum. Upon cooling the resulting brittle colorless resin (128 g) was sampled and analyzed by GPC: M$_n$: 17,972, M$_w$: 37,183, M$_z$: 49,015, PD: 1.318, $\sigma_n$=18,581, $_n\alpha_3$=1.299.

Examples 38-40

Examples 38-40 are examples of hydrogen mediated saline hydride initiated polymerization processes involving styrene monomer and other forms of saline hydride as catalyst. The super active saline hydride (SASH) catalyst of Example 38 was prepared from butyllithium and t-butyl alcohol in the presence of TMEDA. This catalyst is sparingly soluble at best and consequently produced HMSHIP distributions high in molecular weight. The SASH catalyst of Example 39 was prepared from potassium t-butoxide in addition to butyllithium in the presence of TMEDA. This catalyst was highly effective in forming low molecular weight HMSHIP distributions however this SASH catalyst process formed undesired quaternary "tail to head to tail" linkages in the polymer microstructure (Like all other potassium based anionic chain transfer polymerization reactions). Example 40 utilized a highly active saline hydride (HASH) catalyst formed by feeding styrene monomer to sodium potassium alloy dispersion in THF under a hydrogen atmosphere. The HASH catalyst was relatively inefficient based on the gram-atoms of sodium and potassium required to produce the obtained molecular weight distribution. Furthermore the HASH catalyst not surprisingly provided a complex mélange of polymer distributions of different microstructures especially fragmentation oligomers.

Example 38

Super Active Lithium Hydride Catalyst Process Producing High Molecular Weight Polystyrene Distribution Composition Anhydrous ethylbenzene 300 g, was charged to the reactor at 20° C. under a hydrogen atmosphere (0 PSIG). To the stirred solvent (800 RPM, twin pitch blade impellers, blade placement Configuration III) was charged through the charge vessel a solution previously formed from 3.62 g (0.0489 mol.) of tert-butyl alcohol, 69.9 g (0.66 mol.) of ethylbenzene, and 23.50 g (0.202 mol.) of TMEDA. The charge vessel and transfer line to the reactor was flushed with a 50 g portion of ethylbenzene. Agitation was increased to 1130 RPM and then 54.10 ml (0.11 mole) of 2.0 M n-butyllithium dissolved in 100 g of ethylbenzene was transferred slowly through the charge vessel to the reactor. The reactor temperature rose 5° C. to 25° C. and the pressure increased to 2 PSIG then dropped to −4 PSIG drawing the butyllithium solution and a subsequent 50 g rinse aliquot of ethylbenzene into the reactor. The reactor containing a total of 570 g (5.4 mol.) of ethylbenzene was heated to 90° C. Trace $N_2$ introduced during the catalyst component charge was purged by pressuring to 50 PSIG with dry $H_2$ (through the headspace) and venting three times (slowly venting to keep the contents from foaming out of the reactor). The $H_2$ regulator was set initially to 21 PSIG. Styrene, 462.2 g (4.44 mol.), was fed through a subsurface feed line (0.02" ID tip, 1.2 ft/s) against the hydrogen head pressure over a period of 116 minutes controlling the temperature at 90° C. and gradually increasing the hydrogen pressure to 41 PSIG. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils. During the course of the run the valve to the hydrogen regulator was periodically closed to verify uptake of hydrogen during the styrene feed. The reaction did take up hydrogen albeit very slowly.

The unquenched content of the reaction mixture was transferred to the wash vessel ($N_2$ atmosphere) previously charged with 300 ml of deoxygenated water heated to 65° C. and then washed with deoxygenated water (3×300 ml). This reaction mixture was then properly discarded upon separation of the aqueous quench. During the course of the transfer of the unquenched reaction mixture, a 10 ml aliquot of the unquenched reaction mixture was obtained. This colorless sample was full of uniformly suspended extremely finely divided solids. The sample was quenched with methanol resulting in the immediate production and evolution of hydrogen gas from the viscous mixture. GPC analyses of the sample using standard higher molecular weight columns and polystyrene standards was as follows: GPC MWD of $M_n$: 1030, $M_w$: 5635, $M_z$: 10,066 PD: 5.47, $\sigma_n$=2178, $_n\alpha_3$=4.13.

Example 39

Representative of 80% Monomer Feed Volume for SASH Catalyst Runs in Ethylbenzene at Moderate Temperatures 70° C. w/Oligomer Microstructure Analysis Anhydrous ethylbenzene 200 g of 300 g (2.83 mole), was charged to the reactor at 20° C. under a dry nitrogen atmosphere. To the stirred solvent (800 RPM, twin pitch blade impellers, blade placement Configuration I) was charged through the charge vessel a solution previously formed from 4.57 g (0.0407 mol.) potassium t-butoxide, 44 g (0.41 mol.) ethylbenzene and 20.83 g (0.179 mol.) TMEDA. The charge vessel and transfer line to the reactor was flushed with a 50 g portion of ethylbenzene of the 300 g above. Next 20.34 ml (0.0407 mole) 2.0 M n-butyllithium was transferred through the charge vessel to the reactor followed by a 50 g aliquot of ethylbenzene from above. The reactor was heated to 65° C. Agitation was then increased to 1130 RPM and the reactor purged of $N_2$ by pressuring to 65 PSIG with dry $H_2$ (through the headspace) and venting three times (slowly venting to keep the contents from foaming out of the reactor). The $H_2$ regulator was set to 11 PSIG and 800 g (7.68 mol.) styrene was fed through a subsurface feed line (0.01" ID tip, 5.2 ft/s) against the hydrogen head pressure over a period of 183 minutes controlling the temperature at 70° C. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils.

The unquenched polymerization reaction mixture was transferred with positive $H_2$ pressure to the wash vessel previously heated ($N_2$ atmosphere) and previously charged with 300 ml of deoxygenated water along with 500 ml of recovered cyclohexane distilled from previous runs. During the transfer of the unquenched reaction mixture a 10 ml sample of the reaction mixture was obtained for analysis. The sample was red in color and transparent to light giving it an appearance similar to the color of a living APS process sample. The sample's appearance was completely unlike the characteristic dark black-red (black cherry) color of samples anionic chain transfer polymerization conducted in the absence of a hydrogen atmosphere. Such samples of SASH catalyst where the catalyst components are combined under $N_2$ before forming the hydride generally can contain large (mm size) catalyst particles. The sample is quenched by the addition of a drop of methanol which immediately quenches the red color and results in the immediate formation and evolution of hydrogen gas. GPC Analysis of the crude quenched reaction mixture was as follows: $M_n$: 367, $M_w$: 497, $M_z$: 695, PD: 1.35, $\sigma_n$=218, $_n\alpha_3$=2.38.

The standard work-up and strip procedure from above provided 1303 g of solution. Wiped film evaporation (WFE, 2" glass Pope Still, operated at 50.0 mmHg vacuum, 140° C., 60% of full wiper speed, feeding at 1.0 liters/hr) produced 827.9 g of a SASH PS distribution having GPC MWD of $M_n$: 376, $M_w$: 508, $M_z$: 707, PD: 1.35, $\sigma_n$=223, $_n\alpha_3$=3.34. A second WFE operation (0.1-0.3 mmHg vacuum, 172.5° C., 60% of full wiper speed, feeding at 1.0 liters/hr) provided 608.7 of a SASH PS distribution having 0.99 GPC area % styrene dimer content and a GPC MWD of $M_n$: 486, $M_w$: 593, $M_z$: 750, PD: 1.22, $\sigma_n$=228, $_n\alpha_3$=2.15. A third WFE operation was performed to obtain the low molecular weight oligomers in order to determine the SASH PS distribution microstructure. Thus a 180.2 g sample of the 608.7 g product distribution recovered from the $2^{nd}$ WFE operation was stripped of oligomers 0.1 mmHg vacuum, 199.5° C., wiper speed 85% of full rate, feeding at 2.0 g/min.). This third WFE operation produced 33.17 g of a styrene oligomer mixture having GPC MWD: of $M_n$: 332, $M_w$: 348, $M_z$: 363, PD: 1.048. GC analysis indicated that 93.49% of the chains had the desired "head to tail" microstructure, with only a 0.11% of the chains having the fragmented ($FW_f$-14) microstructure (See FIG. 7). The gas chromatogram in FIG. 7 demonstrates the oligomer microstructure purity: 93.49% "Head to Tail" Microstructure; 6.4% of oligomers w/one quaternary "tail to head to tail" linkage; and 0.11% fragmentation oligomers Example 40

Highly Active Saline Hydride Catalyst Hydrogen Mediated Styrene Polymerization w/Oligomer Microstructure Analysis The anionic chain transfer process was conducted in the modified 2-liter autoclave reactor described in U.S. Pat. Nos.

5,777,162 and 5,866,720. Anhydrous tetrahydrofuran 818 g and 6.2 g (0.183 g-atoms alkali metal) of sodium potassium alloy (NaK$_2$) were charged to the reactor at 20° C. under a dry nitrogen atmosphere. The unstirred reaction mixture was purged of nitrogen with hydrogen (3λ70 PSIG) and the pressurized to 70 PSIG H$_2$. High speed high sheer mixing (1900 RPM) applied and styrene, 208.0 g (2.00 mole), was fed over 73 minutes (3.15 ml/min) to the reaction mixture. During the styrene monomer feed the reactor pressure was maintained between 70 and 60 PSIG H$_2$. Upon completion of the feed the reactor was vented of H$_2$ and the reaction mixture was carefully quenched with isopropyl alcohol. A sample of the quenched reaction mixture was analyzed by GPC and had the following MWD: M$_n$: 591, M$_w$: 943, M$_z$: 1438, PD: 1.60, σ$_n$=456, $_n$α$_3$=2.38. The reaction mass is transferred to a creased wash reactor containing ethylbenzene water washed and stripped of THE. Further stripping on a wiped film evaporator WFE (2" glass Pope Still, graphite blades, operated at 300.0 mmHg vacuum, 140° C., 60% of full wiper speed feeding at 1.0 liter/hr rate) produced 191 g of a polystyrene resin having GPC MWD: M$_n$: 603, M$_w$: 956, M$_z$: 1373, PD: 1.58, σ$_n$=461, $_n$α$_3$=1.906. A 164 g sample of the 191 g from above was subjected to a second WFE operation (at 0.4 mmHg vacuum, 230° C., 60% of full wiper speed feeding at 1.0 liter/hr rate) yielding 153.6 g of a resin having GPC MWD: M$_n$: 802, M$_w$: 1081, M$_z$: 1418, PD: 1.35, σ$_n$=473, $_n$α$_3$=1.645. The second WFE operation provided 18.2 g of complex mixture of dimers, trimers, tetramers, pentamers and hexamers. GC analysis demonstrates that this complex mixture arises from reaction pathways that include head to tail polymerization, chain isomerization and chain fragmentation polymerization (see FIG. 5). Gas chromatogram shown in FIG. 5 includes demonstrates this complex mixture of microstructures which includes the desired "head to tail" linkages as well as undesired quaternary carbon linkages, fragmentation polymerization (FW$_i$-14) and (FW$_L$+14) oligomers as well as even "tail to tail" styrene oligomers arising from radical coupling reactions.

Upon completion of preparation of the dimer stripped LOXLiH and LOXMgH$_2$ hydrogen mediated saline hydride initiate polymerization product distributions. Eleven of these compositions were brominated according to the process technology of PCT Pub. No.: WO2010/127091 (U.S. Pat. No. 8,802,787 B2) to form brominated anionic chain transfer vinylaromatic polymers (Br-ACTVAP). The average and standard deviation of the physical properties of these brominated polymers are listed below as well as the properties of the Br-ACTVAP formed by combining and then stripping the product distribution of Examples 14-15, that dimer stripped composition having M$_w$=731 and PD$_n$=1.38. The compositions were further tested as polymeric flame retardants in high impact polystyrene (HIPS) and were found to provide flame retarded (UL 94 VO at ⅛" and ¹/₁₆") HIPS formulations with excellent overall properties including color (YI), Izod Impact, heat distortion temperature and VICAT softening temperature.

| Br-ACTVAP Property | Example 14 + 15 | Average All | Standard Dev. |
|---|---|---|---|
| % Br (NMR) | 73.0 | 73.7 | 0.3 |
| T$_g$ (° C.) | 112.5 | 118.9 | 4.2 |
| Thermally Labile Bromine (ppm) at 300° C. 15 minutes | 75 | 90.5 | 19.6 |
| Color Solution | | | |
| L | 99.5 | 99.2 | 0.2 |
| a | −1.39 | −1.8 | 0.3 |
| Br-ACTVAP Property | Example 14 + 15 | Average All | Standard Dev. |
| b | 3.68 | 5.1 | 1.0 |
| Delta E | 3.97 | 5.5 | 1.0 |
| COLOR Solids | | | |
| L | 96.41 | 95.0 | 2.3 |
| a | −0.64 | −0.8 | 0.1 |
| b | 2.94 | 3.6 | 0.4 |
| Yellowness Index | 4.97 | 6.2 | 0.6 |
| Thermal Color (250° C. 15 min.) Delta E | 10.03 | 13.8 | 1.8 |
| TGA under Nitrogen | | | |
| 1% Wt. Loss (° C.) | 314.90 | 313.7 | 13.7 |
| 5% Wt. Loss (° C.) | 356.56 | 356.7 | 10.2 |
| 10% Wt. Loss (° C.) | 370.82 | 370.7 | 7.7 |
| 50% Wt. Loss (° C.) | 407.94 | 404.7 | 5.6 |
| 90% Wt. Loss (° C.) | 437.11 | 454.1 | 14.6 |
| GPC (UV Detector) | | | |
| M$_n$ | 1996 | 1949.7 | 119.0 |
| M$_w$ | 2565 | 2519.4 | 196.2 |
| PD$_n$ | 1.285 | 1.3 | 0.0 |
| σ$_n$ | 1066 | 1052.5 | 107.3 |

In that the catalyst composition of Examples 14 and 15 were comprised of [DMEA$^-$]Li$_3$H$_2$.1.0 TMEDA, and this composition provided excellent over all properties once brominated, further development of this particular LOXLiH catalyst and the resulting hydrogen mediated anionic polystyrene (HMAPS) was deemed warranted.

Examples 41-42

Examples 41-42 further demonstrate experiments designed to further elucidate the complex stoichiometry of the [DMEA$^-$]$_x$Li$_y$H$_z$. These Examples were run under identical conditions except for the charge ratio of the DMEAH:n-butyllithium. The numerical details of these two Examples are presented in Table IX. The experimental details are presented below.

Example 41

Representative of [DMEA$^-$]Li$_3$H$_2$ Catalyst Under Hydrocarbon Atmosphere at 77-79° C.

Anhydrous cyclohexane, 220 ml of a total of 500 ml (385.3 g) was charged to the reactor at 37.6° C. under a dry hydrogen (20 PSIG H$_2$) atmosphere. To the stirred solvent (600 RPM, four pitched blade turbines with Configuration IV above) was charged through the charge vessel via positive nitrogen pressure, a solution previously formed from 5.18 g (0.0581 mol.) N,N-dimethylaminoethanol dissolved in 20 ml of the total amount of anhydrous cyclohexane above. The charge vessel and transfer line to the reactor was flushed with a 50 ml portion of anhydrous cyclohexane from the total amount above. Next, 44.95 ml (0.0899 mole) 2.0 M n-butyllithium in cyclohexane dissolved in 120 ml cyclohexane of the 500 ml total above was transferred through the charge vessel to the reactor over 20 minutes followed by a 50 ml aliquot of the anhydrous cyclohexane from the total amount above. During the organolithium charge agitation speed was maintained at 600 RPM and the reactor pressure decreased to 18 PSIG after having raised to 24 PSIG and the temperature increased to 39.9° C. The reactor head space was then pressured to 53 PSIG with dry H$_2$ (through a subsurface feedline), agitation was increased to 1000 RPMs and the catalyst solution heated over a period of 30 minutes to 69.9° C. During the course of the heating process the $H_2$ pressure reached 64 PSIG. The reactor was further pressured to 76 PSIG and left to stir for 2.5 hours before venting to 0 PSIG at 73.2° C. The reactor was then heated to 92° C. over 30 minutes with the heating process conducted with 115° C. oil flowing through the reactor jacket. Upon reaching 92° C. and 8 PSIG the hydrogen atmosphere was vented to a mineral oil bubbler to 4 PSIG when cyclohexane vapors began to condense in the overhead establishing a hydrocarbon atmosphere. The valve to the mineral oil bubbler was closed and the agitation was reduced increased to 1100 RPM and the reactor was cooled to 76.9° C. and −2 PSIG pressure. Styrene monomer 98.0 g (0.94 mol.) was combined with 90 g of cyclohexane. The styrene/cyclohexane feed was fed through a subsurface feed line (0.02" ID tip) against the hydrocarbon atmosphere over a period of 60 minutes (5.0 ml/min.) controlling the reaction temperature at the reaction temperature never rising above 79.4° C. (80-85° C.) oil on the jacket.

At the end of the styrene feed, the monomer feed line to the reactor, including the alumina columns (basic alumina), were flushed with 50 ml of anhydrous cyclohexane. The reactor was pressured to 65 PSIG $H_2$. The hydrogen quenched anionic polymerization reaction mixture was transferred with positive $H_2$ pressure to the wash vessel previously heated ($N_2$ atmosphere) and previously charged with 300 ml of deoxygenated water. During the transfer of the unquenched hydride reaction mixture a 10 ml sample of the reaction mixture was obtained. The sample was faintly pink in color and transparent to light with no settled or suspended solids. Shaking the sample with the air entrapped in the sample vial quenched the faint pink color. The standard work-up and solvent strip from above except that the distillation was deemed complete when no more ethylbenzene could be taken over head with a nitrogen sparge of the headspace. The resulting resin (90 g) was transferred through the bottom drain valve (with great difficulty and the aid of a high temperature air gun) to a previously weighed metal tray lined with aluminum foil. Analysis of the cooled resin by GPC provided the following: $M_n$: 13,845, $M_w$: 38,933, $M_z$: 65,777, PD: 2.812, $\sigma_n$=18,637, $_n\alpha_3$=2.84.

Examples 42-51

Examples 42 through 51 demonstrate the improved yield generally brought on by reduced formation of the co-product ethylbenzene and styrene dimer (increased $M_n$) resulting from faster relative feed rates and slightly reduced hydrogen pressure when using TMEDA as a promotor at a catalyst concentration that varies over the course of the feed from about 275±50 ppm LiH down to about 80±20 ppm LiH. The detail and results for these Examples is presented in Table X. In the course of running this set of Examples it was found that the presence of TMEDA during catalyst formation can have a deactivating affect. Thus for Example 42-47 TMEDA was charged to the reactor only after combining the DMEAH and n-butyllithium under a hydrogen atmosphere wherein the reactor would have contained some amount of a heal from the previous run (except for Example 42 where the reactor had be previously cleaned). Thus for Examples 42-47 $M_n$ generally increases with increased feed rate and decreased $H_2$ pressure. Example 48 however, $M_n$ dropped to 457 Daltons with the increased feed rate and decreased $H_2$ (9 PSIG) pressure employed. A period of time greater than 2 weeks had past been running Example 47 and 48 and thus during this time any reaction mixture—which would contain TMEDA—left on the surfaces of the reactor had flowed to the bottom of the reactor. Additionally because the reactor had been left for such an extended period a 500 ml flush of anhydrous cyclohexane was used to purge any remnant of Example 47 before forming the catalyst for Example 48. Thus on Example 49 TMEDA was charged to the reactor before charging n-butyllithium and as a consequence this Example produced a HMAPS distribution having an $M_n$=540 despite using an increased $H_2$ (11 PSIG) pressure. Thus on the subsequent two runs Examples 50 and 51, the catalyst component charges were made to a well rinsed reactor. It is surmised that TMEDA promotes the formation of super active yet insoluble lithium hydride which would be formed directly from n-butyllithium, TMEDA and hydrogen without the intermediary DMEAH which provides the hydrocarbon soluble form of LiH. Thus Examples 50 and 51 together is representative of the Examples of Table X and are deemed as representative of the preferred process of the Examples of that Table.

Examples 50 and 51

Representative of Full Scale Monomer Feed Volume for [DMEA$^-$]$_4$Li$_6$H$_2$.2TMEDA Catalyst at 80° C.

Anhydrous cyclohexane, 150 ml of 300 ml (233.7 g) was charged to the well rinsed reactor at 37° C. under a dry hydrogen (16 PSIG $H_2$) atmosphere. To the stirred solvent (800 RPM, four pitched blade turbines with Configuration IV above) was charged through the charge vessel via positive nitrogen pressure, a solution previously formed from 2.53 g (0.0284 mol.) N,N-dimethylethanolamine, 20 g of a total of 170.0 g (1.60 mol) ethylbenzene and 50 ml of the 300 ml above. Next, 21.25 ml (0.0425 mole) 2.0 M n-butyllithium dissolved in 120 g anhydrous ethylbenzene (from the 170 g above) and another 50 ml aliquots of the anhydrous cyclohexane from the total amount above were combined in the charge vessel and then pressure transferred over a period of 15 minutes to the stirred (800 RPM) reaction mixture under hydrogen. At the end of the organolithium charge agitation speed was increased to 1130 RPM and the reactor pressure decreased from a peak pressure of 19 PSIG to an ending pressure of 14 PSIG. During the course of the catalyst formation the temperature increased 2-3° C. Finally, 3.40 g (0.0293 mol) of TMEDA dissolved in 30 g anhydrous ethylbenzene was combined with the last 50 ml aliquot of anhydrous cyclohexane and pressure transferred to the stirred reaction mixture. The reactor head space was vented to 0 PSIG and then pressured to 45 PSIG with dry $H_2$ (through a subsurface feedline). The reactor was then heated to 73.2° C. with the pressuring building to 63 PSIG. The heating was conducted with 80° C. oil flowing through the reactor jacket. Upon reaching a reaction temperature of 73° C. the styrene monomer feed was initiated, feeding 1058.7 g (10.17 mol.) of styrene. The styrene was fed through a subsurface feed line (0.02" ID tip) against the hydrogen head pressure of 11 PSIG over a period of 116 minutes attempting to control the reaction temperature at 80° C. Within 10 minutes of initiation of the monomer feed the reactor temperature reached 82.8° C. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole $H_2$ per mole of styrene feed appeared constant or near constant.

At the end of the styrene feed, the monomer feed line to the reactor, including the alumina columns (basic alumina), were flushed with 50 ml of anhydrous cyclohexane. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of 5 wt % aqueous $H_2SO_4$. Thus the reaction mixture was quenched with care in the wash reactor. The charge vessel and the reactor were then rinsed with 300 ml of anhydrous cyclohexane and the rinse solution transferred to the wash reactor and combined with the crude quenched reaction mixture.

The above process was repeated as Example 51 with the identical charges and conditions to within minor run to run variations in measuring out the reagents and reproducing the conditions except that 10 PSIG $H_2$ was employed. Despite the near 10% reduction in $H_2$ activity, hydrogen uptake was still faster for Example 51 vs. Example 50.

During the transfer of the unquenched reaction mixtures (Examples 50 and 51) 10 ml samples of the individual reaction mixtures were obtained for analyses. The samples were slightly pink to water white—i.e. essentially colorless and transparent to light—with no settled or suspended solids. Any color was quenched by gently shaking/swirling or otherwise contacting the mixtures with air. The samples were submitted for GPC analysis without quenching the crude reaction mixtures. The GPC analysis excluding ethylbenzene but including the dimer content was as follows: Example 50 $M_n$: 525, $M_w$: 804, $M_z$: 1165, PD: 1.449, $\sigma_n$=383, $_n\alpha_3$=2.075 and $M_w$ 10% High=2048; Example 51 $M_n$: 506, $M_w$: 758, $M_z$: 1080, PD: 1.425, $\sigma_n$=357, $_n\alpha_3$=2.001; and $M_w$ 10% High=1844.

The standard work-up from above provided 2613 g of solution. Wiped film evaporation (WFE, 2" glass Pope Still, operated at 50.0 mmHg vacuum, 140° C., wiper speed 60% of full rate, feeding at 1.0 liters/hr) produced 1997.5 g HMAPS distribution having GPC MWD including dimer of $M_n$: 519, $M_w$: 783, $M_z$: 1122, PD: 1.452, $\sigma_n$=370, $_n\alpha_3$=2.0274: and $M_w$ 10% High=1922. A second WFE operation (0.1-0.3 mmHg vacuum, 172.5° C., wiper speed 60% of full rate, feeding at 1.0 liters/hr) provided 1800.0 g of a HMAPS distribution having 2.38 GPC area % styrene dimer content and a GPC MWD of $M_n$: 601, $M_w$: 836, $M_z$: 1142, PD: 1.391, $\sigma_n$=326, $_n\alpha_3$=1.923; and $M_w$ 10% High=1955.

Examples 52-59

Examples 52 through 59 demonstrate the HMAPS process can be run without the benefit of an added aromatic solvent including ethylbenzene. These Examples well demonstrate that the HMAPS process is very robust in that it reproducibly produces near identical HMAPS distributions under a variety of process conditions. Examples 56-59 demonstrate that any process benefit provided by the use of the promoter TMEDA, can be offset with increased hydrogen pressure thereby reducing and even eliminating the use of a promotor. This set of high yield Examples (polymer yield from about 96 to about 97% yield; and a yield of dimer stripped polymer from about 86% to about 87%) produced HMAPS distributions with asymmetry values in the range of about 1.67 to 2.00 and dimer stripped HMAPPS distributions with asymmetry values in the range of about 1.63 to 1.82. Examples 58 and 59 are deemed representative of the Examples in conducting these two Examples it was inadvertently discovered that catalyst aging provided a more active and preferred catalyst.

Examples 58 and 59

Representative of Full Scale Monomer Feed Volume for [DMEA$^-$]$_4$Li$_6$H$_2$ Catalyst at 80° C.

Anhydrous cyclohexane, 200 ml of 500 ml (389.5 g) was charged to the well rinsed reactor at 37° C. under a dry hydrogen (16 PSIG $H_2$) atmosphere. To the stirred solvent (800 RPM, four pitched blade turbines with Configuration IV above) was charged through the charge vessel via positive nitrogen pressure, a solution previously formed from 2.55 g (0.0285 mol.) N,N-dimethylethanolamine, 70 ml of a total of 500 ml of cyclohexane of the 500 ml above. Next, 21.47 ml (0.0429 mole) 2.0 M n-butyllithium further dissolved in 170 ml the anhydrous cyclohexane from the 500 ml sbove were transferred to the charge vessel and then pressure transferred over a period of 15 minutes to the stirred (800 RPM) reaction mixture under hydrogen. At the end of the organolithium charge agitation speed was increased to 1130 RPM and the reactor pressure decreased from a peak pressure of 19 PSIG to an ending pressure returning to 16 PSIG. During the course of the catalyst formation the temperature increased 2-3° C. The reactor head space was vented to 0 PSIG and then pressured to 45 PSIG with dry $H_2$ (through a subsurface feedline). The reactor was then heated to 73.2° C. with the pressuring building to 63 PSIG. The heating was conducted with 80° C. oil flowing through the reactor jacket. Upon reaching a reaction temperature of 73° C. the styrene monomer feed was initiated, feeding 1061.0 g (10.19 mol.) of styrene. The styrene was fed through a subsurface feed line (0.02" ID tip) against the hydrogen head pressure of 15-17 PSIG over a period of 117 minutes controlling the reaction temperature at 80° C. Within 10 minutes of initiation of the monomer feed the reactor temperature reached 81.7° C. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole $H_2$ per mole of styrene feed appeared constant or near constant.

At the end of the styrene feed, the monomer feed line to the reactor, including the alumina columns (basic alumina), were flushed with 50 ml of anhydrous cyclohexane. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of 5 wt % aqueous $H_2SO_4$ and ≈250 g of ethylbenzene recovered from the wiped film evaporator from the solvent strip of a previous runs. Thus the reaction mixture was quenched with care in the wash reactor. The charge vessel and the reactor were then rinsed with 200 ml of anhydrous cyclohexane and the rinse solution transferred to the wash reactor and combined with the crude quenched reaction mixture.

The above process was repeated as Example 59 with the identical charges and conditions to within minor run to run variations in measuring out the reagents with the exception that the catalyst was allowed to age for 3 hours consequently the $H_2$ was adjusted down to 14 PSIG in order to match the uptake of Example 58. It is clear however that the HMAPS distributions produced were near identical except that Example 59 had a lower asymmetry than Example 58; asymmetry of 1.826 vs. 1.928 respectively.

During the transfer of the unquenched reaction mixtures (Examples 58 and 59) 10 ml samples of the individual reaction mixtures were obtained for analyses. The samples were slightly pink to water white—i.e. essentially colorless and transparent to light—with no settled or suspended solids. Any color was quenched by gently shaking/swirling or otherwise contacting the mixtures with air. The samples were submitted for GPC analysis without quenching the crude reaction mixtures. The GPC analysis excluding ethylbenzene but including the dimer content was as follows: Example 58 $M_n$: 570, $M_w$: 890, $M_z$: 1276, PD: 1.434, $\sigma_n$=427, $_n\alpha_3$=1.928 and $M_w$ 10% High=2168; Example 59 $M_n$: 584, $M_w$: 909, $M_z$: 1286, PD: 1.415, $\sigma_n$=436, $_n\alpha_3$=1.826; and $M_w$ 10% High=2166.

The standard work-up from above provided 2487 g of solution. Wiped film evaporation (WFE, 2" glass Pope Still, operated at 50.0 mmHg vacuum, 140° C., wiper speed 60% of full rate, feeding at 1.0 liters/hr) produced 2094.3 g (2052 g when adjusted for dime content of recycle ethylbenzene from the WFE in the wash) HMAPS distribution having GPC MWD excluding dimer of $M_n$: 690, $M_w$: 970, $M_z$: 1328, PD: 1.406, $\sigma_n$=440, $_n\alpha_3$=1.889: and $M_w$ 10% High=2263. The total distribution including dimer formed during the reaction when statistically corrected is estimated as follows: $M_n$: 612, $M_w$: 919.18, $M_z$: 1294, PD: 1.406, $\sigma_n$=434, $_n\alpha_3$=1.8791. A second WFE operation (0.1-0.3 mmHg vacuum, 160° C., wiper speed 65% of full rate, feeding at 1.0 liters/hr) provided 1825.7 g of a HMAPS distribution having 0.48 GPC area % styrene dimer content and a GPC MWD of $M_n$: 704, $M_w$: 984, $M_z$: 1334, PD: 1.398, $\sigma_n$=444, $_n\alpha_3$=1.815; and $M_w$ 10% High=2268.

Figure 16:
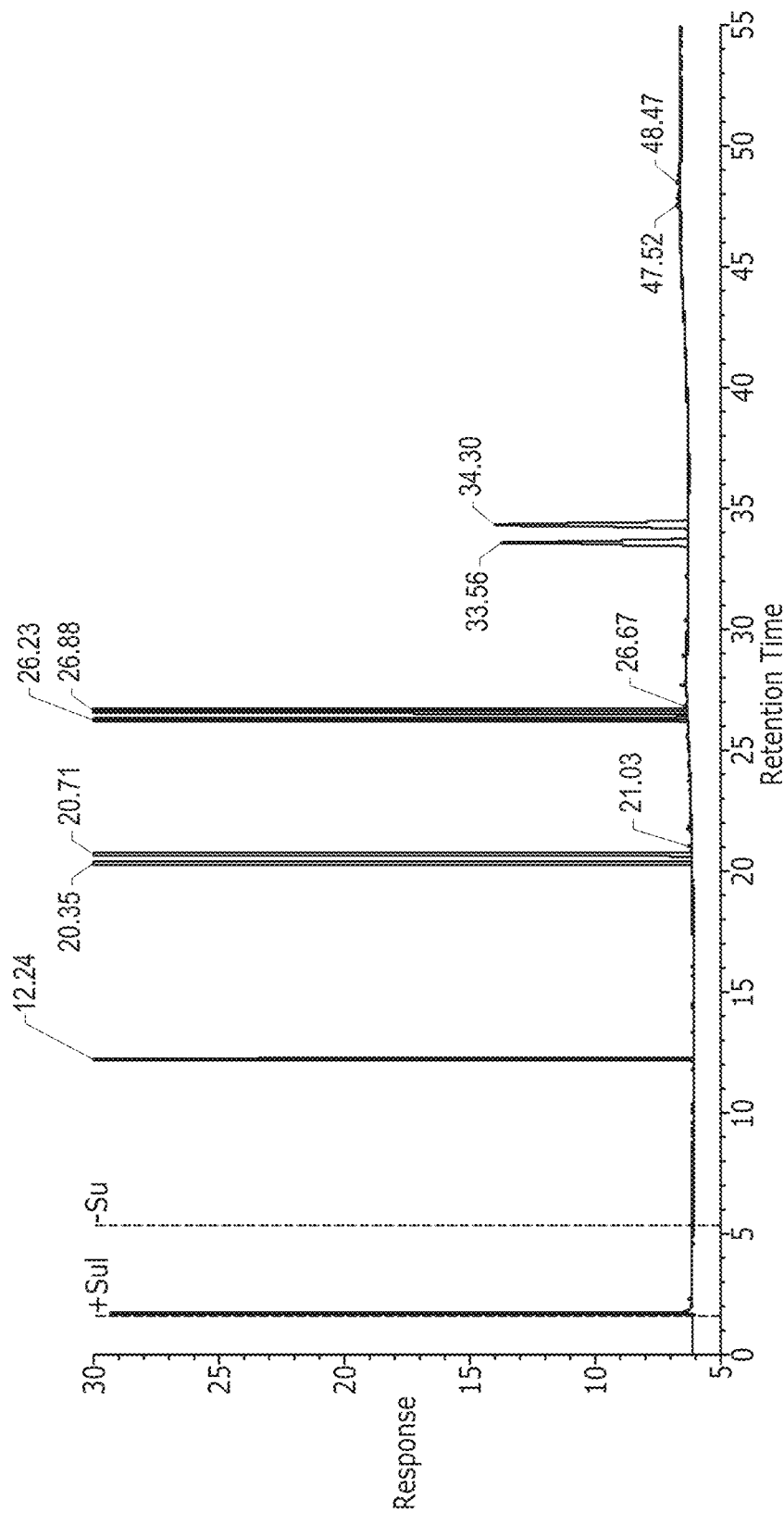
FIG. 16 is a gas chromatogram of styrene oligomers obtained from a polystyrene composition of this invention formed from another LOXLiH catalyst $[DMEA^-]_xLi_yH_z$ (wherein x:y:z is about 3:2:1) of this invention (Examples 58 and 59) employing a Hydrogen Mediated Anionic Styrene Polymerization (HMAPS) process of this invention conducted at about 80° C. demonstrating 99.97% Head to Tail microstructure.

A third WFE operation was performed to obtain the low molecular weight oligomers in order to determine the HMAPS PS distribution microstructure. Thus a 125 g sample of the 1825 g product distribution recovered from the $2^{nd}$ WFE operation was stripped of oligomers (0.13 mmHg vacuum, 199.5° C., wiper speed 85% of full rate, feeding at 2.0 g/min.). This third WFE operation produced 22 g of a styrene oligomer GC analysis of which indicated that 99.97% of the chains had the desired "head to tail" microstructure, with only a trace if any of chains having assumed to be ($FW_i$-2) microstructure wherein lithium hydride elimination had occurred producing an unsaturated chain end (See FIG. 16). A spiking experiment of authentic ($FW_i$-14) material clearly proved the composition to be free of this microstructure.

Examples 60-67

Examples 60 through 67 demonstrate the HMAPS process can be run with dried (<10 ppm moisture) recycled solvent obtain from previous Examples. Recycle of solvent entails combining cyclohexane and ethylbenzene from the wash reactor strip and the first WFE operation, azeotropic distillation of water followed by simple distillation to a pot temperature of about 140° C. at one atmosphere. Further drying is accomplished with the use of activated molecular sieves. Due to the less than preferred process conditions employed Examples 61 and 62; and to a lesser extent Examples 60 and 67, these Examples produced high molecular weight material at the end of the monomer feed as evidenced by the MWD formed and the reduced uptake of $H_2$ during the last 8 to 13% of the feed.

Of the runs Example 61 produced the least preferred result forming a high molecular weight tail with $M_w$ 10% High of 2629 Daltons. For Example 61 a lower catalyst loading was employed and thus under the resulting less preferred relative styrene to catalyst feed rate, hydrogen mass transfer became inefficient during the last 13% of the feed. Example 60 is comparable to Example 58 (no ageing) and 59 (3 hr ageing) except that the catalyst was aged for 1 hr and the solvent contained recycle ethylbenzene. Initially the catalyst appeared more active than either Example 58 or 59; however catalyst activity appeared to fall off during the last 8 minutes of the styrene feed producing a slightly higher molecular weight. For Example 61 an attempt was made to reduce the catalyst loading by 20% however this resulted in a high molecular weight tail when during the last 13 minutes of the feed Hydrogen uptake slowed. In the course of further establishing the scope of this invention (Examples 62-67) it was found that a reduction in mixing (1000 rpms vs. the standard 1130 rpms) could be offset by: i) increased temperature; and/or ii) reduced total monomer feed; and/or iii) decreased monomer feed rate; and/or iv) increase hydrogen pressure; v) increased catalyst aging time. The results of these experiments are presented in Table XII. Examples 64 and 65 are deemed representative.

Examples 64 and 65

Representative of Full Scale Monomer Feed Volume for [DMEA$^-$]$_4$Li$_6$H$_2$ Catalyst at 90° C. with Recycle Solvent Recovered from Previous Examples Recycled anhydrous solvent [79.4 wt % cyclohexane (CH), 20.6 wt % Ethylbenzene (EB)], 220 ml of 320 ml (252.65 g) total was charged to the well rinsed reactor at 37° C. under a dry hydrogen (16 PSIG $H_2$) atmosphere. To the stirred solvent (800 RPM, four pitched blade turbines with Configuration IV above) was charged through the charge vessel via positive nitrogen pressure, a solution previously formed from 2.55 g (0.0285 mol.) N,N-dimethylethanolamine and 20 ml of cyclohexane further combined with 50 ml of the recycle solvent from above. Next, 21.47 ml (0.0429 mole) 2.0 M n-butyllithium dissolved in 120 ml the anhydrous cyclohexane was transferred to the charge vessel and further combined with 50 ml of the recycle solvent (with little if any back mixing) from above. This unmixed solution was then pressure transferred over a period of 15 minutes to the stirred (800 RPM) reaction mixture under hydrogen. At the end of the organolithium charge agitation speed was increased to 1130 RPM and the reactor pressure decreased from a peak pressure of 19 PSIG to an ending pressure returning to 16 PSIG. During the course of the catalyst formation the temperature increased 2-3° C. The reactor head space was vented to 0 PSIG and then pressured to 45 PSIG with dry $H_2$ (through a subsurface feedline). The reactor was then heated to 72° C. with the pressuring building to 63 PSIG and further pressured to 72 PSIG. The heating was conducted with 80° C. oil flowing through the reactor jacket—holding the reactor at 72° C. and 72 PSIG for 60 minutes before venting to 17 PSIG. The reactor was then heated to 82° C. with the pressuring maintained at 17 PSIG by venting as needed. The heating was conducted with 90° C. oil flowing through the reactor jacket—holding the reactor at 82° C. and 17 PSIG for 75 minutes at which time styrene monomer feed was initiated, feeding 1015.0 g (9.75 mol.) of styrene. The styrene was fed through a subsurface feed line (0.02" ID tip) against the hydrogen head pressure of 13-15 PSIG over a period of 119 minutes controlling the reaction temperature at 80° C. Within 10 minutes of initiation of the monomer feed the reactor temperature reached 81.7° C. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole $H_2$ per mole of styrene feed appeared constant or near constant.

At the end of the styrene feed, the monomer feed line to the reactor, including the alumina columns (basic alumina), were flushed with 50 ml of anhydrous cyclohexane. The styrene feed and flush to the reactor was deemed complete when no further heat of reaction was observed generally signified by the permanent closing of the automated control valve on the coiling coils. The unquenched polymerization reaction mixture was transferred with positive $H_2$ pressure to the wash vessel previously heated ($N_2$ atmosphere) and previously charged with 300 ml of 5.13 g of Acetic Acid dissolved in 300 g $H_2O$ and 300 recovered solvent previously recovered from the initial solvent strip of a previous runs. Thus the reaction mixture was quenched with care in the wash reactor. The charge vessel and the reactor were then rinsed with 200 ml of recycle solvent and the rinse solution transferred to the wash reactor and combined with the crude quenched reaction mixture.

The above process was repeated as Example 65 with the identical charges and conditions to within minor run to run variations in measuring out the reagents with the exception that 1035.8 g of styrene was fed over 121 minutes the catalyst was allowed to age for 34 minutes at 72° C. and 26 minutes at 82° C. It is clear that the HMAPS distributions produced were near identical to within the experimental error of the GPC analyses.

During the transfer of the unquenched reaction mixtures (Examples 64 and 65) 10 ml samples of the individual reaction mixtures were obtained for analyses. The samples were slightly pink to water white—i.e. essentially colorless and transparent to light—with no settled or suspended solids. Any color was quenched by gently shaking/swirling or otherwise contacting the mixtures with air. The samples were submitted for GPC analysis without quenching the crude reaction mixtures. The GPC analysis excluding ethylbenzene but including the dimer content was as follows: Example 64 $M_n$: 550, $M_w$: 835, $M_z$: 1173, PD: 1.405, $\sigma_n$=396, $_n\alpha_3$=1.832 and $M_w$ 10% High=1982; Example 65 $M_n$: 558, $M_w$: 848, $M_z$: 1188, PD: 1.401, $\sigma_n$=402, $_n\alpha_3$=1.805; and $M_w$ 10% High=2003.

The standard work-up from above provided 2487 g of solution. Wiped film evaporation (WFE, 2" glass Pope Still, operated at 50.0 mmHg vacuum, 140° C., wiper speed 60% of full rate, feeding at 1.0 liters/hr) produced 1947 g HMAPS distribution having GPC MWD including dimer of $M_n$: 562, $M_w$: 848, $M_z$: 1186, PD: 1.509, $\sigma_n$=401, $_n\alpha_3$=1.811: and $M_w$ 10% High=2002. A second WFE operation (0.1-0.3 mmHg vacuum, 160° C., wiper speed 65% of full rate, feeding at 1.0 liters/hr) provided 1716 g of a HMAPS distribution having 0.13 GPC area % styrene dimer content and a GPC MWD of $M_n$: 695, $M_w$: 935, $M_z$: 12284, PD: 1.345, $\sigma_n$=408, $_n\alpha_3$=1.681; and $M_w$ 10% High=2064.

Figure 17:
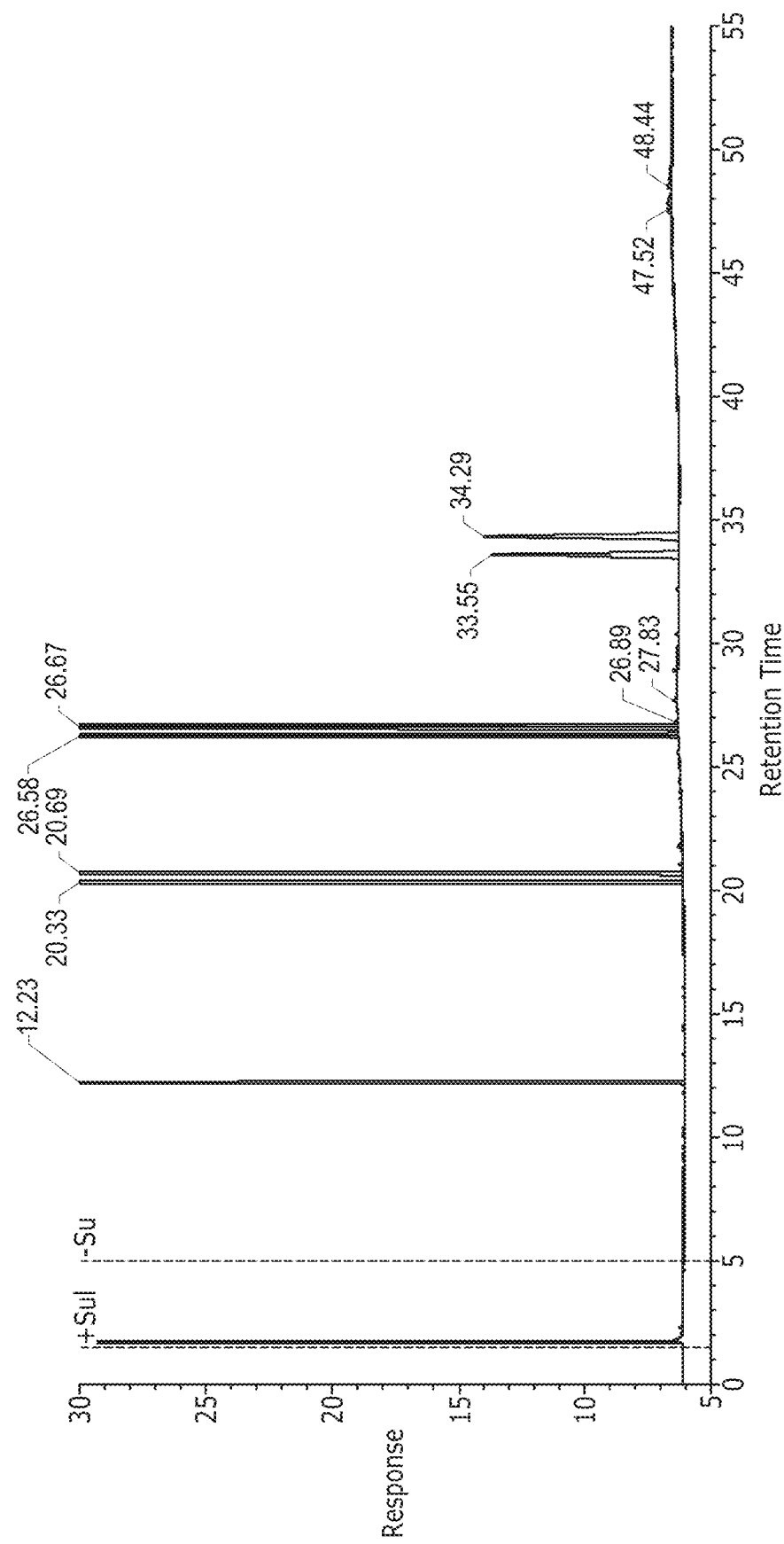
FIG. 17 is a gas chromatogram of styrene oligomers obtained from a polystyrene composition of this invention formed from another LOXLiH catalyst $[DMEA^-]_xLi_yH_z$ (wherein x:y:z is about 3:2:1) of this invention (Examples 64 and 65) employing a Hydrogen Mediated Anionic Styrene Polymerization (HMAPS) process of this invention conducted at about 90° C. demonstrating 99.93% Head to Tail microstructure.

A third WFE operation was performed to obtain the low molecular weight oligomers in order to determine the HMAPS PS distribution microstructure. Thus a 125 g sample of the 1825 g product distribution recovered from the $2^{nd}$ WFE operation was stripped of oligomers (0.13 mmHg vacuum, 199.5° C., wiper speed 85% of full rate, feeding at 2.0 g/min.). This third WFE operation produced 22 g of a styrene oligomer GC analysis of which indicated that 99.93% of the chains had the desired "head to tail" microstructure, with only a trace if any of chains having assumed to be ($FW_i$-2) microstructure wherein lithium hydride elimination had occurred producing an unsaturated chain end (See FIG. 17).

Examples 68-74

Examples 68 through 74 demonstrate the HMAPS process can be run with 100% dried (<10 ppm moisture) recycled solvent obtain from previous Examples. As above recycle of solvent entails combining cyclohexane and ethylbenzene from the wash reactor strip and the first WFE operation, azeotropic distillation of water followed by simple distillation to a pot temperature of about 140° C. at one atmosphere. Further drying is accomplished with the use of activated molecular sieves. Like above, due to the less than preferred process conditions employed—mixing of <1000 RPMs for the reactor geometry employed—Examples 68 and 72; and to a lesser extent Examples 67 and 70 produced high molecular weight material at the end of the monomer feed as evidenced by the MWD formed and the reduced uptake of $H_2$ during the last 8 to 13% of the feed. It is important to note that Examples 68 and 69 are near identical to Examples 66 and 67 from above except for the change in the solvent used to further dilute the 2.0 M n-butyllithium before charging. In Example 66 and in Example 67, fresh anhydrous cyclohexane was used to initially dissolve the organolithium reagent. Whereas in Examples 68 and 69 recycle solvent comprised of 93% cyclohexane and 7% ethylbenzene was employed. This charge protocol surprisingly formed a much more active catalyst as evidenced by the slightly lower molecular weight distribution ($M_n$=550 and $M_n$=558 [Ex. 64 and 65 respectively] vs. $M_n$=532 and $M_n$=533 [Ex. 68 and 69 respectively]) at even lower hydrogen pressure (17 to 19 PSIG vs. 13 to 14 PSIG respectively). Examples 70-73 demonstrate that the activity of the catalyst formed by first dilution with some amount of ethylbenzene (without any promoter used in the process) could be curtailed by reducing the RPMs of the agitator and hence amount of mixing during the polymerization. However this was less preferred in that there was a propensity to form high molecular material at the end of the styrene feed which could be offset by increasing the RPMs and/or the hydrogen pressure and/or reducing the total amount of styrene monomer fed.

Examples 72 and 73 demonstrate that having more ethylbenzene present had less of an affect than forming the catalyst at a slightly reduce RPMs. Accordingly the catalyst is generally formed at 800 RPM which is sufficient for effective mass transfer of hydrogen to the condensed phase during catalyst formation with the present reactor geometry. For Example 73 the catalyst components were combined at 500 RPMs mixing which is less sufficient than 800 but clearly adequate to form surprisingly an even more active catalyst. In Example 74 200 RPMs and 2 PSIG hydrogen was used to form the catalyst. This catalyst was initially very active and had to be run at 9 to 11 PSIG and even at that hydrogen activity $H_2$ uptake was too great. Surprisingly this catalyst although very active at the start became less and less active producing a very asymmetric distribution high in the lower molecular weight chains and having a Mw 10% High of 3323 Daltons. Thus it is desirable to reduce the complex formed from [DMEA$^-$]Li and n-butyllithium as it is formed when forming the catalyst at temperatures well above cryogenic conditions. Though we wish not to be bound by theory it is thought that controlling the rate of the reduction by controlling mixing and hydrogen mass transfer helps precondition the catalyst to form the most active form of catalyst aggregates in the hydrocarbon solution. Thus Examples 72 and 73 are deemed representative of this set (68 through 74) of Examples and described in greater detail below.

Examples 72 and 73

Representative of Full and 90% Scale Monomer Feed Volume for [DMEA$^-$]$_4$Li$_6$H$_2$ Catalyst at 90° C. with 100% Recycle Solvent Recovered from Previous Examples Recycled anhydrous solvent [85.0 wt % cyclohexane (CH), 15.0 wt % Ethylbenzene (EB)], 220 ml of 500 ml (392 g) total was charged to the well rinsed reactor at 37° C. under a dry hydrogen (16 PSIG H$_2$) atmosphere. To the stirred solvent (800 RPM, four pitched blade turbines with Configuration IV above) was charged through the charge vessel via positive nitrogen pressure a thoroughly mixed solution formed from 2.54 g (0.0285 mol.) N,N-dimethylethanolamine and 20 ml of the recycle solvent from above to which an additional 50 ml of aliquot of the recycle solvent was added with little if any mixing when combining in said charge vessel. Next, 21.47 ml (0.0429 mole) 2.0 M n-butyllithium further dissolved in 120 ml the recycle solvent was transferred to the charge vessel and further combined with 50 ml of the recycle solvent (with little if any back mixing) from above. This unmixed solution was then pressure transferred over a period of 15 minutes to the stirred (800 RPM) reaction mixture under hydrogen. At the end of the organolithium charge the agitation speed was increased to 1130 RPM and the reactor pressure decreased from a peak pressure of 19 PSIG to an ending pressure returning to 16 PSIG. During the course of the catalyst formation the temperature increased 2-3° C. The reactor head space was vented of 0 PSIG and then pressured to 45 PSIG with dry H$_2$ (through a subsurface feedline). The reactor was then heated to 72° C. with the pressuring building to 63 PSIG and further pressured to 72 PSIG. The heating was conducted with 80° C. oil flowing through the reactor jacket—holding the reactor at 72° C. and 72 PSIG for 150 minutes before venting to 17 PSIG. The reactor was then heated to 80° C. with the pressure increased to 20 PSIG with 90° C. oil flowing through the reactor jacket. At the end of the 150 minute catalyst aging the RPMs was adjusted to 960 time and styrene monomer feed was initiated, feeding 1000.0 g (9.60 mol.) of styrene. The styrene was fed through a subsurface feed line (0.02" ID tip) against the hydrogen head pressure of 15-17 PSIG over a period of 122 minutes controlling the reaction temperature at 91° C. Within 10 minutes of initiation of the monomer feed the reactor temperature reached 90.5° C. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared constant or near constant. At the end of the run the RPMs were adjusted to 975 and the hydrogen pressure increased to 18 PSIG.

At the end of the styrene feed, the monomer feed line to the reactor, including the alumina columns (basic alumina), were flushed with 50 ml of anhydrous cyclohexane. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 300 ml of 5.13 g of Acetic Acid dissolved in 300 g H$_2$O water and 300 recovered solvent previously recovered from the initial solvent strip of a previous runs. Thus the reaction mixture was quenched with care in the wash reactor. The charge vessel and the reactor were then rinsed with 200 ml of recycle solvent and the rinse solution transferred to the wash reactor and combined with the crude quenched reaction mixture.

The above process was repeated as Example 73 with the identical charges and conditions to within minor run to run variations in measuring out the reagents with the exception that 911.3 g of styrene was fed over 111 minutes against a hydrogen pressure of 14 PSIG, the catalyst components were combined with 500 RPM mixing instead of 800 RPMs. The reduction in the amount of feed precluded the need to increase the RPMs or hydrogen pressure at the end of the feed. It is clear that the HMAPS distributions produced were very similar except that Example 72 produce a small amount of a high molecular weight composition at the end of the feed.

During the transfer of the unquenched reaction mixtures (Examples 72 and 73) 10 ml samples of the individual reaction mixtures were obtained for analyses. The samples were slightly pink to water white—i.e. essentially colorless and transparent to light—with no settled or suspended solids. Any color was quenched by gently shaking/swirling or otherwise contacting the mixtures with air. The samples were submitted for GPC analysis without quenching the crude reaction mixtures. The GPC analysis excluding ethylbenzene but including the dimer content was as follows: Example 72 M$_n$: 485, M$_w$: 747, M$_z$: 1133, PD: 1.517, $\sigma_n$=356, $_n\alpha_3$=2.462 and M$_w$ 10% High=1965; Example 73 M$_n$: 480, M$_w$: 710, M$_z$: 1009, PD: 1.421, $\sigma_n$=332, $_n\alpha_3$=2.025; and M$_w$ 10% High=1732.

The standard work-up from above provided 2270 g of solution. Wiped film evaporation (WFE, 2" glass Pope Still, operated at 50.0 mmHg vacuum, 140° C., wiper speed 60% of full rate, feeding at 1.0 liters/hr) produced 1786.5 g HMAPS which was the further stripped (w/o analysis) in a second WFE operation (0.1-0.3 mmHg vacuum, 160° C., wiper speed 65% of full rate, feeding at 1.0 liters/hr) provided 1574 g of a HMAPS distribution having 0.13 GPC area % styrene dimer content and a GPC MWD of M$_n$: 591, M$_w$: 817, M$_z$: 1149, PD: 1.382, $\sigma_n$=365, $_n\alpha_3$=2.285; and M$_w$ 10% High=1998.

Upon completion of Examples 42 through 74 (a total of 32 runs) the reactor was rinsed with 1 liter of recycle solvent blown free of organics with nitrogen and then opened for inspection. The reactor was found to be generally very clean with no polymer and only trace levels of solids on the walls and surfaces at the level which marks the volume of solvent used to form the catalyst. The reactor was wiped cleaned with a damp cloth and then with a cloth wetted with methanol. The monomer the 0.02" I.D. feed tip was replaced with one of equal length but having an I.D. of ≈0.45". The reactor was sealed dried under stream of nitrogen while heating the jacket with 100° C. oil.

Examples 75-79

In all of these Examples (75 through 79) the catalyst was formed with 500 RPM mixing with 18 to 21 PSIG hydrogen pressure with further aging at 72° C. and 72 PSIG hydrogen pressure for a period of between 200 and 240 minutes. Examples 75 through 77 utilized the 0.045" I.D. monomer feed line tip 80° C. and 1130 RPM mixing, different styrene feed rates and different recycle solvent charges and compositions. Of the three runs, the HMAPS process of Example 77 was preferred. Example 78 utilized the 0.045" I.D. styrene feed tip and fresh anhydrous methylcyclohexane (MCH) solvent, thus during this run there was no initial dilution of the organolithium reagent with ethylbenzene. Upon completion of Examples 75-78, the reactor was again flushed and purged of organics with nitrogen and opened for inspection. The reactor was found to be clean and free of any solids at the line that marks the volume of the reactor during catalyst formation. It is surmised that the lower RPMs employed during catalyst formation may also bring the benefit of less splashing of the catalyst forming reaction mixture and thereby reduce the deposition of catalyst components due to solvent flashing off the exposed and heated reactor surfaces. Upon completion of Examples 75-78 the less preferred 0.045" I.D. styrene feed tip was removed and replaced with the preferred 0.02" styrene feed tip and then prepared for the final run (Example 79) in this series. Example 79 which utilized a catalyst formed in MCH and ethylbenzene is described in greater detail below.

Examples 79

Representative of Full Scale Monomer Feed Volume for [DMEA$^-$]$_4$Li$_6$H$_2$ Catalyst at 90° C. with Mixed Ethylbenzne and Methylcyclohexane Solvent Anhydrous methylcyclohexane (MCH) solvent 220 of 320 ml (246.4 g) total was charged to the well rinsed reactor at 37.6° C. under a dry hydrogen (18 PSIG H$_2$) atmosphere. To the stirred solvent (500 RPM, four pitched blade turbines with Configuration IV above) was charged through the charge vessel via positive nitrogen pressure a thoroughly mixed solution formed from 2.55 g (0.0286 mol.) N,N-dimethylethanolamine and 20 ml of the ethylbenzene to which an a 50 ml of aliquot of the MCH was added with little if any mixing when combining in said charge vessel. Next, 21.52 ml (0.0430 mole) 2.0 M n-butyllithium further dissolved in 160 ml of anhydrous ethylbenzene was transferred to the charge vessel and further combined with 50 ml MCH with little if any back mixing. This unmixed solution was then pressure transferred over a period of 20.75 minutes to the stirred (525 RPM) reaction mixture under hydrogen. At the end of the organolithium charge the agitation speed was increased to 1050 RPM and the reactor pressure decreased from a peak pressure of 21 PSIG to an ending pressure returning to 20 PSIG at 38.8° C. The reactor head space was then pressured to 48 PSIG with dry H$_2$ (through a subsurface feedline). The reactor was then heated to 73.2° C. with the pressuring building to 59 PSIG and further pressured to 75 PSIG (60 minutes having elapsed since completing the organolithium charge to the reactor). The heating was conducted with 80° C. oil flowing through the reactor jacket—holding the reactor at 73.9° C. and 75 PSIG for 205 minutes before venting to 15 PSIG. Thus ca. 4 hours had passed since the starting the charge of the organolithium reagent solution in ethylbenzene to the reactor. At this time the mixing was adjusted to 1130 RPMs time and styrene monomer feed was initiated, feeding 1023.9 g (9.83 mol.) of styrene. The styrene was fed through a subsurface feed line (0.02" ID tip) against the hydrogen head pressure of 11-15 PSIG over a period of 113 minutes controlling the reaction temperature at 82.5° C. Within 10 minutes of initiation of the monomer feed the reactor temperature reached 83.6° C. Periodically the hydrogen uptake was monitored by closing the valve to the regulator and timing the period required to drop 5 PSIG. Thus the period in seconds required for the pressure to drop (−1) one PSIG was recorded. When this value was adjusted for estimated reactor headspace, the hydrogen uptake in terms of mole H$_2$ per mole of styrene feed appeared constant or near constant.

At the end of the styrene feed, the monomer feed line to the reactor, including the alumina columns (basic alumina), were flushed with 50 ml of anhydrous MCH. The styrene feed and flush to the reactor was deemed complete when no further heat of reaction was observed generally signified by the permanent closing of the automated control valve on the coiling coils. The unquenched polymerization reaction mixture was transferred with positive H$_2$ pressure to the wash vessel previously heated (N$_2$ atmosphere) and previously charged with 400 ml of 6 g of Acetic Acid and 14 g H$_2$SO$_4$ dissolved in 380 g H$_2$O water and 300 ml of fresh MCH. Thus the reaction mixture was quenched with care in the wash reactor. The charge vessel and the reactor were then rinsed with 200 ml of recycle solvent and the rinse solution transferred to the wash reactor and combined with the crude quenched reaction mixture.

During the transfer of the unquenched reaction mixture a 10 ml samples of the reaction mixtures were obtained for analyses. The samples were slightly pink to water white—i.e. essentially colorless and transparent to light—with no settled or suspended solids. Any color was quenched by gently shaking/swirling or otherwise contacting the mixtures with air. The samples were submitted for GPC analysis without quenching the crude reaction mixtures. The GPC analysis excluding ethylbenzene but including the dimer content was as follows: M$_n$: 511, M$_w$: 767, M$_z$: 1096, PD: 1.429, $\sigma_n$=362, $_n\alpha_3$=2.020 and M$_w$ 10% High=1871.

The standard work-up from above provided 1000 g of solution. Wiped film evaporation (WFE, 2" glass Pope Still, operated at 50.0 mmHg vacuum, 140° C., wiper speed 60% of full rate, feeding at 1.0 liters/hr) produced 961 g HMAPS having GPC analysis: M$_n$: 542, M$_w$: 804, M$_z$: 1142, PD: 1.483, $\sigma_n$=377, $_n\alpha_3$=2.009 and M$_w$ 10% High=1955. A second WFE operation (0.1-0.3 mmHg vacuum, 160° C., wiper speed 65% of full rate, feeding at 1.0 liters/hr) provided 871 g of a HMAPS distribution having 1.3 GPC area % styrene dimer content and a GPC MWD of M$_n$: 627, M$_w$: 855, M$_z$: 1163, PD: 1.364, $\sigma_n$=378, $_n\alpha_3$=1.999; and M$_w$ 10% High=1995.

HMAPS Distributions prepared from Examples 42-79 were brominated according to the process technology of PCT Pub. No.: WO2010/127091 (U.S. Pat. No. 8,802,787 B2) to form brominated anionic chain transfer vinylaromatic polymers (Br-ACTVAP). The average and standard deviation of the physical properties of these brominated polymers are listed below as well as the properties of the Br-ACTVAP formed by combining and then stripping the product distribution of Examples 14-15, that dimer stripped composition having M$_w$=731 and Pa, =1.38. The compositions were further tested as polymeric flame retardants in high impact polystyrene (HIPS) and were found to provide flame retarded (UL 94 VO at ⅛" and ¹⁄₁₆") HIPS formulations with excellent overall properties including color (YI), Izod Impact, heat distortion temperature and VICAT softening temperature.

| Br-ACTVAP Property | Of Examples 46 and 47 | Average | Stand. Dev. |
|---|---|---|---|
| % Br (XRF) | 73.9 | 73.5 | 0.6 |
| % Br (NMR) | 73.8 | 73.9 | 0.4 |
| $T_g$ (° C.) | 123.51 | 132.03 | 6.05 |
| Thermally Labile Bromine (ppm at 300° C.) | 305 | 156.72 | 74.76 |
| Color Solution | | | |
| L | 99.58 | 99.22 | 0.18 |
| a | −1.55 | −1.73 | 0.26 |
| b | 4.02 | 4.89 | 0.75 |
| Delta E | 4.33 | 5.19 | 0.77 |
| COLOR Solids | | | |
| L | 95.97 | 94.18 | 5.37 |
| a | −0.97 | −0.78 | 0.15 |
| b | 4.16 | 4.26 | 0.32 |
| Yellowness Index | 7.03 | 7.48 | 0.46 |
| Thermal Color (250° C.) Delta E | 14.45 | 15.06 | 1.93 |
| TGA (nitrogen) | | | |
| 1% Wt. Loss (° C.) | 341.08 | 341.74 | 5.44 |
| 5% Wt. Loss (° C.) | 365.93 | 370.38 | 2.82 |
| 10% Wt. Loss (° C.) | 376.22 | 379.02 | 5.67 |
| 50% Wt. Loss (° C.) | 409.03 | 410.37 | 3.09 |
| 90% Wt. Loss (° C.) | 450.7 | 449.92 | 8.60 |
| GPC (UV Detector) | | | |
| $M_n$ | 2167 | 2282 | 234 |
| $M_w$ | 4078 | 3871 | 1002 |
| $M_z$ | 10437 | 8219 | 4343 |
| $PD_n$ | 1.882 | 1.69 | 0.34 |

COMPARATIVE EXAMPLES

Figure 12:
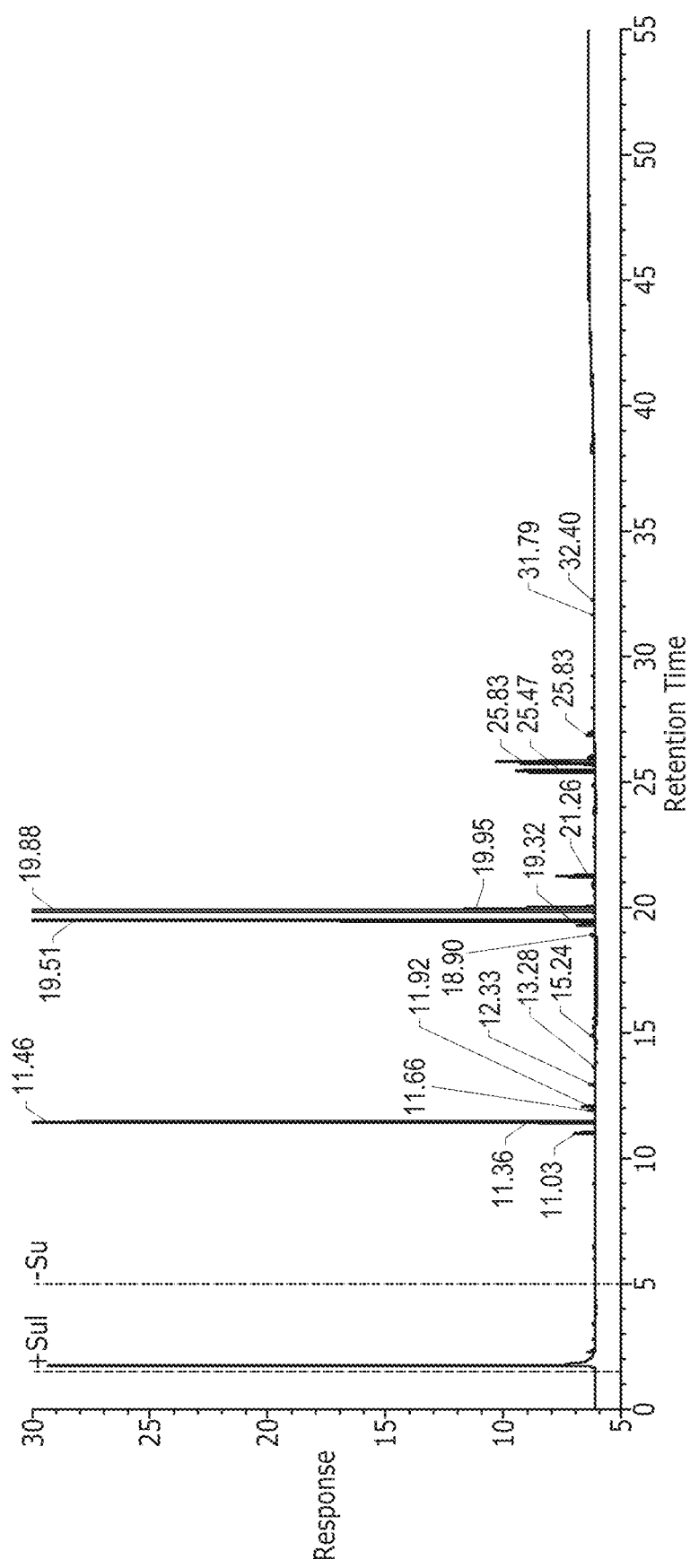
FIG. 12 is a gas chromatogram of oligomers obtained from the ethylbenzene chain transfer polymerization of styrene process technology of EPO 741147 demonstrating the undesired levels of polymer microstructures arising from isomerization and fragmentation polymerization reactions characteristic of the catalyst and processes of that technology.
Figure 13:
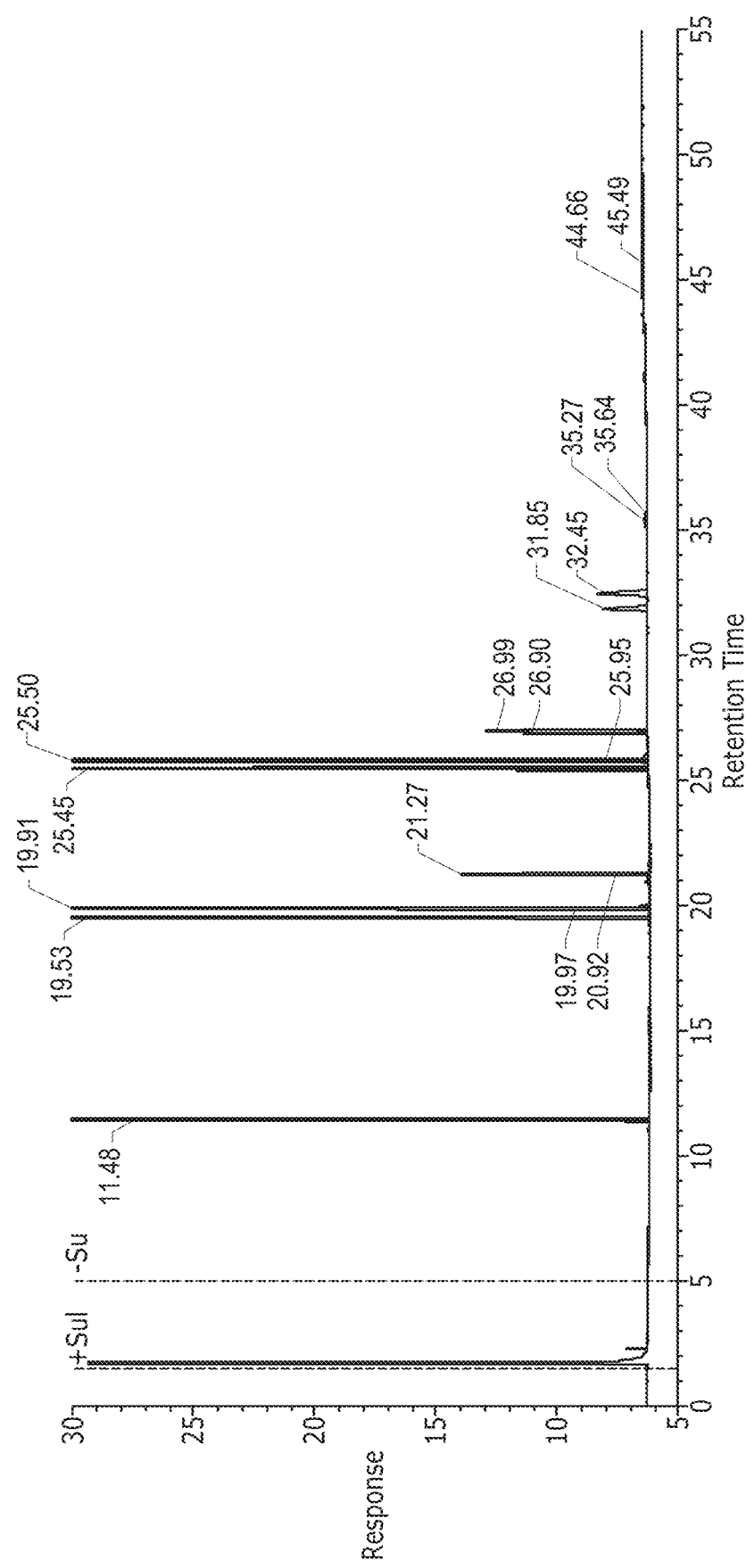
FIG. 13 is a gas chromatogram of oligomers obtained from the ethylbenzene (2 mole parts) chain transfer polymerization of styrene (1 mole part) process technology of WO2008154453 demonstrating the undesired levels of polymer microstructures arising from isomerization and fragmentation polymerization reactions characteristic of the catalyst and processes of that technology when ethylbenzene is the chain transfer agent.
Figure 14:
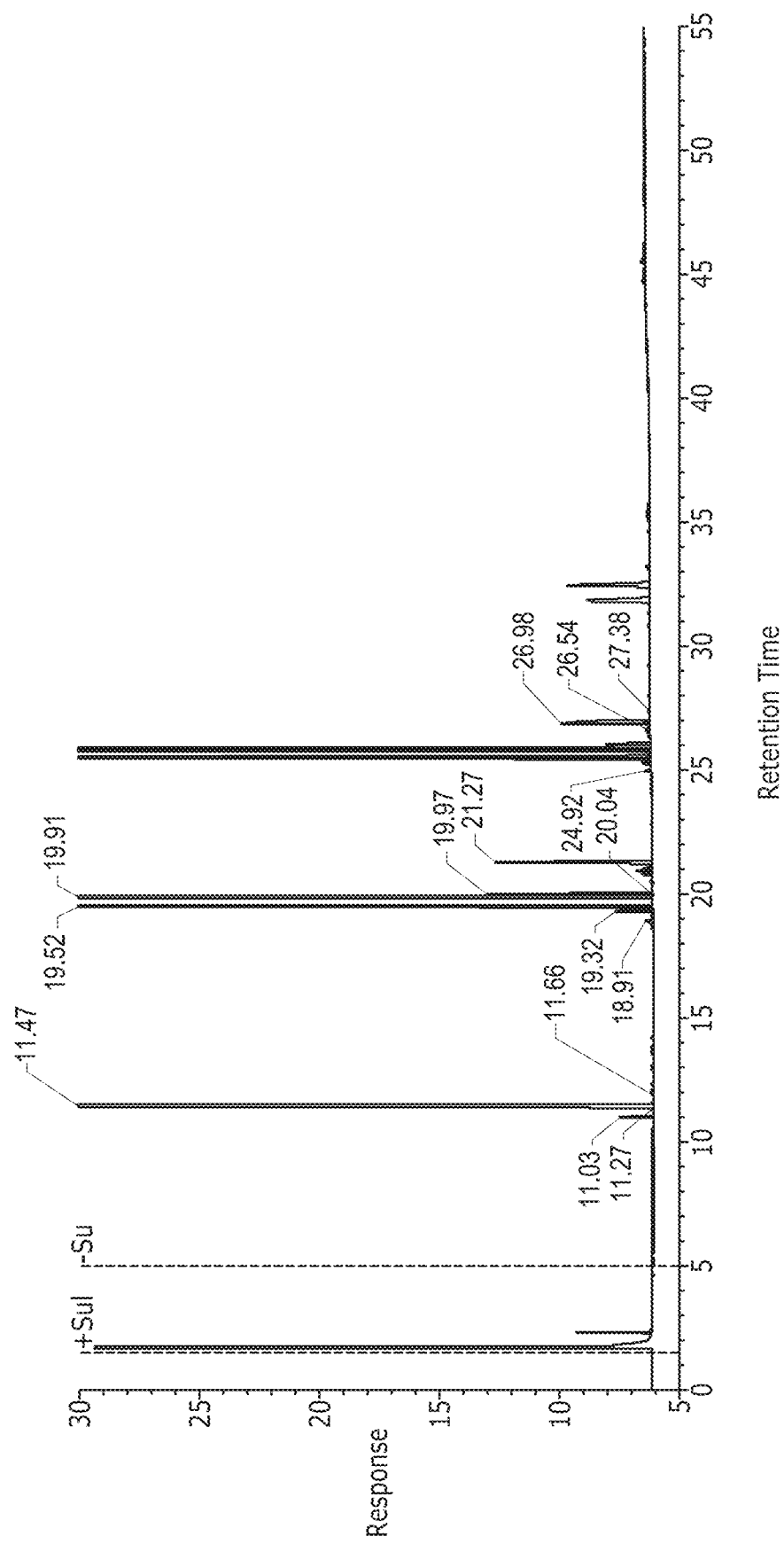
FIG. 14 is a gas chromatogram of oligomers obtained from the ethylbenzene (1 mole part) chain transfer polymerization of styrene (2 mole parts) process technology of WO2008154453 demonstrating the undesired levels of polymer microstructures arising from isomerization and fragmentation polymerization reactions characteristic of the catalyst and processes of that technology when ethylbenzene is the chain transfer agent.
Figure 15:
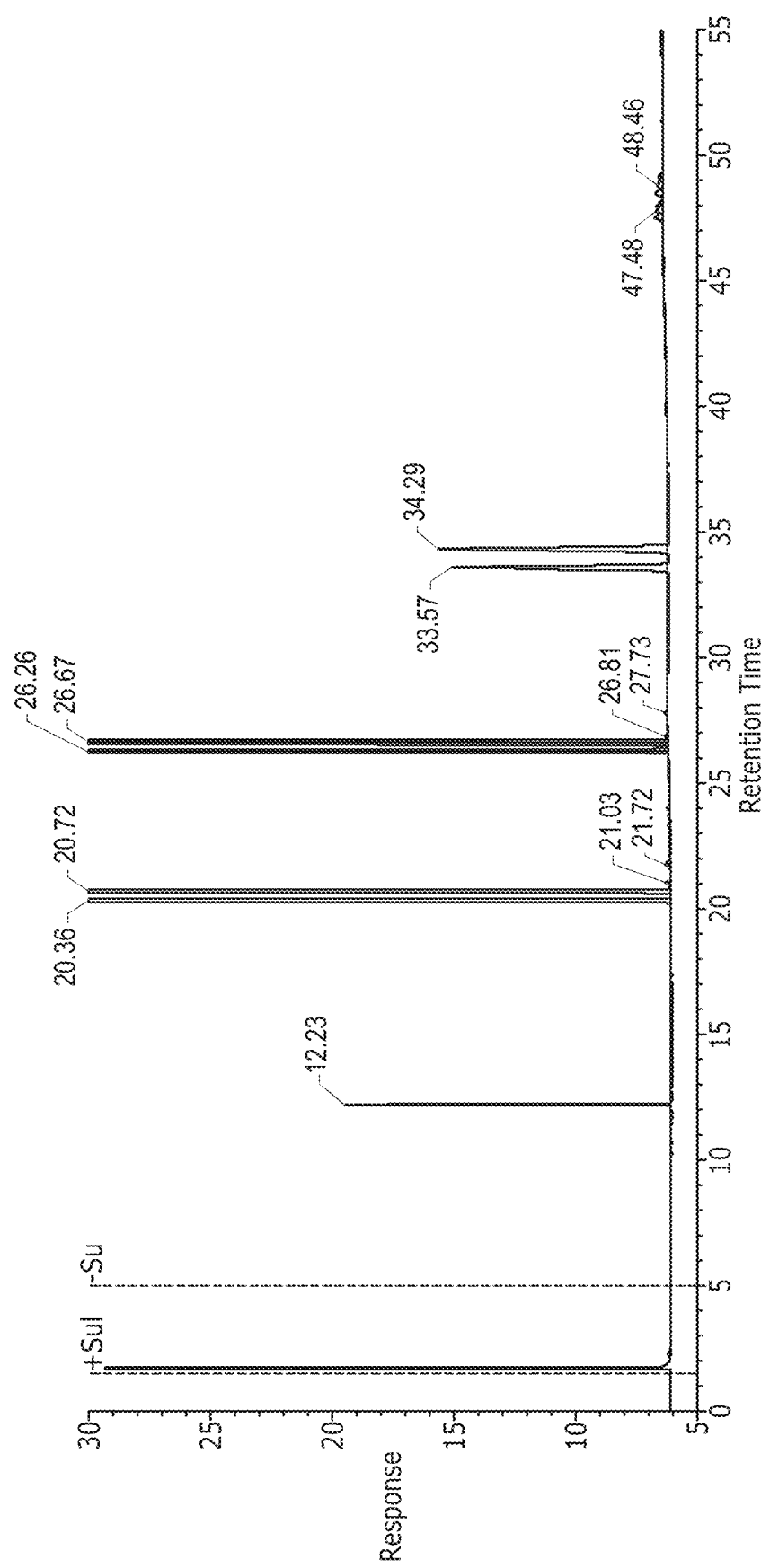
FIG. 15 is a gas chromatogram of styrene oligomers obtained from a polystyrene composition of this invention formed from another LOXLiH catalyst [DMEA⁻]xLiyHz.2TMEDA (wherein x:y:z is about 3:2:1) of this invention (Examples 52 and 53) employing a Hydrogen Mediated Anionic Styrene Polymerization (HMAPS) process of this invention conducted at about 80° C. demonstrating 99.94% Head to Tail microstructure.

In the Comparative Examples 80-83 set forth below and demonstrated in FIGS. 12, 13 and 14 above, using prior art anionic chain transfer polymerization methods under nitrogen atmospheres where the chain transfer agent is ethylbenzene with a potassium based catalyst, it is demonstrated that these prior art technologies greatly suffer from undesired competing polymerization steps leading to complex polymer chain distributions with different and less desired microstructures (i.e. the steps of the reaction pathways provided in FIGS. 1 and 2). In Examples 25-27, 39 and 40 we demonstrate that LOXKH, SASH and HASH, potassium and potassium with sodium based catalyst systems, the hydrogen mediated anionic chain transfer process technology of this invention, like the (hydrogen free) prior art technology produce complex multiple polymer chain length distributions. The difference between such potassium and sodium based saline hydride process product distribution compositions lies mainly in the different relative proportions of the desired "head to tail" and undesired "tail to head to tail" and fragmentation microstructures.

Unpredictably and beneficially as is set forth in the Examples 1-24, 28, 29 and 42-79, the process technologies of this invention that employ the LOXLiH and/or the LOXMgH₂ aggregates as the catalyst, provide greatly improved overall polymer microstructure. That is to say that the LOXLiH and the LOXMgH₂ catalyst produce polystyrene distributions comprised almost exclusively of oligomer chains of the most desired "head to tail" microstructure. Surprisingly these reagents and catalyst of this invention for all intents and purposes nearly eliminate all undesired competing pathways and afford only chain transfer distributions of the most desired polymer microstructure (i.e. polymer structure 1 above) in ranges of molecular weight distributions already proven to be useful in forming polymeric products such as polymeric brominated flame retardants. Though we wish to not be bound by theory, under anionic chain transfer polymerization conditions when catalyst other than a the LOXLiH and/or the LOXMgH₂ is employed, significant competing side reaction pathways give rise to added distributions of isomeric oligomeric chains with different and undesired microstructures (see FIG. 1). The isomerization pathway of FIG. 1 provides additional competing pathways which entail fragmentation/polymerization. These fragmentation/polymerization processes lead to: (A) oligomer chain structures that have one more methyl (—CH₃) carbon (increase of 14 Daltons); and/or (B) oligomer chain structures that have one less methyl (—CH₃) carbon (decrease of 14 Daltons, see FIG. 2). Such competing polymerization reaction pathways are undesirable because they generally lead to quaternary carbon atoms in the polymer chain backbone (i.e polymermicrostructure). Such quaternary carbon atoms render a polymer distribution as less compatible with aromatic electrophilic substitution catalyst which include either Brönstead acids (e.g. sulphonation) or Lewis acids (e.g. halogenation).

Comparative Example 80

Isolation of Low Molecular Weight Oligomers from Comparative Example 46 of WO2010065468A8, an Ethylbenzene Chain Transfer Composition of EPO 741147

A 150 ml sample of the water washed product mixture retained from Example 46 of WO2010065468A8 was carefully concentrated at reduced pressure in a kugelrohr distillation apparatus. The cyclohexane solvent and ethylbenzene chain transfer agent were distilled from the polymer to an ending condition of 150° C. in the kugelrohr oven and 1.0 mmHg vacuum in the bulb tube. The receiver with the solvent was removed and replace with a fresh receiver, distillation was continued until a final temperature of 220° C. in the oven and <0.1 mmHg vacuum in the bulb tube the distillation was continued until no evidence of a condensate in the receiver could be perceived. The content of the receiver was dissolved in methylene chloride and analyzed by gas chromatography. GC analysis indicated that 93% of the chains had the desired "head to tail" microstructure, with 3.4% of the chains having the undesired "tail to head to tail" quaternary carbon linkage and 3.2% of the chains having the fragmented (FW$_i$-14) microstructure (See FIG. 12). The gas chromatogram in FIG. 12 also demonstrates large number of other unidentified impurities oligomers present.

Comparative Example 81

Isolation of Low Molecular Weight Oligomers from an ACTVAP Composition of WO2008154453 w/Oligomer Microstructure Analysis An ACTVAP composition prepared from styrene wherein ethylbenzene instead of toluene was used as the chain transfer agent. The anionic chain transfer process was conducted in the 12-liter glass polymerization reactor described in WO2008154453 in a like fashion of Example 8 of that application. Thus 1905 g of styrene (18.29 mole) was fed (110 min, 70° C. rxn. temp.) to a reaction mixture formed in 4517.07 g (42.55 mole) from 13.74 g (0.1224 mole) potassium tert-butoxide, 71.51 g (0.6154 mole) TMEDA, and 63.12 (0.1262 mole) of 2M n-butyllithium in cyclohexane. After work-up and stripping of ethylbenzene (WFE 195° C., 60 mmHg) 2765.7 g of the ACTVAP was recovered having GPC MWD: $M_n$: 266, $M_w$: 301, $M_z$: 357, PD: 1.133. A second WFE operation (195° C. 25 mmHg) yielded 2070 g of an ACTVAP composition having GPC MWD: $M_n$: 297, $M_w$: 334, $M_z$: 385, PD: 1.126. A third WFE operation (135° C. 0.5 mmHg) on 1106 g of the 2070 g from the first yielded 909.25 g of a composition essentially free of the major reaction product of the process, the mono-adduct of ethylbenzene to styrene (structurally identical to the head to tail styrene dimer). A fourth WFE operation (199.5° C., 0.12 mmHg) provided 449.02 g of a distillate. GC analysis indicated that 91% of the chains had the desired "head to tail" microstructure, with 8.9% of the chains having the undesired "tail to head to tail" quaternary carbon linkage and 0.22% of the chains having the fragmented ($FW_i$-14) microstructure (See FIG. 13).

Comparative Example 82

Process Identical to Example 40 Except Under Nitrogen—No Hydrogen, w/Oligomer Microstructure Analysis Anhydrous ethylbenzene 256 g of 356 g (3.35 mole), was charged to the reactor and then heated to 65° C. under a dry nitrogen atmosphere. To the stirred solvent (1000 RPM, twin pitch blade impellers, blade placement Configuration I) was charged through the charge vessel a solution previously formed from 4.57 g (0.0407 mol.) potassium t-butoxide, 44 g (0.41 mol.) ethylbenzene and 20.83 g (0.179 mol.) of TMEDA. The charge vessel and transfer line to the reactor was flushed with a 50 g portion of anhydrous ethylbenzene of the 356 g above. Next 20.34 ml (0.0407 mole) 2.0 M n-butyllithium was transferred through the charge vessel to the reactor followed by a 50 g aliquot of ethylbenzene from above. Agitation was maintained at 1045 RPMs while 800 g (7.68 mol.) styrene was fed through a subsurface feed line (0.01" ID tip, 5.2 ft/s) against the nitrogen head pressure over a period of 183 minutes controlling the temperature at 70° C. During the feed the reactor pressure increased from 0 PSIG to 4 PSIG which was then vented back to 0 PSIG and consequently for the rest of the feed the reactor was vented to the mineral oil bubbler. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils.

The unquenched polymerization reaction mixture was transferred with positive $N_2$ pressure to the wash vessel previously heated ($N_2$ atmosphere) and previously charged with 300 ml of deoxygenated water along with 500 ml of cyclohexane. During the transfer of the unquenched reaction mixture a 10 ml sample of the reaction mixture is obtained for analysis. The sample is dark black-red (black cherry) in color and not transparent to light typical of all other ACTVAP and ACTSP processes previously observed. The sample was quenched by the addition of a drop of methanol which immediately quenches the dark red color without the formation of a gas. GPC Analysis of the crude quenched reaction mixture was as follows: $M_n$: 567, $M_w$: 908, $M_z$: 1331, PD: 1.601, $\sigma_n$=440, $_n\alpha_3$=2.048.

The standard work-up and solvent strip recited above provided 1240.2 g of solution. Wiped film evaporation (WFE, 2" glass Pope Still, operated at 50.0 mmHg vacuum, 140° C., 60% of full wiper speed, feeding at 1.0 liters/hr) produced 943.1 g of an ACTVAP distribution having GPC MWD of $M_n$: 580, $M_w$: 904, $M_z$: 1286, PD: 1.559, 611= 433, $_n\alpha_3$=1.868. A second WFE operation (0.1-0.3 mmHg vacuum, 172.5° C., 60% of full wiper speed, feeding at 1.0 liters/hr) provided 849.4 of an ACTVAP distribution having 0.70 GPC area % styrene dimer content and a GPC MWD of $M_n$: 707, $M_w$: 976, $M_z$: 1306, PD: 1.380, 611=436, $_n\alpha_3$=1.741. Thus the conditions of this Comparative Example and that of Example 40 are identical except for the atmosphere employed. Clearly the hydrogen mediation of Example 40 greatly improved the chain transfer efficiency and provided a MWD with much lower values for $M_n$, $M_w$ and $M_z$. A third WFE operation was performed to obtain the low molecular weight oligomers in order to determine the ACTVAP distribution microstructure. Thus a 131.2 g sample of the 849.4 g product distribution recovered from the $2^{nd}$ WFE operation was stripped of oligomers 0.1 mmHg vacuum, 199.5° C., wiper speed 85% of full rate, feeding at 2.0 g/min.). This third WFE operation produced 19.07 g of a styrene oligomer mixture having MWD: of $M_n$: 318, $M_w$: 338, $M_z$: 357, PD: 1.061. GC analysis indicated that 93% of the chains had the desired "head to tail" microstructure, with 5.0% of the chains having the undesired "tail to head to tail" quaternary carbon linkage and 2.3% of the chains having the fragmented ($FW_i$-14) microstructure (See FIG. 14).

Comparative Example 83

Process Identical to Example 40 Except Under Nitrogen and Comparative Example 43 w/No Hydrogen but Using n-Propylbenzene w/Oligomer Microstructure Analysis Anhydrous n-propylbenzene 281 g of 381 g (3.18 mole), was charged heated to the reactor and then to 65° C. under a dry nitrogen atmosphere. To the stirred solvent (1130 RPM, twin pitch blade impellers, blade placement Configuration I) was charged through the charge vessel a solution previously formed from 4.61 g (0.0411 mol.) potassium t-butoxide, 50 g (0.42 mol.) n-propylbenzene and 26.34 g (0.179 mol.) of TMEDA. The charge vessel and transfer line to the reactor was flushed with a 50 g portion of anhydrous n-propylbenzene of the 381 g above. Next 20.32 ml (0.0407 mole) 2.0 M n-butyllithium was transferred through the charge vessel to the reactor followed by a 50 g aliquot of n-propylbenzene from above. Agitation was maintained at 1131 RPMs while 804 g (7.72 mol.) styrene was fed through a subsurface feed line (0.01" ID tip, 5.2 ft/s) against the nitrogen head pressure over a period of 183 minutes controlling the temperature at 70° C. During the styrene monomer feed the reactor pressure increased from 0 PSIG to 9 PSIG. At the end of the styrene feed, the monomer feed line to the reactor, including the alumina columns, were flushed with 50 ml of anhydrous cyclohexane. The styrene feed and flush to the reactor was deemed complete when no further heat of reaction was observed generally signified by the permanent closing of the automated control valve on the coiling coils.

The unquenched polymerization reaction mixture was transferred with positive $N_2$ pressure to the wash vessel previously heated ($N_2$ atmosphere) and previously charged with 300 ml of deoxygenated water along with 500 ml of cyclohexane. During the transfer of the unquenched reaction mixture a 10 ml sample of the reaction mixture is obtained for analysis. The sample is dark black-red (black cherry) in color and not transparent to light typical of all other ACTVAP and ACTSP processes previously observed. The sample was quenched by the addition of a drop of methanol which immediately quenches the dark red color without the formation of a gas. GPC Analysis of the crude quenched reaction mixture was as follows: $M_n$: 668, $M_w$: 1013, $M_z$: 1354, PD: 1.517, $\sigma_n$=480, $_n\alpha_3$=1.413.

The standard work-up and strip from above produced 1908.2.2 g of solution. Wiped film evaporation (WFE, 2" glass Pope Still, operated at 50.0 mmHg vacuum, 140° C., 60% of full wiper speed, feeding at 1.0 liters/hr). This first WFE operation produced 939.88 g of an ACTVAP distribution having GPC MWD of $M_n$: 690, $M_w$: 1017, $M_z$: 1336, PD: 1.475, $\sigma_n$=475, $_n\alpha_3$=1.992. A second WFE operation (0.1-0.3 mmHg vacuum, 172.5° C., 60% of full wiper speed, feeding at 1.0 liters/hr) provided 866.04 of an ACTVAP distribution having 0.70 GPC area % styrene dimer content and a GPC MWD of $M_n$: 785, $M_w$: 1066, $M_z$: 1353, PD: 1.358, $\sigma_n$=470, $_n\alpha_3$=1.245. Thus the conditions of this Comparative Example and that of Comparative Example 43 are identical except for the chain transfer agent employed and thus the compositions in terms of their MWD are nearly identical.

Figure 9:
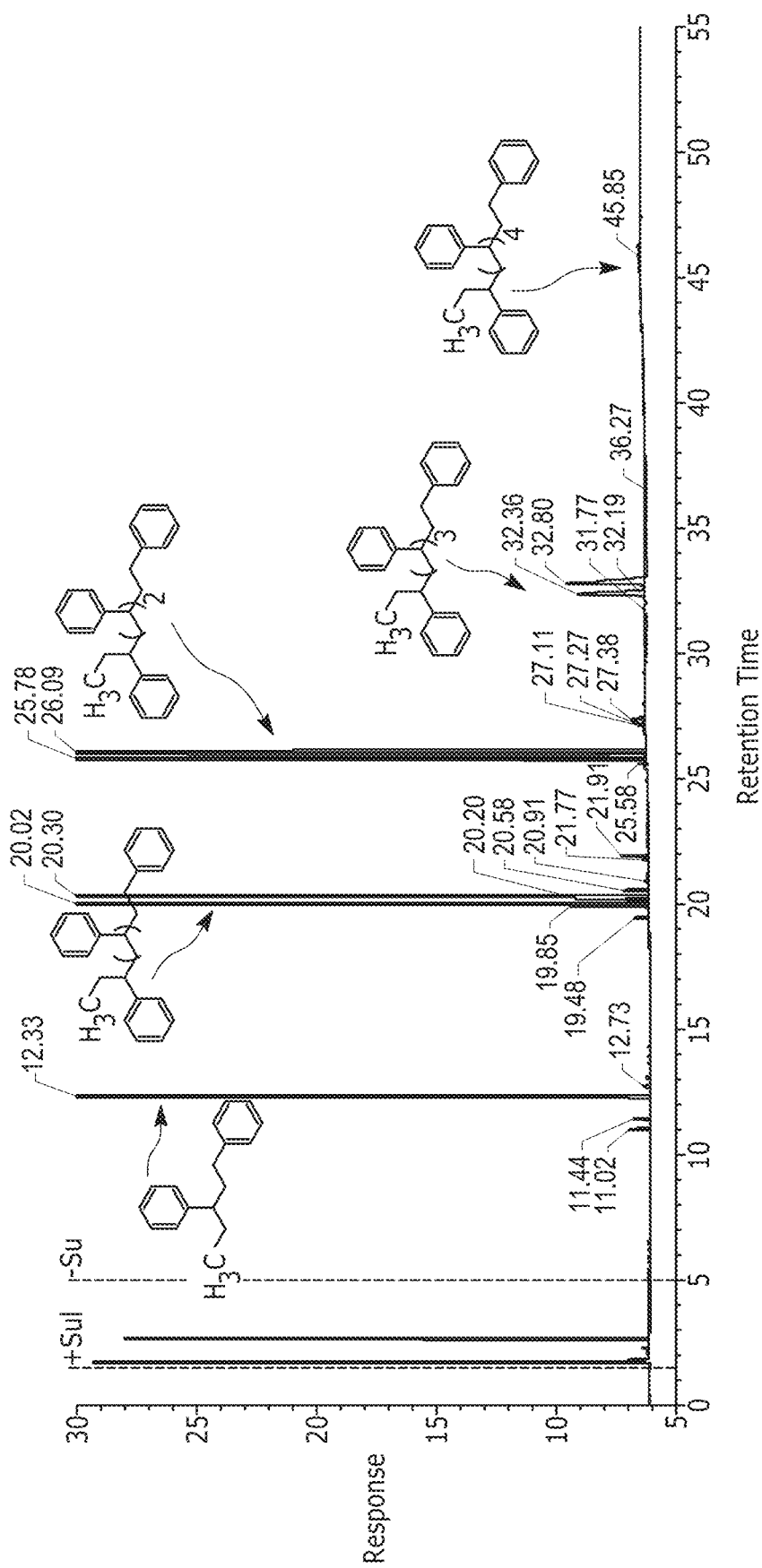
FIG. 9 is a gas chromatogram with structural assignments of a comparative ACTVAP composition of WO2008154453 formed from n-propylbenzene and styrene under a nitrogen atmosphere provided as a standard for comparison. Standard for comparison: gas chromatogram demonstrating oligomer microstructure purity for Comparative Example 44 demonstrating the polymer microstructure of an Anionic Chain Transfer Vinyl Aromatic Polymer (ACTVAP) of WO2008154453 formed from n-propylbenzene and styrene: 99.08% "Head to Tail" Microstructure
Figure 10:
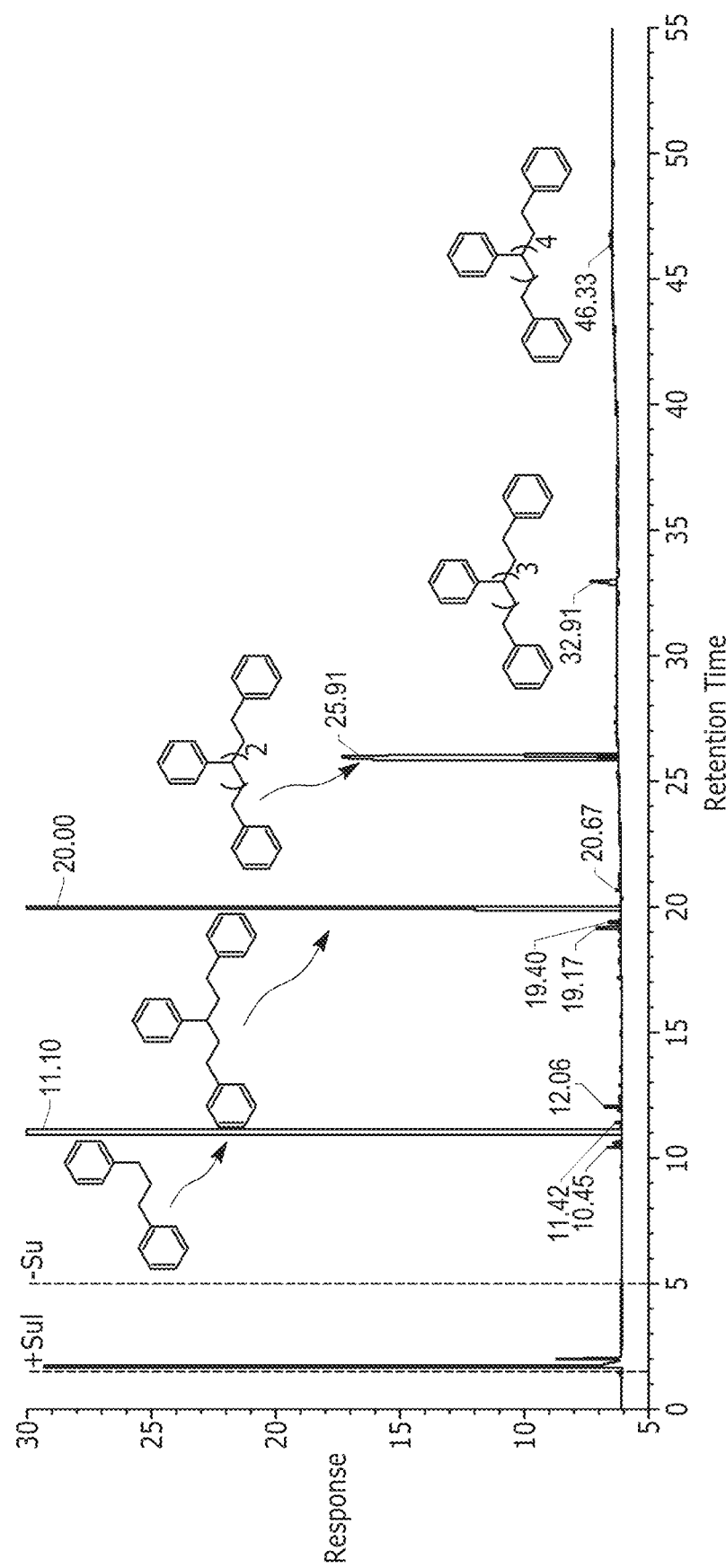
FIG. 10 is a gas chromatogram with structural assignments of a comparative ACTSP composition of WO2008154453 formed from toluene and styrene under a nitrogen atmosphere provided as a standard for comparison to identify the $FW_i=[i(104)+2-14]$ (where i=2-6) Daltons that form from the undesired fragmentation polymerization process. Standard for comparison: gas chromatogram demonstrating oligomer microstructure purity for an anionic chain transfer styrene polymer (ACTVSP) of WO2008154453 low molecular weight toluene styrene adducts; identical in structure to fragments ($FW_i$–14 where i=1 to 6) fragmentation oligomers formed in anionic styrene polymerizations that employ catalyst and/or initiators comprising potassium and/or sodium ions.
Figure 11:
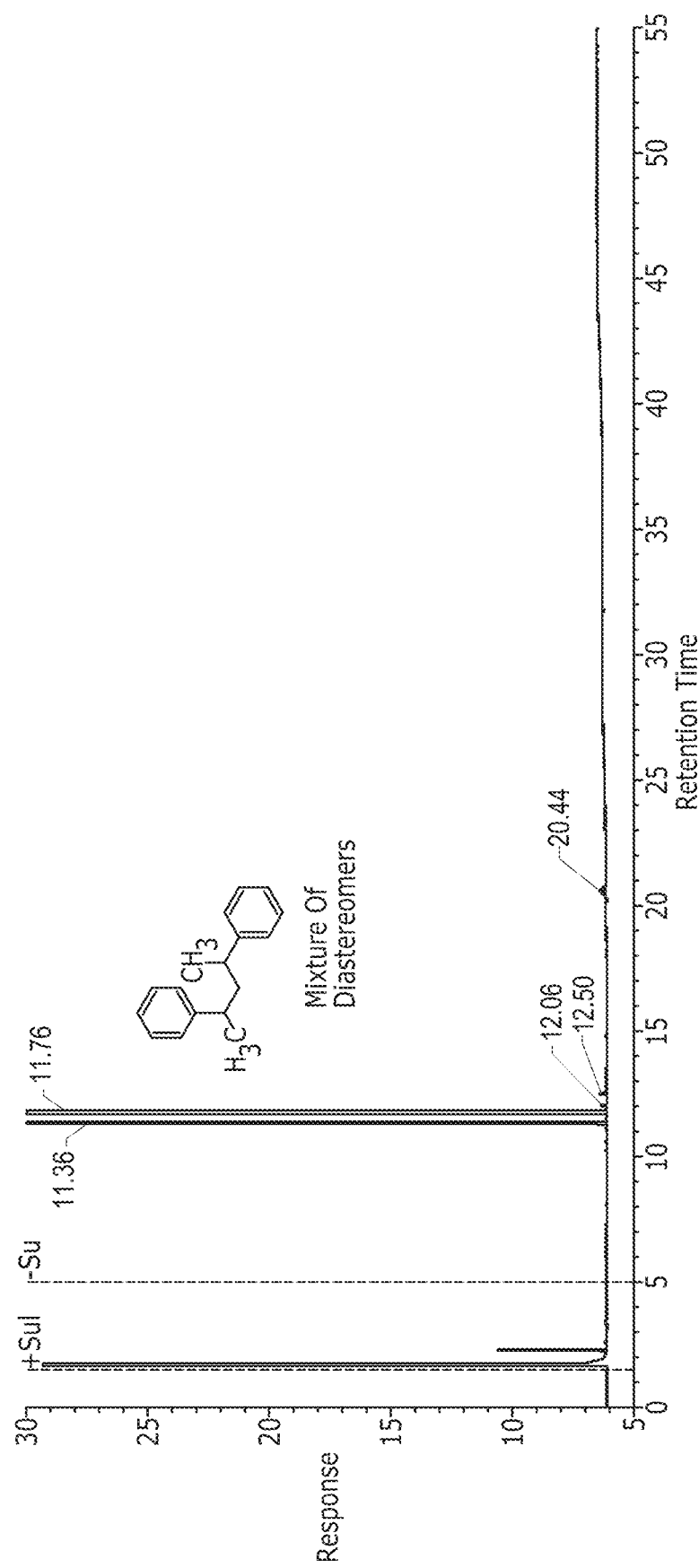
FIG. 11 is a gas chromatogram with structural assignments of a comparative mono-adduct of α-methylstyrene to ethylbenzene provided as a standard for comparison to identify the $FW_i=[i(104)+2+14]$ (where i=2) Daltons that form from the undesired fragmentation polymerization process that results in the in situ formation subsequent incorporation of α-methylstyrene. Standard for comparison: gas chromatogram of the mono-addition product of α-methylstyrene to ethylbenzene identical in structure to the ($FW_i$+ 14) fragments specifically where i=1 (210+14=224 MW oligomer) formed in anionic styrene polymerizations employing catalyst and/or initiators comprising potassium and/or sodium ions.

A third WFE operation was performed to obtain the low molecular weight oligomers in order to determine the ACTVAP distribution microstructure. Thus a 161.4 g sample of the 866.04 g product distribution recovered from the 2$^{nd}$ WFE operation was stripped of oligomers 0.1 mmHg vacuum, 199.5° C., wiper speed 85% of full rate, feeding at 2.0 g/min.). This third WFE operation produced 16.33 g of the ACTVAP oligomer mixture. GC analysis indicated that 99.08% of the chains had the desired "head to tail" microstructure (See FIG. 9).

Thus it is clear from these three Comparative Examples (41-43) that prior art compositions that rely on ethylbenzene as a chain transfer agent in their formation suffer from both chain isomerization reactions that lead to the formation of added distributions of polymer chains with undesired microstructures. The results presented in the Comparative Examples and in the LOXKH, SASH and HASH Examples of this invention indicate that this undesired pathway as laid out in FIG. 1 and FIG. 2 is promoted by potassium and by sodium. Quite surprisingly and beneficially the LOXLiH and LOXMgH$_2$ Examples of this invention clearly indicate that the reaction pathways of FIGS. 1 and 2 are greatly suppressed and for all intents and purpose even eliminated when these novel catalyst of this invention are employed in the hydrogen mediated saline hydride initiated polymerizations processes also of this invention.

It is important to note that the undesirably high levels—greater than 3% of the polymer chains—of quaternary carbons only results when the polymer chain initiating species is an α-methylbenzyl anion ArC(R)H$^-$ (where R=CH$_3$) whether formed from ethylbenzene or formed from styrene. For the anion ArC(R)H$^-$ where R=H (i.e. initiator formed from a methylbenzene e.g. toluene) it is structurally impossible to form a quaternary carbon linkage no matter how frequently a pathway analogous to FIG. 1 takes place. As Comparative Example 44 demonstrates, for the anion ArC(R)H$^-$ when R is alkyl group bigger than CH$_3$ (e.g. CH$_2$CH$_3$ as in Example 40) and likewise inductively a better electron donor than CH$_3$, then the pathways of FIGS. 1 and 2 are reduced significantly and consequently compositions having less than 3% even less than 1% of the chains with quaternary carbon linkage can result. This should be clear by inspection of the following structures below.

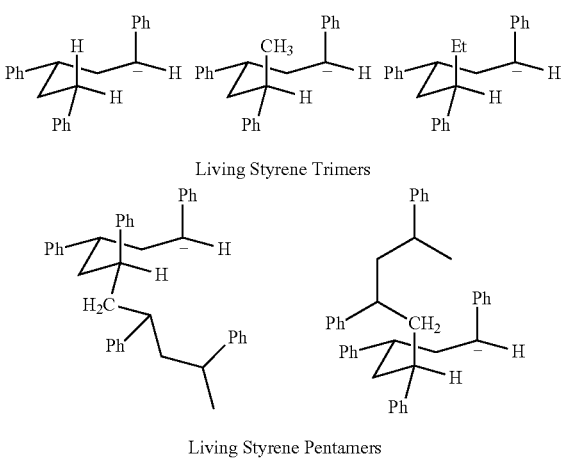

Living Styrene Trimers

Living Styrene Pentamers

Figure 2:
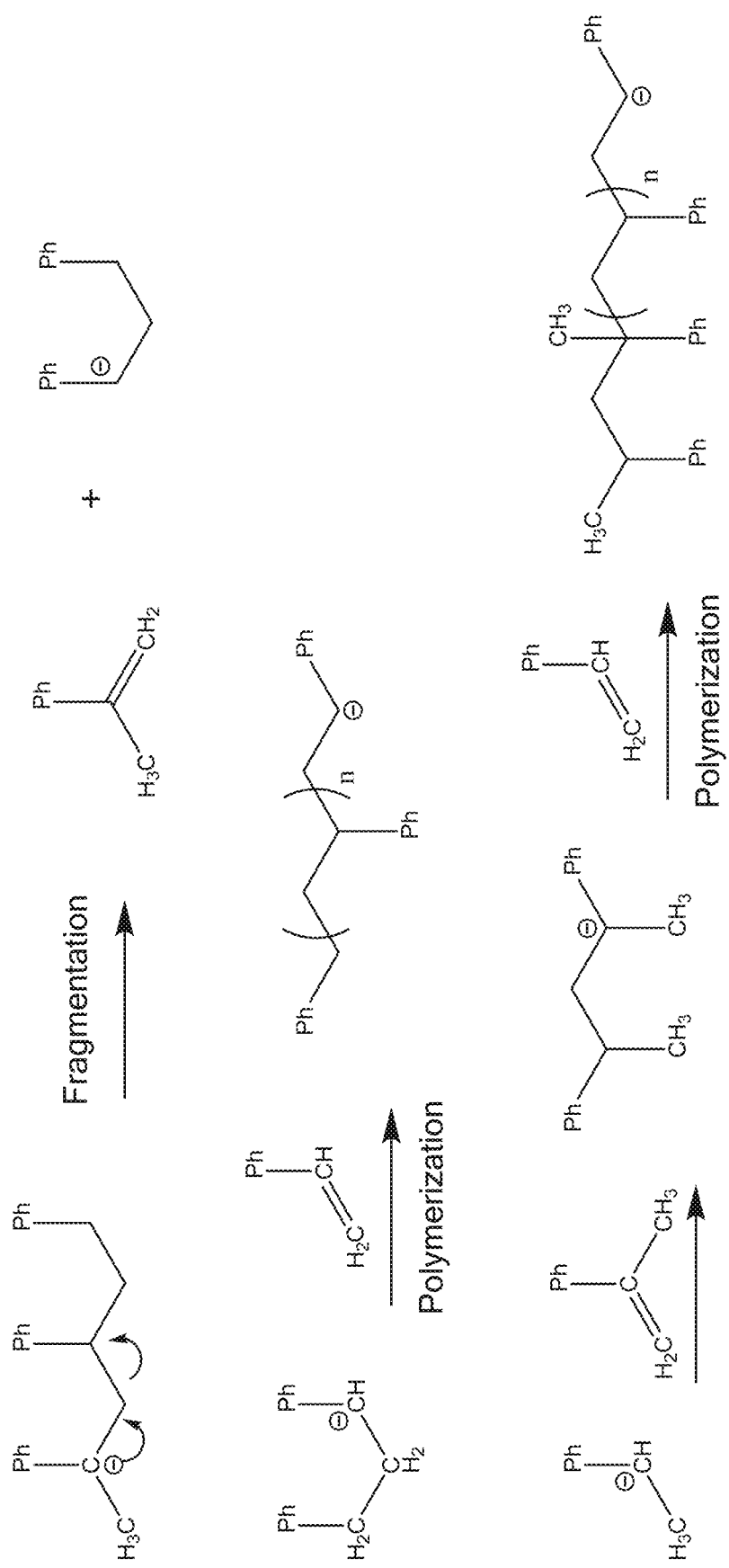
FIG. 2 is a drawing explaining the chemical reaction pathway that entails fragmentation of an isomerized living (meaning ionized or as the poly(styryl) anion or alkyl) anionic styrene trimer or styrene trimer equivalent with subsequent polymerization to form polymer chains having formula weights given by the equations: $FW_i=[i(104)+2-14]$ Daltons as well as a discrete oligomer with $FW_i=[i(104)+2+14]$ Daltons.

As can now be explained in the light of the discoveries of this invention, it should be further understood that the isomerization reaction—backbiting pathway—of FIG. 1 essentially only occurs for the living trimer of styrene. One of ordinary skill in the art would recognize that the backbiting pathway involving a living styrene tetramer, pentamer, hexamer etc. etc. would force a phenyl group or the poly(styryl) chain into a disfavored position and hence backbiting is suppressed. This should be clear from the chemical structures depicting the living pentamers above. Accordingly the extent of undesired chain isomerization reaction arising from backbiting or intramolecular proton transfer is dictated by stereo electronic effects. The transition state or activated complex involves 6 atoms (5 carbons and one proton) and is suppressed when the group alpha to the proton to be transferred is large and a stronger electron donor. Surprisingly the nature of the cation associated with the anion has a dramatic effect on the proton transfer reaction. Thus the intramolecular proton transfer of the living trimer is greatly suppressed by magnesium and essentially eliminated by lithium as compared to other alkali and alkaline earth metals. Accordingly, sodium, potassium and all other Group 1 and Group 2 metals promote the undesired intramolecular proton transfer and this backbiting reaction produces composition with less desired polymer microstructure. This is particularly problematic when forming compositions from either ethylbenzene in combination with styrene, or from styrene alone.

Ethylbenzene is an ineffective chain transfer agent when using lithium based chain transfer catalyst (e.g. catalyst formed form ethylbenzene, butyllithium and TMEDA, Table I above Example D from EP O 741 147). However the novel monometallic lithium and the novel bimetallic lithium and magnesium catalysts used in combination with the novel hydrogen mediated saline hydride initiated polymerization process of this invention, afford for the first time anionic chain transfer polystyrene distributions free of an added organic chain transfer agent and having very high—greater than 97% even greater than 99.2%—of the desired "head to tail" polymer microstructure and incorporating essentially no other initiating species other than a hydride ion—such microstructure integrity that is necessary for further derivatization via aromatic electrophilic substitution reactions of polystyrene compositions.

Analytical Methods

Molecular weight distributions in terms of $M_w$, $M_n$, $M_z$, PD and $M_w$ 10% High values for low molecular weight ($M_w$<1600 Daltons) were obtained by GPC using a Viscotek TDA modular system equipped with a UV detector, autosampler, pump, and temperature controlled column compartment. The columns used were Agilent Oligopore columns, 300 mm by 7.5 mm, part number 1113-6520. The solvent used was tetrahydrofuran, HPLC grade. The test procedure used entailed dissolving approximately 0.06-0.1 g of sample in 10 mL of THF. An aliquot of this solution is filtered and 200λ, is injected on the columns. Based on isolated 1,3-diphenylbutane (dimer) and 1,3,5-triphenylhexane (trimer) adducts, and the mode of separation is size exclusion, peaks are identified according to their order of elution as 1,3-diphenylbutane, 1,3,5-triphenylhexane, 1,3,5,7-tetraphenyloctane (tetramer), 1,3,5,7,9-pentaphenyldecane (pentamer), etc. The individual peaks of the oligomeric material are then assigned theoretical molecular weight values. A calibration curve is constructed using these theoretical values and their corresponding retention times. Based on this calibration, the overall distribution data is calculated and reported. The calculations were performed by the Viscotek Omnisec, version 4.2.0.237 gel permeation chromatography (GPC) data collection and processing system.

Molecular weight distributions in terms of $M_w$, $M_n$, $M_z$ and PD values for higher molecular weight ($M_w$>1600 Daltons) were obtained by GPC using a Viscotek TDA modular system equipped with a UV detector, autosampler, pump, and temperature controlled column compartment. The following three Agilent Technologies columns were used in series to perform the separation: (1) Oligopore column, 300 mm by 7.5 mm, part number 1113-6520, (1) Mixed Bed E, 300 mm×7.5 mm, part number 1110-6300, and (1) Mixed Bed D, 300 mm×7.5 mm, part number 1110-6504. The solvent used was tetrahydrofuran, HPLC grade. The test procedure used entailed dissolving approximately 0.06-0.1 g of sample in 10 mL of THF. An aliquot of this solution is filtered and 200λ, is injected on the columns. Based on isolated 1,3-diphenylbutane(dimer) and 1,3,5-triphenylhexane (trimer) adducts, and the mode of separation is size exclusion, peaks are identified according to their order of elution as 1,3-diphenylbutane, 1,3,5-triphenylhexane, 1,3,5,7-tetraphenyloctane (tetramer), 1,3,5,7,9-pentaphenyldecane (pentamer), etc. The individual peaks of the oligomeric material are then assigned theoretical molecular weight values. A calibration curve is constructed using these theoretical values and their corresponding retention times along with the retention times of polystyrene reference standards of known molecular weight. Based on this calibration, the overall distribution data is calculated and reported. As above the calculations were performed by the Viscotek Omnisec, version 4.2.0.237 gel permeation chromatography (GPC) data collection and processing system.

The gas chromatography method and conditions for analyses of low molecular styrene oligomers (dimers thru hexamers) was as follows. Styrene oligomeric mixtures obtained from wiped film distillation and/or kugelrohr distillation from the product resin were analyzed using a Hewlett Packard HP 6850 gas chromatograph equipped with an Agilent Technologies DB-5 30 meter, 0.25 mm I.D., 0.25 μm column. Oligomer samples were prepared as 2.5 wt % solutions in methylene chloride and manually injected (injection temperature of 270° C.), separated using a temperature program with a helium carrier gas and response measured using a flame ionization detector. The temperature program was as follows: a) 100° C. initial temperature w/2 min hold w/carrier gas flow rate of 1.5 ml/min; b) programed temperature rise to 300° C. at 8° C./min w/carrier gas flow rate of 2.0 ml/min; c) 10.0 min hold an 300° C. w/carrier gas flow rate of 2.0 ml/min; d) programed temperature rise to 320° C. at 3.0° C./min w/carrier gas flow rate of 2.0 ml/min; and e) 15.0 min hold at 320° C. w/carrier gas flow rate of 2.0 ml/min. Data was collected and analyzed using Atlas 8.2.3 chromatography data system. Microstructure assignment was made based on isolated standards or mixtures of standards for the oligomers grouped based on the number of styrene monomer units (i.e dimers separate from trimers separate from tetramers separate from pentamers separate from hexamers) incorporated in the oligomer microstructure and normalized based on total area counts for said group. Additionally oligomer mixtures were analyzed by mass spectrometry to further confirm assignment of oligomer structures formed from the competing undesired fragmentation polymerization process of FIGS. 1 and 2 above (i.e discrete oligomer with $FW_i$=[i(104)+2−14] Daltons as well as a discrete oligomer with $FW_i$=[i(104)+2+14] where i is the number of: 1) styrene monomer units; or 2) is the number of aromatic rings for an ethylbenzene styrene chain transfer polymerization product; incorporated in the discrete oligomer chain of interest). As is demonstrated in FIGS. 3-17, it is clear and unequivocal from the application of this GC method of microstructure analysis that compositionally related yet quite different prior art technologies provide compositions with drastically dissimilar and undesirable amounts of oligomeric microstructures for the first six discrete oligomer structures. Furthermore this technique of analyzing the dimers thru hexamers product mixture, especially the trimeric and tetrameric oligomers, is deemed to be predictive of the microstructure integrity or purity of entire polymeric distribution. Thus it is deemed sufficient that the microstructure purity of the entire distribution can be established by this oligomer analyses. Thus the preferred LOXSH PS and HMAPS compositions are easily differentiated from prior art compositions by the oligomer test whether the GC analyses is conducted over the first 5 (dimers through hexamers) oligomers or only the trimers and tetramers. Such microstructure purity is deemed to be a superior advantage over the prior art and is an advancement in forming polystyrene compositions deemed as polymeric by the OECD definition of a polymer and comprised essentially if not solely of styrene monomer.

Determination of Empirical Formula for Catalyst and Reagent Compositions of this Invention As mentioned above the complications brought on by the degree of association of alkyllithium compound as initiators as well as mixed organometallic as initiators for living anionic polymerization reactions of styrene and conjugated dienes is well established in the art (in this connection see Hsieh H. L. and Quirk, R. P. *Anionic Polymerization Principles and Practical Applications*, Marcel Dekker, 1996, New York, pp 135-132 especially Table 6.2 pg. 138). The degree of association of n-butyllithium is generally 6 wherein the degree of association of t-butyllithium and sec-butyllithium is generally 4 in hydrocarbon solvents. Thus only one in six n-butyllithium agents in the aggregate of the associated alkyllithium compound initiates living polymerization; one in four for both sec-butyllithium and t-butyllithium. A concept of this invention is that by analogy only one hydride per aggregate of the catalyst composition will initiate anionic polymerization. Thus the inverse ratio of the number of polymers formed to the number of aggregates that in theory could be formed under living anionic polymerization, should provide evidence for the average constitutional catalyst compositions of this invention.

As was mentioned above, the only two known hydrocarbon soluble lithium hydride reagents existed as aggregates having the molecular formulae [(t-BuOLi)$_{16}$(LiH)$_{17}$] for the super aggregate formed via photo-degradation and [(DipNPPh$_2$)$_4$Li$_8$H$_4$] (Dip, 2,6-iPr$_2$C$_6$H$_3$) for Stash's hydrocarbon soluble LiH complex. In both cases the molecular formulae were determined by isolation and x-ray crystallography. The catalyst compositions of this invention are not of necessity isolated such that x-ray crystallography or say combustion analyses or other modern method of chemical analyses can be conducted. The term empirical formula as commonly used in the art is a chemical formula in which the subscripts are the smallest integers that give the ratio of atoms in one molecule. Here, however, we define "empirical formula" as the chemical formula of the constituents as the whole number ratio of the polarizing complexing agent(s), the saline metal(s) and the total ionic hydride present in the catalyst composition. Furthermore the catalyst composition is taken as the constituent composition of the catalysts aggregates wherein each aggregate will initiate only one living anionic polystyrene chain.

The catalyst compositions of this invention in terms of their constituents are known because: (1) well understood and well characterized reagents are used in forming the catalyst compositions; and (2) the relative charge ratios clearly define the catalyst reaction mixture in terms of (a) the relative ratios of the polarizing complexing agent(s), (b) the saline metal(s) and (c) the active metal alkyl and hence the total ionic hydride present. However the state of aggregation of the catalyst(s) cannot be known simply based on these simple charge ratios of known components. A simple test to determine the average or in this context "empirical formula" (as defined in this context above) of the catalyst aggregate composition has been devised. This test entails the application of the catalyst as reagents as initiators for living anionic polymerization of styrene (APS) under inert hydrogen free atmosphere (i.e. free of all forms of chain transfer, Examples 33-37). The ratio of the number average molecular weight of the resulting APS distribution (M$_{n\,APS}$) is then related to the theoretical number average molecular weight M$_{n\text{-}Th}$. Wherein M$_{n\text{-}Th}$ 104*[mole of styrene charged]/[total mole of hydride formed] and wherein each mole of hydride formed is equal to the total equivalents of active lithium alkyl and active magnesium alkyl from which the hydride is formed (wherein an active lithium alkyl provides one equivalent and an active magnesium alkyl provides two equivalents). To illustrate this analytical technique Example 36 is reviewed. In Example 36 a catalyst was formed from a charge ration that entails 1 mole of dimethylethanolamine, 2 moles of n-butyllithium and 1 mole of hydrogen. Thus this catalyst forming reaction would produce a catalyst composition having the chemical formula [DMEA$^-$]Li$_2$H. To this catalyst composition was charged styrene (10.5 mole) which is 21 mole relative to the amount of lithium hydride present in the catalyst and hence M$_{n\text{-}Th}$≈104*21≈2184 Daltons. However the M$_{n\,APS}$ determined experimentally was 8447 and accordingly M$_{n\,APS}$/M$_{n\text{-}Th}$=8447/2184=3.9≈4. Based on this it is concluded that an aggregate comprised of [DMEA$^-$]$_4$Li$_8$H$_4$ was formed in the reaction mixture and only one of the hydride present in the aggregates initiates living anionic polymerization of styrene under an inert atmosphere. This empirical formula [DMEA$^-$]$_4$Li$_8$H$_4$ compares well with the molecular formula [(DipNPPh$_2$)$_4$Li$_8$H$_4$] obtained by x-ray crystallography by Stasch for his aggregate formed from one mole of the bulky phosphinous amide ligand DipNHPPh$_2$, 2 mole of sec-butyllithium, and phenylsilane. Thus in fact by simple analogy to Stasch's hydrocarbon soluble LiH complex and the application of this test method, strong evidence exist that the empirical formula [DMEA$^-$]$_4$Li$_8$H$_4$ is in fact the molecular formula for at least a portion of the catalyst composition aggregates of Example 36. It is pointed out that the lowest whole number ratio for [DMEA$^-$]$_4$Li$_8$H$_4$ is [DMEA$^-$]Li$_2$H, however this formula brings with it little information about the catalyst aggregate composition(s) as they are used in the practice of this invention. It is also pointed out that the practitioner of this invention when desired may use multiple polarizing complexing agents such that the aggregates formed are comprised for example as [PCA$^-$]$_4$Li$_8$H$_4$ wherein each [PCA$^-$] is independently the same or different.

TABLE III

LOXLiH catalyst small scale screening Examples with ca. ¼ styrene monomer feed.

| | Example | | | | |
|---|---|---|---|---|---|
| | 1 | 2 | 3 | 4 | 5 |
| Temp Catalyst Formed, ° C. | 20-24 | 23 | 25-27 | 30-32 | 31-48 |
| Temperature, ° C. | 80 | 80 | 80 | 80 | 80 |
| Hydrogen, psig | 5 | 6 | 13 | 13 | 13 |
| Solvent | EB | EB | CH | CH | CH |
| Mass, g | 434.2 | 434.2 | 384.9 | 384.9 | 384.9 |
| Ethylbenzene moles | 4.09 | 4.09 | 0.00 | 0.00 | 0.00 |
| DMEAH (g) | 2.36 | 1.22 | 2.27 | 2.30 | 2.30 |
| moles | 0.0265 | 0.0137 | 0.0255 | 0.0258 | 0.0258 |
| Ethylbenzene (g) | 71.5 | 139.5 | 134.7 | 135.01 | 135.01 |
| moles | 0.67 | 1.32 | 1.27 | 1.27 | 1.27 |
| vol, ml | 82 | 161 | 155 | 156 | 156 |
| TMEDA (g) | 12.13 | 6.31 | 12.22 | 6.50 | 3.25 |
| moles | 0.104 | 0.054 | 0.105 | 0.056 | 0.028 |
| vol, ml | 15.65 | 8.14 | 15.77 | 8.39 | 4.19 |
| n-Butyllithium, M | 2.0 | 2.0 | 2.0 | 2.0 | 2.0 |
| vol, ml | 28.82 | 15.03 | 30.37 | 27.11 | 28.77 |
| moles | 0.0576 | 0.0301 | 0.0607 | 0.0542 | 0.0575 |
| Styrene (g) | 240 | 247.7 | 257.2 | 258 | 263 |
| moles | 2.30 | 2.38 | 2.47 | 2.48 | 2.53 |

TABLE III-continued

LOXLiH catalyst small scale screening Examples with ca. ¼ styrene monomer feed.

| | Example | | | | |
|---|---|---|---|---|---|
| | 1 | 2 | 3 | 4 | 5 |
| vol, ml | 264 | 272 | 283 | 284 | 289 |
| feed rate ml/min | 7.50 | 7.96 | 7.50 | 7.00 | 7.00 |
| time of feed, min | 35 | 34 | 38 | 41 | 41 |
| feed rate g/min | 6.82 | 7.24 | 6.82 | 6.36 | 6.36 |
| feed velocity ft/sec | 2.02 | 2.15 | 2.02 | 1.89 | 1.89 |
| Process Scale-Up Parameters | | | | | |
| mole organolithium/mole DMEAH | 2.18 | 2.20 | 2.38 | 2.10 | 2.23 |
| Mole TMEDA/mole LiH* | 3.35 | 3.32 | 2.98 | 1.03 | 0.486 |
| Initial LiH* conc. ppm | 457 | 220 | 499 | 408 | 457 |
| Initial LiH* conc., M | 0.0500 | 0.0240 | 0.0503 | 0.0411 | 0.461 |
| Final LiH* conc. ppm | 317 | 155 | 345 | 278 | 308 |
| Final LiH* conc., M | 0.034 | 0.017 | 0.034 | 0.028 | 0.031 |
| mole styrene/mole LiH* | 73.9 | 145.3 | 342 | 278 | 309 |
| mole sty/hr/mole LiH* | 126.0 | 254.6 | 111.4 | 129.0 | 115.5 |
| mole styrene/mole of EB | 0.48 | 0.44 | 1.94 | 1.94 | 1.98 |
| mole styrene/hr/mole of EB | 0.82 | 0.77 | 3.09 | 2.88 | 2.88 |
| Solvent stripped polymer yield (g) | 200.4 | 222.0 | 245.0 | 487.5 | |
| yield % on monomer | 83.5% | 89.6% | 95.3% | 93.6% | |
| $M_n$ | 416 | 486 | 702 | 565 | |
| $M_w$ | 579 | 693 | 1091 | 851 | |
| Mz | 794 | 949 | 1489 | 1177 | |
| $PD_n$ | 1.392 | 1.426 | 1.554 | 1.506 | |
| $\sigma_n$ | 260 | 317 | 523 | 402 | |
| $_n\alpha_3$ | 1.961 | 1.822 | 1.537 | 1.719 | |
| Dimer strip. polymer yield (g) | 152.0 | 181.3 | 217.9 | 427.2 | |
| yield % on monomer | 63.3% | 73.2% | 84.7% | 82.0% | |
| $M_n$ | 529 | 600 | 821 | 676 | |
| $M_w$ | 670 | 769 | 1152 | 920 | |
| Mz | 856 | 983 | 1505 | 1210 | |
| $PD_n$ | 1.267 | 1.282 | 1.403 | 1.361 | |
| $\sigma_n$ | 273 | 318 | 521 | 406 | |
| $_n\alpha_3$ | 1.815 | 1.704 | 1.417 | 1.629 | |

TABLE IV

LOXLiH catalyst process Examples with ca. ½ styrene monomer feed without use of a promotor (i.e. TMEDA free).

| | Example | | | | | | | |
|---|---|---|---|---|---|---|---|---|
| | 6 | 7 | 8 | 9 | 10 | 11 | 12 | 13 |
| Temp Catalyst Initially Formed (° C.) | 20 | 34 | 40 | 40 | 55 | 40 | 40 | 35 |
| Rxn. Temperature (° C.) | 80 | 80 | 80 | 80 | 80 | 80 | 80 | 80 |
| Hydrogen (psig) | 59-31 | 59-31 | 65-31 | 17-36 | 15-17 | 15 | 15 | 15 |
| Cyclohexane (g) | 311.6 | 311.6 | 311.6 | 311.6 | 311.6 | 311.6 | 311.6 | 311.6 |
| vol. (ml) | 400 | 400 | 400 | 400 | 400 | 400 | 400 | 400 |
| DMEAH (g) | 2.34 | 2.38 | 3.40 | 3.42 | 2.37 | 4.60 | 4.60 | 4.60 |
| moles | 0.0263 | 0.0267 | 0.0381 | 0.0384 | 0.0266 | 0.0516 | 0.0516 | 0.0516 |
| Ethylbenzene (g) | 106.00 | 106.00 | 106.00 | 110.00 | 120.00 | 100.00 | 100.00 | 100.00 |
| moles | 1.00 | 1.00 | 1.00 | 1.04 | 1.13 | 0.94 | 0.94 | 0.94 |
| vol. (ml) | 122 | 122 | 122 | 127 | 138 | 115 | 115 | 115 |
| n-Butyllithium, M | 2.0 | 2.0 | 2.0 | 2.0 | 2.0 | 2.0 | 2.0 | 2.0 |
| vol. (ml) | 28.59 | 29.25 | 28.59 | 29.23 | 20.28 | 39.28 | 39.02 | 38.87 |
| moles | 0.0572 | 0.0585 | 0.0572 | 0.0585 | 0.0406 | 0.0786 | 0.0780 | 0.0777 |
| Styrene, g | 447.0 | 452.6 | 471.0 | 519.5 | 546.5 | 512.8 | 406.2 | 219.5 |
| moles | 4.29 | 4.35 | 4.52 | 4.99 | 5.25 | 4.92 | 3.90 | 2.11 |
| vol. (ml) | 492 | 498 | 518 | 572 | 601 | 564 | 447 | 241 |
| feed rate (ml/min.) | 7.00 | 5.00 | 5.00 | 5.00 | 5.00 | 7.00 | 5.57 | 4.00 |
| time of feed (min.) | 70.2 | 99.6 | 103.6 | 114.3 | 120.2 | 80.6 | 80.2 | 60.4 |
| feed rate (g/min.) | 6.36 | 4.55 | 4.55 | 4.55 | 4.55 | 6.36 | 5.06 | 3.64 |
| feed velocity (ft/sec.) | 1.89 | 1.35 | 1.35 | 1.35 | 1.35 | 1.89 | 1.50 | 1.08 |
| Process Scale-Up Parameters | | | | | | | | |
| mole organolithium/mole DMEAH | 2.18 | 2.19 | 1.50 | 1.52 | 1.53 | 1.52 | 1.51 | 1.51 |
| Initial LiH* conc. M | 0.056 | 0.058 | 0.035 | 0.036 | 0.025 | 0.049 | 0.048 | 0.047 |
| Initial LiH* conc. ppm | 556 | 571 | 342 | 357 | 247 | 480 | 471 | 465 |
| Final LiH* conc. ppm | 277 | 282 | 166 | 165 | 112* | 223 | 247 | 312 |
| Final LiH* conc., M | 0.028 | 0.029 | 0.017 | 0.017 | 0.011* | 0.023 | 0.025 | 0.032 |
| mole styrene/mole LiH* | 138.8 | 136.7 | 237.5 | 248.1 | 375.3 | 182.7 | 147.5 | 80.7 |

TABLE IV-continued

LOXLiH catalyst process Examples with ca. ½ styrene monomer feed without use of a promotor (i.e. TMEDA free).

| | Example | | | | | | | |
|---|---|---|---|---|---|---|---|---|
| | 6 | 7 | 8 | 9 | 10 | 11 | 12 | 13 |
| mole sty/hr/mole LiH* | 118.5 | 82.4 | 137.5 | 130.3 | 187.3 | 136.0 | 110.3 | 80.2 |
| mole styrene/mole of EB | 4.29 | 4.35 | 4.52 | 4.81 | 4.64 | 5.22 | 4.13 | 2.23 |
| mole styrene/hr/mole of EB | 3.67 | 2.62 | 2.62 | 2.52 | 2.31 | 3.89 | 3.09 | 2.22 |
| $M_{n\ calc}$ | 14,433 | 14,217 | 24,706 | 25,808 | 39,037 | 18,999 | 15,343 | 8390 |
| % Efficiency ($M_{n\ calc}/M_n$) · 100% | 3600% | 4000% | 6640% | 6520% | 8070% | 5280% | 4420% | 2640% |
| Solvent stripped polymer yield (g) | 777 | | | 1306 | | | 910 | |
| yield % on monomer | 86.4% | | | 85.0% | | | 79.9% | |
| $M_n$ | 402 | 356 | 372 | 396 | 484 | 360 | 347 | 318 |
| $M_w$ | 564 | 476 | 513 | 601 | 4722 | 506 | 462 | 408 |
| $M_z$ | 809 | 663 | 728 | 1002 | 38108* | 746 | 641 | 545 |
| $PD_n$ | 1.434 | 1.393 | 1.419 | 1.667 | 8.070 | 1.474 | 1.387 | 1.336 |
| $\sigma_n$ | 255 | 207 | 229 | 285 | 1432 | 229 | 200 | 169 |
| $_n\alpha_3$ | 2.402 | 2.447 | 2.407 | 3.456 | 28.594* | 2.695 | 2.438 | 2.323 |
| Dimer strip. polymer yield (g) | 575.34 | | | 1015.71 | | | 606.32 | |
| yield % on monomer | 64% | | | 66% | | | 53% | |
| $M_n$ | 519 | | | 578 | | | 494 | |
| $M_w$ | 639 | | | 2556 | | | 602 | |
| $M_z$ | 826 | | | 31565 | | | 761 | |
| $PD_n$ | 1.231 | | | 4.422 | | | 1.219 | |
| $\sigma_n$ | 250 | | | 1069 | | | 231 | |
| $_n\alpha_3$ | 2.391 | | | 36.368* | | | 2.166 | |

*Hydrogen uptake became exceedingly slow during the last 25 minutes of monomer feed consequently a high molecular weight tail formed as part of the MWD.

TABLE V

LOXLiH catalyst process w/full styrene monomer feed with promotor (i.e. TMEDA) in cyclohexane.

| | Example | | | | | |
|---|---|---|---|---|---|---|
| | 14 | 15 | 16 | 17 | 18 | 19 |
| Temp Catalyst Initially Formed | 37 | 37 | 37 | 37 | 8 | 8 |
| Temperature, °C. | 80 | 80 | 80 | 80 | 80 | 80 |
| Hydrogen (psig) | 16 | 12 | 19 | 21 | 13 | 13 |
| Cyclohexane (g) | 233.7 | 233.7 | 350.6 | 428.5 | 233.7 | 233.7 |
| vol, ml | 300 | 300 | 450 | 550 | 300 | 300 |
| DMEAH (g) | 2.72 | 2.68 | 2.51 | 3.60 | 1.42 | 1.69 |
| moles | 0.0305 | 0.0301 | 0.0281 | 0.0404 | 0.0159 | 0.0190 |
| Ethylbenzene (g) | 140.00 | 140.00 | 82.00 | 60.00 | 140.0 | 140.0 |
| moles | 1.32 | 1.32 | 0.77 | 0.57 | 1.32 | 1.32 |
| vol, ml | 161 | 161 | 95 | 69 | 161 | 161 |
| TMEDA (g) | 1.82 | 1.78 | 2.47 | 3.55 | 3.70 | 3.30 |
| moles | 0.0157 | 0.0153 | 0.0213 | 0.0306 | 0.032 | 0.028 |
| vol, ml | 2.35 | 2.30 | 3.19 | 4.58 | 4.77 | 4.26 |
| n-Butyllithium, M | 2.0 | 2.0 | 2.0 | 2.0 | 2.0 | 2.0 |
| vol, ml | 22.90 | 22.68 | 21.18 | 30.38 | 23.98 | 23.71 |
| moles | 0.0458 | 0.0454 | 0.0424 | 0.0608 | 0.0480 | 0.0474 |
| Styrene, g | 960.4 | 1020.4 | 780.0 | 668.0 | 953.5 | 963.5 |
| moles | 9.22 | 9.80 | 7.49 | 6.41 | 9.16 | 9.25 |
| vol, ml | 1057 | 1123 | 858 | 735 | 1049 | 1060 |
| feed rate ml/min | 7.00 | 7.00 | 7.00 | 7.00 | 7.00 | 7.00 |
| time of feed, min | 151 | 160 | 123 | 105 | 150 | 151 |
| feed rate g/min | 6.36 | 6.36 | 6.36 | 6.36 | 6.36 | 6.36 |
| feed velocity ft/sec | 1.89 | 1.89 | 1.89 | 1.89 | 1.89 | 1.89 |
| Process Scale-Up Parameters | | | | | | |
| mole organolithium/mole DMEAH | 1.50 | 1.51 | 1.50 | 1.50 | 3.01 | 2.50 |
| Mole TMEDA/mole LiH | 1.02 | 1.00 | 1.50 | 1.50 | 0.99 | 1.00 |
| Initial LiH* conc. M | 0.0314 | 0.0314 | 0.0250 | 0.0311 | 0.0653 | 0.0581 |
| Initial LiH* conc., ppm | 307 | 307 | 249 | 312 | 641 | 570 |
| Final LiH* conc. ppm | 90 | 86 | 91 | 136 | 188 | 166 |
| Final LiH* conc. M | 0.009 | 0.009 | 0.009 | 0.014 | 0.019 | 0.017 |
| mole styrene/mole LiH* | 603.4 | 640.6 | 527.4 | 314.8 | 285.8 | 325.1 |
| mole sty/hr/mole LiH* | 239.9 | 239.7 | 258.1 | 179.9 | 114.4 | 128.8 |
| mole styrene/mole of EB | 6.98 | 7.42 | 9.68 | 11.33 | 6.93 | 7.00 |
| mole styrene/hr/mole of EB | 2.78 | 2.78 | 4.74 | 6.48 | 2.78 | 2.78 |
| $M_{n\ calc}$ | 62,755 | 66,627 | 54,847 | 32,740 | 29728 | 33808 |
| % Efficiency ($M_{n\ calc}/M_n$) · 100% | 14,295% | 15,567% | 13576% | 7908% | 6710% | 7900% |
| Solvent stripped polymer yield (g) | 1793 | | 1309 | | 1744 | |
| yield % on monomer | 90.5% | | 90.4% | | 91.0% | |
| $M_n$ | 439 | 428 | 404 | 414 | 443 | 428 |

TABLE V-continued

LOXLiH catalyst process w/full styrene monomer feed with promotor (i.e. TMEDA) in cyclohexane.

| | Example | | | | | |
|---|---|---|---|---|---|---|
| | 14 | 15 | 16 | 17 | 18 | 19 |
| $M_w$ | 628 | 636 | 561 | 577 | 664 | 613 |
| Mz | 886 | 979 | 778 | 804 | 1040 | 881 |
| $PD_n$ | 1.411 | 1.539 | 1.387 | 1.393 | 1.566 | 1.437 |
| $\sigma_n$ | 288 | 298 | 252 | 260 | 313 | 281 |
| $_n\alpha_3$ | 2.108 | 2.778 | 2.098 | 2.127 | 2.901 | 2.292 |
| Dimer strip. polymer yield (g) | 1492 | | 1076 | | 1452 | |
| yield % on monomer | 75.3% | | 74.3% | | 75.8% | |
| $M_n$ | 530 | | 500 | | 551 | |
| $M_w$ | 731 | | 647 | | 747 | |
| Mz | 1150 | | 848 | | 1109 | |
| $PD_n$ | 1.379 | | 1.294 | | 1.356 | |
| $\sigma_n$ | 326 | | 271 | | 329 | |
| $_n\alpha_3$ | 3.661 | | 1.961 | | 3.118 | |

TABLE VI

LOXLiH catalyst process with full styrene monomer feed with promotor (i.e. TMEDA) in methylcyclohexane (MCH).

| | Example | | | | |
|---|---|---|---|---|---|
| | 20 | 21 | 22 | 23 | 24 |
| Temp Catalyst Initially Formed | −5 | −5 | 5 | −5 | −5 |
| Temperature, ° C. | 80 | 80 | 80 | 80 | 80 |
| Hydrogen (psig) | 14 | 20 to 15 | 25 | 15 | 13 |
| Methylcyclohexane (g) | 231.0 | 231.0 | 231.0 | 231.0 | 231.0 |
| vol, ml | 300 | 300 | 300 | 300 | 300 |
| DMEAH (g) | 1.00 | 1.00 | 1.35 | 1.35 | 2.27 |
| moles | 0.0112 | 0.0112 | 0.0151 | 0.0151 | 0.0255 |
| Ethylbenzene (g) | 140.0 | 140.0 | 140.0 | 140.0 | 140.0 |
| moles | 1.32 | 1.32 | 1.32 | 1.32 | 1.32 |
| vol, ml | 161 | 161 | 161 | 161 | 161 |
| TMEDA (g) | 2.60 | 2.60 | 3.53 | 3.53 | 12.40 |
| moles | 0.022 | 0.022 | 0.030 | 0.030 | 0.107 |
| vol, ml | 3.35 | 3.35 | 4.55 | 4.55 | 16.00 |
| n-Butyllithium, M | 2.0 | 2.0 | 2.0 | 2.0 | 2.0 |
| vol, ml | 16.81 | 16.81 | 22.73 | 22.73 | 30.79 |
| moles | 0.0336 | 0.0336 | 0.0455 | 0.0455 | 0.0616 |
| Styrene, g | 1042.5 | 255.0 | 949.9 | 930.0 | 1041.0 |
| moles | 10.01 | 2.45 | 9.12 | 8.93 | 10.00 |
| vol, ml | 1147 | 281 | 1045 | 1023 | 1145 |
| feed rate ml/min | 7.00 | 7.00 | 7.00 | 7.00 | 7.00 |
| time of feed, min | 164 | 40 | 149 | 146 | 164 |
| feed rate g/min | 6.36 | 6.36 | 6.36 | 6.36 | 6.36 |
| feed velocity ft/sec | 1.88 | 1.88 | 1.88 | 1.88 | 1.88 |
| Process Scale-Up Parameters | | | | | |
| mole organolithium/mole DMEAH | 3.00 | 3.00 | 3.00 | 3.00 | 2.42 |
| Mole TMEDA/mole LiH | 1.00 | 1.00 | 1.00 | 1.00 | 2.95 |
| Initial LiH* concentration, M (moles/liter) | 0.0465 | 0.0465 | 0.0620 | 0.0620 | 0.0711 |
| Initial LiH* conc., ppm | 459 | 459 | 612 | 612 | 701 |
| Final LiH* concentration, Molarity (moles/liter) | 0.013 | 0.028 | 0.018 | 0.018 | 0.020 |
| Final LiH* conc., ppm | 124 | 277 | 179 | 182 | 198 |
| mole styrene/mole LiH* | 447.0 | 109.3 | 300.8 | 294.5 | 276.7 |
| mole sty/hr/mole LiH* | 163.7 | 163.7 | 120.9 | 120.9 | 101.5 |
| mole styrene/mole of EB Charged | 7.58 | 1.85 | 6.91 | 6.76 | 7.57 |
| mole styrene/hr/mole of EB Charged | 2.78 | 2.78 | 2.78 | 2.78 | 2.78 |
| $M_{n\ calc}$ | 46486 | 11372 | 31290 | 30634 | 28781 |
| % Efficiency ($M_{n\ calc}/M_n$) · 100% | 9980% | 2790% | 6950% | 6840% | 6180% |
| Solvent stripped polymer yield (g) | 1168 | | 1729 | | 966 |
| yield % on monomer | 90.0% | | 92.0% | | 92.8% |
| $M_n$ | 466 | 408 | 450 | 448 | 466 |
| $M_w$ | 675 | 598 | 688 | 702 | 675 |
| Mz | 951 | 932 | 1050 | 1137 | 951 |
| $PD_n$ | 1.409 | 1.559 | 1.526 | 1.620 | 1.409 |
| $\sigma_n$ | 312 | 278 | 327 | 337 | 312 |
| $_n\alpha_3$ | 2.033 | 2.993 | 2.550 | 2.989 | 2.033 |
| Dimer strip. polymer yield (g) | 946 | | 1439 | | 828.4 |
| yield % on monomer | 72.9% | | 76.5% | | 79.6% |
| $M_n$ | 536 | | 594 | | 575 |

TABLE VI-continued

LOXLiH catalyst process with full styrene monomer feed with promotor (i.e. TMEDA) in methylcyclohexane (MCH).

| | Example | | | | |
|---|---|---|---|---|---|
| | 20 | 21 | 22 | 23 | 24 |
| $M_w$ | | 722 | | 792 | 753 |
| Mz | | 1049 | | 1091 | 993 |
| $PD_n$ | | 1.347 | | 1.333 | 1.310 |
| $\sigma_n$ | | 316 | | 343 | 320 |
| $_n\alpha_3$ | | 2.912 | | 2.333 | 1.933 |

TABLE VII

LOXLSH bimetallic catalyst process: LOXKH and $LOXMgH_2$.

| | Example | | | | |
|---|---|---|---|---|---|
| | 25 | 26 | 27 | 28 | 29 |
| Temp Catalyst Initially Formed | 9 | 9 | 9 | −5 | −5 |
| Rxn. Temperature, °C. | 80 | 80 | 80 | 80 | 80 |
| Hydrogen (psig) | 16 | 13 | 13 | 13 | 47-63 |
| Solvent | CH | CH | CH | MCH | MCH |
| Mass, g | 272.7 | 272.7 | 272.7 | 288.8 | 288.8 |
| vol, ml | 350 | 350 | 350 | 375.00 | 375.00 |
| DMEAH (g) | 2.45 | 2.46 | 2.46 | 3.32 | 5.00 |
| moles | 0.0275 | 0.0276 | 0.0276 | 0.0372 | 0.0561 |
| Ethlbenzene (g) | 91.23 | 91.23 | 91.23 | 140.00 | 140.00 |
| moles | 0.86 | 0.86 | 0.65 | 0.86 | 0.86 |
| vol, ml | 105 | 105 | 79 | 105 | 105 |
| TMEDA (g) | 3.26 | 3.26 | 3.26 | 6.51 | 8.61 |
| moles | 0.0280 | 0.0280 | 0.0281 | 0.056 | 0.074 |
| vol, ml | 4.20 | 4.20 | 4.21 | 8.40 | 11.11 |
| Dibutylmagnesium, M | na | na | na | 1.0 | 1.0 |
| vol, ml | 0.00 | 0.00 | 0.00 | 7.00 | 14.02 |
| moles | 0.00 | 0.00 | 0.00 | 0.00700 | 0.01402 |
| Potassium Hydride (g) | 0.55 | 0.28 | 0.14 | 0.00 | 0.00 |
| moles | 0.0138 | 0.0069 | 0.0034 | 0.00 | 0.00 |
| Mass of 30% dispersion in mineral oil | 1.84 | 0.92 | 0.46 | 0.00 | 0.00 |
| n-Butyllithium, M | 2.0 | 2.0 | 2.0 | 2.0 | 2.0 |
| vol, ml | 20.61 | 24.10 | 25.80 | 24.50 | 28.05 |
| moles | 0.0412 | 0.0482 | 0.0516 | 0.0490 | 0.05610 |
| Styrene, g | 990.0 | 996.9 | 990.0 | 1009.0 | 509.5 |
| moles | 9.51 | 9.57 | 9.51 | 9.69 | 4.89 |
| vol, ml | 1089 | 1097 | 1089 | 1110 | 561 |
| feed rate ml/min | 7.00 | 7.00 | 7.00 | 7.00 | 7.00 |
| time of feed, min | 155.6 | 156.7 | 155.6 | 158.6 | 80.1 |
| feed rate g/min | 6.36 | 6.36 | 6.36 | 6.36 | 6.36 |
| feed velocity ft/sec | 1.89 | 1.89 | 1.89 | 1.89 | 1.89 |
| Process Scale-Up Parameters | | | | | |
| total moles active metal | 0.0275 | 0.0275 | 0.0274 | 0.0257 | 0.0280 |
| mole Lithium/mole K (or mole Mg) | 2.99 | 7.00 | 15.00 | 7.00 | 4.00 |
| mole lithium/mole DMEAH | 1.50 | 1.75 | 1.87 | 1.32 | 1.00 |
| mole DMEAH/mole K (or mole Mg) | 2.00 | 4.01 | 8.02 | 5.32 | 4.00 |
| Equivalents metal/mole DMEAH | 2.00 | 2.00 | 1.99 | 1.69 | 1.50 |
| Mole TMEDA/mole metal | 0.510 | 0.509 | 0.510 | 1.001 | 1.057 |
| Initial hydride conc. (moles/liter) | 0.0573 | 0.0568 | 0.0598 | 0.0502 | 0.0540 |
| mole styrene/mole hydride equivalents | 346 | 348 | 346 | 376 | 174 |
| mole sty/hr/mole hydride equivalents | 133 | 133 | 134 | 142 | 131 |
| mole styrene/mole of EB charged | 11.0 | 11.1 | 14.7 | 11.3 | 5.7 |
| mole styrene/hr/mole of EB charged | 4.26 | 4.26 | 5.68 | 4.26 | 4.26 |
| $M_{n\ calc}$ | 36000 | 36000 | 36000 | 39100 | 18100 |
| % Efficiency $(M_{n\ calc}/M_n) \cdot 100\%$ | 5740% | 5250% | 6200% | 7760% | 3762% |
| Solvent stripped polymer yield (g) | 911 | 935 | 934 | 962 | 492 |
| yield % on monomer | 92.0% | 93.8% | 94.3% | 95.3% | 96.5% |
| $M_n$ | 627 | 689 | 580 | 504 | 481 |
| $M_w$ | 1066 | 1051 | 915 | 773 | 713 |
| Mz | 1559 | 1461 | 1306 | 1180 | 1008 |
| $PD_n$ | 1.700 | 1.527 | 1.578 | 1.534 | 1.482 |
| $\sigma_n$ | 525 | 500 | 441 | 368 | 334 |
| $_n\alpha_3$ | 1.923 | 1.725 | 1.867 | 2.538 | 1.969 |
| Dimer strip. polymer yield (g) | 829 | 845 | 827 | 825 | 427 |
| yield % on monomer | 84% | 85% | 84% | 82% | 84% |
| $M_n$ | 780 | 765 | 717 | 622 | 593 |

TABLE VII-continued

LOXLSH bimetallic catalyst process: LOXKH and LOXMgH$_2$.

| | Example | | | | |
|---|---|---|---|---|---|
| | 25 | 26 | 27 | 28 | 29 |
| $M_w$ | 1151 | 1099 | 997 | 853 | 805 |
| $M_z$ | 1582 | 1486 | 1335 | 1207 | 1116 |
| $PD_n$ | 1.476 | 1.437 | 1.391 | 1.371 | 1.358 |
| $\sigma_n$ | 538 | 505 | 448 | 379 | 355 |
| $_n\alpha_3$ | 1.725 | 1.667 | 1.711 | 2.417 | 2.256 |

TABLE VIII

Less Preferred LOXLiH monometallic catalyst processes and living anionic polystyrene initiated with LOXLiH w/termination by hydrogen.

| | Example | | | | | | | |
|---|---|---|---|---|---|---|---|---|
| | 30 | 31 | 32 | 33* | 34 | 35 | 36 | 37 |
| Catalyst or Initiator Formed (° C.) | 20 | 15 | −5 | 20 | 20 | 20 | 20 | 20 |
| Rxn. Temperature (° C.) | 80 | 80 | 80 | 82 | 82 | 82 | 82 | 82 |
| Reactor Atmosphere | H$_2$ | H$_2$ | H$_2$ | CH | CH | CH | CH | CH |
| Reactor pressure (psig) | 55 | 60 | 60 | 0 | 0 | 0 | 0 | 0 |
| Solvent | CH | CH | MCH | CH | CH | CH | CH | CH |
| mass (g) | 428.5 | 389.5 | 231.0 | 506.4 | 506.4 | 428.5 | 506.4 | 506.4 |
| vol. (ml) | 550 | 500 | 300 | 650 | 650 | 550 | 650 | 650 |
| Polarizing complexing agent | 2-Methoxy-ethanol | DMAEOEH | | | | DMEAH | | |
| Polarizing complexing agent (g) | 2.10 | 3.80 | 4.00 | 6.98 | 7.02 | 5.00 | 5.00 | 3.02 |
| moles | 0.0276 | 0.0285 | 0.0300 | 0.0783 | 0.0788 | 0.0561 | 0.0561 | 0.0339 |
| Ethylbenzene (g) | 95.00 | 95.00 | 136.00 | 65.00 | 65.00 | 65.00 | 65.00 | 65.00 |
| moles | 0.90 | 0.90 | 1.28 | 0.61 | 0.61 | 0.61 | 0.61 | 0.61 |
| vol. (ml) | 110 | 110 | 157 | 75 | 75 | 75 | 75 | 75 |
| TMEDA (g) | 3.35 | 3.35 | 0.00 | 0.00 | 7.12 | 0.00 | 6.80 | 7.90 |
| moles | 0.029 | 0.029 | 0.000 | 0.000 | 0.061 | 0.000 | 0.059 | 0.068 |
| vol. (ml) | 4.32 | 4.32 | 0.00 | 0.00 | 9.19 | 0.00 | 8.77 | 10.19 |
| n-Butyllithium, 2M vol. (ml) | 28.77 | 28.77 | 22.54 | 58.96 | 58.40 | 58.70 | 58.15 | 50.90 |
| moles | 0.0575 | 0.0575 | 0.0451 | 0.1179 | 0.1168 | 0.1174 | 0.1163 | 0.1018 |
| Styrene, g | 160.0 | 131.5 | 131.5 | 131.5 | 130.0 | 130.9 | 131.5 | 131.3 |
| moles | 1.54 | 1.26 | 1.26 | 1.26 | 1.25 | 1.26 | 1.26 | 1.26 |
| vol, ml | 176 | 145 | 145 | 145 | 143 | 144 | 145 | 144 |
| feed rate ml/min | 5.00 | 5.00 | 5.00 | 4.80 | 4.80 | 4.80 | 4.80 | 4.80 |
| time of feed, min | 35.2 | 28.9 | 28.9 | 30.1 | 29.8 | 30.0 | 30.1 | 30.1 |
| feed rate g/min | 4.55 | 4.55 | 4.55 | 4.36 | 4.36 | 4.36 | 4.36 | 4.36 |
| feed velocity ft/sec | 1.35 | 1.35 | 1.35 | 1.29 | 1.29 | 1.29 | 1.29 | 1.29 |
| Process Scale-Up Parameters | | | | | | | | |
| mole lithium/mole polarizing complexing agent | 2.08 | 2.02 | 1.50 | 1.51 | 1.48 | 2.09 | 2.07 | 3.00 |
| Mole TMEDA/moleLIH | 0.96 | 0.99 | 0.00 | 0.00 | 1.61 | 0.00 | 0.97 | 1.00 |
| Initial LiH Molarity | 0.0432 | 0.0451 | 0.0314 | 0.0505 | 0.0480 | 0.0897 | 0.0760 | 0.0864 |
| Initial LiH conc. (ppm) | 432 | 449 | 308 | 505 | 480 | 896 | 762 | 868 |
| Final LiH conc. (ppm) | 335 | 357 | 230 | 417 | 398 | 722 | 630 | 717 |
| mole styrene/mole LiH | 51.3 | 43.5 | 83.9 | 31.9 | 32.8 | 20.5 | 21.0 | 18.6 |
| mole sty/hr/mole LiH | 87.4 | 90.3 | 174.1 | 63.5 | 66.1 | 41.0 | 41.8 | 37.0 |
| mole styrene/mole EB | 1.71 | 1.41 | 0.98 | 2.06 | 2.04 | 2.05 | 2.06 | 2.06 |
| mole styrene/hr/mole EB | 2.92 | 2.92 | 2.04 | 4.10 | 4.10 | 4.10 | 4.10 | 4.10 |
| polymer yield, g | 150 | not isolated | not isolated | 112 | 125 | 118 | 114 | 128 |
| yield % on monomer** | 94% | na. | na. | 86% | 96% | 90% | 86% | 97% |
| $M_{n\ calc}$ | 5338 | 4528 | 8731 | 3316 | 3413 | 2134 | 2183 | 1933 |
| % Efficiency ($M_{n\ calc}/M_n$) · 100% | 86% | 95% | 1172% | 49% | 67% | 35% | 26% | 11% |
| $M_n$ | 6179 | 4755 | 745 | 6707 | 5084 | 6148 | 8447 | 17972 |
| $M_w$ | 14,550 | 183,233 | 23,605 | 15,064 | 15,947 | 17,445 | 19,116 | 37,183 |
| $M_z$ | 22,964 | 550,722 | 139,795 | 21,423 | 24,967 | 24,274 | 26,143 | 49,015 |
| $PD_n$ | 1.578 | 3.006 | 5.922 | 1.422 | 1.566 | 1.391 | 1.368 | 1.318 |
| $\sigma_n$ | 7192 | 29,132 | 4127 | 7487 | 7432 | 8334 | 9493 | 18581 |
| $_n\alpha_3$ | 2.338 | 18.914 | 34.431 | 1.751 | 2.559 | 1.883 | 1.560 | 1.299 |

*This living anionic polymerization run (Example 33) was terminated transferred to the wash reactor under positive nitrogen pressure applied at the end of the styrene monomer feed. The reaction mass had the characteristic red color of a living anionic polymerization. The living anionic polymer distributions of Examples (34-37) were terminated with 65 PSIG H$_2$ and then subsequently transferred to the wash reactor after observing a pressure drop of 2-5 PSIG H$_2$. The transferred reaction masses were light pink in color before further quenching with water thus indicating termination of most if not essentially all of the living anionic polymer chains by H$_2$.

**Yields below 100% are the result of sampling as well as hold up of these relatively high molecular weight polymers in the wash reactor after stripping ethylbenzene-no evidence of incomplete conversion of styrene or significant formation of ethylbenzene.

TABLE IX

Lithium hydride initiated Living APS Distributions Prepared at from either: 1) $[DMEA^-]_8Li_{12}H_4$ w/$[DMEA^-]_9Li_{14}H_5$ Empirical Catalyst Composition; or 2) $[DMEA^-]_{17}Li_{22}H_5$ w/ $[DMEA^-]_{16}Li_{20}H_4$ Empirical Catalyst Composition; Under a Cyclohexane Atmosphere.

| | Example 40 | Example 41 |
|---|---|---|
| Temperature, °C. | 77-79 | 77-79 |
| Atmosphere | Cyclohexane | Cyclohexane |
| Cyclohexane (psig) | −2 to 0 | −1 to 0 |
| RPM | 1130 | 1130 |
| Cyclohexane (ml) | 500 | 500 |
| Cyclohexane (g) | 385 | 385 |
| Targeted $[DMEA^-]_xLi_yH_z$ catalyst component ratio | $[DMEA^-]_2Li_3H$ | $[DMEA^-]_3Li_4H$ |
| DMEAH (g) | 5.18 | 5.18 |
| moles | 0.0581 | 0.0581 |
| 2M n-Butyllithium (ml) | 44.95 | 38.64 |
| moles | 0.0899 | 0.0773 |
| Styrene, g | 98.0 | 102.0 |
| moles | 0.94 | 0.98 |
| Cyclohexane diluent (g) | 90 | 90 |
| Total Styrene Feed vol. (ml) | 200 | 200 |
| feed rate ml/min | 5.00 | 5.00 |
| time of feed, min | 22 | 22 |
| mole Li/mole DMEAH | 1.55 | 1.33 |
| Initial LiH conc. (M) | 0.058 | 0.036 |
| Final LiH conc. (M) | 0.050 | 0.030 |
| Initial LiH conc. (ppm) | 594 | 362 |
| Final LiH conc. (ppm) | 483 | 292 |
| mole styrene/mole LiH | 29.6 | 51.1 |
| $M_{n\ calc}$ | 3,081 | 5,318 |
| Efficiency ($M_{n\ calc}/M_{n\ exp.}$) | 0.22 | 0.21 |
| Theoretical yield (g) | 98 | 102 |
| APS polymer yield (g) | 90 | 90 |
| yield % on Styrene | 91.8% | 88.2% |
| $M_n$ | 13,845 | 25,652 |
| $M_w$ | 38,933 | 39,057 |
| $M_z$ | 65,777 | 61,865 |
| $PD_n$ | 1.689 | 1.584 |
| $\sigma_n$ | 18,637 | 18,544 |
| $_n\alpha_3$ | 2.838 | 2.923 |

TABLE X

HMAPS Distributions Prepared at 80° C., 1130 RPM Mixing, with Fresh Solvents (Cyclohexane and Ethylbenzene); TMEDA with $[DMEA^-]_2Li_3H$ Catalyst - Demonstrating the Effect of $H_2$ pressure and Styrene Feed Rate on the HMAPS MWD Formed.

| | Example 42 | 43 | 44 | 45 | 46 | 47 |
|---|---|---|---|---|---|---|
| $H_2$ Pressure (psig) | 13 | 12 | 11 | 10 | 10 to 9 | 10 |
| Cyclohexane (g) | 233.7 | 233.7 | 233.7 | 233.7 | 233.7 | 233.7 |
| DMEAH (g) | 2.52 | 2.56 | 2.51 | 2.50 | 2.51 | 2.50 |
| moles | 0.0283 | 0.0287 | 0.0282 | 0.0280 | 0.0282 | 0.0280 |
| Ethybenzene (g) | 140.00 | 140.00 | 140.00 | 140.00 | 146.73 | 160.00 |
| moles | 1.32 | 1.32 | 1.32 | 1.32 | 1.38 | 1.51 |
| TMEDA (g) | 3.40 | 3.88 | 3.31 | 3.33 | 3.31 | 3.30 |
| moles | 0.0293 | 0.0334 | 0.0285 | 0.0287 | 0.0285 | 0.0284 |
| 2M-Butyllithium ml | 21.89 | 21.89 | 21.26 | 21.39 | 21.62 | 21.13 |
| moles | 0.0438 | 0.0438 | 0.0425 | 0.0428 | 0.0432 | 0.0423 |
| Styrene, g | 1042.0 | 1042.0 | 1064.0 | 1065.0 | 1063.6 | 1066.4 |
| moles | 10.00 | 10.00 | 10.22 | 10.23 | 10.21 | 10.24 |
| vol, ml | 1146 | 1146 | 1171 | 1172 | 1170 | 1173 |
| feed rate ml/min | 7.00 | 8.00 | 8.36 | 8.80 | 8.80 | 8.80 |
| time of feed, min | 164 | 143 | 140.01 | 133 | 133 | 133 |
| feed rate g/min | 6.36 | 7.27 | 7.60 | 8.00 | 8.00 | 8.00 |
| mole Li/mole DMEAH | 1.55 | 1.52 | 1.51 | 1.53 | 1.54 | 1.51 |
| Mole TMEDA/mole LiH | 1.89 | 2.22 | 1.98 | 1.94 | 1.89 | 2.00 |
| Initial LiH conc. (M) | 0.032 | 0.031 | 0.030 | 0.030 | 0.030 | 0.028 |
| Final LiH conc. (M) | 0.010 | 0.010 | 0.009 | 0.010 | 0.010 | 0.009 |
| Initial LiH conc. (ppm) | 311 | 302 | 288 | 296 | 298 | 272 |
| Final LiH conc. (ppm) | 86 | 83 | 78 | 80 | 82 | 76 |
| mole styrene/mole LiH | 644.8 | 664.0 | 711.1 | 693.9 | 676.8 | 720.0 |
| mole sty/hr/mole LiH | 236.2 | 278.0 | 304.7 | 312.7 | 305.4 | 324.0 |
| mole styrene/mole of EB | 7.58 | 7.58 | 7.73 | 7.74 | 7.38 | 6.78 |
| mole styrene/hr/mole of EB | 2.78 | 3.17 | 3.31 | 3.49 | 3.33 | 3.05 |
| $M_{n\ calc}$ | 67,058 | 69,055 | 73,954 | 72,166 | 70,393 | 74,878 |
| Efficiency | 155.59 | 163.25 | 160.77 | 140.13 | 147.88 | 150.66 |
| $M_n$ | 431 | 423 | 460 | 515 | 476 | 497 |
| $M_w$ | 623 | 611 | 679 | 781 | 710 | 742 |
| $M_z$ | 899 | 894 | 970 | 1116 | 1018 | 1055 |
| $PD_n$ | 1.443 | 1.463 | 1.429 | 1.429 | 1.434 | 1.422 |
| $\sigma_n$ | 288 | 282 | 317 | 370 | 334 | 349 |
| $_n\alpha_3$ | 2.282 | 2.428 | 2.083 | 1.985 | 2.075 | 1.994 |
| $M_w$ 10% High | 1554 | 1529 | 1672 | 1905 | 1754 | 1806 |
| Theoretical yield | 2084 | | 2129 | | 2130 | |
| Solvent stripped polymer yield, (g) | 1914 | | 2009 | | 1999 | |
| yield % on styrene | 91.8% | | 94.4% | | 93.9% | |

TABLE X-continued

HMAPS Distributions Prepared at 80° C., 1130 RPM Mixing, with Fresh Solvents
(Cyclohexane and Ethylbenzene); TMEDA with [DMEA$^-$]$_2$Li$_3$H Catalyst - Demonstrating
the Effect of H$_2$ pressure and Styrene Feed Rate on the HMAPS MWD Formed.

| | | | |
|---|---|---|---|
| Dimer stripped polymer yield, g | 1531 | 1755 | 1743 |
| yield % on monomer | 73.5% | 82.4% | 81.8% |
| $M_n$ | 548 | 593 | 585 |
| $M_w$ | 705 | 804 | 793 |
| $M_z$ | 930 | 1085 | 1072 |
| PD$_n$ | 1.286 | 1.356 | 1.356 |
| $\sigma_n$ | 293 | 354 | 349 |
| $_n\alpha_3$ | 2.112 | 1.947 | 1.969 |
| $M_w$ 10% High | 1596 | 1861 | 1831 |

| | Example | | | |
|---|---|---|---|---|
| | 48 | 49 | 50 | 51 |
| H$_2$ Pressure (psig) | 9 | 11 | 11 | 10 |
| Cyclohexane (g) | 233.7 | 233.7 | 233.7 | 233.7 |
| DMEAH (g) | 2.52 | 2.54 | 2.53 | 2.53 |
| moles | 0.0283 | 0.0285 | 0.0284 | 0.0284 |
| Ethybenzene (g) | 170.00 | 170.00 | 170.00 | 160.00 |
| moles | 1.60 | 1.60 | 1.60 | 1.51 |
| TMEDA (g) | 3.37 | 3.54 | 3.40 | 3.67 |
| moles | 0.0290 | 0.0305 | 0.0293 | 0.0316 |
| 2M-Butyllithium ml | 21.34 | 21.30 | 21.25 | 21.47 |
| moles | 0.0427 | 0.0426 | 0.0425 | 0.0429 |
| Styrene, g | 1157.5* | 1058.8 | 1058.7 | 1059.3 |
| moles | 11.11 | 10.17 | 10.17 | 10.17 |
| vol, ml | 1273 | 1165 | 1165 | 1165 |
| feed rate ml/min | 9.40 | 9.40 | 10.00 | 10.00 |
| time of feed, min | 135 | 124 | 116 | 117 |
| feed rate g/min | 8.54 | 8.54 | 9.09 | 9.09 |
| mole Li/mole DMEAH | 1.51 | 1.50 | 1.50 | 1.51 |
| Mole TMEDA/mole LiH | 2.01 | 2.16 | 2.07 | 2.17 |
| Initial LiH conc. (M) | 0.028 | 0.027 | 0.027 | 0.028 |
| Final LiH conc. (M) | 0.009 | 0.009 | 0.009 | 0.009 |
| Initial LiH conc. (ppm) | 269 | 263 | 263 | 278 |
| Final LiH conc. (ppm) | 72 | 76 | 76 | 78 |
| mole styrene/mole LiH | 771.3 | 720.6 | 720.1 | 698.8 |
| mole sty/hr/mole LiH | 341.6 | 348.9 | 371.0 | 359.8 |
| mole styrene/mole of EB | 6.93 | 6.34 | 6.34 | 6.74 |
| mole styrene/hr/mole of EB | 3.07 | 3.07 | 3.27 | 3.47 |
| $M_{n\ calc}$ | 80,216 | 74,945 | 74,889 | 72,677 |
| Efficiency | 175.53 | 138.79 | 142.65 | 143.63 |
| $M_n$ | 457 | 540 | 525 | 506 |
| $M_w$ | 661 | 815 | 804 | 758 |
| $M_z$ | 941 | 1152 | 1165 | 1080 |
| PD$_n$ | 1.424 | 1.413 | 1.449 | 1.425 |
| $\sigma_n$ | 305 | 385 | 383 | 357 |
| $_n\alpha_3$ | 2.143 | 1.904 | 2.075 | 2.001 |
| $M_w$ 10% High | 1626 | 1963 | 2048 | 1844 |
| Theoretical yield | 2216 | | 2118 | |
| Solvent stripped polymer yield, (g) | 2057 | | 1998 | |
| yield % on styrene | 92.8% | | 94.3% | |
| Dimer stripped polymer yield, g | 1798 | | 1800 | |
| yield % on monomer | 81.1% | | 85.0% | |
| $M_n$ | 591 | | 601 | |
| $M_w$ | 800 | | 836 | |
| $M_z$ | 1078 | | 1142 | |
| PD$_n$ | 1.354 | | 1.391 | |
| $\sigma_n$ | 351 | | 376 | |
| $_n\alpha_3$ | 1.941 | | 1.923 | |
| $M_w$ 10% High | 1855 | | 1955 | |

TABLE XI

HMAPS Distributions Prepared at 80° C., 1130 RPM Mixing, with Fresh Solvents (Cyclohexane Only); w/wo TMEDA with the [DMEA$^-$]$_2$Li$_3$H Catalyst - Demonstrating the Offsetting Effects of H$_2$ pressure, Styrene Feed Rate and TMEDA on the HMAPS MWD Formed.

| | Example | | | | | | | |
|---|---|---|---|---|---|---|---|---|
| | 52 | 53 | 54 | 55 | 56 | 57 | 58 | 59 |
| H$_2$ (psig) | 10 | 13-14 | 13-15 | 14 | 15-17 | 15-17 | 15-17 | 14 |
| Cyclohexane (g) | 389.5 | 389.5 | 389.5 | 389.5 | 389.5 | 389.5 | 389.5 | 389.5 |
| DMEAH moles | 0.0284 | 0.0284 | 0.0285 | 0.0284 | 0.0286 | 0.0286 | 0.0285 | 0.0286 |
| TMEDA (g) | 3.67 | 3.51 | 3.67 | 3.51 | 1.80 | 1.80 | 0.00 | 0.00 |
| moles | 0.0316 | 0.0302 | 0.0316 | 0.0302 | 0.0155 | 0.0155 | 0.0000 | 0.0000 |
| 2M n-Butyllithium (ml) | 21.25 | 21.25 | 21.51 | 21.51 | 21.38 | 21.38 | 21.47 | 21.64 |
| moles | 0.0425 | 0.0425 | 0.0430 | 0.0430 | 0.0428 | 0.0428 | 0.0429 | 0.0433 |
| Styrene, g | 1058.7 | 1060.0 | 1060.0 | 1060.0 | 1060.0 | 1059.0 | 1061.0 | 1063.7 |
| moles | 10.17 | 10.18 | 10.18 | 10.18 | 10.18 | 10.17 | 10.19 | 10.21 |
| vol, ml | 1165 | 1166 | 1166 | 1166 | 1166 | 1165 | 1167 | 1170 |
| feed rate ml/min | 9.40 | 9.40 | 10.00 | 10.00 | 9.40 | 10.00 | 10.00 | 10.00 |
| time of feed, min | 124 | 124 | 117 | 117 | 124 | 117 | 117 | 117 |
| feed rate g/min | 8.54 | 8.54 | 9.09 | 9.09 | 8.54 | 9.09 | 9.09 | 9.09 |
| mole Li/mole DMEAH | 1.50 | 1.50 | 1.51 | 1.52 | 1.49 | 1.49 | 1.51 | 1.51 |
| Mole TMEDA/mole LiH | 2.24 | 2.14 | 2.18 | 2.06 | 1.09 | 1.09 | 0.00 | 0.00 |
| Initial LiH conc. (M) | 0.027 | 0.027 | 0.028 | 0.028 | 0.027 | 0.027 | 0.028 | 0.028 |
| Final LiH conc. (M) | 0.009 | 0.009 | 0.009 | 0.009 | 0.009 | 0.009 | 0.009 | 0.009 |
| Initial LiH conc. (ppm) | 272 | 272 | 280 | 282 | 274 | 274 | 281 | 285 |
| Final LiH conc. (ppm) | 76 | 76 | 78 | 79 | 77 | 77 | 78 | 79 |
| mole styrene/mole LiH | 720.1 | 721.0 | 700.9 | 695.6 | 719.3 | 718.6 | 705.4 | 696.4 |
| mole sty/hr/mole LiH | 348.7 | 348.7 | 360.7 | 357.9 | 347.9 | 370.1 | 362.6 | 357.1 |
| M$_{n\ calc}$ | 74,889 | 74,981 | 72,900 | 72,341 | 74,805 | 74,735 | 73,359 | 72,430 |
| Efficiency | 133.97 | 134.37 | 122.73 | 125.16 | 136.76 | 121.32 | 128.70 | 124.02 |
| M$_n$ | 559 | 558 | 594 | 578 | 547 | 616 | 570 | 584 |
| M$_w$ | 847 | 863 | 927 | 907 | 849 | 958 | 890 | 909 |
| M$_z$ | 1189 | 1245 | 1309 | 1299 | 1208 | 1330 | 1276 | 1286 |
| PD$_n$ | 1.404 | 1.443 | 1.412 | 1.432 | 1.423 | 1.388 | 1.434 | 1.415 |
| σ$_n$ | 401 | 413 | 445 | 436 | 406 | 459 | 427 | 436 |
| $_n$α$_3$ | 1.831 | 2.007 | 1.804 | 1.907 | 1.880 | 1.673 | 1.928 | 1.826 |
| M$_w$ 10% High | 2012 | 2131 | 2199 | 2203 | 2046 | 2207 | 2168 | 2166 |
| Theoretical yield | 2119 | | 2120 | | 2119 | | 2125 | |
| Solvent stripped polymer yield, (g) | 2027 | | 2033 | | 2029 | | 2054 | |
| yield % on styrene | 95.7% | | 95.9% | | 95.8% | | 96.6% | |
| Dimer stripped polymer yield, g | 1824 | | 1846 | | 1825 | | 1826 | |
| yield % on monomer | 86.1% | | 87.1% | | 86.1% | | 85.9% | |
| M$_n$ | 670 | | 699 | | 715 | | 704 | |
| M$_w$ | 924 | | 993 | | 990 | | 984 | |
| M$_z$ | 1234 | | 1343 | | 1313 | | 1334 | |
| PD$_n$ | 1.379 | | 1.421 | | 1.385 | | 1.398 | |
| σ$_n$ | 413 | | 453 | | 443 | | 444 | |
| $_n$α$_3$ | 1.725 | | 1.714 | | 1.630 | | 1.815 | |
| M$_w$ 10% High | 2116 | | 2266 | | 2194 | | 2268 | |

TABLE XII

HMAPS Distributions Prepared at 80°-90° C., 1130 or 1000 RPM Mixing, with Partial Recycle Solvents (Cyclohexane and Ethylbenzene) with the [DMEA$^-$]$_2$Li$_3$H Catalyst

| | Example | | | | | | | |
|---|---|---|---|---|---|---|---|---|
| | 60 | 61 | 62 | 63 | 64 | 65 | 66 | 67 |
| Catalyst Aging Time (min) | 60 | 90 | 45 | 120 | 135 | 95 | 15 | 170 |
| H$_2$ (psig) | 11-12 | 16-13 | 14 | 16 | 13-15 | 13-15 | 18 | 17-19 |
| Temperature, ° C. | 80 | 80 | 80 | 86* | 90 | 90 | 90 | 90 |
| Agitator RPM | 1130 | 1130 | 1000 | 1000 | 1000 | 1000 | 1000 | 1000 |
| Recycle Solvent (ml) | 320 | 320 | 340 | 320 | 320 | 320 | 320 | 320 |
| Cyclohexane (g) | 200.6 | 200.6 | 213.2 | 200.6 | 200.6 | 200.6 | 200.6 | 233.8 |
| Ethylbenzene (g) | 52.05 | 52.05 | 55.30 | 52.05 | 52.05 | 52.05 | 52.05 | 17.17 |
| DMEAH moles | 0.0285 | 0.0230* | 0.0286 | 0.0286 | 0.0285 | 0.0284 | 0.0285 | 0.0285 |
| Fresh Cyclohexane to form catalyst (g) | 140 | 140 | 140 | 140 | 140 | 140 | 140 | 140 |
| 2M n-Butyllithium (ml) | 21.67 | 17.60 | 21.67 | 21.64 | 21.42 | 21.52 | 21.48 | 21.42 |
| moles | 0.0433 | 0.0352 | 0.0433 | 0.0433 | 0.0428 | 0.0430 | 0.0430 | 0.0428 |
| Styrene, g | 1061.0 | 1061.0 | 1041.0 | 1008.7 | 1015.0 | 1035.8 | 1040.1 | 1045.8 |
| moles | 10.19 | 10.19 | 10.00 | 9.68 | 9.75 | 9.95 | 9.99 | 10.04 |
| vol, ml | 1167 | 1167 | 1145 | 1109 | 1117 | 1139 | 1144 | 1150 |
| feed rate ml/min | 10.00 | 10.00 | 10.00 | 10.00 | 9.40 | 9.40 | 9.40 | 9.40 |
| time of feed, min | 117 | 117 | 115 | 111 | 119 | 121 | 122 | 122 |

TABLE XII-continued

HMAPS Distributions Prepared at 80°-90° C., 1130 or 1000 RPM Mixing, with
Partial Recycle Solvents (Cyclohexane and Ethylbenzene) with the [DMEA⁻]₂Li₃H Catalyst

| | Example | | | | | | | |
|---|---|---|---|---|---|---|---|---|
| | 60 | 61 | 62 | 63 | 64 | 65 | 66 | 67 |
| feed rate g/min | 9.09 | 9.09 | 9.09 | 9.09 | 8.54 | 8.54 | 8.54 | 8.54 |
| mole Li/mole DMEAH | 1.52 | 1.53 | 1.52 | 1.51 | 1.50 | 1.52 | 1.51 | 1.50 |
| Initial LiH conc. (M) | 0.0285 | 0.0236 | 0.0272 | 0.0281 | 0.0275 | 0.0281 | 0.0278 | 0.0276 |
| Final LiH conc. (M) | 0.009 | 0.008 | 0.009 | 0.010 | 0.009 | 0.009 | 0.009 | 0.009 |
| Initial LiH conc. (ppm) | 287 | 238 | 274 | 283 | 277 | 283 | 279 | 278 |
| Final LiH conc. (ppm) | 80 | 66 | 80 | 82 | 80 | 80 | 79 | 78 |
| mole styrene/mole LiH | 685.8 | 834.2 | 678.0 | 660.0 | 679.6 | 678.5 | 690.2 | 700.3 |
| mole sty/hr/mole LiH | 352.5 | 428.8 | 355.2 | 357.1 | 343.3 | 335.8 | 340.2 | 343.3 |
| mole styrene/mole of EB | 20.75 | 20.75 | 19.16 | 19.71 | 19.85 | 20.25 | 20.34 | 61.99 |
| mole styrene/hr/mole of EB | 10.66 | 10.66 | 10.04 | 10.66 | 10.02 | 10.02 | 10.02 | 30.39 |
| $M_{n\,calc}$ | 71,324 | 86,756 | 70,512 | 68,637 | 70,683 | 70,566 | 71,786 | 72,828 |
| Efficiency | 121.09 | 140.84 | 107.49 | 116.93 | 128.52 | 126.46 | 115.60 | 126.00 |
| $M_n$ | 589 | 616 | 656 | 587 | 550 | 558 | 621 | 578 |
| $M_w$ | 927 | 1012 | 1026 | 900 | 835 | 848 | 974 | 911 |
| $M_z$ | 1328 | 1517 | 1424 | 1254 | 1173 | 1188 | 1373 | 1325 |
| $PD_n$ | 1.433 | 1.499 | 1.388 | 1.393 | 1.405 | 1.401 | 1.410 | 1.454 |
| $\sigma_n$ | 446 | 494 | 493 | 429 | 396 | 402 | 468 | 439 |
| $_n\alpha_3$ | 1.902 | 2.168 | 1.660 | 1.735 | 1.832 | 1.805 | 1.779 | 2.023 |
| $M_w$ 10% High | 2253 | 2629 | 2360 | 2100 | 1982 | 2003 | 2304 | 2267 |
| Theoretical yield | 2122 | | 2049 | | 2051 | | 2086 | |
| Solvent stripped polymer yield, (g) | 2040 | | 1960 | | 1947 | | 1989 | |
| yield % on styrene | 96.1% | | 95.6% | | 94.9% | | 95.4% | |
| Dimer stripped polymer yield, g | 1856 | | 1776 | | 1716 | | 1819 | |
| yield % on styrene | 87.5% | | 86.7% | | 83.7% | | 87.2% | |
| $M_n$ | 725 | | 764 | | 695 | | 701 | |
| $M_w$ | 1053 | | 1052 | | 935 | | 1007 | |
| $M_z$ | 1494 | | 1386 | | 1228 | | 1385 | |
| $PD_n$ | 1.452 | | 1.377 | | 1.345 | | 1.437 | |
| $\sigma_n$ | 488 | | 469 | | 408 | | 463 | |
| $_n\alpha_3$ | 2.089 | | 1.586 | | 1.681 | | 1.833 | |
| $M_w$ 10% High | 2602 | | 2307 | | 2064 | | 2355 | |

TABLE XIII

HMAPS Distributions Prepared at 90° C., 1065 to 950 RPM Mixing, with 100%
Recycle Solvents (Cyclohexane and Ethylbenzene) with the [DMEA⁻]₂Li₃H Catalyst.

| | Example | | | | | | |
|---|---|---|---|---|---|---|---|
| | 68 | 69 | 70 | 71 | 72 | 73 | 74 |
| Catalyst Aging Time (min) | 338 | 120 | 180 | 120 | 150 | 150 | 120 |
| Catalyst Combined intial RPM and psig | 800, 16-20 | 800, 16-20 | 800, 16-20 | 800, 16-20 | 800, 16-20 | 500, 16-20 | 200, 2 |
| H₂ (psig) | 13 | 14 | 16-17 (25) | 17 | 15-17 (18) | 14 | 9-11 |
| RPM (HMAPS Process) | 1000 | 1000 | 950 (1000) | 950 | 950 (975) | 950 | 1065 |
| Total Recycle Solvent (ml) | 498 | 498 | 498 | 498 | 500 | 500 | 500 |
| Cyclohexane (g) | 364.3 | 364.3 | 364.3 | 364.3 | 333.2 | 333.2 | 333.2 |
| Ethylbenzene g | 26.74 | 26.74 | 26.74 | 26.74 | 58.80 | 58.80 | 58.80 |
| DMEAH moles | 0.0282 | 0.0283 | 0.0285 | 0.0284 | 0.0285 | 0.0285 | 0.0285 |
| 2M n-Butyllithium (ml) | 21.40 | 21.42 | 21.42 | 21.47 | 21.42 | 21.47 | 21.47 |
| moles | 0.0428 | 0.0428 | 0.0428 | 0.0429 | 0.0428 | 0.0429 | 0.0429 |
| Styrene, g | 1040.1 | 1060.1 | 1045.0 | 890.0 | 1000.0 | 911.3 | 1041.8 |
| moles | 9.99 | 10.18 | 10.03 | 8.55 | 9.60 | 8.75 | 10.00 |
| vol, ml | 1144 | 1166 | 1150 | 979 | 1100 | 1003 | 1146 |
| feed rate ml/min | 9.40 | 9.40 | 9.00 | 9.00 | 9.00 | 9.00 | 9.70 |
| time of feed, min | 122 | 124 | 128 | 109 | 122 | 111 | 118 |
| feed rate g/min | 8.54 | 8.54 | 8.18 | 8.18 | 8.18 | 8.18 | 8.82 |
| mole Li/mole DMEAH | 1.52 | 1.52 | 1.50 | 1.51 | 1.50 | 1.51 | 1.51 |
| Initial LiH conc. (M) | 0.0282 | 0.0280 | 0.0276 | 0.0280 | 0.0275 | 0.0277 | 0.0277 |
| Final LiH conc. (M) | 0.009 | 0.009 | 0.009 | 0.010 | 0.009 | 0.010 | 0.009 |
| Initial LiH conc. (ppm) | 284 | 282 | 278 | 282 | 277 | 279 | 279 |
| Final LiH conc. (ppm) | 80 | 79 | 78 | 89 | 81 | 87 | 79 |
| mole styrene/mole LiH | 681.7 | 698.9 | 699.7 | 587.1 | 669.6 | 605.8 | 692.6 |
| mole sty/hr/mole LiH | 336.0 | 338.0 | 328.7 | 323.8 | 328.7 | 326.3 | 351.7 |
| mole styrene/mole of EB | 39.58 | 40.34 | 39.77 | 33.87 | 17.31 | 15.77 | 18.03 |
| mole styrene/hr/mole of EB | 19.51 | 19.51 | 18.68 | 18.68 | 8.50 | 8.50 | 9.16 |
| $M_{n\,calc}$ | 70,895 | 72,687 | 72,772 | 61,062 | 69,639 | 63,009 | 72,032 |
| Efficiency | 133.26 | 136.37 | 135.52 | 119.97 | 143.58 | 131.27 | 136.68 |

TABLE XIII-continued

HMAPS Distributions Prepared at 90° C., 1065 to 950 RPM Mixing, with 100%
Recycle Solvents (Cyclohexane and Ethylbenzene) with the [DMEA$^-$]$_2$Li$_3$H Catalyst.

|  | Example | | | | | | |
|---|---|---|---|---|---|---|---|
|  | 68 | 69 | 70 | 71 | 72 | 73 | 74 |
| $M_n$ | 532 | 533 | 537 | 509 | 485 | 480 | 527 |
| $M_w$ | 813 | 826 | 925 | 773 | 747 | 710 | 1021 |
| $M_z$ | 1167 | 1211 | 1559 | 1108 | 1133 | 1009 | 1878 |
| $PD_n$ | 1.435 | 1.466 | 1.685 | 1.433 | 1.517 | 1.421 | 1.839 |
| $\sigma_n$ | 387 | 395 | 456 | 367 | 356 | 332 | 510 |
| $_n\alpha_3$ | 2.000 | 2.139 | 2.985 | 2.007 | 2.462 | 2.025 | 3.407 |
| $M_w$ 10% High | 1992 | 2083 | 2802 | 1897 | 1965 | 1732 | 3323 |
| Theoretical yield |  | 2100 |  | 1935 |  | 1911 | 1042 |
| Solvent stripped polymer yield, (g) |  | 1993 |  | 1816 |  | 1787 | 959 |
| yield % on styrene |  | 94.9% |  | 93.9% |  | 93.5% | 92.0% |
| Dimer stripped polymer yield, g |  | 1787 |  | 1623 |  | 1574 | 852 |
| yield % on styrene |  | 85.1% |  | 83.9% |  | 82.4% | 81.8% |
| $M_n$ |  | 648 |  | 646 |  | 591 | 675 |
| $M_w$ |  | 899 |  | 939 |  | 817 | 1145 |
| $M_z$ |  | 1230 |  | 1404 |  | 1149 | 1946 |
| $PD_n$ |  | 1.387 |  | 1.454 |  | 1.382 | 1.696 |
| $\sigma_n$ |  | 403 |  | 435 |  | 365 | 563 |
| $_n\alpha_3$ |  | 1.955 |  | 2.614 |  | 2.285 | 3.101 |
| $M_w$ 10% High |  | 2111 |  | 2498 |  | 1998 | 3484 |

TABLE XIII

HMAPS Distributions Prepared at 80° C., 1130 RPM Mixing, with 100% Recycle Solvents
(Cyclohexane and Ethylbenzene) or with Fresh Methylcyclohexane (w/wo Ethylbenzene) with the
[DMEA$^-$]$_2$Li$_3$H Catalyst - Demonstrating the Offsetting Effects of Catalyst Concentration,
Solvent, H$_2$ pressure, Styrene Feed Rate and Mixing on the HMAPS MWD formed.

|  | Example | | | | |
|---|---|---|---|---|---|
|  | 75 | 76 | 77 | 78 | 79 |
| Feed tip Diameter (cm) | 0.12 | 0.12 | 0.12 | 0.12 | 0.051 |
| Feed tip Diameter (inches) | 0.045 | 0.045 | 0.045 | 0.045 | 0.020 |
| H$_2$, (psig) | 19 | 19-21 | 19-21 | 15 | 15-11 |
| Solvent | Recycle CH | Recycle CH | Recycle CH | MCH | MCH & EB |
| Cycloaliphatic hydrocarbon (g) | 399.9 | 227.1 | 320.2 | 396.4 | 246.4 |
| Ethylbenzene (g) | 70.56 | 39.40 | 71.73 | 0.00 | 156.00 |
| Total Solvent vol. (ml) | 600* | 500 | 500 | 515 | 500 |
| DMEAH, moles | 0.0286 | 0.0285 | 0.0285 | 0.0286 | 0.0286 |
| 2M n-Butyllithium vol (ml) | 21.52 | 21.48 | 21.48 | 21.52 | 21.52 |
| moles | 0.0430 | 0.0430 | 0.0430 | 0.0430 | 0.0430 |
| Styrene, g | 940.0 | 1041.8 | 941.8 | 941.8 | 1023.9 |
| moles | 9.03 | 10.00 | 9.04 | 9.04 | 9.83 |
| vol, ml | 1034 | 1146 | 1036 | 1036 | 1126 |
| feed rate ml/min | 10.00 | 10.00 | 9.40 | 9.40 | 10.00 |
| time of feed, min | 103 | 115 | 110 | 110 | 113 |
| feed rate g/min | 9.09 | 9.09 | 8.54 | 8.54 | 9.09 |
| mole Li/mole DMEAH | 1.50 | 1.51 | 1.51 | 1.50 | 1.50 |
| Initial LiH conc. (M) | 0.0232 | 0.0278 | 0.0278 | 0.0269 | 0.0277 |
| Final LiH conc. (M) | 0.009 | 0.009 | 0.010 | 0.010 | 0.009 |
| Initial LiH conc. (ppm) | 234 | 278 | 280 | 276 | 272 |
| Final LiH conc. (ppm) | 80 | 79 | 85 | 85 | 79 |
| mole styrene/mole LiH | 625.3 | 691.4 | 625.0 | 626.5 | 681.1 |
| mole sty/hr/mole LiH | 362.8 | 361.9 | 340.2 | 341.0 | 362.8 |
| mole styrene/mole of EB | 13.56 | 26.91 | 13.36 | n.a. | 6.68 |
| mole styrene/hr/mole of EB | 7.87 | 14.09 | 7.27 | n.a. | 3.56 |
| $M_{n\,calc}$ | 65,035 | 71,904 | 65,002 | 65,159 | 70,839 |
| Efficiency | 115.31 | 120.24 | 109.99 | 123.88 | 138.63 |
| $M_n$ | 564 | 598 | 591 | 526 | 511 |
| $M_w$ | 889 | 941 | 907 | 831 | 767 |
| $M_z$ | 1313 | 1359 | 1268 | 1255 | 1096 |
| $PD_n$ | 1.477 | 1.444 | 1.398 | 1.510 | 1.429 |
| $\sigma_n$ | 428 | 453 | 432 | 401 | 362 |
| $_n\alpha_3$ | 2.151 | 1.969 | 1.761 | 2.332 | 2.020 |
| $M_w$ 10% High | 2260 | 2307 | 2125 | 2186 | 1871 |
| Theoretical yield | 940 | 1042 | 942 | 942 | 1024 |
| Solvent stripped polymer yield, (g) | 896 | 994 | 899 | 884 | 961 |
| yield % on styrene | 95.3% | 95.4% | 95.5% | 93.9% | 93.9% |

TABLE XIII-continued

HMAPS Distributions Prepared at 80° C., 1130 RPM Mixing, with 100% Recycle Solvents (Cyclohexane and Ethylbenzene) or with Fresh Methylcyclohexane (w/wo Ethylbenzene) with the [DMEA$^-$]$_2$Li$_3$H Catalyst - Demonstrating the Offsetting Effects of Catalyst Concentration, Solvent, H$_2$ pressure, Styrene Feed Rate and Mixing on the HMAPS MWD formed.

| | Example | | | | |
|---|---|---|---|---|---|
| | 75 | 76 | 77 | 78 | 79 |
| Dimer stripped polymer yield, g | 810 | 918 | 837 | 793 | 871 |
| yield % on styrene | 86.2% | 88.1% | 88.9% | 84.2% | 85.1% |
| $M_n$ | 676 | 708 | 682 | 665 | 627 |
| $M_w$ | 964 | 1004 | 946 | 940 | 855 |
| $M_z$ | 1354 | 1380 | 1242 | 1347 | 1163 |
| $PD_n$ | 1.426 | 1.418 | 1.387 | 1.414 | 1.364 |
| $\sigma_n$ | 441 | 458 | 424 | 428 | 378 |
| $_n\alpha_3$ | 2.079 | 1.886 | 1.515 | 2.341 | 1.999 |
| $M_w$ 10% High | 2346 | 2354 | 2056 | 2364 | 1995 |

TABLE IV

LOXLiH catalyst process Examples with ca. ½ styrene monomer feed without use of a promotor (i.e. TMEDA free).

| | Example | | | | | | | |
|---|---|---|---|---|---|---|---|---|
| | 6 | 7 | 8 | 9 | 10 | 11 | 12 | 13 |
| Temp Catalyst Initially Formed (° C.) | 20 | 34 | 40 | 40 | 55 | 40 | 40 | 35 |
| Rxn. Temperature (° C.) | 80 | 80 | 80 | 80 | 80 | 80 | 80 | 80 |
| Hydrogen (PSIG) | 59-31 | 59-31 | 65-31 | 17-36 | 15-17 | 15 | 15 | 15 |
| Cyclohexane (g) | 311.6 | 311.6 | 311.6 | 311.6 | 311.6 | 311.6 | 311.6 | 311.6 |
| vol. (ml) | 400 | 400 | 400 | 400 | 400 | 400 | 400 | 400 |
| DMEAH (g) | 2.34 | 2.38 | 3.40 | 3.42 | 2.37 | 4.60 | 4.60 | 4.60 |
| moles | 0.0263 | 0.0267 | 0.0381 | 0.0384 | 0.0266 | 0.0516 | 0.0516 | 0.0516 |
| Ethylbenzene (g) | 106.00 | 106.00 | 106.00 | 110.00 | 120.00 | 100.00 | 100.00 | 100.00 |
| moles | 1.00 | 1.00 | 1.00 | 1.04 | 1.13 | 0.94 | 0.94 | 0.94 |
| vol. (ml) | 122 | 122 | 122 | 127 | 138 | 115 | 115 | 115 |
| n-Butyllithium, M | 2.0 | 2.0 | 2.0 | 2.0 | 2.0 | 2.0 | 2.0 | 2.0 |
| vol. (ml) | 28.59 | 29.25 | 28.59 | 29.23 | 20.28 | 39.28 | 39.02 | 38.87 |
| moles | 0.0572 | 0.0585 | 0.0572 | 0.0585 | 0.0406 | 0.0786 | 0.0780 | 0.0777 |
| Styrene, g | 447.0 | 452.6 | 471.0 | 519.5 | 546.5 | 512.8 | 406.2 | 219.5 |
| moles | 4.29 | 4.35 | 4.52 | 4.99 | 5.25 | 4.92 | 3.90 | 2.11 |
| vol. (ml) | 492 | 498 | 518 | 572 | 601 | 564 | 447 | 241 |
| feed rate (ml/min.) | 7.00 | 5.00 | 5.00 | 5.00 | 5.00 | 7.00 | 5.57 | 4.00 |
| time of feed (min.) | 70.2 | 99.6 | 103.6 | 114.3 | 120.2 | 80.6 | 80.2 | 60.4 |
| feed rate (g/min.) | 6.36 | 4.55 | 4.55 | 4.55 | 4.55 | 6.36 | 5.06 | 3.64 |
| feed velocity (ft/sec.) | 1.89 | 1.35 | 1.35 | 1.35 | 1.35 | 1.89 | 1.50 | 1.08 |
| Process Scale-Up Parameters | | | | | | | | |
| mole organolithium/mole DMEAH | 2.18 | 2.19 | 1.50 | 1.52 | 1.53 | 1.52 | 1.51 | 1.51 |
| Initial LiH* conc. ppm | 0.056 | 0.058 | 0.035 | 0.036 | 0.025 | 0.049 | 0.048 | 0.047 |
| Initial LiH* conc. M | 556 | 571 | 342 | 357 | 247 | 480 | 471 | 465 |
| Final LiH* conc. ppm | 277 | 282 | 166 | 165 | 112* | 223 | 247 | 312 |
| Final LiH* conc., M | 0.028 | 0.029 | 0.017 | 0.017 | 0.011* | 0.023 | 0.025 | 0.032 |
| mole styrene/mole LiH* | 138.8 | 136.7 | 237.5 | 248.1 | 375.3 | 182.7 | 147.5 | 80.7 |
| mole sty/hr/mole LiH* | 118.5 | 82.4 | 137.5 | 130.3 | 187.3 | 136.0 | 110.3 | 80.2 |
| mole styrene/mole of EB | 4.29 | 4.35 | 4.52 | 4.81 | 4.64 | 5.22 | 4.13 | 2.23 |
| mole styrene/hr/mole of EB | 3.67 | 2.62 | 2.62 | 2.52 | 2.31 | 3.89 | 3.09 | 2.22 |
| $M_{n\ calc}$ | 14,433 | 14,217 | 24,706 | 25,808 | 39,037 | 18,999 | 15,343 | 8390 |
| % Efficiency ($M_{n\ calc}/M_n$) · 100% | 3600% | 4000% | 6640% | 6520% | 8070% | 5280% | 4420% | 2640% |
| Solvent stripped polymer yield (g) | 777 | | | 1306 | | | 910 | |
| yield % on monomer | 86.4% | | | 85.0% | | | 79.9% | |
| $M_n$ | 402 | 356 | 372 | 396 | 484 | 360 | 347 | 318 |
| $M_w$ | 564 | 476 | 513 | 601 | 4722 | 506 | 462 | 408 |
| $M_z$ | 809 | 663 | 728 | 1002 | 38108* | 746 | 641 | 545 |
| $PD_n$ | 1.434 | 1.393 | 1.419 | 1.667 | 8.070 | 1.474 | 1.387 | 1.336 |
| $\sigma_n$ | 255 | 207 | 229 | 285 | 1432 | 229 | 200 | 169 |
| $_n\alpha_3$ | 2.402 | 2.447 | 2.407 | 3.456 | 28.594* | 2.695 | 2.438 | 2.323 |
| Dimer strip. polymer yield (g) | 575.34 | | | 1015.71 | | | 606.32 | |
| yield % on monomer | 64% | | | 66% | | | 53% | |
| $M_n$ | 519 | | | 578 | | | 494 | |
| $M_w$ | 639 | | | 2556 | | | 602 | |
| $M_z$ | 826 | | | 31565 | | | 761 | |

TABLE IV-continued

LOXLiH catalyst process Examples with ca. ½ styrene monomer feed without use of a promotor (i.e. TMEDA free).

| | Example | | | | | | | |
|---|---|---|---|---|---|---|---|---|
| | 6 | 7 | 8 | 9 | 10 | 11 | 12 | 13 |
| $PD_n$ | | 1.231 | | 4.422 | | | 1.219 | |
| $\sigma_n$ | | 250 | | 1069 | | | 231 | |
| $_n\alpha_3$ | | 2.391 | | 36.368* | | | 2.166 | |

*Hydrogen uptake became exceedingly slow during the last 25 minutes of monomer feed consequently a high molecular weight tail formed as part of the MWD.

The invention claimed is:

1. A polystyrene composition comprising a hydrogen mediated anionic polymerization of styrene (HMAPS) polystyrene, the polystyrene having a polymer microstructure greater than 97 wt % head to tail microstructure as depicted by the following polymeric structure:

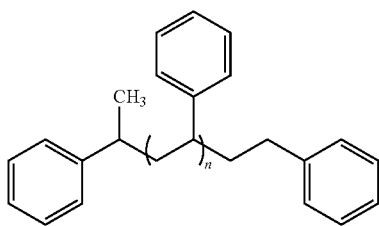

and having a polymer chain length distributions wherein less than 3.0% of the polymer chains have one or more quaternary carbons in the polymer microstructure and coproduct distribution(s) arising from a fragmentation polymerization processes, wherein the microstructure and purity of the chain length distribution is determined vide infra from gas chromatographic analyses of the lowest molecular weight chains obtained from the HMAPS distributions, where n=0 to n=2.

2. The polystyrene composition of claim 1, wherein the polymer microstructure is greater than 98 wt % head to tail, and polymer chain length distributions is less than 2.0 wt % of the polymer chains have one or more quaternary carbons in the polymer microstructure and coproduct distribution(s) arising from a fragmentation polymerization process.

3. The polystyrene composition of claim 1, wherein the polymer microstructure is greater than 99 wt % head to tail, and polymer chain length distributions is less than 1.0 wt % of the polymer chains have one or more quaternary carbons in the polymer microstructure and coproduct distribution(s) arising from a fragmentation polymerization process.

4. The polystyrene composition of claim 1, wherein the HMAPS polystyrene has a molecular weight distribution as measured by GPC (UV detector) analysis of the chain length distribution characterized by having $M_n$ in the range of from about 315 to about 934 Daltons; a $M_w$ in the range of from about 392 to about 1705 Daltons; and a $M_z$ is in the range of about 512 to about 2930 Daltons; a $PD_n$ is in the range of about 1.24 to about 1.82; with a standard deviation in the range of about 156 to about 849 Daltons and the asymmetry in the range of about 1.40 to about 3.00.

5. The polystyrene composition of claim 1, wherein the HMAPS polystyrene has a molecular weight distribution as measured by GPC (UV detector) analysis of the chain length distribution characterized by having $M_n$ is in the range of from about 400 to about 800 Daltons; $M_w$ in the range of from about 600 to about 1200 Daltons; a $PD_n$ in the range of about 1.35 to about 1.75; a standard deviation in the range of about 270 to about 550 Daltons and $M_w$ 10% High of less than about 3300 Daltons.

6. The polystyrene composition of claim 1, wherein the HMAPS polystyrene has a molecular weight distribution as measured by GPC (UV detector) analysis of the chain length distribution characterized by having $M_n$ in the range of from about 400 to about 800 Daltons; $M_w$ in the range of from about 600 to about 1200 Daltons; $M_z$ in the range of about 750 to about 1500 Daltons; $PD_n$ in the range of about 1.35 to about 1.75; standard deviation in the range of about 270 to about 550 Daltons; the asymmetry is in the range of about 1.60 to about 2.2; and $M_w$ 10% High of less than about 2400 Daltons.

7. A brominated polystyrene composition comprising a bromination product of a hydrogen mediated anionic polymerization of styrene (HMAPS) polystyrene, wherein the HMAPS polystyrene has a polymer microstructure that is greater than 97 wt % head to tail microstructure as depicted by the following polymeric structure:

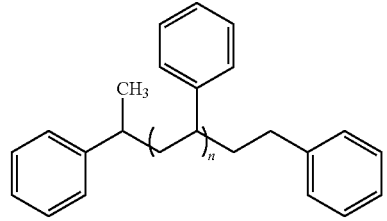

and having a polymer chain length distributions wherein less than 3.0% of the polymer chains have one or more quaternary carbons in the polymer microstructure and coproduct distribution(s) arising from a fragmentation polymerization processes, wherein the microstructure and purity of the chain length distribution is determined vide infra from gas chromatographic analyses of the lowest molecular weight chains obtained from the HMAPS distributions, where n=0 to n=2.

8. The brominated polystyrene of claim 7, wherein the polymer microstructure is greater than 98 wt % head to tail, and polymer chain length distributions is less than 2.0 wt % of the polymer chains have one or more quaternary carbons in the polymer microstructure and coproduct distribution(s) arising from a fragmentation polymerization processes.

9. The brominated polystyrene composition of claim 7, wherein the HMAPS polystyrene has a molecular weight distribution as measured by GPC (UV detector) analysis of the chain length distribution characterized by having $M_n$ in the range of from about 315 to about 934 Daltons; a $M_w$ in the range of from about 392 to about 1705 Daltons; and a $M_z$ is in the range of about 512 to about 2930 Daltons; a $PD_n$ is in the range of about 1.24 to about 1.82; with a standard deviation in the range of about 156 to about 849 Daltons and the asymmetry is in the range of about 1.40 to about 3.00.

10. The brominated polystyrene composition of claim 7, wherein the HMAPS polystyrene has a molecular weight distribution as measured by GPC (UV detector) analysis of the chain length distribution characterized by having $M_n$ is in the range of from about 400 to about 800 Daltons; $M_w$ in the range of from about 600 to about 1200 Daltons; a $PD_n$ in the range of about 1.35 to about 1.75; a standard deviation in the range of about 270 to about 550 Daltons and $M_w$ 10% High of less than about 3300 Daltons.

11. The brominated polystyrene composition of claim 7, wherein the HMAPS polystyrene has a molecular weight distribution as measured by GPC (UV detector) analysis of the chain length distribution characterized by having $M_n$ in the range of from about 400 to about 800 Daltons; $M_w$ in the range of from about 600 to about 1200 Daltons; $M_z$ in the range of about 750 to about 1500 Daltons; $PD_n$ in the range of about 1.35 to about 1.75; standard deviation in the range of about 270 to about 550 Daltons; the asymmetry is in the range of about 1.60 to about 2.2; and $M_w$ 10% High of less than about 2400 Daltons.

12. The brominated polystyrene composition of claim 7, wherein the brominated polystyrene has one or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

13. The brominated polystyrene composition of claim 7, wherein the brominated polystyrene has two or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

14. The brominated polystyrene composition of claim 7, wherein the brominated polystyrene has (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

15. The brominated polystyrene composition of claim 9, wherein the brominated polystyrene has one or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

16. The brominated polystyrene composition of claim 9, wherein the brominated polystyrene has two or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

17. The brominated polystyrene composition of claim 9, wherein the brominated polystyrene has (i) a bromine content in the range of about 73 wt % to about 77 wt % based on the total weight of brominated polystyrene; (ii) a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

18. The brominated polystyrene composition of claim 8, wherein the HMAPS polystyrene has a molecular weight distribution as measured by GPC (UV detector) analysis of the chain length distribution characterized by having $M_n$ in the range of from about 315 to about 934 Daltons; a $M_w$ in the range of from about 392 to about 1705 Daltons; and a $M_z$ is in the range of about 512 to about 2930 Daltons; a $PD_n$ is in the range of about 1.24 to about 1.82; with a standard deviation in the range of about 156 to about 849 Daltons and the asymmetry is in the range of about 1.40 to about 3.00.

19. The brominated polystyrene composition of claim 18, wherein the brominated polystyrene has one or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

20. The brominated polystyrene composition of claim 18, wherein the brominated polystyrene has two or more of (i) a bromine content in the range of about 73 wt % to about 77 wt % based on the total weight of brominated polystyrene; (ii), a thermal HBr value at 300° C. below the detection limit of 50 ppm and no more than about 1000 ppm based upon the total weight of the brominated polystyrene; (iii) a thermogravimetric (TGA) weight loss of 5% occurring at a temperature greater than about 355° C. to about 375° C.; and (iv) a glass transition temperature in the range of about 110° C. to about 155° C.

* * * * *